US012583947B2

(12) United States Patent (10) Patent No.: US 12,583,947 B2
Yoshida et al. (45) **Date of Patent: *Mar. 24, 2026**

(54) METHOD FOR PRODUCING FLUOROPOLYMER

(71) Applicant: DAIKIN INDUSTRIES, LTD., Osaka (JP)

(72) Inventors: Hirotoshi Yoshida, Osaka (JP); Taketo Kato, Osaka (JP); Kenji Ichikawa, Osaka (JP); Yohei Fujimoto, Osaka (JP); Yoshinori Nanba, Osaka (JP); Kengo Ito, Osaka (JP); Masahiro Higashi, Osaka (JP); Satoru Yoneda, Osaka (JP); Akiyoshi Yamauchi, Osaka (JP); Sumi Ishihara, Osaka (JP); Moe Hosokawa, Osaka (JP); Marina Nakano, Osaka (JP); Yuuji Tanaka, Osaka (JP); Yosuke Kishikawa, Osaka (JP); Hirokazu Aoyama, Osaka (JP); Masamichi Sukegawa, Osaka (JP); Taku Yamanaka, Osaka (JP); Hiroyuki Sato, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 275 days.

This patent is subject to a terminal disclaimer.

(21) Appl. No.: 16/978,395

(22) PCT Filed: Mar. 7, 2019

(86) PCT No.: PCT/JP2019/009130
§ 371 (c)(1),
(2) Date: Sep. 4, 2020

(87) PCT Pub. No.: WO2019/172382
PCT Pub. Date: Sep. 12, 2019

(65) Prior Publication Data
US 2021/0095054 A1 Apr. 1, 2021

(30) Foreign Application Priority Data

Mar. 7, 2018 (JP) .................................. 2018-041337

(51) Int. Cl.
| | |
|---|---|
| *C08F 2/20* | (2006.01) |
| *C08F 2/26* | (2006.01) |
| *C08F 4/34* | (2006.01) |
| *C08F 4/40* | (2006.01) |
| *C08F 14/26* | (2006.01) |
| *C08F 214/22* | (2006.01) |
| *C08F 214/26* | (2006.01) |
| *C08K 5/09* | (2006.01) |

(52) U.S. Cl.
CPC .................. *C08F 2/20* (2013.01); *C08F 2/26* (2013.01); *C08F 4/34* (2013.01); *C08F 4/40*
(2013.01); *C08F 14/26* (2013.01); *C08F 214/22* (2013.01); *C08F 214/26* (2013.01); *C08K 5/09* (2013.01)

(58) Field of Classification Search
None
See application file for complete search history.

(56) References Cited

U.S. PATENT DOCUMENTS

| | | | | |
|---|---|---|---|---|
| 2,559,752 A | * | 7/1951 | Berry ...................... | C08F 14/18 |
| | | | | 564/510 |
| 4,058,578 A | * | 11/1977 | Kuhls ................... | C08F 259/08 |
| | | | | 525/276 |
| 6,277,936 B1 | | 8/2001 | Abusleme et al. | |
| 8,563,670 B2 | | 10/2013 | Brothers et al. | |
| 9,074,025 B2 | | 7/2015 | Brothers et al. | |
| 9,255,164 B2 | | 2/2016 | Brothers et al. | |
| 2007/0149695 A1 | | 6/2007 | Hintzer et al. | |
| 2008/0114121 A1 | | 5/2008 | Brothers et al. | |
| 2012/0116015 A1 | | 5/2012 | Brothers et al. | |
| 2013/0303716 A1 | * | 11/2013 | Brothers ............... | C08F 114/26 |
| | | | | 526/255 |
| 2014/0187728 A1 | | 7/2014 | Yamamoto et al. | |
| 2015/0299341 A1 | | 10/2015 | Nanba | |
| 2018/0201708 A1 | * | 7/2018 | Yagi ........................ | C08L 27/18 |
| 2018/0230245 A1 | | 8/2018 | Musio et al. | |
| 2018/0371121 A1 | * | 12/2018 | Hintzer ................ | C09D 127/18 |
| 2021/0108008 A1 | | 4/2021 | Kato et al. | |

FOREIGN PATENT DOCUMENTS

| | | | | |
|---|---|---|---|---|
| CN | 103842389 A | 6/2014 | | |
| CN | 104884476 A | 9/2015 | | |
| CN | 107001509 A | 8/2017 | | |
| EP | 2 084 195 B1 | 6/2011 | | |
| EP | 3 243 851 A1 | 11/2017 | | |
| EP | 3 862 368 A1 | 8/2021 | | |
| JP | 2001-040042 A | 2/2001 | | |
| JP | 2009-521586 A | 6/2009 | | |
| JP | 2010-509444 A | 3/2010 | | |
| JP | 2016-130328 A | 7/2016 | | |
| JP | 2017-534716 A | 11/2017 | | |
| WO | 2008/060463 A1 | 5/2008 | | |
| WO | 2013/051668 A1 | 4/2013 | | |
| WO | WO-2017069069 A1 | * | 4/2017 | ............... C08F 2/26 |
| WO | 2018/181904 A1 | 10/2018 | | |

OTHER PUBLICATIONS

Extended European Search Report dated Nov. 4, 2021, issued by the European Patent Office in corresponding application No. 19764428. 9.

(Continued)

*Primary Examiner* — Mark Eashoo
*Assistant Examiner* — Caitlin Norine Illing
(74) *Attorney, Agent, or Firm* — Sughrue Mion, PLLC

(57) ABSTRACT

A method for producing a fluoropolymer, which includes polymerizing a fluoromonomer in an aqueous medium in the presence of a surfactant to provide a fluoropolymer, wherein the surfactant is a carboxylic acid type hydrocarbon-containing surfactant.

14 Claims, No Drawings

(56)     References Cited

OTHER PUBLICATIONS

International Preliminary Report on Patentability with a Translation of Written Opinion in International Application No. PCT/JP2019/009130, issued on Sep. 8, 2020.
International Search Report for PCT/JP2019/009130 dated Jun. 4, 2019.

* cited by examiner

METHOD FOR PRODUCING FLUOROPOLYMER

CROSS-REFERENCE TO RELATED APPLICATIONS

This application is a National Stage of International Application No. PCT/JP2019/009130 filed Mar. 7, 2019, which claims priority under U.S.C. § 119(a) to Japanese Patent Application No. JP 2018-041337 filed Mar. 7, 2018.

TECHNICAL FIELD

The present invention relates to a method for producing a fluoropolymer.

BACKGROUND ART

Fluorinated anion surfactants have been used in the production of fluoropolymers by emulsion polymerization. Recently, it has been proposed to use hydrocarbon-containing surfactants instead of the fluorinated anion surfactants (see, for example, Patent Documents 1 to 3).

RELATED ART

Patent Documents

Patent Document 1: U.S. Pat. No. 9,255,164
Patent Document 2: U.S. Pat. No. 8,563,670
Patent Document 3: U.S. Pat. No. 9,074,025

SUMMARY OF THE INVENTION

Problem to be Solved by the Invention

An object of the present invention is to provide a novel method for producing a fluoropolymer.

Means for Solving the Problem

The present invention provides a method for producing a fluoropolymer, comprising polymerizing a fluoromonomer in an aqueous medium in the presence of a surfactant to provide a fluoropolymer, wherein the surfactant is a carboxylic acid type hydrocarbon-containing surfactant.

The production method of the present invention preferably further comprises drying the fluoropolymer obtained in the polymerization at 155° C. or higher.

In the polymerization, the fluoromonomer is preferably polymerized in an aqueous medium substantially free from a nonionic surfactant. In the polymerization, the carboxylic acid type hydrocarbon-containing surfactant at the initial stage of polymerization is preferably in an amount of greater than 50 ppm based on the aqueous medium.

In the polymerization, a polymerization initiator is preferably added to the aqueous medium.

The polymerization initiator is preferably a redox initiator. The polymerization initiator is also preferably a radical polymerization initiator.

The carboxylic acid type hydrocarbon-containing surfactant is preferably free from a carbonyl group which is not in a carboxyl group.

In the polymerization, the carboxylic acid type hydrocarbon-containing surfactant is preferably added to the aqueous medium when the concentration of fluoropolymer particles formed in the aqueous medium is 0.36% by mass or less.

In the polymerization, the carboxylic acid type hydrocarbon-containing surfactant is preferably added to the aqueous medium before the initiation of polymerization.

In the polymerization, it is preferable that the polymerization temperature is 30 to 100° C., and that the polymerization pressure is 0.5 to 5.0 MPa.

In the polymerization, it is preferable that the polymerization temperature is 30 to 100° C., that the polymerization pressure is 0.5 to 5.0 MPa, and that the polymerization initiator is a redox initiator.

In the polymerization, it is preferable that the polymerization temperature is 30 to 100° C., that the polymerization pressure is 0.5 to 5.0 MPa, that the polymerization initiator is a redox initiator, and that the carboxylic acid type hydrocarbon-containing surfactant is added to the aqueous medium before the initiation of polymerization or when the concentration of fluoropolymer particles formed in the aqueous medium is 0.36% by weight or less.

In the polymerization, it is preferable that the polymerization temperature is 30 to 100° C., that the polymerization pressure is 0.5 to 5.0 MPa, that the polymerization initiator is a redox initiator, and that the carboxylic acid type hydrocarbon-containing surfactant is free from a carbonyl group which is not in a carboxyl group.

In the polymerization, it is preferable that the polymerization temperature is 30 to 100° C., that the polymerization pressure is 0.5 to 5.0 MPa, and that the carboxylic acid type hydrocarbon-containing surfactant is added to the aqueous medium before the initiation of polymerization or when the concentration of fluoropolymer particles formed in the aqueous medium is 0.36% by mass or less.

In the polymerization, it is preferable that the polymerization initiator is a redox initiator, that the polymerization temperature is 30 to 100° C., that the polymerization pressure is 0.5 to 5.0 MPa, and that the carboxylic acid type hydrocarbon-containing surfactant is added to the aqueous medium when the concentration of fluoropolymer particles formed in the aqueous medium is 0.36% by mass or less.

In the polymerization, it is preferable that the polymerization initiator is a redox initiator, that the polymerization temperature is 30 to 100° C., that the polymerization pressure is 0.5 to 5.0 MPa, and that the carboxylic acid type hydrocarbon-containing surfactant is added to the aqueous medium before the initiation of polymerization.

In the polymerization, it is preferable that the polymerization temperature is 30 to 100° C., that the polymerization pressure is 0.5 to 5.0 MPa, and that the carboxylic acid type hydrocarbon-containing surfactant is free from a carbonyl group which is not in a carboxyl group.

In the polymerization, it is preferable that the polymerization temperature is 30 to 100° C., that the polymerization pressure is 0.5 to 5.0 MPa, that the carboxylic acid type hydrocarbon-containing surfactant is added to the aqueous medium before the initiation of polymerization or when the concentration of fluoropolymer particles formed in the aqueous medium is 0.36% by mass or less, and that the carboxylic acid type hydrocarbon-containing surfactant is free from a carbonyl group which is not in a carboxyl group.

In the polymerization, it is preferable that the polymerization pressure is 1.5 MPa or higher, and that the polymerization initiator is a redox initiator.

The carboxylic acid type hydrocarbon-containing surfactant is preferably a compound of the following formula (A):

$$R\text{—}COO\text{-}M \qquad (A)$$

wherein R is an alkyl group, an alkenyl group, an alkylene group, or an alkenylene group containing 2 to 29 carbon atoms, each of which optionally contains an ether bond; M is H, a metal atom, $NR^{11}_4$, imidazolium optionally having a substituent, pyridinium optionally having a substituent, or phosphonium optionally having a substituent; and $R^{11}$ is the same or different and is H or an organic group having 1 to 10 carbon atoms.

In the formula (A), R is preferably an alkyl group or an alkenyl group, each of which optionally contains an ether group.

It is preferable that the polymerization provides a fluoropolymer aqueous dispersion, and that the fluoropolymer aqueous dispersion is substantially free from a compound represented by the following general formula (3), and contains greater than 20 ppm, based on the fluoropolymer, of a compound represented by the following general formula (4).

$$(H—(CF_2)_8—SO_3)_qM^2 \qquad \text{General Formula (3)}$$

wherein $M^2$ is H, a metal atom, $NR^{11}_4$, imidazolium optionally having a substituent, pyridinium optionally having a substituent, or phosphonium optionally having a substituent; q is 1 or 2; and $R^{11}$ is the same or different and is H or an organic group having 1 to 10 carbon atoms.

$$(H—(CF_2)_7—COO)_pM^1 \qquad \text{General Formula (4)}$$

wherein $M^1$ is H, a metal atom, $NR^5_4$, imidazolium optionally having a substituent, pyridinium optionally having a substituent, or phosphonium optionally having a substituent; and p is 1 or 2.

Effects of Invention

The production method of the present invention can produce a novel fluoropolymer.

DESCRIPTION OF EMBODIMENTS

Before describing the present invention in detail, some terms used herein are defined or described below.

The fluhororesin as used herein means a partially crystalline fluoropolymer which is a fluoroplastic. The fluororesin has a melting point and has thermoplasticity, and may be either melt-fabricable or non melt-processable.

The melt-fabricable as used herein means that a polymer has an ability to be processed in a molten state using a conventional processing device such as an extruder or an injection molding machine. Thus, a melt-fabricable fluororesin usually has a melt flow rate of 0.01 to 500 g/10 min as measured by the measurement method to be described later.

The fluoroelastomer as used herein means an amorphous fluoropolymer. The term "amorphous" means that a fluoropolymer has a melting peak ($\Delta H$) of 4.5 J/g or lower as determined by differential scanning calorimetry (DSC) (temperature-increasing rate: 10° C./min) or differential thermal analysis (DTA) (temperature-increasing rate: 10° C./min). The fluoroelastomer exhibits elastomeric characteristics when crosslinked. The elastomeric characteristics mean that a polymer has an ability to be stretched and to retain its original length when the force required to stretch the polymer is no longer applied.

The partially fluorinated elastomer as used herein means a fluoropolymer containing a fluoromonomer unit, having a perfluoromonomer unit content of less than 90 mol % based on all polymerized units, having a glass transition temperature of 20° C. or lower, and having a melting peak ($\Delta H$) of 4.5 J/g or lower.

The perfluoroelastomer as used herein means a fluoropolymer having a perfluoromonomer unit content of 90 mol % or more based on all polymerized units, having a glass transition temperature of 20° C. or lower, having a melting peak ($\Delta H$) of 4.5 J/g or lower, and having a fluorine atom concentration in the fluoropolymer of 71% by mass or more. The fluorine atom concentration in the fluoropolymer as used herein is the concentration (% by mass) of the fluorine atoms contained in the fluoropolymer calculated based on the type and content of each monomer constituting the fluoropolymer.

The perfluoromonomer as used herein means a monomer free from a carbon-hydrogen bond in the molecule. The perfluoromonomer may be a monomer containing carbon atoms and fluorine atoms in which some of the fluorine atoms bonded to any of the carbon atoms are replaced by chlorine atoms, and may be a monomer containing a nitrogen atom, an oxygen atom, a sulfur atom, a phosphorus atom, a boron atom, or a silicon atom in addition to the carbon atoms. The perfluoromonomer is preferably a monomer in which all hydrogen atoms are replaced by fluorine atoms. The perfluoromonomer does not encompass a monomer that provides a crosslinking site.

The monomer that provides a crosslinking site is a monomer (cure-site monomer) having a crosslinkable group that provides the fluoropolymer with a crosslinking site for forming a crosslink with the curing agent.

The polytetrafluoroethylene (PTFE) as used herein is preferably a fluoropolymer having a tetrafluoroethylene content of 99 mol % or more based on all polymerized units.

The fluororesin other than polytetrafluoroethylene and the fluoroelastomer as used herein are each preferably a fluoropolymer having a tetrafluoroethylene content of less than 99 mol % based on all polymerized units.

The content of each monomer constituting the fluoropolymer can be calculated herein by any appropriate combination of NMR, FT-IR, elemental analysis, and X-ray fluorescence analysis in accordance with the type of the monomer.

The term "organic group" as used herein means a group containing one or more carbon atoms or a group obtainable by removing one hydrogen atom from an organic compound.

Examples of the "organic group" include:

an alkyl group optionally having one or more substituents, an alkenyl group optionally having one or more substituents, an alkynyl group optionally having one or more substituents, a cycloalkyl group optionally having one or more substituents, a cycloalkenyl group optionally having one or more substituents, a cycloalkadienyl group optionally having one or more substituents, an aryl group optionally having one or more substituents, an aralkyl group optionally having one or more substituents, a non-aromatic heterocyclic group optionally having one or more substituents, a heteroaryl group optionally having one or more substituents, a cyano group, a formyl group, $R^aO$—, $R^aCO$—, $R^aSO_2$—, $R^aCOO$—, R$^a$NRaCO—, R$^a$CONRa—, R$^a$OCO—, R$^a$OSO$_2$—, and R$^a$NRbSO$_2$—, wherein each R$^a$ is independently an alkyl group optionally having one or more substituents, an alkenyl group optionally having one or more substituents, an alkynyl group optionally having one or more substituents, a cycloalkyl group optionally having one or more substituents, a cycloalkenyl group optionally having one or more substituents, a cycloalkadienyl group optionally having one or more substituents, an aryl group optionally having one or more substituents, an aralkyl group optionally having one or more substituents, a non-aromatic heterocyclic group optionally having one or more substituents, or a heteroaryl group optionally having one or more substituents, and each R$^b$ is independently H or an alkyl group optionally having one or more substituents.

The organic group is preferably an alkyl group optionally having one or more substituents.

The term "substituent" as used herein means a group capable of replacing another atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoyl amino group, a halogen atom, a sulfamoyl carbamoyl group, a carbamoyl sulfamoyl group, a dialiphatic oxyphosphinyl group, and a diaromatic oxyphosphinyl group.

The ranges expressed by the endpoints as used herein each include all numerical values within the range (for example, the range of 1 to 10 includes 1.4, 1.9, 2.33, 5.75, 9.98, and the like).

The phrase "at least one" as used herein includes all numerical values equal to or greater than 1 (e.g., at least 2, at least 4, at least 6, at least 8, at least 10, at least 25, at least 50, at least 100, and the like).

The present invention will be specifically described hereinbelow.

A production method of the present invention comprises polymerizing a fluoromonomer in an aqueous medium in the presence of a surfactant to provide a fluoropolymer, wherein the surfactant is a carboxylic acid type hydrocarbon-containing surfactant.

In conventional fluoropolymer polymerization, sulfonic acid type hydrocarbon-containing surfactants have been used, but fluoromonomer polymerization using carboxylic acid type hydrocarbon-containing surfactants has not been performed.

As a result of diligent studies, the present inventors have found that the use of a carboxylic acid type hydrocarbon-containing surfactant provides a fluoropolymer with high emulsion stability, little adhesion, and high yield, thereby completing the present invention.

The carboxylic acid type hydrocarbon-containing surfactant is usually an anion surfactant having a hydrophilic moiety formed of carboxylate and a hydrophobic moiety which is a long chain hydrocarbon moiety such as alkyl.

Examples of the carboxylic acid type hydrocarbon-containing surfactant include a compound represented by the following formula:

$$R^{10}—COOM$$

wherein R$^{10}$ is a monovalent organic group containing 1 or more carbon atoms; M is H, a metal atom, NR$^{11}_4$, imidazolium optionally having a substituent, pyridinium optionally having a substituent, or phosphonium optionally having a substituent, wherein R$^{11}$ is H or an organic group and may be the same or different. R$^{11}$ is preferably H or a C$_{1-10}$ organic group, and more preferably H or a C$_{1-4}$ organic group.

From the viewpoint of surfactant function, the number of carbon atoms in R$^{10}$ is preferably 2 or more, and more preferably 3 or more. From the viewpoint of water-solubility, the number of carbon atoms in R$^{10}$ is preferably 29 or less, and more preferably 23 or less.

Examples of the metal atom as M include alkali metals (Group 1) and alkaline earth metals (Group 2), and preferred is Na, K, or Li. M is preferably H, a metal atom, or NR$^{11}_4$, more preferably H, an alkali metal (Group 1), an alkaline earth metal (Group 2), or NR$^{11}_4$, still more preferably H, Na, K, Li, or NH$_4$, further preferably Na, K, or NH$_4$, particularly preferably Na or NH$_4$, and most preferably NH$_4$.

Examples of the carboxylic acid type hydrocarbon-containing surfactant include anionic surfactants represented by R$^{12}$—COOM, wherein R$^{12}$ is a linear or branched, alkyl group, alkenyl group, alkylene group, or alkenylene group having 1 or more carbon atoms and optionally having a substituent, or a cyclic alkyl group, alkenyl group, alkylene group, or alkenylene group having 3 or more carbon atoms and optionally having a substituent, each of which optionally contains an ether bond; when having 3 or more carbon atoms, R$^{12}$ optionally contains a monovalent or divalent heterocycle, or optionally forms a ring; and M is as described above.

Specific examples thereof include a compound represented by CH$_3$—(CH$_2$)$_n$—COOM, wherein n is an integer of 2 to 28, and M is as described above.

From the viewpoint of emulsion stability, the hydrocarbon-containing surfactant is preferably free from a carbonyl group which is not in a carboxyl group.

Further, the surfactant used in the polymerization preferably contains only a hydrocarbon-containing surfactant free from a carbonyl group.

Preferred examples of the hydrocarbon-containing surfactant free from a carbonyl group include a compound of the following formula (A):

$$R—COO\text{-}M \qquad (A)$$

wherein R is an alkyl group, an alkenyl group, an alkylene group, or an alkenylene group containing 6 to 17 carbon atoms, each of which optionally contains an ether bond; M is H, a metal atom, $NR^{11}_4$, imidazolium optionally having a substituent, pyridinium optionally having a substituent, or phosphonium optionally having a substituent; and $R^{11}$ is the same or different and is H or an organic group having 1 to 10 carbon atoms.

In the formula (A), R is preferably an alkyl group or an alkenyl group, each of which optionally contains an ether group. The alkyl group or alkenyl group for R may be linear or branched. The number of carbon atoms in R may be, but is not limited to, 2 to 29.

When the alkyl group is linear, the number of carbon atoms in R is preferably 3 to 29, and more preferably 5 to 23. When the alkyl group is branched, the number of carbon atoms in R is preferably 5 to 35, and more preferably 11 to 23.

When the alkenyl group is linear, the number of carbon atoms in R is preferably 2 to 29, and more preferably 9 to 23. When the alkenyl group is branched, the number of carbon atoms in R is preferably 2 to 29, and more preferably 9 to 23.

Examples of the alkyl group and alkenyl group include a methyl group, an ethyl group, an isobutyl group, a t-butyl group, and a vinyl group.

Examples of the hydrocarbon-containing surfactant include butyric acid, valeric acid, caproic acid, enanthic acid, caprylic acid, pelargonic acid, capric acid, lauric acid, myristic acid, pentadecylic acid, palmitic acid, palmitoleic acid, margaric acid, stearic acid, oleic acid, vaccenic acid, linoleic acid, (9,12,15)-linolenic acid, (6,9,12)linolenic acid, eleostearic acid, arachidic acid, 8,11-eicosadienoic acid, mead acid, arachidonic acid, behenic acid, lignoceric acid, nervonic acid, cerotic acid, montanic acid, melissic acid, crotonic acid, myristoleic acid, palmitoleic acid, sapienic acid, oleic acid, elaidic acid, vaccenic acid, gadoleic acid, eicosenoic acid, erucic acid, nervonic acid, linoleic acid, eicosadienoic acid, docosadienoic acid, linolenic acid, pinolenic acid, α-eleostearic acid, β-eleostearic acid, mead acid, dihomo-γ-linolenic acid, eicosatrienoic acid, stearidonic acid, arachidonic acid, eicosatetraenoic acid, adrenic acid, boseopentaenoic acid, eicosapentaenoic acid, osbond acid, clupanodonic acid, tetracosapentaenoic acid, docosahexaenoic acid, nisinic acid, and salts thereof.

Particularly, preferred is at least one selected from the group consisting of lauric acid, capric acid, myristic acid, pentadecylic acid, palmitic acid, and salts thereof.

Examples of the salts include, but are not limited to, those in which hydrogen of the carboxyl group is a metal atom, $NR^{11}_4$, imidazolium optionally having a substituent, pyridinium optionally having a substituent, or phosphonium optionally having a substituent as M in the formula described above.

Examples of the carboxylic acid type hydrocarbon-containing surfactant in the present invention include at least one selected from the group consisting of a surfactant (a) represented by the following formula (a):

$$R^{1a}\!-\!\underset{\underset{O}{\|}}{C}\!-\!R^{2a}\!-\!\underset{\underset{O}{\|}}{C}\!-\!R^{3a}\!-\!A^{a}$$

wherein $R^{1a}$ is a linear or branched alkyl group having 1 or more carbon atoms or a cyclic alkyl group having 3 or more carbon atoms, with a hydrogen atom bonded to a carbon atom therein being optionally replaced by a hydroxy group or a monovalent organic group containing an ester bond, optionally contains a carbonyl group when having 2 or more carbon atoms, and optionally contains a monovalent or divalent heterocycle or optionally forms a ring when having 3 or more carbon atoms; $R^{2a}$ and $R^{3a}$ are each independently a single bond or a divalent linking group; the total number of carbon atoms of $R^{1a}$, $R^{2a}$, and $R^{3a}$ is 5 or more; $A^a$ is $-COOX^a$, wherein $X^a$ is H, a metal atom, $NR^{4a}_4$, imidazolium optionally having a substituent, pyridinium optionally having a substituent, or phosphonium optionally having a substituent, wherein $R^{4a}$ is H or an organic group and may be the same or different; and any two of $R^{1a}$, $R^{2a}$, and $R^{3a}$ optionally bind to each other to form a ring; and a surfactant (b) represented by the following formula (b):

$$R^{1b}\!-\!\underset{\underset{O}{\|}}{C}\!-\!\!\left(CR^{2b}_2\right)_{\!n}\!\!\left(OR^{3b}\right)_{\!p}\!\!\left(CR^{4b}_2\right)_{\!q}\!\!L\!-\!A^{b}$$

wherein $R^{1b}$ is a linear or branched alkyl group having 1 or more carbon atoms and optionally having a substituent or a cyclic alkyl group having 3 or more carbon atoms and optionally having a substituent, and optionally contains a monovalent or divalent heterocycle or optionally forms a ring when having 3 or more carbon atoms; $R^{2b}$ and $R^{4b}$ are each independently H or a substituent; $R^{3b}$ is an alkylene group having 1 to 10 carbon atoms and optionally having a substituent; n is an integer of 1 or more; p and q are each independently an integer of 0 or more; $A^b$ is $-COOX^b$, wherein $X^b$ is H, a metal atom, $NR^{5b}_4$, imidazolium optionally having a substituent, pyridinium optionally having a substituent, or phosphonium optionally having a substituent, wherein $R^{5b}$ is H or an organic group and may be the same or different; any two of $R^{1b}$, $R^{2b}$, $R^{3b}$, and $R^{4b}$ optionally bind to each other to form a ring; L is a single bond, $-CO_2\!-\!B\!-^*$, $-OCO\!-\!B\!-^*$, $-CONR^{6b}\!-\!B\!-^*$, $-NR^{6b}CO\!-\!B\!-^*$, or $-CO-$ other than the carbonyl groups in $-CO_2\!-\!B-$, $-OCO\!-\!B-$, $-CONR^{6b}\!-\!B-$, and $-NR^{6b}CO-$B—, wherein B is a single bond or an alkylene group having 1 to 10 carbon atoms and optionally having a substituent, $R^{6b}$ is H or an alkyl group having 1 to 4 carbon atoms and optionally having a substituent; and * indicates the side bonded to $A^b$ in the formula.

The surfactant (a) is described below.

In the formula (a), $R^{1a}$ is a linear or branched alkyl group having 1 or more carbon atoms or a cyclic alkyl group having 3 or more carbon atoms.

When having 3 or more carbon atoms, the alkyl group optionally contains a carbonyl group ($-C(\!=\!O)-$) between two carbon atoms. When having 2 or more carbon atoms, the alkyl group optionally contains the carbonyl group at an end of the alkyl group. In other words, acyl groups such as an acetyl group represented by $CH_3\!-\!C(\!=\!O)-$ are also included in the alkyl group.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1a}$, a divalent heterocycle may be present between two carbon atoms, or a divalent heterocycle may be present at an end and bind to —C(=O)—, or a monovalent heterocycle may be present at an end of the alkyl group.

The "number of carbon atoms" in the alkyl group as used herein includes the number of carbon atoms constituting the carbonyl groups and the number of carbon atoms constituting the heterocycles. For example, the number of carbon atoms in the group represented by $CH_3$—C(=O)—$CH_2$— is 3, the number of carbon atoms in the group represented by $CH_3$—C(=O)—$C_2H_4$—C(=O)—$C_2H_4$— is 7, and the number of carbon atoms in the group represented by $CH_3$—C(=O)— is 2.

In the alkyl group, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{101a}$, wherein $R^{101a}$ is an alkyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

In the formula (a), $R^{2a}$ and $R^{3a}$ are each independently a single bond or a divalent linking group.

Preferably, $R^{2a}$ and $R^{3a}$ are each independently a single bond, or a linear or branched alkylene group having 1 or more carbon atoms, or a cyclic alkylene group having 3 or more carbon atoms.

The alkylene group constituting $R^{2a}$ and $R^{3a}$ is preferably free from a carbonyl group.

In the alkylene group, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{102a}$, wherein $R^{102a}$ is an alkyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

The total number of carbon atoms of $R^{1a}$, $R^{2a}$, and $R^{3a}$ is 5 or more. The total number of carbon atoms is preferably 7 or more, more preferably 9 or more, and preferably 20 or less, more preferably 18 or less, still more preferably 15 or less.

Any two of $R^{1a}$, $R^{2a}$, and $R^{3a}$ optionally bind to each other to form a ring.

In the formula (a), $A^a$ is —$COOX^a$, wherein $X^a$ is H, a metal atom, $NR^{4a}_4$, imidazolium optionally having a substituent, pyridinium optionally having a substituent, or phosphonium optionally having a substituent, wherein $R^{4a}$ is H or an organic group and may be the same or different. $R^{4a}$ is preferably H or an organic group having 1 to 10 carbon atoms, and more preferably H or an organic group having 1 to 4 carbon atoms. Examples of the metal atom include alkali metals (Group 1) and alkaline earth metals (Group 2), and preferred is Na, K, or Li.

$X^a$ is preferably H, an alkali metal (Group 1), an alkaline earth metal (Group 2), or $NR^{4a}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^a$ is $NH_4$, the solubility of the surfactant in an aqueous medium is excellent, and the metal component is unlikely to remain in the fluoropolymer or the final product.

$R^{1a}$ is preferably a linear or branched alkyl group having 1 to 8 carbon atoms and free from a carbonyl group, a cyclic alkyl group having 3 to 8 carbon atoms and free from a carbonyl group, a linear or branched alkyl group having 2 to 45 carbon atoms and containing 1 to 10 carbonyl groups, a cyclic alkyl group having 3 to 45 carbon atoms and containing a carbonyl group, or an alkyl group having 3 to 45 carbon atoms and containing a monovalent or divalent heterocycle.

$R^{1a}$ is more preferably a group represented by the following formula:

$$R^{11a}\!\!\left(\!\!\begin{array}{c} C \\ \| \\ O \end{array}\!\!- R^{12a}\right)_{\!\!n}{}^{\!\!11a}$$

wherein $n^{11a}$ is an integer of 0 to 10; $R^{11a}$ is a linear or branched alkyl group having 1 to 5 carbon atoms or a cyclic alkyl group having 3 to 5 carbon atoms; $R^{12a}$ is an alkylene group having 0 to 3 carbon atoms; and when $n^{11a}$ is an integer of 2 to 10, each $R^{12a}$ may be the same or different.

$n^{11a}$ is preferably an integer of 0 to 5, more preferably an integer of 0 to 3, and still more preferably an integer of 1 to 3.

The alkyl group for $R^{11a}$ is preferably free from a carbonyl group.

In the alkyl group for $R^{11a}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{103a}$, wherein $R^{103a}$ is an alkyl group.

In the alkyl group for $R^{11a}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^{12a}$ is an alkylene group having 0 to 3 carbon atoms. The alkylene group preferably has 1 to 3 carbon atoms.

The alkylene group for $R^{12a}$ may be either linear or branched.

The alkylene group for $R^{12a}$ is preferably free from a carbonyl group. $R^{12a}$ is more preferably an ethylene group (—$C_2H_4$—) or a propylene group (—$C_3H_6$—).

In the alkylene group for $R^{12a}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{104a}$, wherein $R^{104a}$ is an alkyl group.

In the alkylene group for $R^{12a}$, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

$R^{2a}$ and $R^{3a}$ are preferably each independently an alkylene group having 1 or more carbon atoms and free from a carbonyl group, more preferably an alkylene group having 1 to 3 carbon atoms and free from a carbonyl group, and still more preferably an ethylene group (—$C_2H_4$—) or a propylene group (—$C_2H_6$—).

Next, the surfactant (b) is described below.

In the formula (b), $R^{1b}$ is a linear or branched alkyl group having 1 or more carbon atoms and optionally having a substituent or a cyclic alkyl group having 3 or more carbon atoms and optionally having a substituent.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1b}$, a divalent heterocycle may be present between two carbon atoms, or a divalent heterocycle may be present at an end and bind to —C(=O)—, or a monovalent heterocycle may be present at an end of the alkyl group.

The "number of carbon atoms" in the alkyl group as used herein includes the number of carbon atoms constituting the heterocycles.

The substituent which may be contained in the alkyl group for $R^{1b}$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for $R^{1b}$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably does not have any substituent.

$R^{1b}$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group (—$CH_3$) or an ethyl group (—$C_2H_5$), and most preferably a methyl group (—$CH_3$).

In the formula (b), $R^{2b}$ and $R^{4b}$ are each independently H or a substituent. A plurality of $R^{2b}$ and $R^{4b}$ may be the same or different.

The substituent for each of $R^{2b}$ and $R^{4b}$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for each of $R^{2b}$ and $R^{4b}$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably does not have any substituent.

The alkyl group for each of $R^{2b}$ and $R^{4b}$ is preferably a linear or branched alkyl group having 1 to 10 carbon atoms and free from a carbonyl group or a cyclic alkyl group having 3 to 10 carbon atoms and free from a carbonyl group, more preferably a linear or branched alkyl group having 1 to 10 carbon atoms and free from a carbonyl group, still more preferably a linear or branched alkyl group having 1 to 3 carbon atoms and not having a substituent, and particularly preferably a methyl group (—$CH_3$) or an ethyl group (—$C_2H_5$).

$R^{2b}$ and $R^{4b}$ are preferably each independently H or a linear or branched alkyl group having 1 to 10 carbon atoms and free from a carbonyl group, more preferably H or a linear or branched alkyl group having 1 to 3 carbon atoms and not having a substituent, still more preferably H, a methyl group (—$CH_3$), or an ethyl group (—$C_2H_5$), and particularly preferably H.

In the formula (b), $R^{3b}$ is an alkylene group having 1 to 10 carbon atoms and optionally having a substituent. When a plurality of $R^{3b}$ are present, they may be the same or different.

The alkylene group is preferably free from a carbonyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkyl group free from halogen atoms such as fluorine atoms and chlorine atoms.

The alkylene group preferably does not have any substituent.

The alkylene group is preferably a linear or branched alkylene group having 1 to 10 carbon atoms and optionally having a substituent or a cyclic alkylene group having 3 to 10 carbon atoms and optionally having a substituent, preferably a linear or branched alkylene group having 1 to 10 carbon atoms and free from a carbonyl group or a cyclic alkylene group having 3 to 10 carbon atoms and free from a carbonyl group, more preferably a linear or branched alkylene group having 1 to 10 carbon atoms and not having a substituent, and still more preferably a methylene group (—$CH_2$—), an ethylene group (—$C_2H_4$—), an isopropylene group (—$CH(CH_3)CH_2$—), or a propylene group (—$C_3H_6$—).

Any two of $R^{1b}$, $R^{2b}$, $R^{3b}$, and $R^{4b}$ optionally bind to each other to form a ring.

In the formula (b), n is an integer of 1 or more. n is preferably an integer of 1 to 40, more preferably an integer of 1 to 30, and still more preferably an integer of 5 to 25.

In the formula (b), p and q are each independently an integer of 0 or more. p is preferably an integer of 0 to 10, more preferably 0 or 1. q is preferably an integer of 0 to 10, more preferably an integer of 0 to 5.

The sum of n, p, and q is preferably an integer of 6 or more. The sum of n, p, and q is more preferably an integer of 8 or more. The sum of n, p, and q is also preferably an integer of 60 or less, more preferably an integer of 50 or less, and still more preferably an integer of 40 or less.

In the formula (b), $A^b$ is —$COOX^b$, wherein $X^b$ is H, a metal atom, $NR^{5b}_4$, imidazolium optionally having a substituent, pyridinium optionally having a substituent, or phosphonium optionally having a substituent, wherein $R^{5b}$ is H or an organic group and may be the same or different. $R^{5b}$ is preferably H or an organic group having 1 to 10 carbon atoms, and more preferably H or an organic group having 1 to 4 carbon atoms. Examples of the metal atom include alkali metals (Group 1) and alkaline earth metals (Group 2), and preferred is Na, K, or Li. $X^b$ may be a metal atom or $NR^{5b}_4$, wherein $R^{5b}$ is defined as described above.

$X^b$ is preferably H, an alkali metal (Group 1), an alkaline earth metal (Group 2), or $NR^{5b}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^b$ is $NH_4$, the solubility of the surfactant in an aqueous medium is excellent, and the metal component is unlikely to remain in the fluoropolymer or the final product.

In the formula (b), L is a single bond, —$CO_2$—B—*, —OCO—B—*, —$CONR^{6b}$—B—*, —$NR^{6b}CO$—B—*, or —CO— other than the carbonyl groups in —$CO_2$—B—, —OCO—B—, —$CONR^{6b}$—B—, and —$NR^{6b}CO$—B—, wherein B is a single bond or an alkylene group having 1 to 10 carbon atoms and optionally having a substituent, $R^{6b}$ is H or an alkyl group having 1 to 4 carbon atoms and optionally having a substituent. The alkylene group more preferably has 1 to 5 carbon atoms. $R^{6b}$ is more preferably H or a methyl group. * indicates the side bonded to $A^b$ in the formula.

L is preferably a single bond.

The surfactant preferably has a $^1$H-NMR spectrum in which all peak intensities observed in a chemical shift range of 2.0 to 5.0 ppm give an integral value of 10% or higher.

The surfactant preferably has a $^1$H-NMR spectrum in which all peak intensities observed in a chemical shift range of 2.0 to 5.0 ppm give an integral value within the above range. In this case, the surfactant preferably has a ketone structure in the molecule.

The integral value of the surfactant is more preferably 15 or more, and preferably 95 or less, more preferably 80 or less, and still more preferably 70 or less.

The integral value is determined using a heavy water solvent at room temperature. The heavy water content is adjusted to 4.79 ppm.

The surfactant (a) is a novel compound, and may be produced by any of the following production methods, for example.

The surfactant (a) may be produced by a production method including:

a step (11a) of reacting a compound (10a) represented by the formula:

$$\text{(morpholine)}N - \underset{\underset{O}{\|}}{C} - R^{3a} - CH_2 - OE^a$$

14

(wherein $R^{3a}$ is defined as described above; and $E^a$ is a leaving group), lithium, and a chlorosilane compound represented by the formula: $R^{201a}_3Si$—Cl (wherein each $R^{201a}$ is independently an alkyl group or an aryl group) to provide a compound (11a) represented by the formula:

$$R^{201a}_3 - \underset{\underset{O}{\|}}{C} - R^{3a} - CH_2 - OE^a$$

(wherein $R^{3a}$, $R^{201a}$, and $E^a$ are defined as described above);

a step (12a) of reacting the compound (11a) and an olefin represented by the formula:

$$R^{1a} - \underset{\underset{O}{\|}}{C} - R^{21a}\!\!=\!\!$$

(wherein $R^{1a}$ is defined as described above; and $R^{21a}$ is a single bond or a divalent linking group) to provide a compound (12a) represented by the formula:

$$R^{1a} - \underset{\underset{O}{\|}}{C} - R^{21a}\frown\frown\underset{\underset{O}{\|}}{C} - R^{3a} - CH_2 - OE^a$$

(wherein $R^{1a}$, $R^{21a}$, $R^{3a}$, and $E^a$ are defined as described above);

a step (13a) of eliminating the leaving group in the compound (12a) to provide a compound (13a) represented by the formula:

$$R^{1a} - \underset{\underset{O}{\|}}{C} - R^{21a}\frown\frown\underset{\underset{O}{\|}}{C} - R^{3a} - CH_2 - OH$$

(wherein $R^{1a}$, $R^{21a}$, and $R^{3a}$ are defined as described above); and a step (14a) of oxidizing the compound (13a) to provide a compound (14a) represented by the formula:

$$R^{1a} - \underset{\underset{O}{\|}}{C} - R^{21a}\frown\frown\underset{\underset{O}{\|}}{C} - R^{3a} - \underset{\underset{O}{\overset{O}{\|}}}{C} - OH$$

wherein $R^{1a}$, $R^{21a}$, and $R^{3a}$ are defined as described above.

When $R^{1a}$ contains a furan ring, the furan ring may be cleaved by an acid and converted into a dicarbonyl derivative, for example. Examples of the acid include acetic acid, hydrochloric acid, and p-toluene sulfone. The same applies to other production methods described later.

$E^a$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group. The same applies to other production methods described later.

$R^{21a}$ is preferably a single bond or a linear or branched alkylene group having 1 or more carbon atoms.

Examples of the chlorosilane compound include:

Any of the reactions in the step (11a) may be performed in a solvent. The solvent used may be an organic solvent; examples thereof include aprotic polar solvents, and specific examples thereof include ethers.

Regarding the reaction ratio between the compound (11a) and the olefin in the step (12a), the olefin may be used in an amount of 1 to 2 mol, based on 1 mol of the compound (11a) in consideration of the improvement of the yield and the reduction of the waste.

The reaction in the step (12a) may be performed in a solvent in the presence of a thiazolium salt and a base.

Examples of the thiazolium salt include 3-ethyl-5-(2-hydroxyethyl)-4-methylthiazolium bromide and 3-benzyl-5-(2-hydroxyethyl)-4-methylthiazolium chloride.

Examples of the base include 1,8-diazabicyclo[5.4.0]-7-undecene and triethylamine.

The solvent used may be an organic solvent; examples thereof include aprotic polar solvents, and specific examples thereof include ethers.

The elimination reaction for the leaving group in the step (13a) may be performed using a fluoride ion or an acid. Examples of methods of eliminating the leaving group include a method using hydrofluoric acid; a method using an amine complex of hydrogen fluoride such as pyridine-nHF or triethylamine-nHF; a method using an inorganic salt such as cesium fluoride, potassium fluoride, lithium tetrafluoroborate (LiBF₄), or ammonium fluoride; and a method using an organic salt such as tetrabutylammonium fluoride (TBAF).

The elimination reaction for the leaving group in the step (13a) may be performed in a polar solvent. The solvent used may be an organic solvent; examples thereof include aprotic polar solvents, and specific examples thereof include ethers.

The oxidation in the step (14a) may be performed in a solvent in the presence of sodium chlorite.

The solvent used may be an alcohol, such as methanol, ethanol, 1-propanol, isopropanol, 1-butanol, or tert-butyl alcohol, or water. A disodium hydrogen phosphate solution may be used as the buffer.

The compound (14a) may be brought into contact with an alkali to convert —COOH into a salt form. Examples of the alkali include sodium hydroxide, potassium hydroxide, lithium hydroxide, and ammonia; for example, an aqueous solution of ammonia may be used.

After the completion of each step, the solvent may be distilled off, or distillation, purification or the like may be performed to increase the purity of each resulting compound.

The surfactant (a) may also be produced by a production method including:

a step (21a) of reacting a ketone represented by the formula:

$$R^{22a}-\overset{\overset{\displaystyle }{\|}}{\underset{\underset{\displaystyle O}{}}{C}}-R^{3a}-CH_2-OE^a$$

(wherein $R^{3a}$ is defined as described above; $R^{22a}$ is a monovalent organic group; and $E^a$ is a leaving group) and a carboxylate represented by the formula:

$$R^{1a}-\overset{\overset{\displaystyle }{\|}}{\underset{\underset{\displaystyle O}{}}{C}}-O-R^{23a}$$

(wherein $R^{1a}$ is defined as described above; and $R^{23a}$ is a monovalent organic group) to provide a compound (21a) represented by the formula:

$$R^{1a}-\overset{\overset{\displaystyle }{\|}}{\underset{\underset{\displaystyle O}{}}{C}}-R^{24a}-\overset{\overset{\displaystyle }{\|}}{\underset{\underset{\displaystyle O}{}}{C}}-R^{3a}-CH_2-OE^a$$

(wherein $R^{1a}$, $R^{3a}$, and $E^a$ are defined as described above; and $R^{24a}$ is a single bond or a divalent linking group);

a step (22a) of eliminating the leaving group in the compound (21a) to provide a compound (22a) represented by the formula:

$$R^{1a}-\overset{\overset{\displaystyle }{\|}}{\underset{\underset{\displaystyle O}{}}{C}}-R^{24a}-\overset{\overset{\displaystyle }{\|}}{\underset{\underset{\displaystyle O}{}}{C}}-R^{3a}-CH_2-OH$$

(wherein $R^{1a}$, $R^{24a}$, and $R^{3a}$ are defined as described above); and a step (23a) of oxidizing the compound (22a) to provide a compound (23a) represented by the formula:

$$R^{1a}-\overset{\overset{\displaystyle }{\|}}{\underset{\underset{\displaystyle O}{}}{C}}-R^{24a}-\overset{\overset{\displaystyle }{\|}}{\underset{\underset{\displaystyle O}{}}{C}}-R^{3a}-\overset{\overset{\overset{\displaystyle O}{\|}}{}}{C}-OH$$

wherein $R^{1a}$, $R^{24a}$, and $R^{3a}$ are defined as described above.

$R^{22a}$ is preferably a linear or branched alkyl group having 1 or more carbon atoms, and more preferably a methyl group.

$R^{23a}$ is preferably a linear or branched alkyl group having 1 or more carbon atoms, and more preferably a methyl group.

$R^{24a}$ is preferably a linear or branched alkylene group having 1 or more carbon atoms, and more preferably a methylene group ($-CH_2-$).

The reaction in the step (21a) may be performed in a solvent in the presence of a base.

Examples of the base include sodium amide, sodium hydride, sodium methoxide, and sodium ethoxide.

The solvent used may be an organic solvent; examples thereof include aprotic polar solvents, and specific examples thereof include ethers.

The elimination reaction for the leaving group in the step (22a) may be performed using a fluoride ion or an acid. Examples of methods of eliminating the leaving group include a method using hydrofluoric acid; a method using an amine complex of hydrogen fluoride such as pyridine-nHF or triethylamine-nHF; a method using an inorganic salt such as cesium fluoride, potassium fluoride, lithium tetrafluoroborate ($LiBF_4$), or ammonium fluoride; and a method using an organic salt such as tetrabutylammonium fluoride (TBAF).

The elimination reaction for the leaving group in the step (22a) may be performed in a solvent. The solvent may be an organic solvent; examples thereof include aprotic polar solvents, and specific examples thereof include ethers.

The oxidation in the step (23a) may be performed in a solvent in the presence of sodium chlorite.

The solvent used may be an alcohol or water. A disodium hydrogen phosphate solution may be used as the buffer.

The compound (23a) may be brought into contact with an alkali to convert $-COOH$ into a salt form. Examples of the alkali include sodium hydroxide, potassium hydroxide, lithium hydroxide, and ammonia; for example, an aqueous solution of ammonia may be used.

After the completion of each step, the solvent may be distilled off, or distillation, purification or the like may be performed to increase the purity of each resulting compound.

The surfactant (a) may also be produced by a production method including:

a step (31a) of reacting an alkyl halide represented by the formula: $Y^a-R^{3a}-CH_2-OE^a$ (wherein $R^{3a}$ is defined as described above; $Y^a$ is a halogen atom; and $E^a$ is a leaving group) and lithium acetylide represented by the formula:

$$R^{1a}-\!\!\!\equiv\!\!\!-Li$$

(wherein $R^{1a}$ is defined as described above) to provide a compound (31a) represented by the formula:

$$R^{1a}-\!\!\!\equiv\!\!\!-R^{3a}-CH_2-OE^a$$

(wherein $R^{1a}$, $R^{3a}$, and $E^a$ are defined as described above); a step (32a) of oxidizing the compound (31a) to provide a compound (32a) represented by the formula:

$$R^{1a}-\overset{\overset{O}{\|}}{C}-\overset{\overset{}{C}}{\underset{\|}{\phantom{C}}}-R^{3a}-CH_2-OE^a$$
$$O$$

(wherein $R^{1a}$, $R^{3a}$, and $E^a$ are defined as described above);

a step (33a) of eliminating the leaving group in the compound (32a) to provide a compound (33a) represented by the formula:

$$R^{1a}-\overset{\overset{O}{\|}}{C}-\overset{\overset{}{C}}{\underset{\|}{\phantom{C}}}-R^{3a}-CH_2-OH$$
$$O$$

(wherein $R^{1a}$ and $R^{3a}$ are defined as described above); and a step (34a) of oxidizing the compound (33a) to provide a compound (34a) represented by the formula:

$$R^{1a}-\overset{\overset{O}{\|}}{C}-\overset{\overset{}{C}}{\underset{\|}{\phantom{C}}}-R^{3a}-\overset{\overset{O}{\|}}{C}-OH$$
$$O$$

wherein $R^{1a}$ and $R^{3a}$ are defined as described above.

Regarding the reaction ratio between the alkyl halide and the lithium acetylide in the step (31a), the lithium acetylide may be used in an amount of 1 to 2 mol, based on 1 mol of the alkyl halide in consideration of the improvement of the yield and the reduction of the waste.

The reaction in the step (31a) may be performed in a solvent. An example of the solvent is hexane.

The oxidation in the step (32a) may be performed in a nitrile solvent using a complex generated by treating $[(Cn^*)Ru^{III}(CF_3CO_2)_3]\cdot H_2O$ (wherein $Cn^*$ is 1,4,7-trimethyl-1,4,7-triazabicyclononane) with $(NH_4)_2Ce(NO_3)_6$ and trifluoroacetic acid and then adding sodium perchlorate thereto.

After the completion of the oxidation, the product may be neutralized with an alkali, and then an organic solvent such as an ether may be used to extract the compound (32a).

The elimination reaction for the leaving group in the step (33a) may be performed using a fluoride ion or an acid. Examples of methods of eliminating the leaving group include a method using hydrofluoric acid; a method using an amine complex of hydrogen fluoride such as pyridine-nHF or triethylamine-nHF; a method using an inorganic salt such as cesium fluoride, potassium fluoride, lithium tetrafluoroborate ($LiBF_4$), or ammonium fluoride; and a method using an organic salt such as tetrabutylammonium fluoride (TBAF).

The elimination reaction for the leaving group in the step (33a) may be performed in a solvent. The solvent used may be an organic solvent; examples thereof include aprotic polar solvents, and specific examples thereof include ethers.

The oxidation in the step (34a) may be performed in a solvent in the presence of sodium chlorite.

The solvent used may be an alcohol or water. A disodium hydrogen phosphate solution may be used as the buffer.

The compound (34a) may be brought into contact with an alkali to convert $-COOH$ into a salt form. Examples of the alkali include sodium hydroxide, potassium hydroxide, lithium hydroxide, and ammonia; specifically, an aqueous solution of ammonia may be used.

After the completion of each step, the solvent may be distilled off, or distillation, purification or the like may be performed to increase the purity of each resulting compound.

The surfactant (a) may also be produced by a production method including:

a step (51a) of reacting divinyl ketone represented by the formula:

and 2-methylfuran represented by the formula:

to provide a compound (51a) represented by the formula:

a step (52a) of reacting the compound (51a) and furan represented by the formula:

to provide a compound (52a) represented by the formula:

a step (53a) of heating the compound (52a) in the presence of an acid to provide a compound (53a) represented by the formula:

and
a step (54a) of oxidizing the compound (53a) to provide a compound (54a) represented by the formula:

Regarding the reaction ratio between divinyl ketone and 2-methyl furan in the step (51a), 2-methyl furan may be used in an amount of 0.5 to 1 mol, based on 1 mol of divinyl ketone in consideration of the improvement of the yield and the reduction of the waste.

The reaction in the step (51a) may be performed in the presence of an acid. Examples of the acid include acetic acid, hydrochloric acid, and p-toluenesulfonic acid.

The amount of the acid used in the step (51a) may be 0.1 to 2 mol based on 1 mol of divinyl ketone in consideration of the improvement of the yield and the reduction of the waste.

The reaction in the step (51a) may be performed in a polar solvent. Examples of the solvent include water and acetonitrile.

Regarding the reaction ratio between the compound (51a) and furan in the step (52a), furan may be used in an amount of 1 to 2 mol, based on 1 mol of the compound (51a) in consideration of the improvement of the yield and the reduction of the waste.

The reaction in the step (52a) may be performed in the presence of an acid, and examples of the acid include acetic acid, hydrochloric acid, and p-toluene sulfone.

The amount of the acid used in the step (52a) may be 0.1 to 2 mol based on 1 mol of the compound (51a) in consideration of the improvement of the yield and the reduction of the waste.

The reaction in the step (52a) may be performed in a polar solvent. An example of the solvent is water.

In the step (53a), the furan ring is cleaved by heating the compound (52a) in the presence of an acid.

The acid used may be hydrochloric acid or sulfuric acid.

The reaction in the step (53a) may be performed in a polar solvent. An example of the solvent is water.

The oxidation in the step (54a) may be performed in a solvent in the presence of sodium chlorite.

The solvent used may be tert-butyl alcohol or water. A disodium hydrogen phosphate solution may be used as the buffer.

The compound (54a) may be brought into contact with an alkali to convert —COOH into a salt form. Examples of the alkali include sodium hydroxide, potassium hydroxide, lithium hydroxide, and ammonia; specifically, an aqueous solution of ammonia may be used.

After the completion of each step, the solvent may be distilled off, or distillation, purification or the like may be performed to increase the purity of each resulting compound.

The surfactant (a) may also be produced by a production method including:
a step (61a) of reacting an alkene represented by the formula:

(wherein $R^{1a}$ is defined as described above; and $R^{21a}$ is a single bond or a divalent linking group) and an alkyne represented by the formula:

(wherein $Y^{61a}$ is an alkyl ester group) to provide a compound (61a) represented by the formula:

$$R^{1a}\overset{O}{\underset{O}{\text{—}}}R^{21a}\text{———}\overset{O}{\text{——}}\text{——}Y^{61a}$$

(wherein $R^{1a}$, $R^{21a}$, and $R^{61a}$ are defined as described above); and a step (62a) of causing an alkali to act on the compound (61a) and then causing an acid to act thereon to provide a compound (62a) represented by the formula:

$$R^{1a}\overset{O}{\underset{O}{\text{—}}}R^{21a}\text{———}\overset{O}{\text{——}}\text{———}\overset{O}{\underset{}{\text{OH}}}$$

wherein $R^{1a}$ and $R^{21a}$ are defined as described above.

Regarding the reaction ratio between the alkene and the alkyne in the step (61a), the alkene may be used in an amount of 0.5 to 2 mol, based on 1 mol of the alkyne in consideration of the improvement of the yield and the reduction of the waste.

The reaction in the step (61a) may be performed in the presence of a metal catalyst. An example of the metal is ruthenium.

The amount of the metal catalyst used in the step (61a) may be 0.01 to 0.4 mol based on 1 mol of the alkene in consideration of the improvement of the yield and the reduction of the waste.

The reaction in the step (61a) may be performed in a polar solvent. Examples of the solvent include water, acetonitrile, dimethylacetamide, and dimethylformamide.

Regarding the reaction ratio between the compound (61a) and the alkali in the step (62a), the alkali may be used in an amount of 0.6 to 2 mol, based on 1 mol of the compound (61a) in consideration of the improvement of the yield and the reduction of the waste.

The amount of the acid used in the step (62a) may be 1.0 to 20.0 mol based on 1 mol of the compound (61a) in consideration of the improvement of the yield and the reduction of the waste.

The reaction in the step (62a) may be performed in a polar solvent. An example of the solvent is water.

The compound (62a) may be brought into contact with an alkali to convert —COOH into a salt form. Examples of the alkali include sodium hydroxide, potassium hydroxide, lithium hydroxide, and ammonia; for example, an aqueous solution of ammonia may be used.

After the completion of each step, the solvent may be distilled off, or distillation, purification or the like may be performed to increase the purity of each resulting compound.

The surfactant (b) is a novel compound, and may be produced by any of the following production methods, for example.

The surfactant (b) may be produced by a production method including a step (11b) of reacting a compound (10b) represented by the following formula:

$$R^{1b}\text{—}\overset{}{\underset{\overset{\|}{O}}{C}}\text{—}(CR^{2b}{}_2)_n\text{—OH}$$

(wherein $R^{1b}$, $R^{2b}$, and n are defined as described above) and a sultone represented by the following formula:

$$O{=}\overset{L\text{—}R^{3b}}{\underset{\overset{\|}{O}}{S}}\text{—O}$$

(wherein $R^{3b}$ is defined as described above; L is a single bond, —CO$_2$—B—*, —OCO—B—*, —CONR$^{6b}$—B—*, 13 NR$^{6b}$CO—B—*, or —CO— other than the carbonyl groups in —CO$_2$—B—, —OCO—B—, —CONR$^{6b}$—B—, and —NR$^{6b}$CO—B—, wherein B is a single bond or an alkylene group having 1 to 10 carbon atoms and optionally having a substituent, $R^{6b}$ is H or an alkyl group having 1 to 4 carbon atoms and optionally having a substituent; and * indicates the side bonded to —S(=O)$_2$— in the formula) to provide a compound (11b) represented by the following formula:

$$R^{1b}\text{—}\overset{}{\underset{\overset{\|}{O}}{C}}\text{—}(CR^{2b}{}_2)_n\text{—O—}R^{3b}\text{—L—OSO}_3X^b$$

wherein $R^{1b}$ to $R^{3b}$, n, and $X^b$ are defined as described above; L is a single bond, —CO$_2$—B—*, —OCO—B—*, —CONR$^{6b}$—B—*, —NR$^{6b}$CO—B—*, or —CO— other than the carbonyl groups in —CO$_2$—B—, —OCO—B—, —CONR$^{6b}$—B—, and —NR$^{6b}$CO—B—, wherein B is a single bond or an alkylene group having 1 to 10 carbon atoms and optionally having a substituent, $R^{6b}$ is H or an alkyl group having 1 to 4 carbon atoms and optionally having a substituent; and * indicates the side bonded to —OSO$_3$X$^b$ in the formula.

The reaction in the step (11b) may be performed in the presence of a base.

Examples of the base include sodium hydride, sodium hydroxide, potassium hydroxide, and triethylamine. The base may be used in an amount of 0.5 to 20 mol based on 1 mol of the compound (10b).

The reaction in the step (11b) may be performed in a solvent.

The solvent used may be an organic solvent; examples thereof include aprotic polar solvents, and specific examples thereof include ethers, aromatic compounds, nitriles, and halogenated hydrocarbons.

The surfactant (b) may also be produced by a production method including a step (21b) of oxidizing a compound (20b) represented by the following formula:

$$R^{1b}\text{—}\overset{}{\underset{\overset{\|}{O}}{C}}\text{—}(CR^{2b}{}_2)_n(OR^{3b})_p(CR^{4b}{}_2)_q\text{—L—CH}_2\text{—OH}$$

(wherein $R^{1b}$ to $R^{4b}$, n, p, and q are defined as described above; L is a single bond, —OC$_2$—B—*, —OCO—B—*, —CONR$^{6b}$—B—*, —NR$^{6b}$CO—B—*, or —CO— other than the carbonyl groups in —OC$_2$—B—, —OCO—B—, —CONR$^{6b}$—B—, and —NR$^{6b}$CO—B—, wherein B is a single bond or an alkylene group having 1 to 10 carbon atoms and optionally having a substituent, R$^{6b}$ is H or an alkyl group having 1 to 4 carbon atoms and optionally having a substituent; and * indicates the side bonded to —CH$_2$—OH in the formula)

to provide a compound (21b) represented by the following formula:

$$R^{1b}-C-(CR^{2b}_2)_n-(OR^{3b})_p-(CR^{4b}_2)_q-L-CH_2-COOX^b$$
$$\underset{O}{\|}$$

wherein R$^{1b}$ to R$^{4b}$, n, p, q, and X$^b$ are defined as described above; L is a single bond, —OC$_2$—B—*, —OCO—B—*, —CONR$^{6b}$—B—*, —NR$^{6b}$CO—B—*, or —CO— other than the carbonyl groups in —OC$_2$—B—, —OCO—B—, —CONR$^{6b}$—B—, and —NR$^{6b}$CO—B—, wherein B is a single bond or an alkylene group having 1 to 10 carbon atoms and optionally having a substituent, R$^{6b}$ is H or an alkyl group having 1 to 4 carbon atoms and optionally having a substituent; and * indicates the side bonded to —CH$_2$—COOX$^b$ in the formula.

The oxidation in the step (21b) may performed by causing a nitrosating agent to act on the compound (20b).

The nitrosating agent used may be sodium nitrite, nitrosyl sulfuric acid, isoamyl nitrite or the like.

The nitrosating agent may be used in an amount of 0.5 to 10 mol based on 1 mol of the compound (20b).

The oxidation in the step (21b) may be performed in a solvent. The solvent used may be trifluoroacetic acid, acetonitrile, or the like.

The compound (10b) and the compound (20b) may be produced by a production method including:

a step (101b) of hydroxylating a compound (100b) represented by the following formula:

$$R^{11b}-CH=CH-Y^{1b}-OH$$

(wherein R$^{11b}$ is H, a linear or branched alkyl group having 1 or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms; Y$^{1b}$ is —(CR$^{2b}_2)_n$— or —(CR$^{2b}_2)_n$—(OR$^{3b})_p$—(CR$^{4b}_2)_q$-L-CH$_2$—, wherein R$^{2b}$ to R$^{4b}$, n, p, and q are defined as described above; L is a single bond, —OC$_2$—B—*, —OCO—B—*, —CONR$^{6d}$—B—*, —NR$^{6d}$CO—B—*, or —CO— other than the carbonyl groups in —CO$_2$—B—, —OCO—B—, —CONR$^{6d}$—B—, and —NR$^{6d}$CO—B—, wherein B is a single bond or an alkylene group having 1 to 10 carbon atoms and optionally having a substituent, R$^{6d}$ is H or an alkyl group having 1 to 4 carbon atoms and optionally having a substituent; and * indicates the side bonded to —CH$_2$— in the formula) to provide a compound (101b) represented by the following formula:

$$R^{11b}-CH_2-CH-Y^{1b}-OH$$
$$\underset{OH}{|}$$

(wherein R$^{11b}$ and Y$^{1b}$ are defined as described above); and a step (102b) of oxidizing the compound (101b) to provide a compound (102b) represented by the following formula:

$$R^{11b}-CH_2-C-Y^{1b}-OH$$
$$\underset{O}{\|}$$

wherein R$^{11b}$ and Y$^{1b}$ are defined as described above.

The alkyl group for R$^{11b}$ is preferably free from a carbonyl group.

In the alkyl group for R$^{11b}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably does not have any substituent.

R$^{11b}$ is preferably H, a linear or branched alkyl group having 1 to 9 carbon atoms and optionally having a substituent, or a cyclic alkyl group having 3 to 9 carbon atoms and optionally having a substituent, more preferably H, a linear or branched alkyl group having 1 to 9 carbon atoms and free from a carbonyl group, or a cyclic alkyl group having 3 to 9 carbon atoms and free from a carbonyl group, still more preferably H or a linear or branched alkyl group having 1 to 9 carbon atoms and not having a substituent, further preferably H, a methyl group (—CH$_3$), or an ethyl group (—C$_2$H$_5$), particularly preferably H or a methyl group (—CH$_3$), and most preferably H.

The hydroxylation in the step (101b) may be performed by a method (1b) in which iron(II) phthalocyanine (Fe(Pc)) and sodium borohydride are caused to act on the compound (100b) in an oxygen atmosphere or a method (2b) in which isopinocampheylborane (IpcBH$_2$) is caused to act on the compound (100b) and then the resulting intermediate (dialkyl borane) is oxidized.

In the method (1b), iron(II) phthalocyanine may be used in a catalytic amount, and may be used in an amount of 0.001 to 1.2 mol based on 1 mol of the compound (100b).

In the method (1b), sodium borohydride may be used in an amount of 0.5 to 20 mol based on 1 mol of the compound (100b).

The reaction in the method (1b) may be performed in a solvent. The solvent used may be an organic solvent; specific examples thereof include ethers, halogenated hydrocarbons, aromatic hydrocarbons, nitriles, and nitrogen-containing polar organic compounds.

In the method (2b), isopinocampheylborane may be used in an amount of 1.0 to 10.0 mol based on 1 mol of the compound (100b).

The reaction of the compound (100b) and isopinocampheylborane may be performed in a solvent. The solvent used may be an organic solvent; specific examples thereof include ethers, halogenated hydrocarbons, and aromatic hydrocarbons.

The temperature of the reaction of the compound (100b) and isopinocampheylborane may be −78 to 200° C.

The pressure of the reaction of the compound (100b) and isopinocampheylborane may be 0 to 5.0 MPa.

The duration of the reaction of the compound (100b) and isopinocampheylborane may be 0.1 to 72 hours.

The oxidation in the method (2b) may be performed by causing an oxidizing agent to act on the intermediate. An example of the oxidizing agent is hydrogen peroxide. The oxidizing agent may be used in an amount of 0.7 to 10 mol based on 1 mol of the intermediate.

The oxidation in the method (2b) may be performed in a solvent. Examples of the solvent include water, methanol, and ethanol.

Examples of the method of oxidizing the compound (101b) in the step (102b) include (a) a method of using Jones reagent ($CrO_3/H_2SO_4$) (Jones oxidation), (b) a method of using Dess-Martin periodinane (DMP) (Dess-Martin oxidation), (c) a method of using pyridinium chlorochromate (PCC), (d) a method of causing a bleaching agent (about 5 to 6% aqueous solution of NaOCl) to act in the presence of a nickel compound such as $NiCl_2$, and (e) a method of causing a hydrogen acceptor such as an aldehyde or a ketone to act in the presence of an aluminum catalyst such as $Al(CH_3)_3$ or $Al[OCH(CH_3)_2]_3$ (Oppenauer oxidation).

The oxidation in the step (102b) may be performed in a solvent. The solvent used may be water or an organic solvent; specific examples thereof include water, ketones, ethers, halogenated hydrocarbons, aromatic hydrocarbons, and nitriles.

The compound (10b) and the compound (20b) may also be produced by a production method including a step (201b) of ozonolyzing a compound (200b) represented by the following formula:

$$R^{1b}-\underset{\underset{CR^{101b}_2}{\|}}{C}-Y^{1b}-OH$$

(wherein $R^{1b}$ and $Y^{1b}$ are defined as described above; and $R^{101b}$ is an organic group); to provide a compound (201b) represented by the following formula:

$$R^{1b}-\underset{\underset{O}{\|}}{C}-Y^{1b}-OH$$

wherein $R^{1b}$ and $Y^{1b}$ are defined as described above.

$R^{101b}$ is preferably an alkyl group having 1 to 20 carbon atoms. The two $R^{101b}$ may be the same as or different from each other.

The ozonolysis in the step (201b) may be performed by causing ozone to act on the compound (200b), followed by post-treatment with a reducing agent.

The ozone may be generated by dielectric barrier discharge in oxygen gas.

Examples of the reducing agent used in the post-treatment include zinc, dimethyl sulfide, thiourea, and phosphines.

The ozonolysis in the step (201b) may be performed in a solvent. The solvent used may be water or an organic solvent; examples thereof include water, alcohols, carboxylic acids, ethers, halogenated hydrocarbons, and aromatic hydrocarbons.

The compound (10b) and the compound (20b) may also be produced by a production method including:

a step (301b) of epoxidizing a compound (300b) represented by the following formula:

$$R^{21b}-CH=CH-Y^{1b}-OH$$

(wherein $Y^{1b}$ is defined as described above; and $R^{21b}$ is H, a linear or branched alkyl group having 1 or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms) to provide a compound (301b) represented by the following formula:

$$R^{21b}-\underset{O}{\overset{O}{CH-CH}}-Y^{1b}-OH$$

(wherein $R^{21b}$ and $Y^{1b}$ are defined as described above);

a step (302b) of reacting the compound (301b) with a lithium dialkylcopper represented by $R^{22b}_2CuLi$ (wherein $R^{22b}$ is a linear or branched alkyl group having 1 or more carbon atoms and optionally having a substituent or a cyclic alkyl group having 3 or more carbon atoms and optionally having a substituent, and optionally contains a monovalent or divalent heterocycle or optionally forms a ring when having 3 or more carbon atoms) to provide a compound (302b) represented by the following formula:

$$R^{21b}-\underset{\underset{R^{22b}}{|}}{CH}-\underset{\underset{OH}{|}}{CH}-Y^{1b}-OH$$

(wherein $R^{21b}$, $R^{22b}$, and $Y^{1b}$ are defined as described above); and a step (303b) of oxidizing the compound (302b) to provide a compound (303b) represented by the following formula:

$$R^{21b}-\underset{\underset{R^{22b}}{|}}{CH}-\underset{\underset{O}{\|}}{C}-Y^{1b}-OH$$

wherein $R^{21b}$, $R^{22b}$, and $Y^{1b}$ are defined as described above.

The alkyl group for $R^{21b}$ is preferably free from a carbonyl group.

In the alkyl group for $R^{21b}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably does not have any substituent.

$R^{21b}$ is preferably H, a linear or branched alkyl group having 1 to 8 carbon atoms and optionally having a substituent, or a cyclic alkyl group having 3 to 8 carbon atoms and optionally having a substituent, more preferably H, a linear or branched alkyl group having 1 to 8 carbon atoms and free from a carbonyl group, or a cyclic alkyl group having 3 to 8 carbon atoms and free from a carbonyl group, still more preferably H or a linear or branched alkyl group having 1 to 8 carbon atoms and not having a substituent, particularly preferably H or a methyl group ($-CH_3$), and most preferably H.

The alkyl group for $R^{22b}$ is preferably free from a carbonyl group.

In the alkyl group for $R^{22b}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably does not have any substituent.

$R^{22b}$ is preferably a linear or branched alkyl group having 1 to 9 carbon atoms and optionally having a substituent or a cyclic alkyl group having 3 to 9 carbon atoms and optionally having a substituent, more preferably a linear or branched alkyl group having 1 to 9 carbon atoms and free from a carbonyl group or a cyclic alkyl group having 3 to 9 carbon atoms and free from a carbonyl group, still more preferably a linear or branched alkyl group having 1 to 9 carbon atoms and not having a substituent, particularly preferably a methyl group ($-CH_3$) or an ethyl group ($-C_2H_5$), and most preferably a methyl group ($-CH_3$).

The two $R^{22b}$s may be the same as or different from each other.

The total number of carbon atoms of $R^{21b}$ and $R^{22b}$ is preferably 1 to 7, and more preferably 1 to 2.

The epoxidation in the step (301b) may be performed by causing an epoxidizing agent to act on the compound (300b).

Examples of the epoxidizing agent include peracids such as meta-chloroperbenzoic acid (m-CPBA), perbenzoic acid, hydrogen peroxide, and tert-butyl hydroperoxide, dimethyl dioxirane, and methyl trifluoromethyl dioxirane.

The epoxidizing agent may be used in an amount of 0.5 to 10.0 mol based on 1 mol of the compound (300b).

The epoxidation in the step (301b) may be performed in a solvent. The solvent used may be an organic solvent; examples thereof include ketones, ethers, halogenated hydrocarbons, aromatic hydrocarbons, nitriles, pyridines, nitrogen-containing polar organic compounds, and dimethyl sulfoxide.

In the step (302b), the lithium dialkylcopper may be used in an amount of 0.5 to 10.0 mol based on 1 mol of the compound (301b).

The reaction in the step (302b) may be performed in a solvent. The solvent used may be an organic solvent; examples thereof include ethers, halogenated hydrocarbons, and aromatic hydrocarbons.

Examples of the method of oxidizing the compound (302b) in the step (303b) include (a) a method of using Jones reagent ($CrO_3/H_2SO_4$) (Jones oxidation), (b) a method of using Dess-Martin periodinane (DMP) (Dess-Martin oxidation), (c) a method of using pyridinium chlorochromate (PCC), (d) a method of causing a bleaching agent (about 5 to 6% aqueous solution of NaOCl) to act in the presence of a nickel compound such as $NiCl_2$, and (e) a method of causing a hydrogen acceptor such as an aldehyde or a ketone to act in the presence of an aluminum catalyst such as $Al(CH_3)_3$ or $Al[OCH(CH_3)_2]_3$ (Oppenauer oxidation).

The oxidation in the step (303b) may be performed in a solvent. The solvent used may be water or an organic solvent; examples thereof include water, ketones, alcohols, ethers, halogenated hydrocarbons, aromatic hydrocarbons, and nitriles.

The compound (10b) and the compound (20b) may also be produced by a production method including a step (401b) of oxidizing a compound (100b) represented by the following formula:

$$R^{11b}-CH=CH-Y^{1b}-OH$$

28

(wherein $R^{11b}$ and $Y^{1b}$ are defined as described above) to provide a compound (401b) represented by the following formula:

$$R^{11b}-CH_2-\underset{\underset{O}{\parallel}}{C}-Y^{1b}-OH$$

wherein $R^{11b}$ and $Y^{1b}$ are defined as described above.

The oxidation in the step (401b) may be performed by causing an oxidizing agent to act on the compound (100b) in the presence of water and a palladium compound.

Examples of the oxidizing agent include monovalent or divalent copper salts such as copper chloride, copper acetate, copper cyanide, and copper trifluoromethanethiolate, iron salts such as iron chloride, iron acetate, iron cyanide, iron trifluoromethanethiolate, and hexacyanoferrates, benzoquinones such as 1,4-benzoquinone, 2,3-dichloro-5,6-dicyano-1,4-benzoquinone, tetrachloro-1,2-benzoquinone, and tetrachloro-1,4-benzoquinone, $H_2O_2$, $MnO_2$, $KMnO_4$, $RuO_4$, m-chloroperbenzoic acid, and oxygen.

The oxidizing agent may be used in an amount of 0.001 to 10 mol based on 1 mol of the compound (100b).

The water may be used in an amount of 0.5 to 1,000 mol based on 1 mol of the compound (100b).

An example of the palladium compound is palladium dichloride. The palladium compound may be used in a catalytic amount, and may be used in an amount of 0.0001 to 1.0 mol based on 1 mol of the compound (100b).

The oxidation in the step (401b) may be performed in a solvent. Examples of the solvent include water, esters, aliphatic hydrocarbons, aromatic hydrocarbons, alcohols, carboxylic acids, ethers, halogenated hydrocarbons, nitrogen-containing polar organic compounds, nitriles, dimethyl sulfoxide, and sulfolane.

The surfactant (b) may also be produced by a production method including:

a step (31b) of oxidizing a compound (30b) represented by the following formula:

$$R^{11b}-CH=CH-(CR^{2b}_2)_n-(OR^{3b})_p-(CR^{4b}_2)_q\text{-L-}COOX^b$$

(wherein $R^{2b}$ to $R^{4b}$, $R^{11b}$, n, p, q, and $X^b$ are defined as described above; L is a single bond, $-OC_2-B-*$, $-OCO-B-*$, $-CONR^{6b}-B-*$, $-NR^{6b}CO-B-*$, or $-CO-$ other than the carbonyl groups in $-OC_2-B-$, $-OCO-B-$, $-CONR^{6b}-B-$, and $-NR^{6b}CO-B-$, wherein B is a single bond or an alkylene group having 1 to 10 carbon atoms and optionally having a substituent, $R^{6b}$ is H or an alkyl group having 1 to 4 carbon atoms and optionally having a substituent; the alkylene group more preferably has 1 to 5 carbon atoms; $R^{6b}$ is more preferably H or a methyl group; and * indicates the side bonded to $-COOX^b$ in the formula) to provide a compound (31b) represented by the following formula:

$$R^{11b}-CH_2-\underset{\underset{O}{\parallel}}{C}-(CR^{2b}_2)_{\overline{n}}(OR^{3b})_{\overline{p}}(CR^{4b}_2)_{\overline{q}}-L-COOX^b$$

wherein $R^{2b}$ to $R^{4b}$, L, $R^{11b}$, n, p, q, and $X^b$ are defined as described above.

The oxidation in the step (31b) may be performed by causing an oxidizing agent to act on the compound (30b) in the presence of water and a palladium compound under the same conditions as in the oxidation in the step (401b).

In any of the production methods described above, after the completion of each step, the solvent may be distilled off, or distillation, purification or the like may be performed to increase the purity of each resulting compound. For the resulting compounds in which $X^b$ is H, such as those containing —COOH, the compounds may be brought into contact with an alkali such as sodium carbonate or ammonia to covert these groups into the salt form.

The surfactant (a) or (b) may be used to produce a high-molecular-weight PTFE. In other words, even without using a conventional fluorine-containing surfactant, the production method of the present invention using the surfactant as described above can surprisingly produce PTFE having a molecular weight equivalent to that of PTFE obtained by a production method using such a conventional fluorine-containing surfactant.

The surfactant (a) or (b) may be used to produce a low-molecular-weight PTFE.

The low-molecular-weight PTFE may be produced by polymerization, or may be produced by reducing the molecular weight of a high-molecular-weight PTFE obtained by polymerization by a known method (e.g., thermolysis, radiolysis).

Further, the carboxylic acid type hydrocarbon-containing surfactant in the present invention may be a compound represented by the general formula (1) (hereinafter also referred to as "surfactant (1)").

General Formula (1):

$$R^1\!\!-\!\!\underset{\underset{R^5}{\overset{}{\overset{|}{C}}}}{\overset{\overset{R^4}{\overset{|}{C}}}{\overset{|}{}}}\!\!-\!\!R^2$$
$$R^3\!\!-\!\!\overset{}{\underset{}{C}}\!\!-\!\!X\!\!-\!\!A$$

wherein $R^1$ to $R^5$ each represent H or a monovalent substituent, with the proviso that at least one of $R^1$ and $R^3$ represents a group represented by the general formula: —Y—$R^6$ and at least one of $R^2$ and $R^5$ represents a group represented by the general formula: —X-A or a group represented by the general formula: —Y—$R^6$;

X is the same or different at each occurrence and represents a divalent linking group or a bond;

A is the same or different at each occurrence and represents —COOM, wherein M is H, a metal atom, $NR^7_4$, imidazolium optionally having a substituent, pyridinium optionally having a substituent, or phosphonium optionally having a substituent, wherein $R^7$ is H or an organic group; and Y is the same or different at each occurrence and represents a divalent linking group selected from the group consisting of —S(=O)$_2$—, —O—, —COO—, —OCO—, —CONR$^8$—, and —NR$^8$CO—, or a bond, wherein $R^8$ is H or an organic group;

$R^6$ is the same or different at each occurrence and represents an alkyl group having 2 or more carbon atoms and optionally containing, between carbon atoms, at least one selected from the group consisting of a carbonyl group, an ester group, an amide group, and a sulfonyl group; and any two of $R^1$ to $R^5$ optionally bind to each other to form a ring, with the proviso that, when $R^6$ does not contain any of a carbonyl group, an ester group, an amide group, and a sulfonyl group, X is a divalent linking group containing at least one selected from the group consisting of a carbonyl group, an ester group, an amide group, and a sulfonyl group.

In the formula, $R^1$ to $R^5$ each represent H or a monovalent substituent, with the proviso that at least one of $R^1$ and $R^3$ represents a group represented by the general formula: —Y—$R^6$ and at least one of $R^2$ and $R^5$ represents a group represented by the general formula: —X-A or a group represented by the general formula: —Y—$R^6$. Any two of $R^1$ to $R^5$ optionally bind to each other to form a ring.

The substituent which may be contained in the alkyl group for $R^1$ is preferably a halogen atom, a linear or branched alkyl group having 1 to 10 carbon atoms, a cyclic alkyl group having 3 to 10 carbon atoms, or a hydroxy group, particularly preferably a methyl group or an ethyl group.

The alkyl group for $R^1$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^1$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group (—CH$_3$) or an ethyl group (—C$_2$H$_5$), and most preferably a methyl group (—CH$_3$).

The monovalent substituent is preferably a group represented by the general formula: —Y—$R^6$, a group represented by the general formula: —X-A, —H, and a C$_{1\text{-}20}$ alkyl group optionally having a substituent, —NH$_2$, —NHR$^9$ (wherein $R^9$ is an organic group), —OH, —COOR$^9$ (wherein $R^9$ is an organic group) or —OR$^9$ (wherein $R^9$ is an organic group). The alkyl group preferably has 1 to 10 carbon atoms.

$R^9$ is preferably a C$_{1\text{-}10}$ alkyl group or a C$_{1\text{-}10}$ alkylcarbonyl group, more preferably a C$_{1\text{-}4}$ alkyl group or a C$_{1\text{-}4}$ alkylcarbonyl group.

In the formula, X is the same or different at each occurrence and represents a divalent linking group or a bond.

When $R^6$ does not contain any of a carbonyl group, an ester group, an amide group, and a sulfonyl group, X is preferably a divalent linking group containing at least one selected from the group consisting of a carbonyl group, an ester group, an amide group, and a sulfonyl group.

X is preferably a divalent linking group containing at least one bond selected from the group consisting of —CO—, —S(=O)$_2$—, —O—, —COO—, —OCO—, —S(=O)$_2$—O—, —O—S(=O)$_2$—, —CONR$^8$—, and —NR$^8$CO—, a C$_{1\text{-}10}$ alkylene group, or a bond. $R^8$ represents H or an organic group.

$R^8$ is preferably H or a $C_{1-10}$ organic group, more preferably H or a $C_{1-4}$ organic group, and still more preferably H.

In the formula, A is the same or different at each occurrence and represents —COOM, wherein M is H, a metal atom, $NR^7_4$, imidazolium optionally having a substituent, pyridinium optionally having a substituent, or phosphonium optionally having a substituent, wherein $R^7$ is H or an organic group, and four $R^7$ are the same as or different from each other.

$R^7$ is preferably H or a $C_{1-10}$ organic group, more preferably H or a $C_{1-4}$ organic group.

Examples of the metal atom include alkali metals (Group 1) and alkaline earth metals (Group 2), and preferred is Na, K, or Li.

M is preferably H, a metal atom, or $NR^7_4$, more preferably H, an alkali metal (Group 1), an alkaline earth metal (Group 2), or $NR^7_4$, still more preferably H, Na, K, Li, or $NH_4$, further preferably Na, K, or $NH_4$, particularly preferably Na or $NH_4$, and most preferably $NH_4$.

In the formula, Y is the same or different at each occurrence and represents a divalent linking group selected from the group consisting of —S(=O)$_2$—, —O—, —COO—, —OCO—, —CONR$^8$—, and —NR$^8$CO—, or a bond, wherein $R^8$ represents H or an organic group.

Y is preferably a divalent linking group selected from the group consisting of a bond, —O—, —COO—, —OCO—, —CONR$^8$—, and —NR$^8$CO—, more preferably a divalent linking group selected from the group consisting of a bond, —COO—, and —OCO—.

$R^8$ is preferably H or a $C_{1-10}$ organic group, more preferably H or a $C_{1-4}$ organic group, and still more preferably H.

In the formula, $R^6$ is the same or different at each occurrence and represents an alkyl group having 2 or more carbon atoms and optionally containing, between carbon atoms, at least one selected from the group consisting of a carbonyl group, an ester group, an amide group, and a sulfonyl group. The organic group represented by $R^6$ preferably has 2 to 20 carbon atoms, more preferably 2 to 10 carbon atoms.

The alkyl group for $R^6$ optionally contains, between carbon atoms, one or two or more of at least one selected from the group consisting of a carbonyl group, an ester group, an amide group, and a sulfonyl group, but the alkyl group contains no such groups at ends. In the alkyl group for $R^6$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^6$ is preferably a group represented by the general formula: —R$^{10}$—CO—R$^{11}$, a group represented by the general formula: —R$^{10}$—COO—R$^{11}$, a group represented by the general formula: —R$^{11}$, a group represented by the general formula: —R$^{10}$—NR$^8$CO—R$^{11}$, or a group represented by the general formula: —R$^{10}$—CONR$^8$—R$^{11}$, wherein $R^8$ represents H or an organic group; $R^{10}$ represents an alkylene group; and $R^{11}$ represents an alkyl group optionally having a substituent.

$R^6$ is more preferably a group represented by the general formula: —R$^{10}$—CO—R$^{11}$.

$R^8$ is preferably H or a $C_{1-10}$ organic group, more preferably H or a $C_{1-4}$ organic group, and still more preferably H.

The alkylene group for $R^{10}$ preferably has 1 or more, and more preferably 3 or more carbon atoms, and preferably 20 or less, more preferably 12 or less, still more preferably 10 or less, and particularly preferably 8 or less carbon atoms. Further, the alkylene group for $R^{10}$ preferably has 1 to 20, more preferably 1 to 10, and still more preferably 3 to 10 carbon atoms.

The alkyl group for $R^{11}$ may have 1 to 20 carbon atoms, and preferably has 1 to 15, more preferably 1 to 12, still more preferably 1 to 10, further preferably 1 to 8, still further preferably 1 to 6, still much more preferably 1 to 3, particularly preferably 1 or 2, and most preferably 1 carbon atom. The alkyl group for $R^{11}$ preferably consists only of primary carbons, secondary carbons, and tertiary carbons, and particularly preferably consists only of primary carbons and secondary carbons. In other words, $R^{11}$ is preferably a methyl group, an ethyl group, an n-propyl group, or an isopropyl group, and most preferably a methyl group.

The surfactant (1) is preferably a compound represented by the general formula (1-1), a compound represented by the general formula (1-2), or a compound represented by the general formula (1-3), more preferably a compound represented by the general formula (1-1) or a compound represented by the general formula (1-2).

General Formula (1-1):

$$R^6\!-\!Y\!-\!\overset{\displaystyle R^4}{\underset{\displaystyle R^3\!-\!\overset{|}{\underset{\displaystyle R^5}{C}}\!-\!X\!-\!A}{\overset{|}{C}}}\!-\!X\!-\!A$$

wherein $R^3$ to $R^6$, X, A, and Y are defined as described above.

General Formula (1-2):

$$R^6\!-\!Y\!-\!\overset{\displaystyle R^4}{\underset{\displaystyle R^6\!-\!Y\!-\!\overset{|}{\underset{\displaystyle R^5}{C}}\!-\!X\!-\!A}{\overset{|}{C}}}\!-\!X\!-\!A$$

wherein $R^4$ to $R^6$, X, A, and Y are defined as described above.

General formula (1-3):

$$R^6\!-\!Y\!-\!\overset{\displaystyle R^4}{\underset{\displaystyle R^6\!-\!Y\!-\!\overset{|}{\underset{\displaystyle R^5}{C}}\!-\!X\!-\!A}{\overset{|}{C}}}\!-\!R^2$$

wherein $R^2$, $R^4$ to $R^6$, X, A, and Y are defined as described above.

The group represented by the general formula: —X-A is preferably

—COOM,

—$R^{12}$COOM,

—OCO—$R^{12}$—COOM,

—COO—$R^{12}$—COOM,

—CONR$^8$—$R^{12}$—COOM,

—NR$^8$CO—$R^{12}$—COOM,

—OS(=O)$_2$—$R^{12}$—COOM, wherein $R^8$ and M are defined as described above; and $R^{12}$ is a $C_{1-10}$ alkylene group.

In the alkylene group for $R^{12}$, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

The group represented by the general formula: —Y—$R^6$ is preferably a group represented by the general formula: —$R^{10}$—CO—$R^{11}$, a group represented by the general formula: —OCO—$R^{10}$—CO—$R^{11}$, a group represented by the general formula: —COO—$R^{10}$—CO—$R^{11}$, a group represented by the general formula: —OCO—$R^{10}$—COO—$R^{11}$, a group represented by the general formula: —COO—$R^{11}$, a group represented by the general formula: —NR$^8$CO—$R^{10}$—CO—$R^{11}$, or a group represented by the general formula: —CONR$^8$—$R^{10}$—NR$^8$CO—$R^{11}$, wherein $R^8$, $R^{10}$, and $R^{11}$ are defined as described above.

In the formula, $R^4$ and $R^5$ are each independently preferably H or a $C_{1-4}$ alkyl group.

In the alkyl groups for $R^4$ and $R^5$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^3$ in the general formula (1-1) is preferably H or a $C_{1-20}$ alkyl group optionally having a substituent, more preferably H or a $C_{1-20}$ alkyl group having no substituent, and still more preferably H.

In the alkyl group for $R^3$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^2$ in the general formula (1-3) is preferably H, OH, or a $C_{1-20}$ alkyl group optionally having a substituent, more preferably H, OH, or a $C_{1-20}$ alkyl group having no substituent, and still more preferably H or OH.

In the alkyl group for $R^2$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The surfactant (1) may suitably be produced by a production method including:

a step (11) of reacting a carboxylic acid represented by the formula: $R^6$—COOH (wherein $R^6$ is defined as mentioned above) and a halogenating agent to provide a carboxylic acid halide represented by the formula: $R^6$—COZ (wherein $R^6$ is defined as mentioned above; and Z is a halogen atom); and a step (12) of reacting the carboxylic acid halide and a compound represented by the formula:

$$HZ^{11}\!-\!\underset{\underset{\displaystyle R^5}{|}}{\overset{\overset{\displaystyle R^4}{|}}{C}}\!-\!X\!-\!A \atop R^3\!-\!C\!-\!X\!-\!A$$

(wherein $R^3$ to $R^5$, X, and A are defined as described above; and $Z^{11}$ is —CH$_2$O—, —O—, or —NH—) to provide a compound (12) represented by the formula:

$$R^6\!-\!\overset{\overset{\displaystyle O}{\|}}{C}\!-\!Z^{11}\!-\!\underset{\underset{\displaystyle R^5}{|}}{\overset{\overset{\displaystyle R^4}{|}}{C}}\!-\!X\!-\!A \atop R^3\!-\!C\!-\!X\!-\!A$$

wherein $R^3$ to $R^6$, X, A, and $Z^{11}$ are defined as described above.

$R^3$ in the formula for the above acid compound is preferably a group represented by the general formula: —$Z^{11}$H (wherein $Z^{11}$ is defined as described above) or —H. When $R^3$ is a group represented by the general formula: —$Z^{11}$H, this group reacts with the carboxylic acid halide in the step (12) to generate a group represented by the general formula: —$Z^{11}$—CO—$R^6$, wherein $R^6$ and $Z^{11}$ are defined as described above.

Examples of the halogenating agent used in the step (11) include oxalyl chloride, thionyl chloride, diethylaminosulfur trifluoride (DAST), Deoxo-Fluor, and 1,1,2,2-tetrafluoro-N, N-dimethylethylamine (TFEDMA).

Z is preferably F or Cl, more preferably Cl.

Regarding the reaction ratio between the carboxylic acid and the halogenating agent in the step (11), the amount of the halogenating agent is preferably 0.6 to 5.0 mol, and more preferably 0.8 to 2.0 mol, based on 1 mol of the carboxylic acid in consideration of the improvement of the yield and the reduction of the waste. The amount of the halogenating agent is also preferably 0.5 to 10 mol, and more preferably 0.6 to 5.0 mol.

The reaction in the step (11) may be performed in a solvent. Examples of the solvent include esters, ketones, aromatic hydrocarbons, ethers, nitrogen-containing polar organic compounds, halogenated hydrocarbons, nitriles, pyridines, and mixtures thereof.

Examples of the esters include ethyl acetate, butyl acetate, ethylene glycol monomethyl ether acetate, and propylene glycol monomethyl ether acetate (PGMEA, also known as 1-methoxy-2-acetoxypropane), of which ethyl acetate is preferred.

Examples of the ketones include acetone, methyl ethyl ketone, methyl isobutyl ketone, cyclohexanone, and diacetone alcohol, of which acetone is preferred.

Examples of the aromatic hydrocarbon include benzene, toluene, and xylene, of which benzene and toluene are preferred.

Examples of the ether include diethyl ether, tetrahydrofuran, dioxane, and diethylene glycol diethyl ether, of which diethyl ether and tetrahydrofuran are preferred.

Examples of the nitrogen-containing polar organic compound include N,N-dimethylformamide, N,N-dimethylacetamide, N-methyl-2-pyrrolidone, 2-pyrrolidone, and 1,3-dimethyl-2-imidazolidinone, of which N,N-dimethylformamide, N,N-dimethylacetamide, and N-methyl-2-pyrrolidone are preferred.

Examples of the halogenated hydrocarbon include dichloromethane, dichloroethane, chloroform, chlorobenzene, and o-dichlorobenzene, of which dichloromethane and chloroform are preferred.

Examples of the nitrile include acetonitrile, propionitrile, butyronitrile, isobutyronitrile, and benzonitrile, of which acetonitrile is preferred.

The reaction temperature in the step (11) is preferably 0 to 150° C., and more preferably 20 to 100° C. The reaction temperature is also preferably −78 to 150° C., and more preferably 0 to 100° C.

The reaction pressure in the step (11) is preferably 0 to 5 MPa, and more preferably 0.1 to 1.0 MPa.

The reaction duration in the step (11) is preferably 0.1 to 72 hours, and more preferably 0.1 to 48 hours.

Regarding the reaction ratio between the carboxylic acid halide and the acid compound in the step (12), the amount of the acid compound is preferably 0.5 to 10 mol, more preferably 0.6 to 5.0 mol, and still more preferably 0.8 to 2.0 mol, based on 1 mol of the carboxylic acid halide in consideration of the improvement of the yield and the reduction of the waste.

The reaction in the step (12) is preferably performed in the presence of an acid. Examples of the acid include sulfuric acid, methanesulfonic acid, and p-toluenesulfonic acid, of which sulfuric acid is preferred.

The amount of the acid used in the step (12) is preferably 0.00001 to 1.0 mol, more preferably 0.0001 to 1.0 mol, still more preferably 0.00005 to 0.1 mol, and particularly preferably 0.001 to 0.1 mol, based on 1 mol of the carboxylic acid halide in consideration of the improvement of the yield and the reduction of the waste.

The reaction temperature in the step (12) is preferably 0 to 150° C., and more preferably 20 to 100° C.

The reaction pressure in the step (12) is preferably 0 to 5 MPa, and more preferably 0.1 to 1.0 MPa.

The reaction duration in the step (12) is preferably 0.1 to 72 hours, and more preferably 0.1 to 48 hours.

The surfactant (1) may also suitably be produced by a production method including a step (21) of reacting a compound (20) represented by the formula:

$$R^1—\underset{\underset{R^5}{|}}{\overset{\overset{R^4}{|}}{C}}—R^2$$
$$R^3—C—Z^{11}H$$

(wherein $R^1$ to $R^5$ are defined as described above; and $Z^{11}$ is —CH$_2$O—, —O—, or —NH—) and an acid anhydride represented by the formula:

$$O{=}C\underset{(CH_2)_n}{\overset{O}{\diagdown\diagup}}C{=}O$$

(wherein n is an integer of 1 to 5) to provide a compound (21) represented by the formula:

$$R^1—\overset{\overset{R^4}{|}}{C}—R^2$$
$$R^3—\underset{\underset{R^5}{|}}{C}—Z^{11}—\overset{\overset{}{C}}{\underset{O}{\|}}—(CH_2)_n—COOM$$

wherein $R^1$ to $R^5$, $Z^{11}$, M, and n are defined as described above.

$R^2$ in the formula of the compound (20) is preferably a group represented by the general formula: —$Z^{11}$H (wherein $Z^{11}$ is defined as described above) or —H. When $R^2$ is a group represented by the general formula: —$Z^{11}$H, this group reacts with the acid anhydride in the step (21) to generate a group represented by the general formula: —$Z^{11}$—CO—(CH$_2$)$_n$—COOM, wherein $Z^{11}$, M, and n are defined as described above. The compound (20) may be a hydrochloride salt, a sulfate salt, or the like as long as it has a structure represented by the above formula.

Regarding the reaction ratio between the compound (20) and the acid anhydride in the step (21), the amount of the acid anhydride is preferably 0.5 to 10 mol, more preferably 0.6 to 5.0 mol, still more preferably 1.2 to 10 mol, and particularly preferably 1.6 to 4.0 mol, based on 1 mol of the compound (20) in consideration of the improvement of the yield and the reduction of the waste.

The reaction in the step (21) may be performed in the presence of a base.

Examples of the base include amines, potassium hydroxide, sodium hydroxide, and potassium carbonate.

Examples of the amines include tertiary amines such as trimethylamine, triethylamine, tributylamine, N,N-dimethylaniline, dimethylbenzylamine, and N,N,N',N'-tetramethyl-1,8-naphthalenediamine, heteroaromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene, and pyridine or triethylamine is preferred.

The reaction temperature in the step (21) is preferably 0 to 150° C., and more preferably 20 to 80° C. The reaction temperature is also preferably −78 to 150° C., and more preferably 0 to 100° C.

The reaction pressure in the step (21) is preferably 0 to 5 MPa, and more preferably 0.1 to 1 MPa.

The reaction duration in the step (21) is preferably 0.1 to 72 hours, and more preferably 0.1 to 48 hours.

The surfactant (1) may also suitably be produced by a production method including:

a step (31) of reacting a tartaric acid ester represented by the formula:

$$C_2H_5-O-\overset{\overset{O}{\|}}{C}-\overset{\overset{R^4}{|}}{C}-OH$$
$$C_2H_5-O-\overset{}{C}-\overset{}{\underset{\underset{R^5}{|}}{C}}-OH$$
$$\qquad\qquad\qquad\overset{\|}{O}$$

(wherein $R^4$ and $R^5$ are defined as described above) and an amine represented by the formula: $R^6R^8$—NH (wherein $R^6$ and $R^8$ are defined as described above) to provide a compound (31) represented by the formula:

$$R^6-\overset{\overset{R^8}{|}}{N}-\overset{\overset{O}{\|}}{C}-\overset{\overset{R^4}{|}}{C}-OH$$
$$R^6-\overset{}{\underset{\underset{R^8}{|}}{N}}-\overset{}{\underset{\underset{O}{\|}}{C}}-\overset{}{\underset{\underset{R^5}{|}}{C}}-OH$$

(wherein $R^4$ to $R^6$ and $R^8$ are defined as described above); and a step (51) of reacting the compound (31) and an acid anhydride represented by the formula:

$$O=C\overset{\overset{O}{\diagup\diagdown}}{\underset{\underset{(CH_2)_n}{\diagdown\diagup}}{}}C=O$$

(wherein n is an integer of 1 to 5) to provide a compound (51) represented by the formula:

$$R^6-\overset{\overset{R^8}{|}}{N}-\overset{\overset{O}{\|}}{C}-\overset{\overset{R^4}{|}}{C}-O-\overset{\overset{O}{\|}}{C}-(CH_2)_n-COOM$$
$$R^6-\overset{}{\underset{\underset{R^8}{|}}{N}}-\overset{}{\underset{\underset{O}{\|}}{C}}-\overset{}{\underset{\underset{R^5}{|}}{C}}-O-\overset{}{\underset{\underset{O}{\|}}{C}}-(CH_2)_n-COOM$$

wherein $R^4$ to $R^6$, $R^8$, M, and n are defined as described above.

Regarding the reaction ratio between the compound (31) and the acid anhydride in the step (51), the amount of the acid anhydride is preferably 0.5 to 10 mol, more preferably 0.6 to 4.0 mol, still more preferably 1.2 to 4.0 mol, and particularly preferably 1.6 to 4.0 mol, based on 1 mol of the compound (31) in consideration of the improvement of the yield and the reduction of the waste.

The reaction in the step (51) may be performed in the presence of a base.

Examples of the base include amines, potassium hydroxide, sodium hydroxide, and potassium carbonate.

Examples of the amines include tertiary amines such as trimethylamine, triethylamine, tributylamine, N,N-dimethylaniline, dimethylbenzylamine, and N,N,N',N'-tetramethyl-1,8-naphthalenediamine, heteroaromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene, and pyridine or triethylamine is preferred.

The reaction temperature in the step (51) is preferably −78 to 150° C., more preferably 0 to 150° C., still more preferably 0 to 100° C., and particularly preferably 20 to 80° C.

The reaction pressure in the step (51) is preferably 0 to 5 MPa, and more preferably 0.1 to 1 MPa.

The reaction duration in the step (51) is preferably 0.1 to 72 hours, and more preferably 0.1 to 48 hours.

In any of the production methods described above, after the completion of each step, the solvent may be distilled off, or distillation, purification or the like may be performed to increase the purity of each resulting compound. When the resulting compound is —COOH, the compound may be brought into contact with an alkali such as sodium carbonate or ammonia to covert these groups into the salt form.

In the production method of the present invention, at least one carboxylic acid type hydrocarbon-containing surfactant may be used. In the production method of the present invention, two or more of the carboxylic acid type hydrocarbon-containing surfactants may be used as the surfactant in combination, and a surfactant other than the carboxylic acid type hydrocarbon-containing surfactants may also be used in combination therewith insofar as the surfactant is volatile or is allowed to remain in a molded body formed from the fluoropolymer or the like.

In the production method of the present invention, a carboxylic acid type hydrocarbon-containing surfactant obtained by subjecting the carboxylic acid type hydrocarbon-containing surfactant to a radical treatment or an oxidation treatment may also be used. The production method of the present invention preferably includes subjecting the carboxylic acid type hydrocarbon-containing surfactant to a radical treatment or an oxidation treatment.

The radical treatment may be any treatment that generates radicals in the carboxylic acid type hydrocarbon-containing surfactant, for example, a treatment in which deionized water and the carboxylic acid type hydrocarbon-containing surfactant are added to the reactor, the reactor is sealed, the system is purged with nitrogen, the reactor is heated and pressurized, a polymerization initiator is charged, the reactor is stirred for a certain time, and then the pressure is released until the pressure in the reactor decreases to the atmospheric pressure, and the reactor is cooled. The oxidation treatment is a treatment in which an oxidizing agent is added to the carboxylic acid type hydrocarbon-containing surfactant. Examples of the oxidizing agent include oxygen, ozone, hydrogen peroxide solution, manganese(IV) oxide, potassium permanganate, potassium dichromate, nitric acid, sulfur dioxide, and iron(II) sulfate heptahydrate.

The production method of the present invention may further include adjusting the pH of the aqueous medium containing the carboxylic acid type hydrocarbon-containing surfactant to basic. Regarding the basicity, the pH is preferably 7.1 or higher, more preferably 7.5 or higher, still more preferably 8.0 or higher, particularly preferably 8.5 or higher, and still further preferably 9.0 or higher. By adjusting the pH to basic, the surfactant abilities can be increased. The adjustment of the pH may be performed before or after performing the radical treatment or the oxidation treatment on the carboxylic acid type hydrocarbon-containing surfactant, but is preferably performed thereafter. Examples of the method of adjusting the pH include, but are not limited to, a method of adding a pH adjuster to the aqueous medium. Examples of the pH adjuster include ammonia, NaOH aqueous solution, potassium hydroxide aqueous solution, sodium carbonate, potassium carbonate, ammonium carbonate, sodium hydrogen carbonate, potassium hydrogen carbonate, ammonium hydrogen carbonate, sodium phosphate, potassium phosphate, sodium citrate, potassium citrate, ammonium citrate, sodium gluconate, potassium gluconate, and ammonium gluconate. The pH can be measured by a pH meter manufactured by orion.

Examples of the other surfactants include nonionic surfactants and silicone-based surfactants.

The nonionic surfactant is preferably at least one selected from the group consisting of:

a compound represented by the general formula (240):

$$Rf^{241}\!-\!(X^{241})_n\!-\!Y^{241}$$

wherein $Rf^{241}$ is a partially fluorinated alkyl group or fully fluorinated alkyl group having 1 to 12 carbon atoms; n is 0 or 1; $X^{241}$ is —O—, —COO—, or —OCO—; $Y^{241}$ is —$(CH_2)_p$H, —$(CH_2)_p$OH, or —$(OR241)_q(OR^{242})_z$ OH; p is an integer of 1 to 12; q is an integer of 1 to 12; r is an integer of 0 to 12; and $R^{241}$ and $R^{242}$ are each an alkylene group having 2 to 4 carbon atoms, with the proviso that $R^{241}$ and $R^{242}$ are different from each other;

a block polymer represented by the general formula (250):

$$H(OR^{251})_u(OR^{252})_v OH$$

wherein $R^{251}$ and $R^{252}$ are each an alkylene group having 1 to 4 carbon atoms; u and v are each an integer of 1 to 5, with the proviso that $R^{251}$ and $R^{252}$ are different from each other;

a nonionic polymer having a hydrophobic group containing a hydrocarbon group having 8 to 20 carbon atoms and a hydrophilic group containing a polyalkylene oxide in the molecule; and a silicon compound represented by the general formula (260):

$$R^{261}{}_m\!-\!Si\!-\!(OR^{262})_{4-m}$$

wherein $R^{261}$ is an alkyl group having 1 to 12 carbon atoms; $R^{262}$ is an alkyl group having 1 to 4 carbon atoms; and m is an integer of 1 to 3.

Specific examples of the block polymer represented by the general formula (250) include block polymers composed of at least two segments selected from the group consisting of polyoxyethylene, polyoxypropylene, and polyoxybutylene. Examples thereof include polyoxyethylene-polyoxypropylene block polymers and polyoxyethylene-polyoxybutylene block polymers, and not only A-B block polymers but also A-B-A block polymers are preferred. More preferably, use of a polyoxyethylene-polyoxypropylene block polymer or a polyoxypropylene-polyoxyethylene-polyoxypropylene block polymer allows to prepare a stable fluoropolymer dispersion at a high concentration. In addition, the content of the polyoxyethylene segment is preferably 10 to 50% in view of reducing generation of agglomerates considered to be caused by re-agglomeration, and more preferably 20 to 40% because it allows for the preparation of low viscosity fluoropolymer dispersions. The polyoxyethylene segment may have a molecular weight of, but not limited to, 1,000 to 7,000 g/mol, and in particular, the use of a polyoxyethylene segment having a molecular weight of 2,500 to 6,500 g/mol allows to prepare a dispersion having a low viscosity and excellent dispersibility.

Examples of the silicone-based surfactant include those described in Silicone Surfactants, R. M. Hill, Marcel Dekker, Inc., ISBN: 0-8247-00104. The structure of the silicone-based surfactant includes defined hydrophobic and hydrophilic moieties. The hydrophobic moiety contains one or more dihydrocarbyl siloxane units, where the substituents on the silicone atoms are completely hydrocarbon.

In the sense that the carbon atoms of the hydrocarbyl groups are fully substituted with hydrogen atoms where they can be substituted by halogen such as fluorine, these siloxane surfactants can also be regarded as hydrocarbon surfactants, i.e. the monovalent substituents on the carbon atoms of the hydrocarbyl groups are hydrogen.

The hydrophilic moiety of the silicone-based surfactant may contain one or more polar moieties including ionic groups such as sulfate, sulfonate, phosphonate, phosphate ester, carboxylate, carbonate, sulfosuccinate, taurate (as the free acid, a salt or an ester), phosphine oxides, betaine, betaine copolyol, or quaternary ammonium salts. Ionic hydrophobic moieties may also contain ionically functionalized siloxane grafts.

Examples of such silicone-based surfactants include polydimethylsiloxane-graft-(meth)acrylic acid salts, polydimethylsiloxane-graft-polyacrylate salts, and polydimethylsiloxane-grafted quaternary amines.

The polar moieties of the hydrophilic moiety of the silicone-based surfactant may contain nonionic groups formed by polyethers, such as polyethylene oxide (PEO), and mixed polyethylene oxide/propylene oxide polyethers (PEG/PPO); mono- and disaccharides; and water-soluble heterocycles such as pyrrolidinone. The ratio of ethylene oxide to propylene oxide (EO/PO) may be varied in mixed polyethylene oxide/propylene oxide polyethers.

The hydrophilic moiety of the silicone-based surfactant may also contain a combination of ionic and nonionic moieties. Such moieties include, for example, ionically end-functionalized or randomly functionalized polyether or polyol. Preferred for the practice of the present invention are silicone-based surfactants that have nonionic moieties, i.e., are nonionic silicone-based surfactants.

The arrangement of the hydrophobic and hydrophilic moieties of the structure of a silicone-based surfactant may take the form of a diblock polymer (AB), triblock polymer (ABA), wherein the "B" represents the siloxane portion of the molecule, or a multi-block polymer. Alternatively, the silicone-based surfactant may contain a graft polymer.

The silicone-based surfactants also include those disclosed in U.S. Pat. No. 6,841,616.

Examples of the silicone-based anionic hydrocarbon surfactant include Noveon (R) by Lubrizol Advanced Materials, Inc. and SilSense™ PE-100 silicone and SilSense™ CA-1 silicone available from Consumer Specialties.

Examples of the anionic hydrocarbon surfactant also include a sulfosuccinate surfactant Lankropol (R) K8300 by Akzo Nobel Surface Chemistry LLC.

Examples of the sulfosuccinate hydrocarbon surfactant include sodium diisodecyl sulfosuccinate (Emulsogen (R) SB10 by Clariant) and sodium diisotridecyl sulfosuccinate (Polirol (R) TR/LNA by Cesapinia Chemicals).

Examples of the hydrocarbon surfactants also include PolyFox (R) surfactants by Omnova Solutions, Inc. (PolyFox™ PF-156A, PolyFox™ PF-136A, etc.).

When the carboxylic acid type hydrocarbon-containing surfactant is used in combination with another surfactant, the carboxylic acid type hydrocarbon-containing surfactant is preferably 50% by mass or more, more preferably 60% by mass or more, still more preferably 70% by mass or more, particularly preferably 80% by mass or more, and particularly preferably 90% by mass or more based on the total amount of the surfactant. In the polymerization step, it is preferable that the carboxylic acid type hydrocarbon-containing surfactant and the other surfactant are not used substantially in combination, and the other surfactant is preferably 1% by mass or less, more preferably 0.5% by mass or less, and still more preferably 0.1% by mass or less of the total amount of the surfactant.

The method for producing a fluoropolymer of the present invention includes polymerizing a fluoromonomer in an aqueous medium to provide a fluoropolymer. The polymerization may be emulsion polymerization, for example.

The fluoromonomer preferably has at least one double bond.

The fluoromonomer is preferably at least one selected from the group consisting of tetrafluoroethylene (TFE), hexafluoropropylene (HFP), chlorotrifluoroethylene (CTFE), vinyl fluoride, vinylidene fluoride (VDF), trifluoroethylene, fluoroalkyl vinyl ether, fluoroalkyl ethylene, trifluoropropylene, pentafluoropropylene, trifluorobutene, tetrafluoroisobutene, hexafluoroisobutene, a fluoromonomer represented by the general formula (100): $CH_2=CFRf^{101}$ (wherein $Rf^{101}$ is a linear or branched fluoroalkyl group having 1 to 12 carbon atoms), a fluorinated vinyl heterocyclic compound, and a monomer that provides a crosslinking site.

The fluoroalkyl vinyl ether is preferably, for example, at least one selected from the group consisting of:

a fluoromonomer represented by the general formula (110):

$$CF_2=CF\!-\!ORf^{111}$$

wherein $Rf^{111}$ represents a perfluoroorganic group;

a fluoromonomer represented by the general formula (120):

$$CF_2=CF\!-\!OCH_2\!-\!Rf^{121}$$

wherein $Rf^{121}$ represents a perfluoroalkyl group having 1 to 5 carbon atoms;

a fluoromonomer represented by the general formula (130):

$$CF_2=CFOCF_2ORf^{131}$$

wherein $Rf^{131}$ is a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms and containing 1 to 3 oxygen atoms;

a fluoromonomer represented by the general formula (140):

$$CF_2=CFO(CF_2CF(Y^{141})O)_m(CF_2)_nF$$

wherein $Y^{141}$ represents a fluorine atom or a trifluoromethyl group; m is an integer of 1 to 4; and n is an integer of 1 to 4; and a fluoromonomer represented by the general formula (150):

$$CF_2=CF\!-\!O\!-\!(CF_2CFY^{151}O)_n\!-\!(CFY^{152})_m\!-\!A^{151}$$

wherein $Y^{151}$ represents a fluorine atom, a chlorine atom, a $-SO_2F$ group, or a perfluoroalkyl group; the perfluoroalkyl group optionally contains ether oxygen and a $-SO_2F$ group; n represents an integer of 0 to 3; n $Y^{151}$s are the same as or different from each other; $Y^{152}$ represents a fluorine atom, a chlorine atom, or a $-SO_2F$ group; m represents an integer of 1 to 5; m $Y^{152}$s are the same as or different from each other; $A^{151}$ represents $-SO_2X^{151}$, $-COZ^{151}$, or $-POZ^{152}Z^{153}$; $X^{151}$ represents F, Cl, Br, I, $-OR^{151}$, or $-NR^{152}R^{153}$; $Z^{151}$, $Z^{152}$, and $Z^{153}$ are the same as or different from each other, and each represent $-NR^{154}R^{155}$ or $-OR^{156}$; $R^{151}$, $R^{152}$, $R^{153}$, $R^{154}$, $R^{155}$, and $R^{156}$ are the same as or different from each other, and each represent H, ammonium, an alkali metal, or an alkyl group, aryl group, or sulfonyl-containing group optionally containing a fluorine atom.

The "perfluoroorganic group" as used herein means an organic group in which all hydrogen atoms bonded to the carbon atoms are replaced by fluorine atoms. The perfluoroorganic group optionally has ether oxygen.

An example of the fluoromonomer represented by the general formula (110) is a fluoromonomer in which $Rf^{111}$ is a perfluoroalkyl group having 1 to 10 carbon atoms. The perfluoroalkyl group preferably has 1 to 5 carbon atoms.

Examples of the perfluoroorganic group in the general formula (110) include a perfluoromethyl group, a perfluoroethyl group, a perfluoropropyl group, a perfluorobutyl group, a perfluoropentyl group, and a perfluorohexyl group.

Examples of the fluoromonomer represented by the general formula (110) also include those represented by the general formula (110) in which $Rf^{111}$ is a perfluoro(alkoxyalkyl) group having 4 to 9 carbon atoms; those in which $Rf^{111}$ is a group represented by the following formula:

wherein m represents 0 or an integer of 1 to 4; and those in which $Rf^{111}$ is a group represented by the following formula:

wherein n represents an integer of 1 to 4.

Of these, the fluoromonomer represented by the general formula (110) is preferably a fluoromonomer represented by the general formula (160):

$$CF_2=CF\!-\!ORf^{161}$$

wherein $Rf^{161}$ represents a perfluoroalkyl group having 1 to 10 carbon atoms. $Rf^{161}$ is preferably a perfluoroalkyl group having 1 to 5 carbon atoms.

The fluoroalkyl vinyl ether is preferably at least one selected from the group consisting of fluoromonomers represented by the general formulas (160), (130), and (140).

The fluoromonomer represented by the general formula (160) is preferably at least one selected from the group consisting of perfluoro(methyl vinyl ether), perfluoro(ethyl vinyl ether), and perfluoro(propyl vinyl ether), and is more preferably at least one selected from the group consisting of perfluoro(methyl vinyl ether) and perfluoro(propyl vinyl ether).

The fluoromonomer represented by the general formula (130) is preferably at least one selected from the group consisting of $CF_2=CFOCF_2OCF_3$, $CF_2=CFOCF_2OCF_2CF_3$, and $CF_2=CFOCF_2OCF_2CF_2OCF_3$.

The fluoromonomer represented by the general formula (140) is preferably at least one selected from the group consisting of $CF_2=CFOCF_2CF(CF_2)O(CF_2)_3F$, $CF_2=CFO(CF_2CF(CF_2)O)_2(CF_2)_3F$, and $CF_2=CFO(CF_2CF(CF_3)O)_2(CF_2)_2F$.

The fluoromonomer represented by the general formula (150) is preferably at least one selected from the group consisting of $CF_2=CFOCF_2CF_2SO_2F$, $CF_2=CFOCF_2CF$ $(CF_3)OCF_2CF_2SO_2F$, $CF_2=CFOCF_2CF(CF_2CF_2SO_2F)$ $OCF_2CF_2SO_2F$, and $CF_2=CFOCF_2CF(SO_2F)_2$.

The fluoromonomer represented by the general formula (100) is preferably a fluoromonomer in which $Rf^{101}$ is a linear fluoroalkyl group, and more preferably a fluoromonomer in which $Rf^{101}$ is a linear perfluoroalkyl group. $Rf^{101}$ preferably has 1 to 6 carbon atoms. Examples of the fluoromonomer represented by the general formula (100) include $CH_2=CFCF_3$, $CH_2=CFCF_2CF_3$, $CH_2=CFCF_2CF_2CF_3$, $CH_2=CFCF_2CF_2CF_2H$, and $CH_2=CFCF_2CF_2CF_2CF_3$, of which preferred is 2,3,3,3-tetrafluoropropylene represented by $CH_2=CFCF_3$.

The fluoroalkyl ethylene is preferably a fluoroalkyl ethylene represented by the general formula (170):

$$CH_2=CH-(CF_2)_n-X^{171}$$

(wherein $X^{171}$ is H or F; and n is an integer of 3 to 10), and more preferably at least one selected from the group consisting of $CH_2=CH-C_4F_9$ and $CH_2=CH-C_6F_{13}$.

The monomer that provides a crosslinking site is preferably at least one selected from the group consisting of:

a fluoromonomer represented by the general formula (180):

$$CX^{181}_2=CX^{182}-R_f^{181}CHR^{181}X^{183}$$

wherein $X^{181}$ and $X^{182}$ are each independently a hydrogen atom, a fluorine atom, or $CH_3$; $Rf^{181}$ is a fluoroalkylene group, a perfluoroalkylene group, a fluoro(poly)oxyalkylene group, or a perfluoro(poly)oxyalkylene group; $R^{181}$ is a hydrogen atom or $CH_3$; and $X^{183}$ is an iodine atom or a bromine atom;

a fluoromonomer represented by the general formula (190):

$$CX^{191}_2=CX^{192}-R_f^{191}X^{193}$$

wherein $X^{191}$ and $X^{192}$ are each independently a hydrogen atom, a fluorine atom, or $CH_3$; $R_f^{191}$ is a fluoroalkylene group, a perfluoroalkylene group, a fluoropolyoxyalkylene group, or a perfluoropolyoxyalkylene group; and $X^{193}$ is an iodine atom or a bromine atom;

a fluoromonomer represented by the general formula (200):

$$CF_2=CFO(CF_2CF(CF_3)O)_m(CF_2)_n-X^{201}$$

wherein m is an integer of 0 to 5; n is an integer of 1 to 3; and $X^{201}$ is a cyano group, a carboxyl group, an alkoxycarbonyl group, an iodine atom, a bromine atom, or $-CH_2I$; and a fluoromonomer represented by the general formula (210):

$$CH_2=CFCF_2O(CF(CF_3)CF_2O)_m(CF(CF_3))_n-X^{211}$$

wherein m is an integer of 0 to 5; n is an integer of 1 to 3; and $X^{211}$ is a cyano group, a carboxyl group, an alkoxycarbonyl group, an iodine atom, a bromine atom, or $-CH_2OH$; and a monomer represented by the general formula (220):

$$CR^{221}R^{222}=CR^{223}-Z^{221}-CR^{224}=CR^{225}R^{226}$$

wherein $R^{221}$, $R^{222}$, $R^{223}$, $R^{224}$, $R^{225}$, and $R^{226}$ are the same as or different from each other, and are each a hydrogen atom or an alkyl group having 1 to 5 carbon atoms; $Z^{221}$ is a linear or branched alkylene group having 1 to 18 carbon atoms and optionally having an oxygen atom, a cycloalkylene group having 3 to 18 carbon atoms, an at least partially fluorinated alkylene or oxyalkylene group having 1 to 10 carbon atoms, or a (per) fluoropolyoxyalkylene group which is represented by:

$$-(Q)_p-CF_2O-(CF_2CF_2O)_m(CF_2O)_n-CF_2-(Q)_p-$$

(wherein Q is an alkylene group or an oxyalkylene group; p is 0 or 1; and m/n is 0.2 to 5) and has a molecular weight of 500 to 10,000.

$X^{183}$ and $X^{193}$ are each preferably an iodine atom. $R_f^{181}$ and $R_f^{191}$ are each preferably a perfluoroalkylene group having 1 to 5 carbon atoms. $R^{181}$ is preferably a hydrogen atom. $X^{201}$ is preferably a cyano group, an alkoxycarbonyl group, an iodine atom, a bromine atom, or $-CH_2I$. $X^{211}$ is preferably a cyano group, an alkoxycarbonyl group, an iodine atom, a bromine atom, or $-CH_2OH$.

An example of the fluorinated vinyl heterocyclic compound is a fluorinated vinyl heterocyclic compound represented by the general formula (230):

$$X^{231}C=CX^{232}$$

wherein $X^{231}$ and $X^{232}$ are each independently F, Cl, a methoxy group, or a fluorinated methoxy group; and $Y^{231}$ is represented by the formula $Y^{232}$ or $Y^{233}$:

$$-FC=CF-\quad (Y^{232})$$

$$\begin{matrix} & C & \\ Z^{231} & & Z^{232} \end{matrix}\quad (Y^{233})$$

wherein $Z^{231}$ and $Z^{232}$ are each independently F or a fluorinated alkyl group having 1 to 3 carbon atoms.

The monomer that provides a crosslinking site is preferably at least one selected from the group consisting of $CF_2=CFOCF_2CF(CF_3)OCF_2CF_2CN$, $CF_2=CFOCF_2CF$ $(CF_3)OCF_2CF_2COOH$, $CF_2=CFOCF_2CF(CF_3)OCF_2$ $CF_2CH_2I$, $CF_2=CFOCF_2CF_2CH_2I$, $CH_2=CFCF_2OCF$ $(CF_3)CF_2OCF(CF_3)CN$, $CH_2=CFCF_2OCF(CF_3)CF_2OCF$ $(CF_3)COOH$, $CH_2=CFCF_2OCF(CF_3)CF_2OCF(CF_3)$ $CH_2OH$, $CH_2=CHCF_2CF_2I$, $CH_2=CH(CF_2)_2CH=CH_2$, $CH_2=CH(CF_2)_6CH=CH_2$, and $CF_2=CFO(CF_2)_5CN$, and is more preferably at least one selected from the group consisting of $CF_2=CFOCF_2CF(CF_3)OCF_2CF_2CN$ and $CF_2=CFOCF_2CF_2CH_2I$.

In the above step, the fluoromonomer may be polymerized with a fluorine-free monomer. An example of the fluorine-free monomer is a hydrocarbon monomer reactive with the fluoromonomer. Examples of the hydrocarbon monomer include alkenes such as ethylene, propylene, butylene, and isobutylene; alkyl vinyl ethers such as ethyl vinyl ether, propyl vinyl ether, butyl vinyl ether, isobutyl vinyl ether, and cyclohexyl vinyl ether; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butylbenzoate, vinyl cyclohexanecarboxylate, monochlorovinyl acetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The fluorine-free monomer may also be a functional group-containing hydrocarbon monomer (other than monomers that provide a crosslinking site). Examples of the functional group-containing hydrocarbon monomer include hydroxy alkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; fluorine-free monomers having carboxyl groups such as itaconic acid, succinic acid, succinic anhydride, fumaric acid, fumaric anhydride, crotonic acid, maleic acid, maleic anhydride, and perfluorobutenoic acid; fluorine-free monomers having a glycidyl group such as glycidyl vinyl ether and glycidyl allyl ether; fluorine-free monomers having an amino group such as aminoalkyl vinyl ether and aminoalkyl allyl ether; and fluorine-free monomers having an amide group such as (meth)acrylamide and methylol acrylamide.

In the above step, desired fluoropolymer particles can be obtained by polymerizing one or two or more of the above fluoromonomers.

In the production method of the present invention, a nucleating agent may be used. The nucleating agent is preferably used in an amount appropriately selected in accordance with the type of the nucleating agent. For example, the amount thereof is 1,000 ppm or less, more preferably 500 ppm or less, still more preferably 100 ppm or less, particularly preferably 50 ppm or less, and still further preferably 10 ppm or less, based on the aqueous medium.

The use of the above nucleating agent allows for obtaining a fluoropolymer having a smaller primary particle size than that in the case of polymerization in the absence of the above nucleating agent.

Examples of the nucleating agent include perfluoropolyether (PFPE) acid or salts thereof, and nonionic surfactants (for example, nonionic hydrocarbon surfactants). The nucleating agent is preferably free from an aromatic ring, and is preferably an aliphatic compound.

Although the nucleating agent is preferably added before addition of the polymerization initiator or simultaneously with addition of the polymerization initiator, it is also possible to adjust the particle size distribution by adding the nucleating agent during the polymerization.

The perfluoropolyether (PFPE) acids or salts thereof may have any chain structure in which the oxygen atoms in the main chain of the molecule are separated by saturated carbon fluoride groups having 1 to 3 carbon atoms. Two or more carbon fluoride groups may be present in the molecule. Representative structures thereof have the repeating units represented by the following formulas:

$$(\text{—CFCF}_3\text{—CF}_2\text{—O—})_n \qquad\qquad (\text{VII})$$

$$(\text{—CF}_2\text{—CF}_2\text{—CF}_2\text{—O—})_n \qquad\qquad (\text{VIII})$$

$$(\text{—CF}_2\text{—CF}_2\text{—O—})_n\text{—}(\text{—CF}_2\text{—O—})_m \qquad\qquad (\text{IX})$$

$$(\text{—CF}_2\text{—CFCF}_3\text{—O—})_n\text{—}(\text{—CF}_2\text{—O—})_m \qquad\qquad (\text{X})$$

These structures are described in Kasai, J. Appl. Polymer Sci., 57, 797(1995). As disclosed in this document, the PFPE acid or a salt thereof may have a carboxylic acid group or a salt thereof at one end or both ends. The PFPE acid or a salt thereof may also have a sulfonic acid, a phosphonic acid group, or a salt thereof at one end or both ends. The PFPE acid or a salt thereof may have different groups at each end. Regarding monofunctional PFPE, the other end of the molecule is usually perfluorinated, but may contain a hydrogen or chlorine atom. The PFPE acid or a salt thereof has at least two ether oxygen atoms, preferably at least four ether oxygen atoms, and still more preferably at least six ether oxygen atoms. Preferably, at least one carbon fluoride group separating ether oxygen atoms, more preferably at least two of such carbon fluoride groups, have 2 or 3 carbon atoms. Still more preferably, at least 50% of the carbon fluoride groups separating ether oxygen atoms has 2 or 3 carbon atoms. Also preferably, the PFPE acid or a salt thereof has at least 15 carbon atoms in total, and for example, a preferable minimum value of n or n+m in the repeating unit structure is preferably at least 5. Two or more of the PFPE acids and salts thereof having an acid group at one end or both ends may be used in the production method of the present invention. The PFPE acid or a salt thereof preferably has a number average molecular weight of less than 6,000 g/mol.

The nucleating agent is preferably a nonionic surfactant. The nonionic surfactant may be free from an aromatic moiety.

Examples of the nonionic surfactant include a compound represented by the following general formula (i):

$$\text{R}^3\text{—O-A}^1\text{-H} \qquad\qquad (\text{i})$$

wherein $R^3$ is a linear or branched primary or secondary alkyl group having 8 to 18 carbon atoms, and $A^1$ is a polyoxyalkylene chain.

$R^3$ preferably has 10 to 16, more preferably 12 to 16 carbon atoms. When $R^3$ has 18 or less carbon atoms, the aqueous dispersion tends to have good dispersion stability. Further, when $R^3$ has more than 18 carbon atoms, it is difficult to handle due to its high flowing temperature. When $R^3$ has less than 8 carbon atoms, the surface tension of the aqueous dispersion becomes high, so that the permeability and wettability are likely to decrease.

The polyoxyalkylene chain may be composed of oxyethylene and oxypropylene. The polyoxyalkylene chain is composed of an average repeating number of 5 to 20 oxyethylene groups and an average repeating number of 0 to 2 oxypropylene groups, and is a hydrophilic group. The number of oxyethylene units may have either a broad or narrow monomodal distribution as typically supplied, or a broader or bimodal distribution which may be obtained by blending. When the average number of repeating oxypropylene groups is more than 0, the oxyethylene groups and oxypropylene groups in the polyoxyalkylene chain may be arranged in blocks or randomly.

From the viewpoint of viscosity and stability of the aqueous dispersion, a polyoxyalkylene chain composed of an average repeating number of 7 to 12 oxyethylene groups and an average repeating number of 0 to 2 oxypropylene groups is preferred. In particular, when $A^1$ has 0.5 to 1.5 oxypropylene groups on average, low foaming properties are good, which is preferable.

More preferably, $R^3$ is (R') (R")HC—, where R' and R" are the same or different linear, branched, or cyclic alkyl groups, and the total amount of carbon atoms is at least 5, preferably 7 to 17. Preferably, at least one of R' and R" is a branched or cyclic hydrocarbon group.

Specific examples of the polyoxyethylene alkyl ether include $C_{13}H_{27}$—O—$(C_2H_4O)_{10}$—H, $C_{12}H_{25}$—O—$(C_2H_4O)_{10}$—H, $C_{10}H_{21}CH(CH_3)CH_2$—O—$(C_2H_4O)_9$—H, $C_{13}H_{27}$—O—$(C_2H_4O)_9$—$(CH(CH_3)CH_2O)$—H, $C_{16}H_{33}$—O—$(C_2H_4O)_{10}$—H, and $HC(C_5H_{11})(C_7H_{15})$—O—$(C_2H_4O)_9$—H. Examples of commercially available products of the polyoxyethylene alkyl ethers include Genapol X080 (product name, manufactured by Clariant), NOIGEN TDS series (manufactured by DKS Co., Ltd.) exemplified by NOIGEN TDS-80 (trade name), LEOCOL TD series (manufactured by Lion Corp.) exemplified by LEOCOL TD-90 (trade name), LIONOL (R) TD series (manufactured by Lion Corp.), T-Det A series (manufactured by Harcros Chemicals Inc.) exemplified by T-Det A 138 (trade name), and TERGITOL (R) 15 S series (manufactured by Dow).

The nonionic surfactant is preferably an ethoxylate of 2,6,8-trimethyl-4-nonanol having about 4 to about 18 ethylene oxide units on average, an ethoxylate of 2,6,8-trimethyl-4-nonanol having about 6 to about 12 ethylene oxide units on average, or a mixture thereof. This type of nonionic surfactant is also commercially available, for example, as TERGITOL TMN-6, TERGITOL TMN-10, and TERGITOL TMN-100X (all product names, manufactured by Dow Chemical Co., Ltd.).

The hydrophobic group of the nonionic surfactant may be any of an alkylphenol group, a linear alkyl group, and a branched alkyl group.

Examples of the polyoxyethylene alkylphenyl ether-based nonionic compound include, for example, a compound represented by the following general formula (ii):

$$R^4\text{—}C_6H_4\text{—}O\text{-}A^2\text{-}H \qquad \text{(ii)}$$

wherein $R^4$ is a linear or branched primary or secondary alkyl group having 4 to 12 carbon atoms, and $A^2$ is a polyoxyalkylene chain. Specific examples of the polyoxyethylene alkylphenyl ether-based nonionic compound include Triton X-100 (trade name, manufactured by Dow Chemical Co., Ltd.).

Examples of the nonionic surfactant also include polyol compounds. Specific examples thereof include those described in International Publication No. WO2011/014715.

Typical examples of the polyol compound include compounds having one or more sugar units as a polyol unit. The sugar units may have been modified to contain at least one long chain. Examples of suitable polyol compounds containing at least one long chain moiety include alkyl glycosides, modified alkyl glycosides, sugar esters, and combinations thereof. Examples of the sugars include, but are not limited to, monosaccharides, oligosaccharides, and sorbitanes. Examples of monosaccharides include pentoses and hexoses. Typical examples of monosaccharides include ribose, glucose, galactose, mannose, fructose, arabinose, and xylose. Examples of oligosaccharides include oligomers of 2 to 10 of the same or different monosaccharides. Examples of oligosaccharides include, but are not limited to, saccharose, maltose, lactose, raffinose, and isomaltose.

Typically, sugars suitable for use as the polyol compound include cyclic compounds containing a 5-membered ring of four carbon atoms and one heteroatom (typically oxygen or sulfur, preferably oxygen atom), or cyclic compounds containing a 6-membered ring of five carbon atoms and one heteroatom as described above, preferably, an oxygen atom. These further contain at least two or at least three hydroxy groups (—OH groups) bonded to the carbon ring atoms. Typically, the sugars have been modified in that one or more of the hydrogen atoms of a hydroxy group (and/or hydroxyalkyl group) bonded to the carbon ring atoms has been substituted by the long chain residues such that an ether or ester bond is created between the long chain residue and the sugar moiety.

The sugar-based polyol may contain a single sugar unit or a plurality of sugar units. The single sugar unit or the plurality of sugar units may be modified with long chain moieties as described above. Specific examples of sugar-based polyol compounds include glycosides, sugar esters, sorbitan esters, and mixtures and combinations thereof.

A preferred type of polyol compounds are alkyl or modified alkyl glucosides. These type of surfactants contains at least one glucose moiety. Examples of alkyl or modified alkyl glucosides include compounds represented by:

wherein x represents 0, 1, 2, 3, 4, or 5 and $R^1$ and $R^2$ each independently represent H or a long chain unit containing at least 6 carbon atoms, with the proviso that at least one of $R^1$ and $R^2$ is not H. Typical examples of $R^1$ and $R^2$ include aliphatic alcohol residues. Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof.

It is understood that the above formula represents specific examples of alkyl poly glucosides showing glucose in its pyranose form but other sugars or the same sugars but in different enantiomeric or diastereomeric forms may also be used.

Alkyl glucosides are available, for example, by acid-catalyzed reactions of glucose, starch, or n-butyl glucoside with aliphatic alcohols which typically yields a mixture of various alkyl glucosides (Alkyl polygylcoside, Rompp, Lexikon Chemie, Version 2.0, Stuttgart/New York, Georg Thieme Verlag, 1999). Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof. Alkyl glucosides are also commercially available under the trade name GLUCOPON or DISPONIL from Cognis GmbH, Dusseldorf, Germany.

Examples of other nonionic surfactants include bifunctional block copolymers supplied from BASF as Pluronic (R) R series, tridecyl alcohol alkoxylates supplied from BASF Corporation as Iconol (R) TDA series, and hydrocarbon-containing siloxane surfactants, preferably hydrocarbon surfactants. In the sense that the hydrocarbyl groups are fully substituted with hydrogen atoms where they can be substituted by halogen such as fluorine, these siloxane surfactants can also be regarded as hydrocarbon surfactants, i.e. the monovalent substituents on the hydrocarbyl groups are hydrogen.

In the polymerization, the fluoromonomer is preferably polymerized in an aqueous medium substantially free from a nonionic surfactant.

Further, it is preferable that the aqueous medium is substantially free from a nonionic surfactant before the initiation of polymerization.

The amount of the nonionic surfactant is, for example, preferably 10 ppm or less, more preferably 1 ppm or less, still more preferably 0.1 ppm or less, particularly preferably 0.01 ppm or less, and still further preferably 0.001 ppm or less based on the aqueous medium.

The above "before the initiation of polymerization" means before the pressure of the fluoromonomer fed under pressure is lowered after the addition of the polymerization initiator into the aqueous medium or before the fluoromonomer has a flow rate (for example, 0.01 g/hour or more).

In the case of using TFE as a fluoromonomer to produce polytetrafluoroethylene (PTFE) as a fluoropolymer, (polyfluoroalkyl)ethylene (a) and/or a comonomer (b) having a monomer reactivity ratio rTFE in copolymerization with TFE of 0.1 to 8 may be mixed in the emulsion polymerization system in an amount of 0.001 to 0.01% by mass relative to the final PTFE yield at the initiation of emulsion polymerization of TFE, so that a PTFE aqueous emulsion can be produced which has high stability enough to maintain properties such as processability and moldability in the following steps and which is capable of providing a molded article having high heat resistance.

The reactivity ratio can be determined by copolymerizing the comonomer with TFE varying the charging compositional features, determining the compositional features in the polymer formed immediately after initiation, and calculating the reactivity ratio by Fineman-Ross equation based on the compositional features.

The copolymerization is performed using 3,600 g of deionized degassed water, 1,000 ppm of ammonium perfluorooctanoate based on the water, and 100 g of paraffin wax contained in an autoclave made of stainless steel with an internal volume of 6.0 L at a pressure of 0.78 MPa and a temperature of 70° C. A comonomer in an amount of 0.05 g, 0.1 g, 0.2 g, 0.5 g, or 1.0 g is added into the reactor, and then 0.072 g of ammonium persulfate (20 ppm based on the water) is added thereto. To maintain the polymerization pressure at 0.78 MPa, TFE is continuously fed thereinto. When the charged amount of TFE reaches 1,000 g, stirring is stopped and the pressure is released until the pressure in the reactor decreases to the atmospheric pressure. After cooling, the paraffin wax is separated to obtain an aqueous dispersion containing the resulting polymer. The aqueous dispersion is stirred so that the resulting polymer coagulates, and the polymer is dried at 150° C. The compositional features in the resulting polymer are calculated by an appropriate combination of NMR, FT-IR, elemental analysis, and X-ray fluorescence analysis depending on the types of the monomers.

Also, in the production method of the present invention, in addition to the surfactant and other compounds having a surfactant function used as necessary, an additive may also be used to stabilize the compounds. Examples of the additive include a buffer, a pH adjuster, a stabilizing aid, and a dispersion stabilizer.

The stabilizing aid is preferably paraffin wax, fluorine-containing oil, a fluorine-containing solvent, silicone oil, or the like. The stabilizing aids may be used alone or in combination of two or more. The stabilizing aid is more preferably paraffin wax. The paraffin wax may be in the form of liquid, semi-solid, or solid at room temperature, and is preferably a saturated hydrocarbon having 12 or more carbon atoms. The paraffin wax usually preferably has a melting point of 40 to 65° C., and more preferably 50 to 65° C.

The amount of the stabilizing aid used is preferably 0.1 to 12% by mass, and more preferably 0.1 to 8% by mass, based on the mass of the aqueous medium used. It is desirable that the stabilizing aid is sufficiently hydrophobic so that the stabilizing aid is completely separated from the PTFE aqueous emulsion after emulsion polymerization of TFE, and does not serve as a contaminating component.

In the production method of the present invention, polymerization can be initiated by feeding a monomer under pressure into a polymerization reactor and adding a polymerization initiator. The feeding of monomer under pressure may be performed before or after the addition of the polymerization initiator, or at the same time as the addition of the polymerization initiator.

For example, in the production method of the present invention, the polymerization may be performed by charging a polymerization reactor with an aqueous medium, the surfactant, and optionally other additives, feeding monomers under pressure, stirring the contents of the reactor, maintaining the reactor at a predetermined polymerization temperature, and adding a predetermined amount of a polymerization initiator to thereby initiate the polymerization reaction. In other words, in the polymerization step, the polymerization can be initiated by adding a polymerization initiator.

Alternatively, the polymerization may be performed by charging a polymerization reactor with an aqueous medium, the surfactant, and optionally other additives, stirring the contents of the reactor, maintaining the reactor at a predetermined polymerization temperature, adding a predetermined amount of a polymerization initiator, and then feeding monomers under pressure into the polymerization reactor to thereby initiate the polymerization reaction. In other words, in the polymerization step, the polymerization can be initiated by the feeding of monomer under pressure.

After the initiation of the polymerization reaction, the components such as the monomers, the polymerization initiator, a chain transfer agent, and the surfactant may additionally be added depending on the purpose.

The polymerization step is usually performed at a polymerization temperature of 5 to 120° C. and a polymerization pressure of 0.05 to 10 MPa. The polymerization temperature and the polymerization pressure are determined as appropriate in accordance with the types of the monomers used, the molecular weight of the target fluoropolymer, and the reaction rate.

In the polymerization step, the polymerization temperature is preferably 30° C. or higher, more preferably 40° C. or higher, still more preferably 50° C. or higher, and particularly preferably 60° C. or higher. Further, the polymerization temperature is preferably 100° C. or lower, more preferably 95° C. or lower, and still more preferably 90° C. or lower.

The polymerization pressure is preferably 0.5 MPa or higher, more preferably 1.0 MPa or higher, still more preferably 1.2 MPa or higher, and particularly preferably 1.5 MPa or higher. Further, the polymerization pressure is preferably 5.0 MPa or lower, more preferably 4.5 MPa or lower, still more preferably 4.0 MPa or lower, particularly preferably 3.5 MPa or lower, and still further preferably 3.0 MPa or lower.

A suitable combination of the polymerization temperature and the polymerization pressure is, for example, a polymerization temperature of 30 to 100° C. and a polymerization pressure of 0.5 to 3.0 MPa or lower.

In the polymerization step, the total amount of the carboxylic acid type hydrocarbon-containing surfactant added is preferably 0.0001 to 10% by mass based on 100% by mass of the aqueous medium. The lower limit thereof is more preferably 0.001% by mass, still more preferably 0.01% by mass, and particularly preferably 0.1% by mass. The upper limit thereof is more preferably 1.0% by mass, still more preferably 0.50% by mass, and particularly preferably 0.35% by mass. Less than 0.0001% by mass of the surfactant may cause insufficient emulsion stability. More than 10% by mass of the surfactant may fail to give the effects corresponding to its amount; on the contrary, such an amount of the surfactant may cause a reduction in the polymerization rate or even stop the reaction. The amount of the compound added is appropriately determined in accordance with factors such as the types of the monomers used and the molecular weight of the target fluoropolymer.

In the polymerization, the carboxylic acid type hydrocarbon-containing surfactant at the initial stage of polymerization is preferably in an amount of greater than 50 ppm based on the aqueous medium. The amount of the carboxylic acid type hydrocarbon-containing surfactant is more preferably 60 ppm or more, still more preferably 70 ppm or more, particularly preferably 80 ppm or more, further preferably 90 ppm or more, and still further preferably 100 ppm or more based on the aqueous medium.

The initiation of the polymerization can be confirmed by a decrease in the pressure of the fluoromonomer fed under pressure, or by the flow rate of the fluoromonomer (for example, 0.01 g/hour or more).

The "initial stage of polymerization" is, for example, the time taken from the initiation of polymerization until the filling amount of the fluoromonomer reaches 10 g/L based on the aqueous medium.

In the polymerization, the carboxylic acid type hydrocarbon-containing surfactant is preferably added to the aqueous medium before the initiation of polymerization.

In the polymerization, the carboxylic acid type hydrocarbon-containing surfactant is also preferably added to the aqueous medium when the concentration of fluoropolymer particles formed in the aqueous medium is 0.36% by mass or less. The carboxylic acid type hydrocarbon-containing surfactant is more preferably added when the concentration is 0.2% by mass or less, and still more preferably added when the concentration is 0.1% by mass or less. The surfactant is particularly preferably charged along with the initiation of polymerization.

The concentration is based on the total amount of the aqueous medium and the fluoropolymer particles.

It is also preferable that the method for producing a fluoropolymer of the present invention further includes a step of continuously adding the carboxylic acid type hydrocarbon-containing surfactant. Adding the carboxylic acid type hydrocarbon-containing surfactant continuously means, for example, adding the carboxylic acid type hydrocarbon-containing surfactant not all at once, but adding over time and without interruption or adding in portions. The carboxylic acid type hydrocarbon-containing surfactant may be added as an aqueous solution containing the carboxylic acid type hydrocarbon containing surfactant and water.

In the method for producing a fluoropolymer of the present invention, the step of continuously adding the carboxylic acid type hydrocarbon-containing surfactant is preferably a step of starting to add the carboxylic acid type hydrocarbon-containing surfactant to the aqueous medium when the solid content of the fluoropolymer formed in the aqueous medium is 0.5% by mass or less. The carboxylic acid type hydrocarbon-containing surfactant is more preferably started to be added when the solid content is 0.3% by mass or less, still more preferably started to be added when the solid content is 0.2% by mass or less, further preferably started to be added when the solid content is 0.1% by mass or less, and particularly preferably started to be added when the polymerization is initiated. The solid content is a concentration based on the total amount of the aqueous medium and the fluoropolymer.

In the step of continuously adding the carboxylic acid type hydrocarbon-containing surfactant, the carboxylic acid type hydrocarbon-containing surfactant is preferably added in an amount of 0.0001 to 10% by mass, based on 100% by mass of the aqueous medium. The lower limit thereof is preferably 0.001% by mass, more preferably 0.01% by mass, and still more preferably 0.1% by mass. The upper limit thereof is preferably 10% by mass, more preferably 1.0% by mass, and still more preferably 0.50% by mass. Less than 0.0001% by mass of the surfactant may cause insufficient dispersibility. More than 10% by mass of the surfactant may fail to give the effects corresponding to its amount; on the contrary, such an amount of the surfactant may cause a reduction in the polymerization rate or even stop the reaction. The amount of the compound added is appropriately determined in accordance with factors such as the types of the monomers used and the molecular weight of the target fluoropolymer.

In the polymerization step, the fluoromonomer is preferably polymerized substantially in the absence of a fluorine-containing surfactant.

Conventionally, fluorine-containing surfactants have been used for the polymerization of fluoropolymers, but the production method of the present invention allows for obtaining fluoropolymers without using the fluorine-containing surfactants by using the carboxylic acid type hydrocarbon-containing surfactant.

The expression "substantially in the absence of a fluorine-containing surfactant" as used herein means that the amount of the fluorine-containing surfactant in the aqueous medium is 10 ppm or less, preferably 1 ppm or less, more preferably 100 ppb or less, still more preferably 10 ppb or less, and further preferably 1 ppb or less.

Examples of the fluorine-containing surfactant include anionic fluorine-containing surfactants.

The anionic fluorine-containing surfactant may be, for example, a fluorine atom-containing surfactant having 20 or less carbon atoms in total in the portion excluding the anionic group.

The fluorine-containing surfactant may also be a surfactant containing fluorine having a molecular weight of 800 or less in the anionic moiety.

The "anionic moiety" means the portion of the fluorine-containing surfactant excluding the cation. For example, in the case of $F(CF_2)_{n1}COOM$ represented by the formula (I) described later, the anionic moiety is the "$F(CF_2)_{n1}COO$" portion.

Examples of the fluorine-containing surfactant also include fluorine-containing surfactants having a Log POW of 3.5 or less. The Log POW is a partition coefficient between 1-octanol and water, which is represented by Log P (wherein P represents the ratio between the concentration of the fluorine-containing surfactant in octanol and the concentration of the fluorine-containing surfactant in water in a phase-separated octanol/water (1:1) liquid mixture containing the fluorine-containing surfactant).

Log POW is determined as follows. Specifically, HPLC is performed on standard substances (heptanoic acid, octanoic acid, nonanoic acid, and decanoic acid) each having a known octanol/water partition coefficient using TOSOH ODS-120T column ($\phi$4.6 mm×250 mm, Tosoh Corp.) as a column and acetonitrile/0.6% by mass $HClO_4$ aqueous solution=1/1 (vol/vol %) as an eluent at a flow rate of 1.0 ml/min, a sample amount of 300 μL, and a column temperature of 40° C.; with a detection light of UV 210 nm. For each standard substance, a calibration curve is drawn with respect to the elution time and the known octanol/water partition coefficient. Based on the calibration curve, Log POW is calculated from the elution time of the sample liquid in HPLC.

Specific examples of the fluorine-containing surfactant include those disclosed in U.S. Patent Application Publication No. 2007/0015864, U.S. Patent Application Publication No. 2007/0015865, U.S. Patent Application Publication No. 2007/0015866, and U.S. Patent Application Publication No. 2007/0276103, U.S. Patent Application Publication No. 2007/0117914, U.S. Patent Application Publication No. 2007/142541, U.S. Patent Application Publication No. 2008/0015319, U.S. Pat. Nos. 3,250,808, 3,271,341, Japanese Patent Laid-Open No. 2003-119204, International Publication No. WO2005/042593, International Publication No. WO2008/060461, International Publication No. WO2007/046377, International Publication No. WO2007/119526, International Publication No. WO2007/046482, International Publication No. WO2007/046345, U.S. Patent Application Publication No. 2014/0228531, International Publication No. WO2013/189824, and International Publication No. WO2013/189826.

Examples of the anionic fluorine-containing surfactant include a compound represented by the following general formula ($N^0$):

$$X^{n0}—Rf^{n0}—Y^0 \qquad (N^0)$$

wherein $X^{n0}$ is H, Cl, or F; $Rf^{n0}$ is a linear, branched, or cyclic alkylene group having 3 to 20 carbon atoms in which some or all of H are replaced by F; the alkylene group optionally containing one or more ether bonds in which some of H are replaced by Cl; and $Y^0$ is an anionic group.

The anionic group $Y^0$ may be —COOM, —$SO_2M$, or —$SO_3M$, and may be —COOM or —$SO_3M$.

M is H, a metal atom, $NR^7_4$, imidazolium optionally having a substituent, pyridinium optionally having a substituent, or phosphonium optionally having a substituent, wherein $R^7$ is H or an organic group.

Examples of the metal atom include alkali metals (Group 1) and alkaline earth metals (Group 2), such as Na, K, or Li.

$R^7$ may be H or a $C_{1-10}$ organic group, may be H or a $C_{1-4}$ organic group, and may be H or a $C_{1-4}$ alkyl group.

M may be H, a metal atom, or $NR^7_4$, may be H, an alkali metal (Group 1), an alkaline earth metal (Group 2), or $NR^7_4$, and may be H, Na, K, Li, or $NH_4$.

$Rf^{n0}$ may be one in which 50% or more of H has been replaced by fluorine.

Examples of the compound represented by the general formula ($N^0$) include:

a compound represented by the following general formula ($N^1$):

$$X^{n0}—(CF_2)_{m1}—Y^0 \qquad (N^1)$$

wherein $X^{n0}$ is H, Cl, and F; m1 is an integer of 3 to 15; and $Y^0$ is as defined above;

a compound represented by the following general formula ($N^2$):

$$Rf^{n1}—O—(CF(CF_3)CF_2O)_{m2}CFX^{n1}—Y^0 \qquad (N^2)$$

wherein $Rf^{n1}$ is a perfluoroalkyl group having 1 to 5 carbon atoms; m2 is an integer of 0 to 3; $X^{n1}$ is F or $CF_3$; and $Y^0$ is as defined above;

a compound represented by the following general formula ($N^3$):

$$Rf^{n2}(CH_2)_{m3}—(Rf^{n3})_q—Y^0 \qquad (N^3)$$

wherein $Rf^{n2}$ is a partially or fully fluorinated alkyl group having 1 to 13 carbon atoms and optionally containing an ether bond; m3 is an integer of 1 to 3; $Rf^{n3}$ is a linear or branched perfluoroalkylene group having 1 to 3 carbon atoms; q is 0 or 1; and $Y^0$ is as defined above;

a compound represented by the following general formula ($N^4$):

$$Rf^{n4}—O—(CY^{n1}Y^{n2})_pCF_2—Y^0 \qquad (N^4)$$

wherein $Rf^{n4}$ is a linear or branched partially or fully fluorinated alkyl group having 1 to 12 carbon atoms and optionally containing an ether bond; and $Y^{n1}$ and $Y^{n2}$ are the same or different and are each H or F; p is 0 or 1; and $Y^0$ is as defined above; and a compound represented by the following general formula ($N^5$):

wherein $X^{n2}$, $X^{n3}$, and $X^{n4}$ may be the same or different and are each H, F, or a linear or branched partially or fully fluorinated alkyl group having 1 to 6 carbon atoms and optionally containing an ether bond; $Rf^{n5}$ is a linear or branched partially or fully fluorinated alkylene group having 1 to 3 carbon atoms and optionally containing an ether bond; L is a linking group; and $Y^0$ is as defined above, with the proviso that the total carbon number of $X^{n2}$, $X^{n3}$, $X^{n4}$, and $Rf^{n5}$ is 18 or less.

More specific examples of the compound represented by the above general formula ($N^0$) include a perfluorocarboxylic acid (I) represented by the following general formula (I), an ω-H perfluorocarboxylic acid (II) represented by the following general formula (II), a perfluoropolyethercarboxylic acid (III) represented by the following general formula (III), a perfluoroalkylalkylenecarboxylic acid (IV) represented by the following general formula (IV), a perfluoroalkoxyfluorocarboxylic acid (V) represented by the following general formula (V), a perfluoroalkylsulfonic acid (VI) represented by the following general formula (VI), an ω-H perfluorosulfonic acid (VII) represented by the following general formula (VII), a perfluoroalkylalkylene sulfonic acid (VIII) represented by the following general formula (VIII), an alkylalkylene carboxylic acid (IX) represented by the following general formula (IX), a fluorocarboxylic acid (X) represented by the following general formula (X), an alkoxyfluorosulfonic acid (XI) represented by the following general formula (XI), and a compound (XII) represented by the following general formula (XII).

The perfluorocarboxylic acid (I) is represented by the following general formula (I):

$$F(CF_2)_{n1}COOM \tag{I}$$

wherein n1 is an integer of 3 to 14; and M is H, a metal atom, $NR^7_4$, imidazolium optionally having a substituent, pyridinium optionally having a substituent, or phosphonium optionally having a substituent, wherein $R^7$ is H or an organic group.

The ω-H perfluorocarboxylic acid (II) is represented by the following general formula (II):

$$H(CF_2)_{n2}COOM \tag{II}$$

wherein n2 is an integer of 4 to 15; and M is as defined above.

The perfluoropolyethercarboxylic acid (III) is represented by the following general formula (III):

$$Rf^1—O—(CF(CF_3)CF_2O)_{n3}CF(CF_3)COOM \tag{III}$$

wherein $Rf^1$ is a perfluoroalkyl group having 1 to 5 carbon atoms; n3 is an integer of 0 to 3; and M is as defined above.

The perfluoroalkylalkylenecarboxylic acid (IV) is represented by the following general formula (IV):

$$Rf^2(CH_2)_{n4}Rf^3COOM \tag{IV}$$

wherein $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above.

The alkoxyfluorocarboxylic acid (V) is represented by the following general formula (V):

$$Rf^4—O—CY^1Y^2CF_2—COOM \tag{V}$$

wherein $Rf^4$ is a linear or branched partially or fully fluorinated alkyl group having 1 to 12 carbon atoms and optionally containing an ether bond; $Y^1$ and $Y^2$ are the same or different and are each H or F; and M is as defined above.

The perfluoroalkylsulfonic acid (VI) is represented by the following general formula (VI):

$$F(CF_2)_{n5}SO_3M \tag{VI}$$

wherein n5 is an integer of 3 to 14; and M is as defined above.

The ω-H perfluorosulfonic acid (VII) is represented by the following general formula (VII):

$$H(CF_2)_{n6}SO_3M \tag{VII}$$

wherein n6 is an integer of 4 to 14; and M is as defined above.

The perfluoroalkylalkylenesulfonic acid (VIII) is represented by the following general formula (VIII):

$$Rf^5(CH_2)_{n7}SO_3M \tag{VIII}$$

wherein $Rf^5$ is a perfluoroalkyl group having 1 to 13 carbon atoms; n7 is an integer of 1 to 3; and M is as defined above.

The alkylalkylenecarboxylic acid (IX) is represented by the following general formula (IX):

$$Rf^6(CH_2)_{n8}COOM \tag{IX}$$

wherein $Rf^6$ is a linear or branched partially or fully fluorinated alkyl group having 1 to 13 carbon atoms and optionally containing an ether bond; n8 is an integer of 1 to 3; and M is as defined above.

The fluorocarboxylic acid (X) is represented by the following general formula (X):

$$Rf^7—O—Rf^8—O—CF_2—COOM \tag{X}$$

wherein $Rf^7$ is a linear or branched partially or fully fluorinated alkyl group having 1 to 6 carbon atoms and optionally containing an ether bond; $Rf^8$ is a linear or branched partially or fully fluorinated alkyl group having 1 to 6 carbon atoms; and M is as defined above.

The alkoxyfluorosulfonic acid (XI) is represented by the following general formula (XI):

$$Rf^9{}'O—CY^1Y^2CF_2—SO_3M \tag{XI}$$

wherein $Rf^9$ is a linear or branched partially or fully fluorinated alkyl group having 1 to 12 carbon atoms and optionally containing an ether bond and optionally containing chlorine; $Y^1$ and $Y^2$ are the same or different and are each H or F; and M is as defined above.

The compound (XII) is represented by the following general formula (XII):

$$(XII)$$

wherein $X^1$, $X^2$, and $X^3$ may be the same or different and are H, F, and a linear or branched partially or fully fluorinated alkyl group having 1 to 6 carbon atoms and optionally containing an ether bond; $Rf^{10}$ is a perfluoroalkylene group having 1 to 3 carbon atoms; L is a linking group; and $Y^0$ is an anionic group.

$Y^0$ may be $—COOM$, $—SO_2M$, or $—SO_3M$, and may be $—SO_3M$ or COOM, where M is as defined above.

Examples of L include a single bond, a partially or fully fluorinated alkylene group having 1 to 10 carbon atoms and optionally containing an ether bond.

As described above, examples of the anionic fluorine-containing surfactant include a carboxylic acid-based surfactant and a sulfonic acid-based surfactant.

In the polymerization step, a polymerization initiator is preferably added to the aqueous medium.

The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization. The concentration of the polymerization initiator is appropriately determined depending on the types of the monomers, the molecular weight of the target fluoropolymer, and the reaction rate.

The polymerization initiator to be used may be an oil-soluble radical polymerization initiator or a water-soluble radical polymerization initiator.

The oil-soluble radical polymerization initiator may be a known oil-soluble peroxide, and representative examples thereof include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di(ω-hydro-dodecafluoroheptanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydro-hexadecafluorononanoyl-peroxide, ω-chloro-hexafluorobutyryl-ω-chloro-decafluorohexanoyl-peroxide, ω-hydro-dodecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl) peroxide, di(pentachlorotetradecafluorodecanoyl)peroxide, and di(undecachlorodotoriacontafluorodocosanoyl)peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid, percarbonic acid and the like, t-butyl permaleate, and t-butyl hydroperoxide. A reducing agent may also be contained together, and the use amount thereof may be 0.1 to 20 times that of the peroxide.

The polymerization initiator used is preferably a redox initiator obtained by combining an oxidizing agent and a reducing agent.

Examples of the oxidizing agent include persulfates such as ammonium persulfate and potassium persulfate; organic peroxides such as disuccinic acid peroxide and diglutaric acid peroxide; permanganic acid, permanganates such as ammonium permanganate, alkali metal salts of permanganate, and alkali metal salts of permanganate; manganese triacetate ($C_6H_9MnO_6$); cerium (IV) salts such as cerium ammonium nitrate and cerium ammonium sulfate; and bromic acid or salts thereof such as bromic acid, ammonium bromate, alkali metal salts of bromate, and alkaline earth metal salts of bromate. The permanganate is preferably potassium permanganate.

Examples of the reducing agent include dicarboxylic acids such as oxalic acid, malonic acid, succinic acid, and glutaric acid or salts thereof; and diimines.

The dicarboxylic acid or a salt thereof is preferably oxalic acid or a salt thereof.

The bromic acid or a salt thereof is preferably potassium bromate.

In order to increase the decomposition rate of the initiator, the combination of the redox initiator may preferably contain a copper salt or an iron salt. An example of the copper salt is copper(II) sulfate and an example of the iron salt is iron(II) sulfate.

In the redox initiator, the oxidizing agent is preferably a permanganic acid or a salt thereof, persulfate, manganese triacetate, a cerium (IV) salt, or bromic acid or a salt thereof, and the reducing agent is preferably a dicarboxylic acid or a salt thereof or diimine.

The oxidizing agent is more preferably a permanganic acid or a salt thereof, persulfate, or bromic acid or a salt thereof, and the reducing agent is more preferably a dicarboxylic acid or a salt thereof.

From the viewpoint of redox potential, the combination is more preferably a combination of permanganic acid or a salt thereof and a dicarboxylic acid or a salt thereof, and particularly preferably a combination of potassium permanganate and oxalic acid.

Examples of the redox initiator include combinations of potassium permanganate/oxalic acid, manganese triacetate/oxalic acid, and cerium ammonium nitrate/oxalic acid, and potassium permanganate/oxalic acid is particularly preferred.

In the case of using a redox initiator, either an oxidizing agent or a reducing agent may be charged into a polymerization tank in advance, followed by adding the other continuously or intermittently thereto to initiate the polymerization. For example, in the case of using potassium permanganate/oxalic acid, preferably, oxalic acid is charged into a polymerization tank and potassium permanganate is continuously added thereto.

From the viewpoint of reaction rate, it is preferable to add 0.1 ppm or more of the redox initiator based on the aqueous medium in the polymerization step. The amount of the redox initiator added is more preferably 1 ppm or more, still more preferably 5 ppm or more, and particularly preferably 10 ppm or more based on the aqueous medium. From the viewpoint of adjusting the molecular weight of the fluoropolymer, the redox initiator is preferably 1,000 ppm or less, and more preferably 500 ppm or less based on the aqueous medium.

In the polymerization step, the polymerization initiator used may be a radical polymerization initiator. The radical polymerization initiator is preferably a peroxide. Examples of the radical polymerization initiator include the oil-soluble radical polymerization initiator and the water-soluble radical polymerization initiator described above, and the water-soluble radical polymerization initiator is preferred. The water-soluble radical polymerization initiator is more preferably a peroxide, and still more preferably a persulfate, an organic peroxide, or a mixture thereof. Examples of the persulfate include ammonium persulfate and potassium persulfate. Examples of the organic peroxide include disuccinic acid peroxide and diglutaric acid peroxide. Still more preferred are ammonium persulfate and disuccinic acid peroxide. In the polymerization step, for example, 5 ppm or more of ammonium persulfate is preferably added to the aqueous medium, more preferably 10 ppm or more, still more preferably 20 ppm or more, further preferably 30 ppm or more, still further preferably 40 ppm or more, yet still further preferably 50 ppm or more, particularly preferably 80 ppm or more, and very particularly preferably 100 ppm or more. In the polymerization step, the radical polymerization initiator may be added continuously or intermittently after the polymerization is initiated.

The aqueous medium is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower. The content of water in the aqueous medium is preferably 50% by mass or more, more preferably 80% by mass or more, and most preferably 100% by mass.

Examples of suitable conditions for the polymerization step are described below.

The polymerization step is usually performed at a polymerization temperature of 5 to 120° C. and a polymerization pressure of 0.05 to 10 MPa. The polymerization temperature and the polymerization pressure are determined as appropriate in accordance with the types of the monomers used, the molecular weight of the target fluoropolymer, and the reaction rate.

In the polymerization step, the polymerization temperature is preferably 30° C. or higher, more preferably 40° C. or higher, still more preferably 50° C. or higher, and particularly preferably 60° C. or higher. Further, the polymerization temperature is preferably 100° C. or lower, more preferably 95° C. or lower, and still more preferably 90° C. or lower.

The polymerization pressure is preferably 0.5 MPa or higher, more preferably 1.0 MPa or higher, still more preferably 1.2 MPa or higher, and particularly preferably 1.5 MPa or higher. Further, the polymerization pressure is preferably 5.0 MPa or lower, more preferably 4.5 MPa or lower, still more preferably 4.0 MPa or lower, particularly preferably 3.5 MPa or lower, and still further preferably 3.0 MPa or lower.

A suitable combination of the polymerization temperature and the polymerization pressure is, for example, a polymerization temperature of 30 to 100° C. and a polymerization pressure of 0.5 to 3.0 MPa or lower.

In the polymerization, it is preferable that the polymerization temperature is 30 to 100° C., and that the polymerization pressure is 0.5 to 5.0 MPa.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

In the polymerization, it is preferable that the polymerization temperature is 30 to 100° C., that the polymerization pressure is 0.5 to 5.0 MPa, and that the polymerization initiator is a redox initiator.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

The redox initiator is more preferably a combination of permanganic acid or a salt thereof and a dicarboxylic acid or a salt thereof, and particularly preferably a combination of potassium permanganate and oxalic acid.

In the polymerization, it is preferable that the polymerization temperature is 30 to 100° C., that the polymerization pressure is 0.5 to 5.0 MPa, that the polymerization initiator is a redox initiator, and that the carboxylic acid type hydrocarbon-containing surfactant is added to the aqueous medium before the initiation of polymerization or when the concentration of fluoropolymer particles formed in the aqueous medium is 0.36% by weight or less.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

The carboxylic acid type hydrocarbon-containing surfactant is more preferably added when the concentration of the fluoropolymer particles is 0.2% by mass or less, and still more preferably added when the concentration is 0.1% by mass or less. The surfactant is particularly preferably charged along with the initiation of polymerization.

In the polymerization, it is preferable that the polymerization temperature is 30 to 100° C., that the polymerization pressure is 0.5 to 5.0 MPa, that the polymerization initiator is a redox initiator, and that the carboxylic acid type hydrocarbon-containing surfactant is free from a carbonyl group which is not in a carboxyl group. The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

The carboxylic acid type hydrocarbon-containing surfactant is more preferably the compound represented by the formula (A) described above.

In the polymerization, it is preferable that the polymerization temperature is 30 to 100° C., that the polymerization pressure is 0.5 to 5.0 MPa, and that the carboxylic acid type hydrocarbon-containing surfactant is added to the aqueous medium before the initiation of polymerization or when the concentration of fluoropolymer particles formed in the aqueous medium is 0.36% by mass or less.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

The carboxylic acid type hydrocarbon-containing surfactant is more preferably added when the concentration of the fluoropolymer particles is 0.2% by mass or less, and still more preferably added when the concentration is 0.1% by mass or less. The surfactant is particularly preferably charged along with the initiation of polymerization.

In the polymerization, it is preferable that the polymerization initiator is a redox initiator, that the polymerization temperature is 30 to 100° C., that the polymerization pressure is 0.5 to 5.0 MPa, and that the carboxylic acid type hydrocarbon-containing surfactant is added to the aqueous medium when the concentration of fluoropolymer particles formed in the aqueous medium is 0.36% by mass or less.

The redox initiator is more preferably a combination of permanganic acid or a salt thereof and a dicarboxylic acid or a salt thereof, and particularly preferably a combination of potassium permanganate and oxalic acid.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

The carboxylic acid type hydrocarbon-containing surfactant is more preferably added when the concentration of the fluoropolymer particles is 0.2% by mass or less, and still more preferably added when the concentration is 0.1% by mass or less. The surfactant is particularly preferably charged along with the initiation of polymerization.

In the polymerization, it is preferable that the polymerization initiator is a redox initiator, that the polymerization temperature is 30 to 100° C., that the polymerization pressure is 0.5 to 5.0 MPa, and that the carboxylic acid type hydrocarbon-containing surfactant is added to the aqueous medium before the initiation of polymerization.

The redox initiator is more preferably a combination of permanganic acid or a salt thereof and a dicarboxylic acid or a salt thereof, and particularly preferably a combination of potassium permanganate and oxalic acid.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

In the polymerization, it is preferable that the polymerization temperature is 30 to 100° C., that the polymerization pressure is 0.5 to 5.0 MPa, and that the carboxylic acid type hydrocarbon-containing surfactant is free from a carbonyl group which is not in a carboxyl group.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

The carboxylic acid type hydrocarbon-containing surfactant is more preferably the compound represented by the formula (A) described above.

In the polymerization, it is preferable that the polymerization temperature is 30 to 100° C., that the polymerization pressure is 0.5 to 5.0 MPa, that the carboxylic acid type hydrocarbon-containing surfactant is added to the aqueous medium before the initiation of polymerization or when the concentration of fluoropolymer particles formed in the aqueous medium is 0.36% by mass or less, and that the carboxylic acid type hydrocarbon-containing surfactant is free from a carbonyl group which is not in a carboxyl group.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5

MPa or higher. Further, the polymerization pressure is more preferably 4.5 MPa or lower, still more preferably 4.0 MPa or lower, particularly preferably 3.5 MPa or lower, and still further preferably 3.0 MPa or lower.

The carboxylic acid type hydrocarbon-containing surfactant is more preferably added when the concentration of the fluoropolymer particles is 0.2% by mass or less, and still more preferably added when the concentration is 0.1% by mass or less. The surfactant is particularly preferably charged along with the initiation of polymerization. The carboxylic acid type hydrocarbon-containing surfactant is more preferably the compound represented by the formula (A) described above.

In the polymerization, it is preferable that the polymerization pressure is 1.5 MPa or higher, and that the polymerization initiator is a redox initiator.

The polymerization pressure is 1.8 MPa or higher (still more preferably 2.0 MPa or higher, particularly preferably 2.3 MPa or higher).

The redox initiator is more preferably a combination of permanganic acid or a salt thereof and a dicarboxylic acid or a salt thereof, and particularly preferably a combination of potassium permanganate and oxalic acid.

In the polymerization, it is preferable that the polymerization temperature is 30 to 100° C., that the polymerization pressure is 0.5 to 5.0 MPa, and that the polymerization initiator is a radical polymerization initiator.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

The radical polymerization initiator is preferably a persulfate, an organic peroxide, or a mixture thereof, and more preferably ammonium persulfate or disuccinic acid peroxide.

In the polymerization, it is preferable that the polymerization temperature is 30 to 100° C., that the polymerization pressure is 0.5 to 5.0 MPa, that the polymerization initiator is a radical polymerization initiator, and that the carboxylic acid type hydrocarbon-containing surfactant is added to the aqueous medium before the initiation of polymerization or when the concentration of fluoropolymer particles formed in the aqueous medium is 0.36% by weight or less.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

The carboxylic acid type hydrocarbon-containing surfactant is more preferably added when the concentration of the fluoropolymer particles is 0.2% by mass or less, and still more preferably added when the concentration is 0.1% by mass or less. The surfactant is particularly preferably charged along with the initiation of polymerization.

In the polymerization, it is preferable that the polymerization temperature is 30 to 100° C., that the polymerization pressure is 0.5 to 5.0 MPa, that the polymerization initiator is a radical polymerization initiator, and that the carboxylic acid type hydrocarbon-containing surfactant is free from a carbonyl group which is not in a carboxyl group. The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

The carboxylic acid type hydrocarbon-containing surfactant is more preferably the compound represented by the formula (A) described above.

In the polymerization, it is preferable that the polymerization temperature is 30 to 100° C., that the polymerization pressure is 0.5 to 5.0 MPa, and that the carboxylic acid type hydrocarbon-containing surfactant is added to the aqueous medium before the initiation of polymerization or when the concentration of fluoropolymer particles formed in the aqueous medium is 0.36% by mass or less.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

The carboxylic acid type hydrocarbon-containing surfactant is more preferably added when the concentration of the fluoropolymer particles is 0.2% by mass or less, and still more preferably added when the concentration is 0.1% by mass or less. The surfactant is particularly preferably charged along with the initiation of polymerization.

In the polymerization, it is preferable that the polymerization initiator is a radical polymerization initiator, that the polymerization temperature is 30 to 100° C., that the polymerization pressure is 0.5 to 5.0 MPa, and that the carboxylic acid type hydrocarbon-containing surfactant is added to the aqueous medium when the concentration of fluoropolymer particles formed in the aqueous medium is 0.36% by mass or less.

The radical polymerization initiator is preferably a persulfate, an organic peroxide, or a mixture thereof, and more preferably ammonium persulfate or disuccinic acid peroxide.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

The carboxylic acid type hydrocarbon-containing surfactant is more preferably added when the concentration of the fluoropolymer particles is 0.2% by mass or less, and still more preferably added when the concentration is 0.1% by mass or less. The surfactant is particularly preferably charged along with the initiation of polymerization.

In the polymerization, it is preferable that the polymerization initiator is a radical polymerization initiator, that the polymerization temperature is 30 to 100° C., that the polymerization pressure is 0.5 to 5.0 MPa, and that the carboxylic acid type hydrocarbon-containing surfactant is added to the aqueous medium before the initiation of polymerization.

The radical polymerization initiator is preferably a persulfate, an organic peroxide, or a mixture thereof, and more preferably ammonium persulfate or disuccinic acid peroxide.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

In the polymerization, it is preferable that the polymerization temperature is 30 to 100° C., that the polymerization pressure is 0.5 to 5.0 MPa, and that the carboxylic acid type hydrocarbon-containing surfactant is free from a carbonyl group which is not in a carboxyl group.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

The carboxylic acid type hydrocarbon-containing surfactant is more preferably the compound represented by the formula (A) described above.

In the polymerization, it is preferable that the polymerization temperature is 30 to 100° C., that the polymerization pressure is 0.5 to 5.0 MPa, that the carboxylic acid type hydrocarbon-containing surfactant is added to the aqueous medium before the initiation of polymerization or when the concentration of fluoropolymer particles formed in the aqueous medium is 0.36% by mass or less, and that the carboxylic acid type hydrocarbon-containing surfactant is free from a carbonyl group which is not in a carboxyl group.

The polymerization temperature is more preferably 40° C. or higher, still more preferably 50° C. or higher, and particularly preferably 60° C. or higher. Further, the polymerization temperature is more preferably 95° C. or lower, and more preferably 90° C. or lower. The polymerization pressure is more preferably 1.0 MPa or higher, still more preferably 1.2 MPa or higher, and particularly preferably 1.5 MPa or higher. Further, the polymerization pressure is more preferably 4.5 MPa or lower, still more preferably 4.0 MPa or lower, particularly preferably 3.5 MPa or lower, and still further preferably 3.0 MPa or lower.

The carboxylic acid type hydrocarbon-containing surfactant is more preferably added when the concentration of the fluoropolymer particles is 0.2% by mass or less, and still more preferably added when the concentration is 0.1% by mass or less. The surfactant is particularly preferably charged along with the initiation of polymerization. The carboxylic acid type hydrocarbon-containing surfactant is more preferably the compound represented by the formula (A) described above.

In the polymerization, it is preferable that the polymerization pressure is 1.5 MPa or higher, and that the polymerization initiator is a radical polymerization initiator.

The polymerization pressure is 1.8 MPa or higher (still more preferably 2.0 MPa or higher, particularly preferably 2.3 MPa or higher).

The radical polymerization initiator is preferably a persulfate, an organic peroxide, or a mixture thereof, and more preferably ammonium persulfate or disuccinic acid peroxide.

In the polymerization step, a known chain transfer agent may be further added to adjust the polymerization rate and the molecular weight depending on the purpose.

Examples of the chain transfer agent include esters such as dimethyl malonate, diethyl malonate, methyl acetate, ethyl acetate, butyl acetate, and dimethyl succinate, as well as hydrogen, isopentane, methane, ethane, propane, methanol, isobutane, isopropanol, acetone, various mercaptans, various halogenated hydrocarbons such as carbon tetrachloride, and cyclohexane.

The chain transfer agent to be used may be a bromine compound or an iodine compound. An example of a polymerization method using a bromine compound or an iodine compound is a method of performing polymerization of a fluoromonomer in an aqueous medium substantially in the absence of oxygen and in the presence of a bromine compound or an iodine compound (iodine transfer polymerization). Representative examples of the bromine compound or the iodine compound to be used include compounds represented by the general formula:

$$R^a I_x Br_y$$

wherein x and y are each an integer of 0 to 2 and satisfy $1 \leq x+y \leq 2$; and $R^a$ is a saturated or unsaturated fluorohydrocarbon or chlorofluorohydrocarbon group having 1 to 16 carbon atoms, or a hydrocarbon group having 1 to 3 carbon atoms, each of which optionally contains an oxygen atom. By using a bromine compound or an iodine compound, iodine or bromine is introduced into the polymer, and serves as a crosslinking point.

Examples of the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used alone or in any combination.

Of these, 1,4-diiodoperfluorobutane, 1,6-diiodoperfluorohexane, and 2-iodoperfluoropropane are preferably used from the viewpoints of polymerization reactivity, crosslinkability, availability, and the like.

The amount of the chain transfer agent used can be appropriately selected depending on the molecular weight of the target polymer, the type of chain transfer agent used, the type and amount of the initiator used, or the like, but is usually 1 to 50,000 ppm, preferably 1 to 20,000 ppm, based on the total amount of the fluoromonomer fed.

The chain transfer agent may be added to the reaction vessel at once before initiation of the polymerization, may be added at once after initiation of the polymerization, may be added in multiple portions during the polymerization, or may be added continuously during the polymerization.

The method for producing a fluoropolymer may be a method for producing a fluoropolymer, including: (I) polymerizing the fluoromonomer in an aqueous medium in the presence of the carboxylic acid type hydrocarbon-containing surfactant to provide an aqueous dispersion of particles of a fluorine-containing polymer (A); and (II) seed-polymerizing the fluoromonomer to the particles of the fluorine-containing polymer (A) in the aqueous dispersion of the particles of the fluorine-containing polymer (A).

The polymerization step provides an aqueous dispersion of the fluoropolymer, and a powder of the fluoropolymer can be produced by coagulating the aqueous dispersion.

The production method of the present invention may include coagulating the fluoropolymer aqueous dispersion. A conventionally known method can be adopted as the coagulation method depending on the type of fluoropolymer. Further, the production method of the present invention may include isolating the wet powder of the fluoropolymer obtained in the coagulation from the aqueous medium.

The production method of the present invention preferably further comprises drying the fluoropolymer obtained in the polymerization. The wet powder obtained by coagulating the aqueous dispersion described above and isolating the fluoropolymer is preferably dried by heating the wet powder with a heating means such as hot air while keeping the wet powder in a state in which the wet powder is less fluidized, preferably in a stationary state. For example, the drying may be performed while the air is circulated in a drying furnace at high temperature.

The drying temperature is preferably 155° C. or higher, more preferably 160° C. or higher, still more preferably 170° C. or higher, since impurities in the fluoropolymer can be further reduced. The upper limit of the drying temperature may be any temperature at which the fluoropolymer does not deteriorate, but may be 300° C. or lower, for example.

The average particle size of the fluoropolymer is preferably 0.5 to 2,000 μm because impurities can be further reduced in the drying. The lower limit thereof is more preferably 1 μm, and the upper limit thereof is more preferably 1,000 μm, and still more preferably 800 μm.

The average particle size is determined as follows. That is, the particle size distribution is determined using a laser diffraction particle size distribution measurement apparatus (manufactured by Japan Laser Corp.) at a pressure of 0.1 MPa and a measurement time of 3 seconds without cascade impaction. The value corresponding to 50% of the cumulative volume in the resulting particle size distribution is taken as the average particle size.

For high-molecular-weight PTFE, the average particle size is a value determined in conformity with JIS K 6891.

The polymerization step is for obtaining a fluoropolymer aqueous dispersion, and the fluoropolymer aqueous dispersion is substantially free from a compound represented by the following general formula (3) and preferably contains greater than 20 ppm of a compound represented by the following general formula (4) based on the fluoropolymer.

$$(H—(CF_2)_8—SO_3)_qM^2 \qquad \text{General Formula (3)}$$

wherein $M^2$ is H, a metal atom, $NR^{11}_4$, imidazolium optionally having a substituent, pyridinium optionally having a substituent, or phosphonium optionally having a substituent; q is 1 or 2; and $R^{11}$ is the same or different and is H or an organic group having 1 to 10 carbon atoms.

$$(H—(CF_2)_7—COO)_pM^1 \qquad \text{General Formula (4)}$$

wherein $M^1$ is H, a metal atom, $NR^5_4$, imidazolium optionally having a substituent, pyridinium optionally having a substituent, or phosphonium optionally having a substituent; p is 1 or 2; and $R^{11}$ is the same or different and is H or an organic group having 1 to 10 carbon atoms.

The fluoropolymer aqueous dispersion obtained in the polymerization step is a so-called aqueous dispersion as polymerized.

The expression "substantially free from the compound represented by the general formula (3)" means that, for example, the content of the compound represented by the general formula (3) may be 500 ppb or less based on the fluoropolymer. The content of the compound represented by the general formula (3) is preferably 100 ppb or less, more preferably 25 ppb or less, still more preferably 15 ppb or less, and particularly preferably 10 ppb or less based on the fluoropolymer. The lower limit thereof may be, but is not limited to, 0 ppb or 1 ppb.

The content of the compound represented by the general formula (4) may be greater than 20 ppm, may be 50 ppm or more, or may be 100 ppm or more based on the fluoropolymer. Further, the content thereof may be 10,000 ppm or less, 5,000 ppm or less, 3,000 ppm or less, or 1,000 ppm or less.

When the contents of the compounds represented by the general formulas (3) and (4) are determined by the method described later, the quantification limit is about 10 to 100 ppb, but the quantification limit can be lowered by performing concentration. The concentration may be repeated multiple times.

The polymerization step also preferably includes a step (I) of obtaining particles containing a polymerized unit based on a fluoromonomer and a step (II) of polymerizing the fluoromonomer in an aqueous medium containing the particles obtained in the step (I) to provide a fluoropolymer.

Obtaining the particles in the step (I) as described above and then polymerizing the fluoromonomer in an aqueous medium containing the particles obtained in the step (I) can increase the number of particles of the fluoropolymer, thereby increasing the yield thereof.

When the polymerization step includes the step (II), the step (II) may be performed using the aqueous dispersion containing the particles obtained in the step (I) as it is.

Further, the step (II) may be performed after diluting or concentrating the aqueous dispersion containing the particles obtained in the step (I). The dilution or concentration may be performed as it is in the reactor, or may be performed after collecting the aqueous dispersion containing the particles obtained in the step (I) from the reactor. Therefore, the polymerization may further include collecting the aqueous dispersion containing the particles obtained in the step (I) after the step (I) and before the step (II).

Further, the polymerization may further include bringing the aqueous dispersion containing the particles obtained in the step (I) to less than 50° C., less than 30° C. or less than 10° C. after the step (I) and before the step (II).

When the step (I) and the step (II) are continuously performed, the stirring may be once stopped after the step (I), and then the stirring may be restarted to continue the step (II).

Further, when the step (I) and the step (II) are continuously performed, the stirring may be optionally stopped after the step (I), and then the stirring may be restarted after changing the pressure in the reactor to continue the step (II).

Further, in order to change the monomer composition ratio of the reactor, the pressure of the reactor may be released to the atmospheric pressure after the step (I), and the step (II) may be continued after charging each monomer into the reactor. After the step (I), the step (II) may be continued after changing the polymerization temperature.

When the polymerization step includes the step (II), it is particularly preferable to use a redox initiator in the step (I). The use of a redox initiator allows for increasing the number of particles of the particles.

When the step (I) and the step (II) are continuously performed, the fluoropolymer can be continuously produced by stopping the charge of the redox initiator in the step (I), and then charging the polymerization initiator in the step (II). Examples of the redox initiator include those exemplarily described in the polymerization step.

When the polymerization step includes the step (II), a radical polymerization initiator may be used in the step (I). The use of a radical polymerization initiator allows for increasing the number of particles of the particles.

When the step (I) and the step (II) are continuously performed, the fluoropolymer can be continuously produced by stopping the charge of the radical polymerization initiator in the step (I), and then charging the polymerization initiator in the step (II). Examples of the radical polymerization initiator include those exemplarily described in the polymerization step, preferred in the step (I) is ammonium persulfate. Preferred in the step (II) is disuccinic acid peroxide. Further, in the step (II), the radical polymerization initiator is preferably charged continuously or intermittently. When the radical polymerization initiator is used in the step (I), the fluoropolymer is preferably melt-fabricable fluororesin, low-molecular-weight PTFE, or modified PTFE. More preferred are FEP, PFA, low-molecular-weight PTFE and modified PTFE, and still more preferred are low-molecular-weight PTFE and modified PTFE.

When the polymerization step includes the step (II), the step (I) is preferably a step of obtaining an aqueous dispersion having a particle concentration of 20.0% by mass or less. The solid concentration is more preferably 15.0% by mass or less, still more preferably 10.0% by mass or less, further preferably 8.0% by mass or less, and particularly preferably 5.0% by mass or less. The solid concentration is preferably 0.1% by mass or more, more preferably 0.3% by mass or more, still more preferably 0.5% by mass or more, further preferably 0.8% by mass or more, still further preferably 1.0% by mass or more, and particularly preferably 1.5% by mass or more.

The particles are particles containing polymerized units based on a fluoromonomer. The particles may include only polymerized units based on a fluoromonomer, or may include polymerized units based on a fluoromonomer and polymerized units based on a fluorine-free monomer. As the fluoromonomer and the fluorine-free monomer, the monomers described in the polymerization step may be appropriately used. The particles may have the same monomer composition ratio as any of (I) non melt-processible fluororesin, (II) melt-fabricable fluororesin, (III) fluoroelastomer, which will be described later.

The particles obtained in the step (I) preferably have an average primary particle size of 300 nm or less, more preferably 200 nm or less, and still more preferably 150 nm or less. Further, the average primary particle size is preferably 0.1 nm or more, more preferably 1.0 nm or more, and still more preferably 3.0 nm or more.

The average primary particle size can be determined by dynamic light scattering. The average primary particle size may be determined by preparing a fluoropolymer aqueous dispersion with a fluoropolymer solids concentration being adjusted to 1.0% by mass and using dynamic light scattering at 25° C. with 70 measurement processes, wherein the solvent (water) has a refractive index of 1.3328 and the solvent (water) has a viscosity of 0.8878 mPa·s. The dynamic light scattering may be, for example, ELSZ-1000S (manufactured by Otsuka Electronics Co., Ltd.).

The step (II) is a step of polymerizing a fluoromonomer in an aqueous medium containing the particles to provide a fluoropolymer. The step (II) may be a step of polymerizing only a fluoromonomer, or a step of polymerizing a fluoromonomer and a fluorine-free monomer. As the fluoromonomer and the fluorine-free monomer, the monomers described in the polymerization step may be appropriately used.

The aqueous medium is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

The aqueous medium in the step (II) preferably contains the aqueous medium contained in the aqueous dispersion containing the particles obtained in the step (I). In addition to the aqueous medium contained in the aqueous dispersion containing the particles, another aqueous medium may also be added.

The polymerization temperature and the polymerization pressure in the step (II) are determined as appropriate in accordance with the types of the monomers used, the molecular weight of the target fluoropolymer, and the reaction rate.

For example, the polymerization temperature is preferably 10 to 150° C. The polymerization temperature is more preferably 30° C. or higher, and still more preferably 50° C. or higher. Further, the polymerization temperature is more preferably 120° C. or lower, and still more preferably 100° C. or lower.

Further, the polymerization pressure is preferably 0.05 to 10 MPa. The polymerization pressure is more preferably 0.3 MPa or higher, still more preferably 0.5 MPa or higher, and more preferably 5.0 MPa or lower, still more preferably 3.0 MPa or lower.

In particular, from the viewpoint of improving the yield of fluoropolymer, the polymerization pressure is preferably 1.0 MPa or more, and more preferably 2.0 MPa or more.

The step (II) may be performed in the presence of a carboxylic acid type hydrocarbon-containing surfactant or may be performed in the absence of a carboxylic acid type hydrocarbon containing surfactant.

The step (II) is preferably a step of polymerizing a fluoromonomer in an aqueous medium containing the particles in the presence of a carboxylic acid type hydrocarbon-containing surfactant.

In the step (II), the amount of the carboxylic acid type hydrocarbon-containing surfactant is preferably 0.0001 to 15% by mass based on the aqueous medium. The lower limit thereof is more preferably 0.001% by mass, while the upper limit thereof is more preferably 1% by mass. Less than 0.0001% by mass of the surfactant may cause insufficient dispersibility. More than 15% by mass of the surfactant may fail to give the effects corresponding to its amount. The amount of the carboxylic acid type hydrocarbon-containing surfactant added is appropriately determined in accordance with factors such as the types of the monomers used and the molecular weight of the target fluoropolymer.

The carboxylic acid type hydrocarbon-containing surfactant may be added to the reaction vessel at once before initiation of the polymerization, may be added at once after initiation of the polymerization, may be added in multiple portions during the polymerization, or may be added continuously during the polymerization.

The step (II) preferably includes a step of continuously adding the carboxylic acid type hydrocarbon-containing surfactant. Adding the carboxylic acid type hydrocarbon-containing surfactant continuously means, for example, adding the carboxylic acid type hydrocarbon-containing surfactant not all at once, but adding over time and without interruption or adding in portions. The step of continuously adding allows for obtaining an aqueous dispersion having a smaller average primary particle size and superior stability.

In the step (II), the amount of the carboxylic acid type hydrocarbon-containing surfactant at the initiation of polymerization is preferably 1 ppb or more based on the aqueous medium. The amount of the carboxylic acid type hydrocarbon-containing surfactant at the initiation of the polymerization is preferably 10 ppb or more, more preferably 50 ppb or more, still more preferably 100 ppb or more, and further preferably 200 ppb or more. The upper limit thereof is preferably, but not limited to, 100,000 ppm, and more preferably 50,000 ppm, for example. When the amount of the carboxylic acid type hydrocarbon-containing surfactant at the initiation of polymerization is in the above range, it is possible to obtain an aqueous dispersion having a smaller average primary particle size and superior stability. Also, the aspect ratio of the primary particles can be made smaller.

In the step (II), the step of continuously adding the carboxylic acid type hydrocarbon-containing surfactant is preferably a step of starting to add the carboxylic acid type hydrocarbon-containing surfactant to the aqueous medium when the concentration of the fluoropolymer formed in the aqueous medium is 10% by mass or less. The carboxylic acid type hydrocarbon-containing surfactant is more preferably started to be added when the concentration is 8.0% by mass or less, still more preferably started to be added when the concentration is 5.0% by mass or less, further preferably started to be added when the concentration is 4.0% by mass or less, still further preferably started to be added when the concentration is 3.0% by mass or less, particularly preferably started to be added when the concentration is 2.0% by mass or less, particularly more preferably started to be added when the concentration is 1.5% by mass or less, and very particularly preferably started to be added when the concentration is 1.0% by mass or less. Further, the carboxylic acid type hydrocarbon-containing surfactant is preferably started to be added when the concentration thereof is less than 0.60% by mass, more preferably started to be added when the concentration is 0.50% by mass or less, still more preferably started to be added when the concentration is 0.36% by mass or less, further preferably started to be added when the concentration is 0.30% by mass or less, still further preferably started to be added when the concentration is 0.20% by mass or less, and particularly preferably started to be added when the concentration is 0.10% by mass or less. Further, the carboxylic acid type hydrocarbon-containing surfactant is preferably started to be added when the polymerization is initiated in the step (II). The concentration is based on the total amount of the aqueous medium and the fluoropolymer.

By including the above steps, it is possible to obtain an aqueous dispersion having a smaller average primary particle size and superior stability. Also, an aqueous dispersion having a smaller amount of uncoagulated polymer can be obtained. Furthermore, the aspect ratio of the primary particles can be made smaller.

In the step of continuously adding the carboxylic acid type hydrocarbon-containing surfactant, the amount of the carboxylic acid type hydrocarbon-containing surfactant added is preferably 0.01 to 10% by mass based on 100% by mass of the aqueous medium. The lower limit thereof is more preferably 0.05% by mass, still more preferably 0.1% by mass while the upper limit thereof is more preferably 5% by mass, still more preferably 1% by mass.

When the polymerization includes the step (II), the polymerization preferably includes subjecting the carboxylic acid type hydrocarbon-containing surfactant to a radical treatment or an oxidation treatment.

The step (II) may be performed by charging a polymerization reactor with an aqueous dispersion containing the particles, a fluoromonomer, and optionally an aqueous medium, a fluorine-free monomer, a carboxylic acid type hydrocarbon-containing surfactant, other additives, stirring the contents of the reactor, maintaining the reactor at a predetermined polymerization temperature, and adding a predetermined amount of a polymerization initiator to thereby initiate the polymerization reaction. After the initiation of the polymerization reaction, the components such as the monomers, the polymerization initiator, a chain transfer agent, and the carboxylic acid type hydrocarbon-containing surfactant may additionally be added depending on the purpose. The carboxylic acid type hydrocarbon-containing surfactant may be added after the polymerization reaction is initiated.

The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization. The concentration of the polymerization initiator is appropriately determined depending on the types of the monomers, the molecular weight of the target fluoropolymer, and the reaction rate.

The polymerization initiator to be used is preferably an oil-soluble radical polymerization initiator or a water-soluble radical polymerization initiator. The step (II) is preferably a step performed in the presence of an oil-soluble radical polymerization initiator or a water-soluble radical polymerization initiator. In particular, it is preferable to use the oil-soluble peroxide or water-soluble peroxide described above as the polymerization initiator.

In the step (II), the fluoromonomer is preferably polymerized substantially in the absence of a fluorine-containing surfactant. The expression "substantially in the absence of a fluorine-containing surfactant" means that the fluorine-containing surfactant is 1 ppm or less based on the fluoropolymer obtained by the polymerization, preferably 100 ppb or less, more preferably 10 ppb or less, and still more preferably 1 ppb or less.

The step (I) or step (II) may also be a step of polymerizing in the presence of a nucleating agent. The nucleating agent may be used only in the step (I), may be used only in the step (II), or may be used in both step (I) and step (II).

Examples of the fluoropolymer suitably produced by the production method of the present invention include a TFE polymer in which TFE is the monomer having the highest mole fraction (hereinafter, "most abundant monomer") among the monomers in the polymer, a VDF polymer in which VDF is the most abundant monomer, and a CTFE polymer in which CTFE is the most abundant monomer. Hereinafter, more preferred embodiments will be described for each fluoropolymer.

The TFE polymer may suitably be a TFE homopolymer, or may be a copolymer containing (1) TFE, (2) one or two or more fluorine-containing monomers each of which is different from TFE and has 2 to 8 carbon atoms, in particular VDF, HFP, or CTFE, and (3) another monomer. Examples of (3) the another monomer include fluoro(alkyl vinyl ethers) having an alkyl group having 1 to 5 carbon atoms, particularly 1 to 3 carbon atoms; fluorodioxoles; perfluoroalkyl ethylenes; and co-hydroperfluoroolefins.

The TFE polymer may also be a copolymer of TFE and one or two or more fluorine-free monomers. Examples of the fluorine-free monomers include alkenes such as ethylene and propylene; vinyl esters; and vinyl ethers. The TFE polymer may also be a copolymer of TFE, one or two or more fluorine-containing monomers having 2 to 8 carbon atoms, and one or two or more fluorine-free monomers.

The VDF polymer may suitably be a VDF homopolymer (PVDF), or may be a copolymer containing (1) VDF, (2) one or two or more fluoroolefins each of which is different from VDF and has 2 to 8 carbon atoms, in particular TFE, HFP, or CTFE, and (3) a perfluoro(alkyl vinyl ether) having an alkyl group having 1 to 5 carbon atoms, particularly 1 to 3 carbon atoms, or the like.

The CTFE polymer may suitably be a CTFE homopolymer, or may be a copolymer containing (1) CTFE, (2) one or two or more fluoroolefins each of which is different from CTFE and has 2 to 8 carbon atoms, in particular TFE or HFP, and (3) a perfluoro(alkyl vinyl ether) having an alkyl group having 1 to 5 carbon atoms, particularly 1 to 3 carbon atoms.

The CTFE polymer may also be a copolymer of CTFE and one or two or more fluorine-free monomers, and examples of the fluorine-free monomers include alkenes such as ethylene and propylene; vinyl esters; and vinyl ethers.

The fluoropolymer produced by the production method of the present invention may be vitreous, plastic, or elastomeric. The fluoropolymer is amorphous or partially crystallized, and may be subjected to compression firing, melt fabrication, or non-melt fabrication.

The production method of the present invention can suitably provide (I) non melt-processible fluororesins, including tetrafluoroethylene polymers (TFE polymers (PTFE)); (II) melt-fabricable fluororesins, including ethylene/TFE copolymers (ETFE), TFE/HFP copolymers (FEP), TFE/perfluoro(alkyl vinyl ether) copolymers (e.g., PFA, MFA), TFE/VDF copolymers, and electrolyte polymer precursors; and (III) fluoroelastomers, including TFE/propylene copolymers, TFE/propylene copolymers/third monomer copolymers (the third monomer may be VDF, HFP, CTFE, fluoroalkyl vinyl ether, or the like), TFE/fluoroalkyl vinyl ether copolymers; HFP/ethylene copolymers, HFP/ethylene/TFE copolymers; PVDF; thermoplastic elastomers such as VDF/HFP copolymers, HFP/ethylene copolymers, and VDF/TFE/HFP copolymers; and fluorine-containing segmented polymers disclosed in Japanese Patent Publication No. 61-49327.

The fluoropolymer is preferably a fluororesin, more preferably a fluororesin having a fluorine substitution percentage, calculated by the following formula, of 50% or higher, still more preferably a fluororesin having the fluorine substitution percentage of higher than 50%, further preferably a fluororesin having the fluorine substitution percentage of 55% or higher, further preferably a fluororesin having the fluorine substitution percentage of 60% or higher, further preferably a fluororesin having the fluorine substitution percentage of 75% or higher, particularly preferably a fluororesin having the fluorine substitution percentage of 80% or higher, and most preferably a fluororesin having the fluorine substitution percentage of 90 to 100%, i.e., a perfluororesin.

Fluorine substitution percentage (%)=(number of fluorine atoms bonded to carbon atoms constituting fluoropolymer)/((number of hydrogen atoms bonded to carbon atoms constituting fluoropolymer)+(number of fluorine atoms and chlorine atoms bonded to carbon atoms constituting fluoropolymer))×100　　(Formula)

The perfluororesin is more preferably a fluororesin having a fluorine substitution percentage of 95 to 100%, still more preferably PTFE, FEP, or PFA, particularly preferably PTFE, and further preferably high-molecular-weight PTFE.

The fluoropolymer may have a core-shell structure. An example of the fluoropolymer having a core-shell structure is a modified PTFE including a core of high-molecular-weight PTFE and a shell of a lower-molecular-weight PTFE or a modified PTFE in the particle. An example of such a modified PTFE is PTFE disclosed in National Publication of International Patent Application No. 2005-527652.

The core-shell structure may have the following structures.

Core: TFE homopolymer Shell: TFE homopolymer
Core: modified PTFE Shell: TFE homopolymer
Core: modified PTFE Shell: modified PTFE
Core: TFE homopolymer Shell: modified PTFE
Core: low-molecular-weight PTFE Shell: high-molecular-weight PTFE
Core: high-molecular-weight PTFE Shell: low-molecular-weight PTFE In the fluoropolymer having a core-shell structure, the lower limit of the proportion of the core is preferably 0.5% by mass, more preferably 1.0% by mass, still more preferably 3.0% by mass, particularly preferably 5.0% by mass, and most preferably 10.0% by mass. The upper limit of the proportion of the core is preferably 99.5% by mass, more preferably 99.0% by mass, still more preferably 98.0% by mass, further preferably 97.0% by mass, particularly preferably 95.0% by mass, and most preferably 90.0% by mass.

In the fluoropolymer having a core-shell structure, the lower limit of the proportion of the shell is preferably 0.5% by mass, more preferably 1.0% by mass, still more preferably 3.0% by mass, particularly preferably 5.0% by mass, and most preferably 10.0% by mass. The upper limit of the proportion of the shell is preferably 99.5% by mass, more preferably 99.0% by mass, still more preferably 98.0% by mass, further preferably 97.0% by mass, particularly preferably 95.0% by mass, and most preferably 90.0% by mass.

In the fluoropolymer having a core-shell structure, the core or the shell may be composed of two or more layers. For example, the fluoropolymer may have a trilayer structure including a core center portion of a modified PTFE, a core outer layer portion of a TFE homopolymer, and a shell of a modified PTFE. An example of a fluoropolymer having such a trilayer structure is PTFE disclosed in International Publication No. WO2006/054612.

(I) The non melt-processible fluororesins, (II) the melt-fabricable fluororesins, and (III) the fluoroelastomers suitably produced by the production method of the present invention are preferably produced in the following manner.
(I) Non Melt-Processible Fluororesins In the production method of the present invention, polymerization of TFE is usually performed at a polymerization temperature of 10 to 150° C. and a polymerization pressure of 0.05 to 5 MPaG. For example, the polymerization temperature is more preferably 30° C. or higher, and still more preferably 50° C. or higher. Further, the polymerization temperature is more preferably 120° C. or lower, and still more preferably 100° C. or lower. Further, the polymerization pressure is more preferably 0.3 MPaG or higher, still more preferably 0.5 MPaG or higher, and more preferably 5.0 MPaG or lower, still more preferably 3.0 MPaG or lower. In particular, from the viewpoint of improving the yield of fluoropolymer, the polymerization pressure is preferably 1.0 MPaG or more, more preferably 1.2 MPaG or more, still more preferably 1.5 MPaG or more, and more preferably 2.0 MPaG or more.

In an embodiment, the polymerization reaction is initiated by charging pure water into a pressure-resistant reaction vessel equipped with a stirrer, deoxidizing the system, charging TFE, increasing the temperature to a predetermined level, and adding a polymerization initiator. When the pressure decreases as the reaction progresses, additional TFE is fed continuously or intermittently to maintain the initial pressure. When the amount of TFE fed reaches a predetermined level, feeding is stopped, and then TFE in the reaction vessel is purged and the temperature is returned to room temperature, whereby the reaction is completed. Additional TFE may be added continuously or intermittently to prevent pressure drop.

In production of the TFE polymer (PTFE), various known modifying monomers may be used in combination. The TFE polymer as used herein is a concept that encompasses not only a TFE homopolymer but also a non melt-processible copolymer of TFE and a modifying monomer (hereinafter, referred to as a "modified PTFE").

The modifying monomer may be any modifying monomer copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkylethylenes; ethylene; and fluorine-containing vinyl ethers having a nitrile group. Further, one or more kinds of the modifying monomers may be used.

Examples of the perfluorovinyl ether include, but are not limited to, a perfluoro unsaturated compound represented by the following general formula (X):

$$CF_2=CF-ORf \qquad (X)$$

wherein Rf represents a perfluoroorganic group. The "perfluoroorganic group" as used herein means an organic group in which all hydrogen atoms bonded to the carbon atoms are replaced by fluorine atoms. The perfluoroorganic group optionally has ether oxygen.

Examples of the perfluorovinyl ether include perfluoro (alkyl vinyl ether) (PAVE) in which Rf represents a perfluoroalkyl group having 1 to 10 carbon atoms in the general formula (X). The perfluoroalkyl group preferably has 1 to 5 carbon atoms.

Examples of the perfluoroalkyl group in PAVE include a perfluoromethyl group, a perfluoroethyl group, a perfluoropropyl group, a perfluorobutyl group, a perfluoropentyl group, and a perfluorohexyl group, and preferred are perfluoromethyl vinyl ether (PMVE) of which the perfluoroalkyl group is a perfluoromethyl group and perfluoropropyl vinyl ether (PPVE) of which the perfluoroalkyl group is a perfluoropropyl group.

Examples of the perfluoroalkylethylene include, but are not limited to, perfluorobutyl ethylene (PFBE), perfluorohexyl ethylene (PFHE), and perfluorooctyl ethylene (PFOE).

The modifying monomer in the modified PTFE is preferably at least one selected from the group consisting of HFP, CTFE, VDF, PMVE, PPVE, PFBE, PFHE, and ethylene.

The modified PTFE preferably has modifying monomer units in the range of 0.00001 to 1% by mass. The lower limit of the modifying monomer unit is more preferably 0.0001% by mass, still more preferably 0.001% by mass, and further preferably 0.01% by mass. The upper limit of the modifying monomer unit is more preferably 0.5% by mass, and still more preferably 0.3% by mass. The term "modifying monomer unit" as used herein means a portion of the molecular structure of the modified PTFE as a part derived from the modifying monomer, and the term "all the monomer units" herein means all the portions derived from monomers in the molecular structure of the modified PTFE.

The modifying monomer is also preferably exemplified by a comonomer (3) having a monomer reactivity ratio of 0.1 to 8. The presence of the comonomer (3) makes it possible to obtain modified PTFE particles having a small particle size, and to thereby obtain an aqueous dispersion having high dispersion stability.

Here, the monomer reactivity ratio in copolymerization with TFE is a value obtained by dividing the rate constant in the case that propagating radicals react with TFE by the rate constant in the case that the propagating radicals react with comonomers, in the case that the propagating radicals are terminals of the repeating unit derived from TFE. A smaller monomer reactivity ratio indicates higher reactivity of the comonomers with TFE. The monomer reactivity ratio can be calculated by determining the compositional features of the polymer produced immediately after the initiation of copolymerization of TFE and comonomers and using the Fineman-Ross equation.

The copolymerization is performed using 3,600 g of deionized degassed water, 1,000 ppm of ammonium perfluorooctanoate based on the water, and 100 g of paraffin wax contained in an autoclave made of stainless steel with an internal volume of 6.0 L at a pressure of 0.78 MPa and a temperature of 70° C. A comonomer in an amount of 0.05 g, 0.1 g, 0.2 g, 0.5 g, or 1.0 g is added into the reactor, and then 0.072 g of ammonium persulfate (20 ppm based on the water) is added thereto. To maintain the polymerization pressure at 0.78 MPa, TFE is continuously fed thereinto. When the charged amount of TFE reaches 1,000 g, stirring is stopped and the pressure is released until the pressure in the reactor decreases to the atmospheric pressure. After cooling, the paraffin wax is separated to obtain an aqueous dispersion containing the resulting polymer. The aqueous dispersion is stirred so that the resulting polymer coagulates, and the polymer is dried at 150° C. The compositional features in the resulting polymer are calculated by appropriate combination of NMR, FT-IR, elemental analysis, and X-ray fluorescence analysis depending on the types of the monomers.

The comonomer (3) having a monomer reactivity ratio of 0.1 to 8 is preferably at least one selected from the group consisting of comonomers represented by the formulas (3a) to (3d):

$$CH_2\!=\!CH\!-\!Rf^1 \tag{3a}$$

wherein $Rf^1$ is a perfluoroalkyl group having 1 to 10 carbon atoms;

$$CF_2\!=\!CF\!-\!O\!-\!Rf^2 \tag{3b}$$

wherein $Rf^2$ is a perfluoroalkyl group having 1 to 2 carbon atoms;

$$CF_2\!=\!CF\!-\!O\!-\!(CF_2)_n CF\!=\!CF_2 \tag{3c}$$

wherein n is 1 or 2; and $$\tag{3d}$$

wherein $X^3$ and $X^4$ are each F, Cl, or a methoxy group; and Y is represented by the formula Y1 or Y2;

$$-\!CF\!=\!CF\!- \tag{Y1}$$

$$\tag{Y2}$$

in the formula Y2, Z and Z' are each F or a fluorinated alkyl group having 1 to 3 carbon atoms.

The content of the comonomer (3) is preferably in the range of 0.00001 to 1.0% by mass with respect to the modified PTFE. The lower limit thereof is more preferably 0.0001% by mass, still more preferably 0.001% by mass, further preferably 0.005% by mass, and particularly preferably 0.009% by mass. The upper limit thereof is more preferably 0.50% by mass, still more preferably 0.40% by mass, further preferably 0.30% by mass, still further preferably 0.10% by mass, and particularly preferably 0.05% by mass.

The modifying monomer is preferably at least one selected from the group consisting of hexafluoropropylene, vinylidene fluoride, fluoro(alkyl vinyl ether), (perfluoroalkyl)ethylene, ethylene, and modifying monomers having a functional group capable of reacting by radical polymerization and a hydrophilic group, in view of obtaining an aqueous dispersion of polytetrafluoroethylene particles having a small average primary particle size, a small aspect ratio, and excellent stability.

From the viewpoint of reactivity with TFE, the modifying monomer preferably contains at least one selected from the group consisting of hexafluoropropylene, perfluoro(alkyl vinyl ether), and (perfluoroalkyl)ethylene.

More preferably, the modifying monomer contains at least one selected from the group consisting of hexafluoropropylene, perfluoro(methyl vinyl ether), perfluoro(propyl vinyl ether), (perfluorobutyl)ethylene, (perfluorohexyl)ethylene, and (perfluorooctyl)ethylene.

The total amount of the hexafluoropropylene unit, perfluoro(alkyl vinyl ether) unit and (perfluoroalkyl)ethylene unit is preferably in the range of 0.00001 to 1.0% by mass based on the modified PTFE. The lower limit of the total amount thereof is more preferably 0.001% by mass, still more preferably 0.005% by mass, and particularly preferably 0.009% by mass. The upper limit thereof is more preferably 0.50% by mass, still more preferably 0.40% by mass, further preferably 0.30% by mass, still further preferably 0.10% by mass, and particularly preferably 0.05% by mass.

In the production method of the present invention, a modifying monomer having a functional group capable of reacting by radical polymerization and a hydrophilic group (hereinafter referred to as "modifying monomer (A)") may be used together with the surfactant. The modifying monomer (A) may be a compound containing at least one vinyl group and having a surfactant function. Examples of the hydrophilic group in the modifying monomer (A) include $-NH_2$, $-PO_3M$, $-OPO_3M$, $-SO_3M$, $-OSO_3M$, and $-COOM$, wherein M represents H, a metal atom, $NR^7_4$, imidazolium optionally having a substituent, pyridinium optionally having a substituent, or phosphonium optionally having a substituent, wherein $R^7$ is H or an organic group, and may be the same or different, and any two thereof may be bonded to each other to form a ring. Of these, the hydrophilic group is preferably $-SO_3M$ or $-COOM$. $R^7$ is preferably H or a $C_{1-10}$ organic group, more preferably H or a $C_{1-4}$ organic group, and still more preferably H or a $C_{1-4}$ alkyl group.

Examples of the metal atom include monovalent and divalent metal atoms, alkali metals (Group 1) and alkaline earth metals (Group 2), and preferred is Na, K, or Li.

Examples of the "functional group capable of reacting by radical polymerization" in the modifying monomer (A) include groups having an ethylenically unsaturated bond. Examples of the group having an ethylenically unsaturated bond include a linking group as $R^a$ described later. Preferred are groups having an unsaturated bond, such as $-CH=CH_2$, $-CF=CH_2$, $-CH=CF_2$, $-CF=CF_2$, $-CH_2-CH=CH_2$, $-CF_2-CF=CH_2$, $-CF_2-CF=CF_2$, $-(C=O)-CH=CH_2$, $-(C=O)-CF=CH_2$, $-(C=O)-CH=CF_2$, $-(C=O)-CF=CF_2$, $-(C=O)-C(CH_3)=CH_2$, $-(C=O)-C(CF_3)=CH_2$, $-(C=O)-C(CH_3)=CF_2$, $-(C=O)-C(CF_3)=CF_2$, $-O-CH_2-CH=CH_2$, $-O-CF_2-CF=CH_2$, $-O-CH_2-CH=CF_2$, and $-O-CF_2-CF=CF_2$.

The modifying monomer (A) is preferably a compound represented by the general formula (4):

$$CX^iX^k=CX^jR^a-(CZ^1Z^2)_k-Y^3 \qquad (4)$$

wherein $X^i$, $X^j$, and $X^k$ are each independently F, Cl, H, or $CF_3$; $Y^3$ is a hydrophilic group; $R^a$ is a linking group; $Z^1$ and $Z^2$ are each independently H, F, or $CF_3$; and k is 0 or 1.

Examples of the hydrophilic group include $-NH_2$, $-PO_3M$, $-OPO_3M$, $-SO_3M$, $-OSO_3M$, and $-COOM$, wherein M represents H, a metal atom, $NR^7_4$, imidazolium optionally having a substituent, pyridinium optionally having a substituent, or phosphonium optionally having a substituent, wherein $R^7$ is H or an organic group, and may be the same or different, and any two thereof may be bonded to each other to form a ring. Of these, the hydrophilic group is preferably $-SO_3M$ or $-COOM$. $R^7$ is preferably H or a $C_{1-10}$ organic group, more preferably H or a $C_{1-4}$ organic group, and still more preferably H or a $C_{1-4}$ alkyl group.

Examples of the metal atom include monovalent and divalent metal atoms, alkali metals (Group 1) and alkaline earth metals (Group 2), and preferred is Na, K, or Li.

The use of the modifying monomer (A) allows for obtaining an aqueous dispersion having a smaller average primary particle size and superior stability. Also, the aspect ratio of the primary particles can be made smaller.

$R^a$ is a linking group. The "linking group" as used herein refers to a divalent linking group. The linking group may be a single bond and preferably contains at least one carbon atom, and the number of carbon atoms may be 2 or more, 4 or more, 8 or more, 10 or more, or 20 or more. The upper limit thereof is not limited, but may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of esters, amides, sulfonamides, carbonyls, carbonates, urethanes, ureas and carbamates. The linking group may be free from carbon atoms and may be a catenary heteroatom such as oxygen, sulfur, or nitrogen.

$R^a$ is preferably a catenary heteroatom such as oxygen, sulfur, or nitrogen, or a divalent organic group.

When $R^a$ is a divalent organic group, the hydrogen atom bonded to the carbon atom may be replaced by a halogen other than fluorine, such as chlorine, and may or may not contain a double bond. Further, $R^a$ may be linear or branched, and may be cyclic or acyclic. $R^a$ may also contain a functional group (e.g., ester, ether, ketone, amine, halide, etc.).

$R^a$ may also be a fluorine-free divalent organic group or a partially fluorinated or perfluorinated divalent organic group.

$R^a$ may be, for example, a hydrocarbon group in which a fluorine atom is not bonded to a carbon atom, a hydrocarbon group in which some of the hydrogen atoms bonded to a carbon atom are replaced by fluorine atoms, a hydrocarbon group in which all of the hydrogen atoms bonded to the carbon atoms are replaced by fluorine atoms, $-(C=O)-$, $-(C=O)-O-$, or a hydrocarbon group containing $-(C=O)-$, and these groups optionally contain an oxygen atom, optionally contain a double bond, and optionally contain a functional group.

$R^a$ is preferably $-(C=O)-$, $-(C=O)-O-$, or a hydrocarbon group having 1 to 100 carbon atoms that optionally contains an ether bond and optionally contains a carbonyl group, wherein some or all of the hydrogen atoms bonded to the carbon atoms in the hydrocarbon group may be replaced by fluorine.

$R^a$ is preferably at least one selected from $-(CH_2)_a-$, $-(CF_2)_a-$, $-O-(CF_2)_a-$, $-(CF_2)_a-O-(CF_2)_b-$, $-O(CF_2)_a-O-(CF_2)_b-$, $-(CF_2)_a-[O-(CF_2)_b]_c-$, $-O(CF_2)_a-[O-(CF_2)_b]_c-$, $-[(CF_2)_a-O]_b-[(CF_2)_c-O]_d-$, $-O[(CF_2)_a-O]_b-[(CF_2)_c-O]_d-$, $-O-[CF_2CF(CF_3)O]_a-(CF_2)_b-$, $-(C=O)-$, $-(C=O)-O-$, $-(C=O)-(CH_2)_a-$, $-(C=O)-(CH_2)_a-$, $-(C=O)-(CF_2)_a-$, $-(C=O)-O-(CH_2)_a-$, $-(C=O)-O-(CF_2)_a-$, $-(C=O)-[(CH_2)_a-O]_b-$, $-(C=O)-[(CF_2)_a-O]_b-$, $-(C=O)-O[(CH_2)_a-O]_b-$, $-(C=O)-O[(CF_2)_a-O]_b-$, $-C(=O)-O[(CH_2)_a-O]_b-$, $-(CH_2)_c-$, $-(C=O)-O[(CF_2)_a-O]_b-(CF_2)_c-$, $-(C=O)-(CH_2)_a-O-(CH_2)_b-$, $-(C=O)-(CF_2)_a-$ O—(CF$_2$)$_b$—,  —(C=O)—O—(CH$_2$)$_a$—O—(CH$_2$)$_b$—, —(C=O)—O—(CF$_2$)$_a$—O—(CF$_2$)$_b$—,  —(C=O)—O— C$_6$H$_4$—, and combinations thereof.

In the formula, a, b, c, and d are independently at least 1 or more. a, b, c and d may independently be 2 or more, 3 or more, 4 or more, 10 or more, or 20 or more. The upper limits of a, b, c, and d are 100, for example.

Specific examples suitable for R$^a$ include —CF$_2$—O—, —CF$_2$—O—CF$_2$—,  —CF$_2$—O—CH$_2$—,  —CF$_2$—O— CH$_2$CF$_2$—,  —CF$_2$—O—CF$_2$CF$_2$—,  —CF$_2$—O— CF$_2$CH$_2$—, —CF$_2$—O—CF$_2$CF$_2$CH$_2$—, —CF$_2$—O—CF (CF$_3$)—,  —CF$_2$—O—CF(CF$_3$)CF$_2$—,  —CF$_2$—O—CF (CF$_3$)CF$_2$—O—,  —CF$_2$—O—CF(CF$_3$)CH$_2$—, —(C=O)—,  —(C=O)—O—,  —(C=O)—(CH$_2$)—, —(C=O)—(CF$_2$)—,  —(C=O)—O—(CH$_2$)—, —(C=O)—O—(CF$_2$)—,  —(C=O)—[(CH$_2$)$_2$—O]$_n$—, —(C=O)—[(CF$_2$)$_2$—O]$_n$—,  —(C=O)—O[(CH$_2$)$_2$—O]$_n$—, —(C=O)—O[(CF$_2$)$_2$—O]$_n$—,  —(C=O)—O[(CH$_2$)$_2$—O]$_n$—(CH$_2$)—,  —(C=O)—O[(CF$_2$)$_2$—O]$_n$—(CF$_2$)—, —(C=O)—(CH$_2$)$_2$—O—(CH$_2$)—,  —(C=O)—(CF$_2$)$_2$—O—(CF$_2$)—,  —(C=O)—O—(CH$_2$)$_2$—O—(CH$_2$)—, —(C=O)—O—(CF$_2$)$_2$—O—(CF$_2$)—,  and  —(C=O)—O—C$_6$H$_4$—. In particular, preferred for R$^a$ among these is —CF$_2$—O—, —CF$_2$—O—CF$_2$—, —CF$_2$—O—CF$_2$CF$_2$—, —CF$_2$—O—CF(CF$_3$)—,  —CF$_2$—O—CF(CF$_3$)CF$_2$—, —CF$_2$—O—CF(CF$_3$)CF$_2$—O—,  —(C=O)—, —(C=O)—O—, —(C=O)—(CH$_2$)—, —(C=O)—O— (CH$_2$)—,  —(C=O)—O[(CH$_2$)$_2$—O]$_n$—,  —(C=O)—O [(CH$_2$)$_2$—O]$_n$—(CH$_2$)—,  —(C=O)—(CH$_2$)$_2$—O— (CH$_2$)—, or —(C=O)—O—C$_6$H$_4$—.

In the formula, n is an integer of 1 to 10.

—R$^a$—(CZ$^1$Z$^2$)$_k$ in the general formula (4) is preferably —CF$_2$—O—CF$_2$—,  —CF$_2$—O—CF(CF$_3$)—,  —CF$_2$— O—C(CF$_3$)$_2$—, —CF$_2$—O—CF$_2$—CF$_2$—, —CF$_2$—O— CF$_2$—CF(CF$_3$)—, —CF$_2$—O—CF$_2$—C(CF$_3$)$_2$—, —CF$_2$— O—CF$_2$CF$_2$—CF$_2$—,  —CF$_2$—O—CF$_2$CF$_2$—CF(CF$_3$)—, —CF$_2$—O—CF$_2$CF$_2$—C(CF$_3$)$_2$—,  —CF$_2$—O—CF (CF$_3$)—CF$_2$—,  —CF$_2$—O—CF(CF$_3$)—CF(CF$_3$)—, —CF$_2$—O—CF(CF$_3$)—C(CF$_3$)$_2$—,  —CF$_2$—O—CF (CF$_3$)—CF$_2$—,  —CF$_2$—O—CF(CF$_3$)—CF(CF$_3$)—, —CF$_2$—O—CF(CF$_3$)—C(CF$_3$)$_2$—, —CF$_2$—O—CF(CF$_3$) CF$_2$—CF$_2$—,  —CF$_2$—O—CF(CF$_3$)CF$_2$—CF(CF$_3$)—, —CF$_2$—O—CF(CF$_3$)CF$_2$—C(CF$_3$)$_2$—,  —CF$_2$—O—CF (CF$_3$)CF$_2$—O—CF$_2$—,  —CF$_2$—O—CF(CF$_3$)CF$_2$—O— CF(CF$_3$)—,  —CF$_2$—O—CF(CF$_3$)CF$_2$—O—C(CF$_3$)$_2$—, —(C=O)—,  —(C=O)—O—,  —(C=O)—(CH$_2$)—, —(C=O)—(CF$_2$)—,  —(C=O)—O—(CH$_2$)—, —(C=O)—O—(CF$_2$)—,  —(C=O)—[(CH$_2$)$_2$—O]$_n$— (CH$_2$)—,  —(C=O)—[(CF$_2$)$_2$—O]$_n$—(CF$_2$)—, —(C=O)—[(CH$_2$)$_2$—O]$_n$—(CH$_2$)—(CH$_2$)—, —(C=O)—[(CF$_2$)$_2$—O]$_n$—(CF$_2$)—(CF$_2$)—, —(C=O)— O[(CH$_2$)$_2$—O]$_n$—(CF$_2$)—,  —(C=O)—O[(CH$_2$)$_2$—O]$_n$— (CH$_2$)—(CH$_2$)—,  —(C=O)—O[(CF$_2$)$_2$—O]$_n$—(CF$_2$)—, —(C=O)—O[(CF$_2$)$_2$—O]$_n$—(CF$_2$)—(CF$_2$)—, —(C=O)—(CH$_2$)$_2$—O—(CH$_2$)—(CH$_2$)—,  —(C=O)— (CF$_2$)$_2$—O—(CF$_2$)—(CF$_2$)—,  —(C=O)—O—(CH$_2$)$_2$— O—(CH$_2$)—(CH$_2$)—,  —(C=O)—O—(CF$_2$)$_2$—O— (CF$_2$)—(CF$_2$)—, —(C=O)—O—(CH$_2$)$_2$—O—(CH$_2$)—C (CF$_3$)$_2$—,  —(C=O)—O—(CF$_2$)$_2$—O—(CF$_2$)—C(CF$_3$)$_2$ —, or —(C=O)—O—C$_6$H$_4$—C(CF$_3$)$_2$—, and is more preferably  —CF$_2$—O—CF(CF$_3$)—,  —CF$_2$—O—CF$_2$—CF (CF$_3$)—,  —CF$_2$—O—CF$_2$CF$_2$—CF(CF$_3$)—, —CF$_2$—O— CF(CF$_3$)—CF(CF$_3$)—,  —CF$_2$—O—CF(CF$_3$)CF$_2$—CF (CF$_3$)—,  —CF$_2$—O—CF(CF$_3$)CF$_2$—O—CF(CF$_3$)—, —(C=O)—, —(C=O)—O—(CH$_2$)—,  —(C=O)—O— (CH$_2$)—(CH$_2$)—,  —(C=O)—O[(CH$_2$)$_2$—O]$_n$—(CH$_2$)—

(CH$_2$)—,  —(C=O)—O—(CH$_2$)$_2$—O—(CH$_2$)—C(CF$_3$)$_2$ —, or —(C=O)—O—C$_6$H$_4$—C(CF$_3$)$_2$—.

In the formula, n is an integer of 1 to 10.

Specific examples of the compound represented by the general formula (4) include compounds represented by the following formulas:

$$CH_2=CHC\!\!-\!\!Y^3,\quad CH_2=CHCOCH_2CH_2\!-\!Y^3,$$
$$\underset{O}{\parallel}\qquad\qquad\qquad \underset{O}{\parallel}$$

$$CH_2=CHC\!\!-\!\!OCH_3\!-\!Y^3,\quad CH_2=C\!\!-\!\!\overset{CH_3}{\underset{\parallel}{C}}\!\!-\!\!Y^3,$$
$$\underset{O}{\parallel}\qquad\qquad\qquad\qquad \underset{O}{}$$

$$CH_2=C\!\!-\!\!\overset{CH_3}{\underset{\parallel}{C}}\!\!-\!\!OCH_2CH_2\!-\!Y^3,\quad CH_2=C\!\!-\!\!\overset{CH_3}{\underset{\parallel}{C}}\!\!-\!\!OCH_2Y^3,$$

$$CH_2=CFC\!\!-\!\!Y^3,\quad CH_2=CFC\!\!-\!\!OCH_3CH_3\!-\!Y^3,$$
$$\underset{O}{\parallel}\qquad\qquad\qquad \underset{O}{\parallel}$$

$$CH_2=CFC\!\!-\!\!OCH_2\!-\!Y^3,$$
$$\underset{O}{\parallel}$$

$$CH_2=CFCO\!\!-\!\!(CH_2CH_3O)_nCH_2CH_2\!-\!Y^3,$$
$$\underset{O}{\parallel}$$

$$CH_2=C\!\!-\!\!\overset{CF_3}{\underset{\parallel}{C}}\!\!-\!\!Y^3,\quad CH_2=C\!\!-\!\!\overset{CF_3}{\underset{\parallel}{C}}\!\!-\!\!OCH_2CH_2\!-\!Y^3,$$

$$CH_2=CC\!\!-\!\!\overset{X^i}{\underset{\parallel}{C}}\!\!-\!\!OCH_2CH_2OCH_2\overset{CF_3}{\underset{CF_3}{C}}\!\!-\!\!Y^3,\quad \text{(I)}$$

$$CH_2=CCO\!\!-\!\!\overset{X^j}{\underset{\parallel}{C}}\!\!-\!\!\bigcirc\!\!-\!\!\overset{CF_3}{\underset{CF_3}{C}}\!\!-\!\!Y^3 \quad \text{(II)}$$

wherein X$^j$ and Y$^3$ are as described above; and n is an integer of 1 to 10.

R$^a$ is preferably a divalent group represented by the following general formula (r1):

$$-(C=O)_h-(O)_i-CF_2-O-(CX^6_2)_e-\{O-CF (CF_3)\}_f-(O)_g- \quad \text{(r1)}$$

wherein X$^6$ is each independently H, F, or CF$_3$; e is an integer of 0 to 3; f is an integer of 0 to 3; g is 0 or 1; h is 0 or 1; and i is 0 or 1, and is also preferably a divalent group represented by the following general formula (r2):

$$-(C=O)_h-(O)_i-CF_2-O-(CX^7_2)_e-(O)_g- \quad \text{(r2)}$$

wherein X$^7$ is each independently H, F, or CF$_3$; e is an integer of 0 to 3; g is 0 or 1; h is 0 or 1; and i is 0 or 1.

—R$^a$—CZ$^1$Z$^2$— in the general formula (4) is also preferably a divalent group represented by the following formula (t1):

$$-(C=O)_h-(O)_i-CF_2-O-(CX^6_2)_e-\{O-CF (CF_3)\}_f-(O)_g-CZ^1Z^2- \quad \text{(t1)}$$

wherein X$^6$ is each independently H, F, or CF$_3$; e is an integer of 0 to 3; f is an integer of 0 to 3; g is 0 or 1; h is 0 or 1; i is 0 or 1; and Z$^1$ and Z$^2$ are each independently F or CF$_3$,

and is more preferably a group in which one of $Z^1$ and $Z^2$ is F and the other is $CF_3$ in the formula (t1).

Also, in the general formula (4), $—R^a—CZ^1Z^2—$ is preferably a divalent group represented by the following formula (t2):

$$—(C=O)_h—(O)_i—CF_2—O—(CX^7{}_2)_e—(O)_g—$$
$$CZ^1Z^2— \hspace{2cm} (t2)$$

wherein $X^7$ is each independently H, F, or $CF_3$; e is an integer of 0 to 3; g is 0 or 1; h is 0 or 1; i is 0 or 1; and $Z^1$ and $Z^2$ are each independently H, F, or $CF_3$, and is more preferably a group in which one of $Z^1$ and $Z^2$ is F and the other is $CF_3$ in the formula (t2).

The compound represented by the general formula (4) also preferably has a C—F bond and does not have a C—H bond, in the portion excluding the hydrophilic group ($Y^3$). In other words, in the general formula (4), $X^i$, $X^j$, $X^k$ are all F, and $R^a$ is preferably a perfluoroalkylene group having 1 or more carbon atoms; the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The compound represented by the general formula (4) may be partially fluorinated. In other words, the compound represented by the general formula (4) also preferably has at least one hydrogen atom bonded to a carbon atom and at least one fluorine atom bonded to a carbon atom, in the portion excluding the hydrophilic group ($Y^3$).

The compound represented by the general formula (4) is also preferably a compound represented by the following formula (4a):

$$CF_2=CF—O—Rf^0—Y^3 \hspace{2cm} (4a)$$

wherein $Y^3$ is a hydrophilic group; and $Rf^0$ is a perfluorinated divalent linking group which is perfluorinated and may be a linear or branched, cyclic or acyclic, saturated or unsaturated, substituted or unsubstituted, and optionally contains one or more heteroatoms selected from the group consisting of sulfur, oxygen, and nitrogen.

The compound represented by the general formula (4) is also preferably a compound represented by the following formula (4b):

$$CH_2=CH—O—Rf^0—Y^3 \hspace{2cm} (4b)$$

wherein $Y^3$ is a hydrophilic group; and $Rf^0$ is a perfluorinated divalent linking group as defined in the formula (4a).

In the general formula (4), $Y^3$ is preferably $—OSO_3M$. Examples of the polymerized units derived from the compound represented by the general formula (4) when $Y^3$ is $—OSO_3M$ include $—[CF_2CF(OCF_2CF_2CH_2OSO_3M)]—$, $—[CH_2CH((CF_2)_4CH_2OSO_3M)]—$, $—[CF_2C(O(CF_2)_4CH_2OSO_3M)]—$, $—[CF_2CF(OCF_2CF(CF_3)CH_2OSO_3M)]—$, $—[CF_2CF(OCF_2CF(CF_3)OCF_2CF_2CH_2OSO_3M)]—$, $—[CH_2CH((CF_2)_4CH_2OSO_3M)]—$, $—[CF_2CF(OCF_2CF_2SO_2N(CH_3)CH_2CH_2OSO_3M)]—$, $—[CH_2CH(CF_2CF_2CH_2OSO_3M)]—$, $—[CF_2CF(OCF_2CF_2CF_2SO_2N(CH_3)CH_2CH_2OSO_3M)]—$, and $—[CH_2CH(CF_2CF_2CH_2OSO_3M)]—$. In the formula, M is as described above.

In the general formula (4), $Y^3$ is preferably $—SO_3M$. Examples of the polymerized units derived from the compound represented by the general formula (4) when $Y^3$ is $—SO_3M$ include $—[CF_2CF(OCF_2CF_2SO_3M)]—$, $—[CF_2CF(O(CF_2)_4SO_3M)]—$, $—[CF_2CF(OCF_2CF(CF_3)SO_3M)]—$, $—[CF_2CF(OCF_2CF(CF_3)OCF_2CF_2SO_3M)]—$, $—[CH_2CH(CF_2CF_2SO_3M)]—$, $—[CF_2CF(OCF_2CF(CF_3)OCF_2CF_2CF_2SO_3M)]—$, $—[CH_2CH((CF_2)_4SO_3M)]—$, $—[CH_2CH(CF_2CF_2SO_3M)]—$, and $—[CH_2CH((CF_2)_4SO_3M)]—$. In the formula, M is as described above.

In the general formula (4), $Y^3$ is preferably $—COOM$. Examples of the polymerized units derived from the compound represented by the general formula (4) when $Y^3$ is $—COOM$ include $—[CF_2CF(OCF_2CF_2COOM)]—$, $—[CF_2CF(O(CF_2)_5COOM)]—$, $—[CF_2CF(OCF_2CF(CF_3)COOM)]—$, $—[CF_2CF(OCF_2CF(CF_3)O(CF_2)_nCOOM)]—$ (n is greater than 1), $—[CH_2CH(CF_2CF_2COOM)]—$, $—[CH_2CH((CF_2)_4COOM)]—$, $—[CH_2CH(CF_2CF_2COOM)]—$, $—[CH_2CH((CF_2)_4COOM)]—$, $—[CF_2CF(OCF_2CF_2SO_2NR'CH_2COOM)]—$, $—[CF_2CF(O(CF_2)_4SO_2NR'CH_2COOM)]—$, $—[CF_2CF(OCF_2CF(CF_3)SO_2NR'CH_2COOM)]—$, $—[CF_2CF(OCF_2CF(CF_3)OCF_2CF_2SO_2NR'CH_2COOM)]—$, $—[CH_2CH(CF_2CF_2SO_2NR'CH_2COOM)]—$, $—[CF_2CF(OCF_2CF(CF_3)OCF_2CF_2CF_2CF_2SO_2NR'CH_2COOM)]—$, $—[CH_2CH((CF_2)_4SO_2NR'CH_2COOM)]—$, $—[CH_2CH(CF_2CF_2SO_2NR'CH_2COOM)]—$, and $—[CH_2CH((CF_2)_4SO_2NR'CH_2COOM)]—$. In the formula, R' is H or a $C_{1-4}$ alkyl group, and M is as described above.

In the general formula (4), $Y^3$ is preferably $—OPO_3M$. Examples of the polymerized units derived from the compound represented by the general formula (4) when $Y^3$ is $—OPO_3M$ include $—[CF_2CF(OCF_2CF_2CH_2OP(O)(OM)_2)]—$, $—[CF_2CF(O(CF_2)_4CH_2OP(O)(OM)_2)]—$, $—[CF_2CF(OCF_2CF(CF_3)CH_2OP(O)(OM)_2)]—$, $—[CF_2CF(OCF_2CF(CF_3)OCF_2CF_2CH_2OP(O)(OM)_2)]—$, $—[CF_2CF(OCF_2CF_2SO_2N(CH_3)CH_2CH_2OP(O)(OM)_2)]—$, $—[CF_2CF(OCF_2CF_2CF_2SO_2N(CH_3)CH_2CH_2OP(O)(OM)_2)]—$, $—[CH_2CH(CF_2CF_2CH_2OP(O)(OM)_2)]—$, $—[CH_2CH((CF_2)_4CH_2OP(O)(OM)_2)]—$, $—[CH_2CH(CF_2CF_2CH_2OP(O)(OM)_2)]—$, and $—[CH_2CH((CF_2)_4CH_2OP(O)(OM)_2)]—$. In the formula, M is as described above.

In the general formula (4), $Y^3$ is preferably $—PO_3M$. Examples of the polymerized units derived from the compound represented by the general formula (4) when $Y^3$ is $—PO_3M$ include $—[CF_2CF(OCF_2CF_2P(O)(OM)_2)]—$, $—[CF_2CF(O(CF_2)_4P(O)(OM)_2)]—$, $—[CF_2CF(OCF_2CF(CF_3)P(O)(OM)_2)]—$, $—[CF_2CF(OCF_2CF(CF_3)OCF_2CF_2P(O)(OM)_2)]—$, $—[CH_2CH(CF_2CF_2P(O)(OM)_2)]—$, $—[CH_2CH((CF_2)_4P(O)(OM)_2)]—$, $—[CH_2CH(CF_2CF_2P(O)(OM)_2)]—$, and $—[CH_2CH((CF_2)_4P(O)(OM)_2)]—$, wherein M is as described above.

The compound represented by the general formula (4) is preferably at least one selected from the group consisting of:

a monomer represented by the following general formula (5):

$$CX_2=CY(—CZ_2—O—Rf—Y^3) \hspace{2cm} (5)$$

wherein X is the same or different and is —H or —F; Y is —H, —F, an alkyl group, or a fluorine-containing alkyl group; Z is the same or different and —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above;

a monomer represented by the following general formula (6):

$$CX_2=CY(—O—Rf—Y^3) \hspace{2cm} (6)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above; and a monomer represented by the following general formula (7):

$$CX_2=CY(—Rf—Y^3) \quad (7)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above.

The fluorine-containing alkylene group having 2 to 100 carbon atoms and having an ether bond is an alkylene group which does not include a structure in which an oxygen atom is an end and contains an ether bond between carbon atoms.

In the general formula (5), each X is —H or —F. X may be both —H, may be both —F, or at least one thereof may be —H. For example, one thereof may be —F and the other may be —H, or both may be —H.

In the general formula (5), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —CF$_3$, and more preferably —F.

In the general formula (5), Z is the same or different and is —H, —F, an alkyl group, or a fluoroalkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Z is preferably —H, —F, or —CF$_3$, and more preferably —F.

In the general formula (5), at least one of X, Y, and Z preferably contains a fluorine atom. For example, X, Y, and Z may be —H, —F, and —F, respectively.

In the general formula (5), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —CF$_2$—, —CH$_2$CF$_2$—, —CF$_2$CF$_2$—, —CF$_2$CH$_2$—, —CF$_2$CF$_2$CH$_2$—, —CF(CF$_3$)—, —CF(CF$_3$)CF$_2$—, and —CF(CF$_3$)CH$_2$—. The fluorine-containing alkylene group is preferably a perfluoroalkylene group.

The fluorine-containing alkylene group having an ether bond preferably has 3 or more carbon atoms. The fluorine-containing alkylene group having an ether bond also preferably has 60 or less carbon atoms, more preferably 30 or less carbon atoms, and still more preferably 12 or less carbon atoms.

For example, the fluorine-containing alkylene group having an ether bond is preferably a divalent group represented by the following formula:

$$-(CFCF_2O)_{p1}(CF_2O)_{q1}(CZ^2_2CF_2CF_2O)_{r1}CZ^3(CF_2)_{s1}(CH_2)_{t1}-$$
$$\quad | \qquad\qquad\qquad\qquad\qquad\qquad | $$
$$\quad Z^1 \qquad\qquad\qquad\qquad\qquad\qquad Z^4$$

wherein $Z^1$ is F or CF$_3$; $Z^2$ and $Z^3$ are each H or F; $Z^4$ is H, F, or CF$_3$; p1+q1+r1 is an integer of 0 to 10; s1 is 0 or 1; and t1 is an integer of 0 to 5, with the proviso that when $Z^3$ and $Z^4$ are both H, p1+q1+r1+s1 is not 0.

Specific examples of the fluorine-containing alkylene group having an ether bond include —CF(CF$_3$)CF$_2$—O—CF(CF$_3$)—, —(CF(CF$_3$)CF$_2$—O)$_n$—CF(CF$_3$)— (where n is an integer of 1 to 10), —CF(CF$_3$)CF$_2$—O—CF(CF$_3$)CH$_2$—, —(CF(CF$_3$)CF$_2$—O)$_n$—CF(CF$_3$)CH$_2$— (where n is an integer of 1 to 10), —CH$_2$CF$_2$CF$_2$O—CH$_2$CF$_2$CH$_2$—, —CF$_2$CF$_2$CF$_2$O—CF$_2$CF$_2$—, —CF$_2$CF$_2$CF$_2$O—CF$_2$CF$_2$CH$_2$—, —CF$_2$CF$_2$O—CF$_2$—, —CF$_2$CF$_2$O—CF$_2$CH$_2$—, and —CF(CF$_3$)CH$_2$—.

The fluorine-containing alkylene group having an ether bond is preferably a perfluoroalkylene group.

In the general formula (5), $Y^3$ is —COOM, —SO$_3$M, or —OSO$_3$M, wherein M is H, a metal atom, NR$^7_4$, imidazolium optionally having a substituent, pyridinium optionally having a substituent, or phosphonium optionally having a substituent, wherein R$^7$ is H or an organic group, and may be the same or different, and any two thereof may be bonded to each other to form a ring.

R$^7$ is preferably H or a C$_{1-10}$ organic group, more preferably H or a C$_{1-4}$ organic group, and still more preferably H or a C$_{1-4}$ alkyl group.

Examples of the metal atom include alkali metals (Group 1) and alkaline earth metals (Group 2), and preferred is Na, K, or Li.

M is preferably —H, a metal atom, or —NR$^7_4$, more preferably —H, an alkali metal (Group 1), an alkaline earth metal (Group 2), or —NR$^7_4$, still more preferably —H, —Na, —K, —Li, or —NH$_4$, further preferably —Na, —K, or —NH$_4$, particularly preferably —Na or —NH$_4$, and most preferably —NH$_4$.

$Y^3$ is preferably —COOM or —SO$_3$M, and more preferably —COOM.

Examples of suitable monomers represented by the general formula (5) include a fluoroallyl ether compound represented by the following formula (5a):

$$CX^h_2=CFCF_2—O—(CF(CF_3)CF_2O)_{n5}—CF(CF_3)—Y^3 \quad (5a)$$

wherein each $X^h$ is the same, and represents F or H; n5 represents 0 or an integer of 1 to 10; and $Y^3$ is as defined above.

In the general formula (5a), n5 is preferably 0 or an integer of 1 to 5, more preferably 0, 1, or 2, and still more preferably 0 or 1 from the viewpoint of obtaining PTFE particles having a small primary particle size. $Y^3$ is preferably —COOM from the viewpoint of obtaining appropriate water-solubility and surface activity, and M is preferably H or $NH_4$ from the viewpoint of being less likely to remain as impurities and improving the heat resistance of the resulting composition and the stretched body obtained from the composition.

The monomer represented by the general formula (5) is preferably a monomer (5b) represented by the following general formula (5b):

$$CH_2=CF(-CF_2-O-Rf-Y^3) \qquad (5b)$$

wherein Rf and $Y^3$ are as described above.

Specific examples of the monomer represented by the general formula (5b) include a monomer represented by the following formula:

$$CH_2=CFCF_2O-(CFCF_2O)_{p1}(CF_2O)_{q1}$$
$$\qquad\qquad\quad | $$
$$\qquad\qquad\quad Z^1$$
$$-(CZ^2_2CF_2CF_2O)_{r1}CZ^3-(CF_2)_{s1}(CH_2)_{t1}-Y^3,$$
$$\qquad\qquad\qquad\qquad | $$
$$\qquad\qquad\qquad\qquad Z^4$$

wherein $Z^1$ is F or $CF_3$; $Z^2$ and $Z^3$ are each H or F; $Z^4$ is H, F, or $CF_3$; p1+q1+r1 is an integer of 0 to 10; s1 is 0 or 1; t1 is an integer of 0 to 5; and $Y^3$ is as described above, with the proviso that when $Z^3$ and $Z^4$ are both H, p1+q1+r1+s1 is not 0. More specifically, preferred examples thereof include:

$$CH_2=CFCF_2OCF-Y^3, \quad CH_2=CFCF_2OCFCF_2OCF-Y^3,$$
$$\qquad\qquad | \qquad\qquad\qquad\qquad\qquad | \qquad\quad | $$
$$\qquad\qquad CF_3 \qquad\qquad\qquad\qquad\qquad CF_3 \quad CF_3$$

$$CH_2=CFCF_2O-(CFCF_2O)_2-CF-Y^3,$$
$$\qquad\qquad\qquad | \qquad\quad | $$
$$\qquad\qquad\qquad CF_3 \qquad CF_3$$

$$CH_2=CFCF_2OCFCH_2-Y^3,$$
$$\qquad\qquad\qquad | $$
$$\qquad\qquad\qquad CF_3$$

$$CH_2=CFCF_2OCFCF_2OCFCH_2-Y^3,$$
$$\qquad\qquad\qquad | \qquad\quad | $$
$$\qquad\qquad\qquad CF_3 \qquad CF_3$$

$$CH_2=CFCF_2O-(CFCF_2O)_2-CFCH_2-Y^3,$$
$$\qquad\qquad\qquad | \qquad\quad | $$
$$\qquad\qquad\qquad CF_3 \qquad CF_3$$

$$CH_2=CFCF_2OCH_2CF_2-Y^3,$$

$$CH_2=CFCF_2O(CH_2CF_2CF_2O)CH_2CF_2-Y^3,$$

$$CH_2=CFCF_2OCH_2CF_2CH_2-Y^3,$$

$$CH_2=CFCF_2O(CH_2CF_2CF_2O)CH_2CF_2CH_2-Y^3,$$

$$CH_2=CFCF_2OCF_2CF_2-Y^3,$$

$$CH_2=CFCF_2O(CF_2CF_2CF_2O)CF_2CF_2-Y^3,$$

$$CH_2=CFCF_2OCF_2CF_2CH_2-Y^3,$$

$$CH_2=CFCF_2O(CF_2CF_2CF_2O)CF_2CF_2CH_2-Y^3,$$

$$CH_2=CFCF_2OCF_2-Y^3,$$

$$CH_2=CFCF_2O(CF_2CF_2O)CF_2-Y^3,$$

$$CH_2=CFCF_2OCF_2CH_2-Y^3,$$

$$CH_2=CFCF_2O(CF_2CF_2O)CF_2CH_2-Y^3.$$

Of these, preferred are:

$$CH_2=CFCF_2OCF-Y^3, \quad CH_2=CFCF_2OCFCF_2OCF-Y^3,$$
$$\qquad\qquad | \qquad\qquad\qquad\qquad\qquad | \qquad\quad | $$
$$\qquad\qquad CF_3 \qquad\qquad\qquad\qquad\qquad CF_3 \quad CF_3$$

$$CH_2=CFCF_2O-(CFCF_2O)_2-CF-Y^3,$$
$$\qquad\qquad\qquad | \qquad\quad | $$
$$\qquad\qquad\qquad CF_3 \qquad CF_3$$

$$CH_2=CFCF_2OCFCH_2-Y^3,$$
$$\qquad\qquad\qquad | $$
$$\qquad\qquad\qquad CF_3$$

$$CH_2=CFCF_2OCFCF_2OCFCH_2-Y^3,$$
$$\qquad\qquad\qquad | \qquad\quad | $$
$$\qquad\qquad\qquad CF_3 \qquad CF_3$$

$$CH_2=CFCF_2O-(CFCF_2O)_2-CFCH_2-Y^3,$$
$$\qquad\qquad\qquad | \qquad\quad | $$
$$\qquad\qquad\qquad CF_3 \qquad CF_3$$

In the monomer represented by the general formula (5b), $Y^3$ in the formula (5b) is preferably —COOM. Specifically, the monomer represented by the general formula (5b) is preferably at least one selected from the group consisting of $CH_2=CFCF_2OCF(CF_3)COOM$ and $CH_2=CFCF_2OCF(CF_3)CF_2OCF(CF_3)COOM$ (wherein M is as defined above), and more preferably $CH_2=CFCF_2OCF(CF_3)COOM$.

The monomer represented by the general formula (5) is preferably a monomer (5c) represented by the following general formula (5c):

$$CX^2_2=CFCF_2-O-(CF(CF_3)CF_2O)_{n5}$$
$$\qquad -CF(CF_3)-Y^3 \qquad (5c)$$

wherein each $X^2$ is the same, and each represent F or H; n5 represents 0 or an integer of 1 to 10; and $Y^3$ is as defined above.

In the formula (5c), n5 is preferably 0 or an integer of 1 to 5, more preferably 0, 1, or 2, and still more preferably 0 or 1 from the viewpoint of stability of the resulting aqueous dispersion. $Y^3$ is preferably —COOM$^1$ from the viewpoint of obtaining appropriate water-solubility and stability of the aqueous dispersion, and M$^1$ is preferably H or $NH_4$ from the viewpoint of being less likely to remain as impurities and improving the heat resistance of the resulting molded body.

Examples of the perfluorovinylalkyl compound represented by the formula (5c) include $CH_2=CFCF_2OCF(CF_3)$ $COOM^1$ and $CH_2=CFCF_2OCF(CF_3)CF_2OCF(CF_3)COOM^1$, wherein M$^1$ is as defined above.

Examples of the monomer represented by the general formula (5) further include a monomer represented by the following general formula (5d):

$$CF_2=CFCF_2-O-Rf-Y^3 \qquad (5d)$$

wherein Rf and $Y^3$ are as described above.

More specific examples thereof include:

$$CF_2=CFCF_2OCF_2CF_2CF_2-Y^3, \quad CF_2=CFCF_2OCF_2CF-Y^3,$$
$$\qquad\qquad\qquad\qquad\qquad\qquad\qquad\qquad\qquad\qquad\qquad\quad | $$
$$\qquad\qquad\qquad\qquad\qquad\qquad\qquad\qquad\qquad\qquad\quad CF_3$$

$$CF_2=CFCF_2OCF_2CF_2CF_2CH_2-Y^3,$$

$$CF_2=CFCF_2OCF_2CFCH_2-Y^3,$$
$$\qquad\qquad\qquad\qquad\quad | $$
$$\qquad\qquad\qquad\qquad\quad CF_3$$

In the general formula (6), each X is —H or —F. X may be both —F, or at least one thereof may be —H. For example, one thereof may be —F and the other may be —H, or both may be —H.

In the general formula (6), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —CF$_3$, and more preferably —F.

In the general formula (6), at least one of X and Y preferably contains a fluorine atom. For example, X, Y, and Z may be —H, —F, and —F, respectively.

In the general formula (6), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —CF$_2$—, —CH$_2$CF$_2$—, —CF$_2$CF$_2$—, —CF$_2$CH$_2$—, —CF$_2$CF$_2$CH$_2$—, —CF (CF$_3$)—, —CF(CF$_3$)CF$_2$—, and —CF(CF$_3$)CH$_2$—. The fluorine-containing alkylene group is preferably a perfluoroalkylene group.

The monomer represented by the general formula (6) is preferably at least one selected from the group consisting of monomers represented by the following general formulas (6a), (6b), (6c), and (6d):

$$CF_2\!=\!CF\!-\!O\!-\!(CF_2)_{n1}\!-\!Y^3 \qquad (6a)$$

wherein n1 represents an integer of 1 to 10; Y$^3$ represents —SO$_3$M$^1$ or —COOM$^1$; M$^1$ represents H, a metal atom, NR$^7$$_4$, imidazolium optionally having a substituent, pyridinium optionally having a substituent, or phosphonium optionally having a substituent; and R$^7$ represents H or an organic group;

$$CF_2\!=\!CF\!-\!O\!-\!(CF_2C(CF_3)F)_{n2}\!-\!Y^3 \qquad (6b)$$

wherein n2 represents an integer of 1 to 5, and Y$^3$ is as defined above;

$$CF_2\!=\!CF\!-\!O\!-\!(CFX^1)_{n3}\!-\!Y^3 \qquad (6c)$$

wherein X$^1$ represents F or CF$_3$; n3 represents an integer of 1 to 10; and Y$^3$ is as defined above; and $$CF_2\!=\!CF\!-\!O\!-\!(CF_2CFX^1O)_{n4}\!-\!CF_2CF_2\!-\!Y^3 \qquad (6d)$$

wherein n4 represents an integer of 1 to 10; and Y$^3$ and X$^1$ are as defined above.

In the formula (6a), n1 is preferably an integer of 5 or less, and more preferably an integer of 2 or less. Y$^3$ is preferably —COOM$^1$ from the viewpoint of obtaining appropriate water-solubility and stability of the aqueous dispersion, and M$^1$ is preferably H or NH$_4$ from the viewpoint of being less likely to remain as impurities and improving the heat resistance of the resulting molded body.

Examples of the perfluorovinylalkyl compound represented by the formula (6a) include CF$_2$=CF—O—CF$_2$COOM$^1$, wherein M$^1$ is as defined above.

In the formula (6b), n2 is preferably an integer of 3 or less from the viewpoint of stability of the resulting aqueous dispersion, Y$^3$ is preferably —COOM$^1$ from the viewpoint of obtaining appropriate water-solubility and stability of the aqueous dispersion, and M$^1$ is preferably H or NH$_4$ from the viewpoint of being less likely to remain as impurities and improving the heat resistance of the resulting molded body.

In the formula (6c), n3 is preferably an integer of 5 or less from the viewpoint of water-solubility, Y$^3$ is preferably —COOM$^1$ from the viewpoint of obtaining appropriate water-solubility and stability of the aqueous dispersion, and M$^1$ is preferably H or NH$_4$ from the viewpoint of improving dispersion stability.

In the formula (6d), X$^1$ is preferably —CF$_3$ from the viewpoint of stability of the aqueous dispersion, n4 is preferably an integer of 5 or less from the viewpoint of water-solubility, Y$^3$ is preferably —COOM$^1$ from the viewpoint of obtaining appropriate water-solubility and stability of the aqueous dispersion, and M$^1$ is preferably H or NH$_4$.

Examples of the perfluorovinyl ether compound represented by the formula (6d) include CF$_2$=CFOCF$_2$CF(CF$_3$) OCF$_2$CF$_2$COOM$^1$, wherein M$^1$ represents H, NH$_4$, or an alkali metal.

In the general formula (7), Rf is preferably a fluorine-containing alkylene group having 1 to 40 carbon atoms. In the general formula (7), at least one of X and Y preferably contains a fluorine atom.

The monomer represented by the general formula (7) is preferably at least one selected from the group consisting of:
a monomer represented by the following general formula (7a):

$$CF_2\!=\!CF\!-\!(CF_2)_{n1}\!-\!Y^3 \qquad (7a)$$

wherein n1 represents an integer of 1 to 10; and Y$^3$ is as defined above; and
a monomer represented by the following general formula (7b):

$$CF_2\!=\!CF\!-\!(CF_2C(CF_3)F)_{n2}\!-\!Y^3 \qquad (7b)$$

wherein n2 represents an integer of 1 to 5; and Y$^3$ is as defined above.

Y$^3$ is preferably —SO$_3$M$^1$ or —COOM$^1$, and M$^1$ is preferably H, a metal atom, NR$^7$$_4$, imidazolium optionally having a substituent, pyridinium optionally having a substituent, or phosphonium optionally having a substituent. R$^7$ represents H or an organic group.

In the formula (7a), n1 is preferably an integer of 5 or less, and more preferably an integer of 2 or less. Y$^3$ is preferably —COOM$^1$ from the viewpoint of obtaining appropriate water-solubility and stability of the aqueous dispersion, and M$^1$ is preferably H or NH$_4$ from the viewpoint of being less likely to remain as impurities and improving the heat resistance of the resulting molded body.

Examples of the perfluorovinylalkyl compound represented by the formula (7a) include CF$_2$=CFCF$_2$COOM$^1$, wherein M$^1$ is as defined above.

In the formula (7b), n2 is preferably an integer of 3 or less from the viewpoint of stability of the resulting aqueous dispersion, Y$^3$ is preferably —COOM$^1$ from the viewpoint of obtaining appropriate water-solubility and stability of the aqueous dispersion, and M$^1$ is preferably H or NH$_4$ from the viewpoint of being less likely to remain as impurities and improving the heat resistance of the resulting molded body.

The content of the modifying monomer (A) is preferably in the range of 0.00001 to 1.0% by mass. The lower limit thereof is more preferably 0.0001% by mass, still more preferably 0.001% by mass, further preferably 0.005% by mass, and particularly preferably 0.009% by mass. The upper limit thereof is preferably 0.90% by mass, more preferably 0.50% by mass, still more preferably 0.40% by mass, further preferably 0.30% by mass, still further preferably 0.10% by mass, and particularly preferably 0.05% by mass.

In the TFE polymer (PTFE), the standard specific gravity (SSG) and the melt viscosity (MV) used as indices of the molecular weight are not limited.

In production of the TFE polymer, the carboxylic acid type hydrocarbon-containing surfactant can be used within the use range described for the production method of the present invention.

The surfactant may be added in any concentration within the range, and is usually added at a critical micelle concentration (CMC) or lower at the initiation of polymerization. Too large an amount of the surfactant added may cause generation of needle-shaped particles having a large aspect ratio and gelling of the aqueous dispersion, impairing the stability.

The lower limit of the amount of the carboxylic acid type hydrocarbon-containing surfactant used is preferably 0.0001% by mass, more preferably 0.001% by mass, still more preferably 0.01% by mass, and particularly preferably 0.1% by mass, based on the aqueous medium. The upper limit of the amount of the surfactant used is preferably 10% by mass, more preferably 5% by mass, still more preferably 3% by mass, and particularly preferably 2% by mass, based on the aqueous medium.

The carboxylic acid type hydrocarbon-containing surfactant may be added to the reaction vessel at once before initiation of the polymerization, may be added at once after initiation of the polymerization, may be added in multiple portions during the polymerization, or may be added continuously during the polymerization.

In production of the TFE polymer, the radical polymerization initiator used may be a persulfate, an organic peroxide, or a mixture thereof. Examples of the persulfate include ammonium persulfate and potassium persulfate. Examples of the organic peroxide include disuccinic acid peroxide and diglutaric acid peroxide.

The redox polymerization initiator is preferably a redox initiator obtained by combining an oxidizing agent and a reducing agent. Examples of the oxidizing agent include persulfates, organic peroxides, potassium permanganate, manganese triacetate, and ammonium cerium nitrate. Examples of the reducing agent include bromates, diimines, and oxalic acid. Examples of the persulfates include ammonium persulfate and potassium persulfate. In order to increase the decomposition rate of the initiator, the combination of the redox initiator may preferably contain a copper salt or an iron salt. An example of the copper salt is copper(II) sulfate and an example of the iron salt is iron(II) sulfate.

Examples of the redox initiator include potassium permanganate/oxalic acid, manganese triacetate/oxalic acid, and cerium ammonium nitrate/oxalic acid, and potassium permanganate/oxalic acid is preferred. In the case of using a redox initiator, either an oxidizing agent or a reducing agent may be charged into a polymerization tank in advance, followed by adding the other continuously or intermittently thereto to initiate the polymerization. For example, in the case of potassium permanganate/oxalic acid, preferably, oxalic acid is charged into a polymerization tank and potassium permanganate is continuously added thereto.

In production of the TFE polymer, a known chain transfer agent may be used. Examples thereof include saturated hydrocarbons such as methane, ethane, propane, and butane, halogenated hydrocarbons such as chloromethane, dichloromethane, and difluoroethane, alcohols such as methanol and ethanol, and hydrogen. The chain transfer agent is preferably one in a gas state at a normal temperature and normal pressure.

The amount of the chain transfer agent used is usually 1 to 10,000 ppm, preferably 1 to 5,000 ppm, based on the total amount of TFE fed. The amount used may be 1 to 1,000 ppm, or 1 to 500 ppm.

In production of the TFE polymer, a saturated hydrocarbon that is substantially inert to the reaction, that is in a liquid state under the reaction conditions, and that has 12 or more carbon atoms may be used as a dispersion stabilizer for the reaction system in an amount of 2 to 10 parts by mass based on 100 parts by mass of the aqueous medium. Ammonium carbonate, ammonium phosphate, or the like may be added as a buffer to adjust the pH during the reaction.

At completion of the polymerization for the TFE polymer, an aqueous dispersion having a solid concentration of 1.0 to 70% by mass and an average primary particle size of 50 to 500 nm can be obtained. The aqueous dispersion contains the surfactant and the fluoropolymer. Also, the use of the surfactant allows for obtaining an aqueous dispersion having particles of the TFE polymer having a fine particle size as small as 0.5 μm or smaller.

Fine powder can be produced by coagulating the aqueous dispersion. The aqueous dispersion of the TFE polymer can be formed into fine powder through coagulation, washing, and drying. The resulting fine powder may be used for various applications. Coagulation of the aqueous dispersion of the TFE polymer is usually performed by diluting the aqueous dispersion obtained by polymerization of polymer latex, for example, with water to a polymer concentration of 10 to 20% by mass, optionally adjusting the pH to a neutral or alkaline, and stirring the polymer more vigorously than during the reaction in a vessel equipped with a stirrer. The coagulation may be performed under stirring while adding a water-soluble organic compound such as methanol or acetone, an inorganic salt such as potassium nitrate or ammonium carbonate, or an inorganic acid such as hydrochloric acid, sulfuric acid, or nitric acid as a coagulating agent. The coagulation may be continuously performed using a device such as an inline mixer.

From the viewpoint of productivity, the concentration of the non-agglomerated TFE polymer in the discharge water generated by the agglomeration is preferably low, more preferably less than 0.4% by mass, and particularly preferably less than 0.3% by mass.

Pigment-containing or filler-containing TFE polymer fine powder in which pigments and fillers are uniformly mixed can be obtained by adding pigments for coloring and various fillers for improving mechanical properties before or during the coagulation.

The wet powder obtained by coagulating the TFE polymer in the aqueous dispersion is usually dried by means of vacuum, high-frequency waves, hot air, or the like while keeping the wet powder in a state in which the wet powder is less fluidized, preferably in a stationary state. Friction between the powder particles especially at high temperature usually has unfavorable effects on the TFE polymer in the form of fine powder. This is because the particles made of such a TFE polymer are easily formed into fibrils even with a small shearing force and lose its original, stable particulate structure.

The resulting fine powder of the TFE polymer is preferred for molding, and suitable applications thereof include tubes for hydraulic systems or fuel systems of aircraft or automobiles, flexible hoses for chemicals or vapors, and electric wire coating.

The aqueous dispersion of the TFE polymer obtained by the polymerization is preferably mixed with a nonionic surfactant to stabilize and further concentrate the aqueous dispersion, and then further mixed with, depending on its purpose, an organic or inorganic filler to form a composition and used in a variety of applications. The composition, when applied to a metal or ceramic base material, can provide a coating surface having non-stickiness, a low coefficient of friction, and excellent gloss, smoothness, abrasion resistance, weather resistance, and heat resistance, which is suitable for coating of rolls and cooking utensils and impregnation of glass cloth.

The aqueous dispersion may also be used to prepare an organosol of the TFE polymer. The organosol may contain the TFE polymer and an organic solvent, and examples of the organic solvent include ether-based solvents, ketone-based solvents, alcohol-based solvents, amide-based solvents, ester-based solvents, aliphatic hydrocarbon-based solvents, aromatic hydrocarbon-based solvents, and halogenated hydrocarbon-based solvents. Preferably used are N-methyl-2-pyrrolidone and dimethylacetamide. The organosol may be prepared by the method disclosed in International Publication No. WO2012/002038, for example.

The aqueous dispersion of the TFE polymer or the fine powder of the TFE polymer is also preferably used as a processing aid. When used as a processing aid, the aqueous dispersion or the fine powder is mixed with a host polymer, for example, to improve the melt strength of the host polymer in melt fabrication and to improve the mechanical strength, electric properties, incombustibility, anti-drop performance during combustion, and slidability of the resulting polymer.

The aqueous dispersion of the TFE polymer or the fine powder of the TFE polymer is also preferably used as a binder for batteries or used for dustproof applications.

The aqueous dispersion of the TFE polymer or the fine powder of the TFE polymer is also preferably combined with a resin other than the TFE polymer to form a processing aid before use. The aqueous dispersion or the fine powder is suitable as a material of the PTFEs disclosed in, for example, Japanese Patent Laid-Open No. 11-49912, U.S. Pat. No. 5,804,654, Japanese Patent Laid-Open No. 11-29679, and Japanese Patent Laid-Open No. 2003-2980. Processing aids containing the aqueous dispersion or the fine powder are not inferior in any way to the processing aids disclosed in the publications.

The aqueous dispersion of the TFE polymer is also preferably mixed with an aqueous dispersion of a melt-fabricable fluororesin so that the components coagulate to form co-coagulated powder. The co-coagulated powder is suitable as a processing aid.

Examples of the melt-fabricable fluororesin include FEP, PFA, ETFE, and ethylene/TFE/HFP copolymers (EFEPs), of which FEP is preferred.

The aqueous dispersion also preferably contains a melt-fabricable fluororesin. Examples of the melt-fabricable fluororesin include FEP, PFA, ETFE, and EFEP. The aqueous dispersion containing the melt-fabricable fluororesin may be used as a coating material. The melt-fabricable fluororesin enables sufficient fusion of the TFE polymer particles, improving the film-formability and providing the resulting film with gloss.

The fluorine-free resin to which the co-coagulated powder is added may be in the form of powder, pellets, or emulsion. In order to achieve sufficient mixing of the resins, the addition is preferably performed by a known method such as extrusion kneading or roll kneading under a shearing force.

The aqueous dispersion of the TFE polymer is also preferably used as a dust suppression treatment agent. The dust suppression treatment agent may be used in a method for suppressing dust from a dust-generating substance by mixing the dust suppression treatment agent with the dust-generating substance and subjecting the mixture to a compression-shear action at a temperature of 20 to 200° C. to fibrillate the TFE polymer, for example, methods disclosed in Japanese Patent No. 2,827,152 and Japanese Patent No. 2,538,783.

The aqueous dispersion of the TFE polymer can suitably be used for the dust suppression treatment agent composition disclosed in International Publication No. WO2007/004250, and can also suitably be used for the method of dust suppression treatment disclosed in International Publication No. WO2007/000812.

The dust suppression treatment agent is suitably used in the fields of building-products, soil stabilizers, solidifying materials, fertilizers, landfill of incineration ash and harmful substance, explosion proof equipment, cosmetics, sands for pet excretion represented by cat sand, and the like.

The aqueous dispersion of the TFE polymer is also preferably used as a material for producing TFE polymer fibers by a dispersion spinning method. The dispersion spinning method is a method in which the aqueous dispersion of the TFE polymer and an aqueous dispersion of a matrix polymer are mixed and the mixture is extruded to form an intermediate fiber structure, and then the intermediate fiber structure is fired to decompose the matrix polymer and sinter the TFE polymer particles, thereby providing TFE polymer fibers.

The surfactant described above may be used to produce a high-molecular-weight PTFE. In other words, even without using a conventional fluorine-containing surfactant, the production method of the present invention using the surfactant can surprisingly produce PTFE having a molecular weight equivalent to that of PTFE obtained by a production method using such a conventional fluorine-containing surfactant.

When producing a high-molecular-weight PTFE, the polymerization temperature is preferably 30° C. or higher, more preferably 40° C. or higher, and still more preferably 50° C. or higher. Further, the polymerization temperature is preferably 100° C. or lower, and more preferably 95° C. or lower. The polymerization pressure is preferably 0.5 MPa or higher, preferably 0.7 MPa or higher, preferably 1.0 MPa or higher, and preferably 5.0 MPa or lower, more preferably 4.0 MPa or lower, and still more preferably 3.0 MPa or lower.

The high-molecular-weight PTFE powder obtained by polymerization has stretchability and non melt processability, and is also useful as a material for a stretched body (porous body). When the stretched body is in the form of a film (PTFE stretched film or PTFE porous film), the stretched body can be formed by stretching by a known PTFE stretching method. Stretching allows easy formation of fibrils of PTFE, resulting in a high-molecular-weight PTFE porous body (film) including nodes and fibers.

Preferably, roll-stretching a sheet-shaped or rod-shaped paste extrudate in an extruding direction can provide a uniaxially stretched film.

Further stretching in a transverse direction using a tenter, for example, can provide a biaxially stretched film.

Prebaking treatment is also preferably performed before stretching.

This PTFE stretched body is a porous body having a high porosity, and can suitably be used as a filter material for a variety of microfiltration filters such as air filters and chemical filters and a support member for polymer electrolyte films.

The PTFE stretched body is also useful as a material of products used in the fields of textiles, of medical treatment, of electrochemistry, of sealants, of air filters, of ventilation/internal pressure adjustment, of liquid filters, and of consumer goods.

The following provides examples of specific applications.

Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

Sealant Field

Examples of the applications in this field include gaskets, packings, pump diaphragms, pump tubes, and sealants for aircraft.

Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

Ventilation/Internal Pressure Adjustment Field

Examples of the applications in this field include materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.

Liquid Filter Field

Examples of the applications in this field include liquid filters for semiconductors (for production of semiconductors), hydrophilic PTFE filters (for production of semiconductors), filters for chemicals (for chemical treatment), filters for pure water production lines (for production of pure water), and back-washing liquid filters (for treatment of industrial discharge water).

Consumer Goods Field

Examples of the applications in this field include clothes, cable guides (movable wires for motorcycles), clothes for motor cyclists, cast liners (medical supporters), filters for cleaners, bagpipes (musical instrument), cables (signal cables for guitars, etc.), and strings (for string instrument).

Textile Field

Examples of the applications in this field include PTFE fibers (fiber materials), machine threads (textiles), weaving yarns (textiles), and ropes.

Medical Treatment Field

Examples of the applications in this field include implants (stretched articles), artificial blood vessels, catheters, general surgical operations (tissue reinforcing materials), products for head and neck (dura mater alternatives), oral health (tissue regenerative medicine), and orthopedics (bandages).

The surfactant described above may also be used to produce a low-molecular-weight PTFE.

The low-molecular-weight PTFE may be produced by polymerization, or may be produced by reducing the molecular weight of a high-molecular-weight PTFE obtained by polymerization by a known method (e.g., thermolysis, radiolysis).

When producing a low-molecular-weight PTFE, the polymerization temperature is preferably 30° C. or higher, more preferably 40° C. or higher, and still more preferably 50° C. or higher. Further, the polymerization temperature is preferably 100° C. or lower, more preferably 90° C. or lower, and still more preferably 80° C. or lower. The polymerization pressure is preferably 0.3 MPa or higher, preferably 0.4 MPa or higher, preferably 0.5 MPa or higher, and preferably 5.0 MPa or lower, more preferably 4.0 MPa or lower, and still more preferably 3.0 MPa or lower.

A low-molecular-weight PTFE having a molecular weight of 600,000 or less (also referred to as PTFE micropowder) has excellent chemical stability and a very low surface energy, and is less likely to generate fibrils, and is therefore suitably used as an additive for improving the lubricity and the texture of the coating surface in production of plastics, inks, cosmetics, coating materials, greases, parts of office automation equipment, and toners (e.g., see Japanese Patent Laid-Open No. 10-147617).

A low-molecular-weight PTFE may be obtained by dispersing a polymerization initiator and the surfactant in an aqueous medium in the presence of a chain transfer agent, and then polymerizing TFE alone or TFE and a monomer copolymerizable with TFE.

In the case of using the low-molecular-weight PTFE obtained by the polymerization in the form of powder, the powder particles may be obtained by coagulating the aqueous dispersion.

The high-molecular-weight PTFE as used herein means a non melt-processible and fibrillatable PTFE. The low-molecular-weight PTFE as used herein means a melt-fabricable and non-fibrillatable PTFE.

The term "non melt-processible" means a feature of polymer that the melt flow rate thereof cannot be measured at a temperature higher than the crystal melting point in conformity with ASTM D-1238.

The presence or absence of the fibrillation ability can be determined by "paste extrusion", a representative method of molding a "high-molecular-weight PTFE powder" which is a powder of a TFE polymer. Usually, the high-molecular-weight PTFE can be paste-extruded when it is fibrillatable. When a continuous extrudate (extruded strand) cannot be obtained by paste extrusion or a non-fired molded product obtained by paste extrusion shows substantially no strength or elongation (for example, when it shows an elongation of 0% and is broken when stretched), it can be regarded as non-fibrillatable.

The high-molecular-weight PTFE preferably has a standard specific gravity (SSG) of 2.130 to 2.280. The standard specific gravity is determined by the water replacement method in conformity with ASTM D-792 using a sample molded in conformity with ASTM D4895-89. The "high-molecular-weight" as used herein means that the standard specific gravity is within the above range.

The low-molecular-weight PTFE has a melt viscosity at 380° C. of $1 \times 10^2$ to $7 \times 10^3$ Pa·s. The "low-molecular-weight" as used herein means that the melt viscosity is within the above range.

The high-molecular-weight PTFE has a melt viscosity significantly higher than that of the low-molecular-weight PTFE, and the melt viscosity thereof is difficult to measure accurately. The melt viscosity of the low-molecular-weight PTFE is measurable, but the low-molecular-weight PTFE has difficulty in providing a molded article to be used in measurement of the standard specific gravity. Thus, it is difficult to measure its accurate standard specific gravity. Accordingly, in the present invention, the standard specific gravity is used as an index of the molecular weight of the high-molecular-weight PTFE, while the melt viscosity is used as an index of the molecular weight of the low-molecular-weight PTFE. It should be noted that there is no known measuring method for directly specifying the molecular weight of either the high-molecular-weight PTFE or the low-molecular-weight PTFE.

The high-molecular-weight PTFE preferably has a peak temperature of 333 to 347° C., more preferably 335 to 345° C. The low-molecular-weight PTFE preferably has a peak temperature of 322 to 333° C., more preferably 324 to 332° C. The peak temperature is the temperature corresponding to the maximum value on a heat-of-fusion curve with a temperature-increasing rate of 10° C./min using a differential scanning calorimeter (DSC) for a PTFE which has never been heated up to 300° C. or higher.

Preferably, the high-molecular-weight PTFE has at least one endothermic peak in a range of 333 to 347° C. on a heat-of-fusion curve with a temperature-increasing rate of 10° C./min using a differential scanning calorimeter (DSC) for a PTFE which has never been heated up to 300° C. or higher, and has an enthalpy of fusion of 62 mJ/mg or higher at 290 to 350° C. calculated from the heat-of-fusion curve.

The PTFE fine powder obtained by using the surfactant described above may also be used to produce unfired tape (green tape).

The surfactant, decomposition products and by-products of the surfactant by-produced from the surfactant, residual monomers, and the like may be collected from discharge water generated in the coagulation or the washing and/or from off gas generated in the drying, and then purified to reuse the surfactant, the decomposition products and by-products of the surfactant by-produced by the surfactant, and the residual monomers. The collection and the purification may be performed by known methods, although not limited thereto. For example, they may be performed by the methods disclosed in National Publication of International Patent Application No. 2011-520020.

(II) Melt-Fabricable Fluororesins (1) In the production method of the present invention, the polymerization for FEP is preferably performed at a polymerization temperature of 10 to 150° C. and a polymerization pressure of 0.2 to 8.0 Mpa. When producing FEP, the polymerization temperature is more preferably 30° C. or higher, still more preferably 40° C. or higher, and further preferably 50° C. or higher. Further, the polymerization temperature is more preferably 130° C. or lower, still more preferably 120° C. or lower, particularly preferably 110° C. or lower, and further preferably 100° C. or lower. The polymerization pressure is preferably 0.5 MPa or higher, preferably 1.0 MPa or higher, preferably 1.2 MPa or higher, and more preferably 6.0 MPa or lower, still more preferably 5.0 MPa or lower.

FEP preferably has a monomer composition ratio (% by mass) of TFE:HFP=(60 to 95):(5 to 40), more preferably (85 to 92):(8 to 15). The FEP may be modified with a perfluoro (alkyl vinyl ether) as a third component within a range of 0.1 to 2% by mass of all monomers.

In the polymerization for FEP, the surfactant may be used within the use range of the production method of the present invention, and is usually added in an amount of 0.0001 to 10% by mass based on 100% by mass of the aqueous medium.

In the polymerization for FEP, the chain transfer agent used is preferably cyclohexane, methanol, ethanol, propanol, ethane, propane, butane, pentane, hexane, carbon tetrachloride, chloroform, methylene chloride, methyl chloride, or the like, and the pH buffer used is preferably ammonium carbonate, disodium hydrogen phosphate, or the like.

The aqueous dispersion of FEP obtained by the production method of the present invention may optionally be subjected to post-treatment such as concentration, and then the concentrate may be dried and powdered, and the powder may be melt-extruded into pellets. The aqueous medium in the FEP aqueous dispersion may optionally contain an additive such as a nonionic surfactant and may contain a water-soluble organic solvent such as a water-soluble alcohol or may be free from a water-soluble organic solvent.

The melt extrusion may be performed under any appropriately set extrusion conditions usually capable of providing pellets.

In the production method of the present invention, although the resulting FEP may contain an end group such as —CF$_3$ or —CF$_2$H on at least one of the polymer main chain and a polymer side chain, it is preferred that the content of thermally unstable groups such as —COOH, —CH$_2$OH, —COF, —CF=CF—, —CONH$_2$, or —COOCH$_3$ (hereinafter, referred to as an "unstable end group") is low or absent.

The unstable end group is chemically unstable, and thus not only reduces the heat resistance of the resin but also causes increase in the attenuation of the resulting electric wire.

The production method of the present invention is preferably performed in such a way that a polymer in which the total number of unstable end groups and —CF$_2$H end groups at the completion of the polymerization is 50 or less per 1×10$^6$ carbon atoms is produced. The number of such groups is more preferably less than 20, still more preferably 5 or less, per 1×10$^6$ carbon atoms. There may also be neither unstable end groups nor —CF$_2$H end groups, i.e. all end groups may be —CF$_3$ end groups.

The unstable end groups and the —CF$_2$H end groups may be fluorinated and converted into the —CF$_3$ end groups and thereby stabilized. Examples of the fluorination method include, but not limited to, methods of exposing the polymer to a fluorine radical source that generates fluorine radicals under fluorination conditions. Examples of the fluorine radical source include fluorine gas, CoF$_3$, AgF$_2$, UF$_6$, OF$_2$, N$_2$F$_2$, CF$_3$OF, and halogen fluorides such as IFs and ClF$_3$. Of these, preferred is a method of bringing a fluorination gas and the FEP obtained by the present invention into direct contact with each other. In order to control the reaction, the contact is preferably performed using a diluted fluorine gas having a fluorine gas concentration of 10 to 50% by mass. The diluted fluorine gas is obtainable by diluting fluorine gas with an inert gas such as nitrogen gas or argon gas. The fluorine gas treatment may be performed at a temperature of 100 to 250° C. The treatment temperature is not limited to this range and may be appropriately set in accordance with the situation. The fluorine gas treatment is preferably performed by feeding a diluted fluorine gas into the reactor continuously or intermittently. This fluorination may be performed on dry powder after the polymerization or on melt-extruded pellets.

The FEP obtained by the production method of the present invention has good moldability and is less likely to cause molding defects, as well as has properties such as heat resistance, chemical resistance, solvent resistance, insulation, and electric properties.

The FEP powder may be produced by a method of drying the FEP obtained by the above-described production method of the present invention to powder the FEP.

The powder may be fluorinated. The fluorinated powder may be produced by a method of feeding a fluorine gas to the powder obtained by the above-described method for producing a powder to fluorinate the powder to obtain a fluorinated powder.

The FEP pellets may be produced by a method of pelletizing the FEP obtained by the above-described production method of the present invention.

The pellets may be fluorinated. The fluorinated pellets may be produced by a method of feeding a fluorine gas to the pellets obtained by the above-described method for producing pellets to fluorinate the pellets to obtain fluorinated pellets.

Thus, this FEP may be used in production of a variety of molded articles such as coating materials for electric wires, foamed electric wires, cables, and wires, tubes, films, sheets, and filaments.

(2) In the production method of the present invention, the polymerization for a TFE/perfluoro(alkyl vinyl ether) copolymer such as PFA or MFA is usually preferably performed at a polymerization temperature of 10 to 130° C. and a polymerization pressure of 0.3 to 6.0 Mpa. When producing a TFE/perfluoro(alkyl vinyl ether) copolymer, the polymerization temperature is more preferably 30° C. or higher, still more preferably 40° C. or higher, and further preferably 50° C. or higher. Further, the polymerization temperature is more preferably 120° C. or lower, still more preferably 110° C. or lower, and further preferably 100° C. or lower. The polymerization pressure is preferably 0.5 MPa or higher, preferably 1.0 MPa or higher, and more preferably 5.0 MPa or lower, still more preferably 4.0 MPa or lower, particularly preferably 3.0 MPa or lower.

The TFE/perfluoro(alkyl vinyl ether) copolymer preferably has a monomer composition ratio (mol %) of TFE:perfluoro(alkyl vinyl ether)=(90 to 99.7):(0.3 to 10), more preferably (97 to 99):(1 to 3). The perfluoro(alkyl vinyl ether) used is preferably one represented by the formula: $CF_2$=$CFORf^4$, wherein $Rf^4$ is a perfluoroalkyl group having 1 to 6 carbon atoms.

In the polymerization for the TFE/perfluoro(alkyl vinyl ether) copolymer, the surfactant may be used within the use range of the production method of the present invention, and is usually preferably added in an amount of 0.0001 to 10% by mass based on 100% by mass of the aqueous medium.

In the polymerization for the TFE/perfluoro(alkyl vinyl ether) copolymer, the chain transfer agent used is preferably cyclohexane, methanol, ethanol, propanol, propane, butane, pentane, hexane, carbon tetrachloride, chloroform, methylene chloride, methyl chloride, methane, ethane, or the like, and the pH buffer used is preferably ammonium carbonate, disodium hydrogen phosphate, or the like.

The aqueous dispersion of the TFE/perfluoro(alkyl vinyl ether) copolymer such as PFA or MFA obtained by the production method of the present invention may optionally be subjected to post-treatment such as concentration, and then the concentrate may be dried and powdered, and the powder may be melt-extruded into pellets. The aqueous medium in the aqueous dispersion may optionally contain an additive such as a nonionic surfactant and may contain a water-soluble organic solvent such as a water-soluble alcohol or may be free from a water-soluble organic solvent.

The melt extrusion may be performed under any appropriately set extrusion conditions usually capable of providing pellets.

In order to improve the heat resistance of the copolymer and to reinforce a chemical permeation suppression effect of a molded article, the copolymer is preferably subjected to a fluorine gas treatment.

The fluorine gas treatment is performed by bringing fluorine gas into contact with a chemical permeation suppressant. However, since the reaction with fluorine is extremely exothermic, it is preferable to dilute fluorine with an inert gas such as nitrogen. The amount of fluorine in the fluorine gas/inert gas mixture is 1 to 100% by weight, preferably 10 to 25% by weight. The treatment temperature is 150 to 250° C., preferably 200 to 250° C. and the fluorine gas treatment duration is 3 to 16 hours, preferably 4 to 12 hours. The fluorine gas treatment is performed at a gas pressure in the range of 1 to 10 atm, preferably atmospheric pressure. In the case of using a reactor at atmospheric pressure, the fluorine gas/inert gas mixture may be continuously passed through the reactor. This results in conversion of unstable ends of the copolymer into —$CF_3$ ends, thermally stabilizing the copolymer.

The copolymer and the composition thereof may be molded by compression molding, transfer molding, extrusion molding, injection molding, blow molding, or the like as in the case of conventional PFA.

Such a molding technique can provide a desired molded article. Examples of the molded article include sheets, films, packings, round bars, square bars, pipes, tubes, round tanks, square tanks, tanks, wafer carriers, wafer boxes, beakers, filter housings, flowmeters, pumps, valves, cocks, connectors, nuts, electric wires, and heat-resistant electric wires.

Preferred among these are tubes, pipes, tanks, connectors, and the like to be used for a variety of chemical reaction devices, semiconductor manufacturing devices, and acidic or alkaline chemical feeding devices each requiring chemical impermeability.

The aqueous dispersion of a TFE/perfluoro(alkyl vinyl ether) copolymer such as PFA or MFA may also be appropriately mixed with a nonionic surfactant, and optionally polyethersulfone, polyamide-imide, and/or polyimide and metal powder are dissolved or dispersed in an organic solvent. Thereby, a primer composition can be obtained. This primer composition may be used for a method of applying a fluororesin to a metal surface. The method includes applying the primer composition to a metal surface, applying a melt-fabricable fluororesin composition to the resulting primer layer, and firing the melt-fabricable fluororesin composition layer together with the primer layer.

(3) In the production method of the present invention, the polymerization for ETFE is preferably performed at a polymerization temperature of 0 to 100° C. and a polymerization pressure of 0.1 to 20 MPa. When producing ETFE, the polymerization temperature is preferably 20° C. or higher, more preferably 30° C. or higher, and still more preferably 40° C. or higher. Further, the polymerization temperature is preferably 95° C. or lower, more preferably 90° C. or lower, and still more preferably 80° C. or lower. The polymerization pressure is preferably 0.5 MPa or higher, preferably 0.8 MPa or higher, preferably 1.0 MPa or higher, and preferably 20 MPa or lower, more preferably 10 MPa or lower, still more preferably 5 or lower.

The ETFE preferably has a monomer composition ratio (mol %) of TFE:ethylene=(50 to 99):(50 to 1). The ETFE may be modified with a third monomer within a range of 0 to 20% by mass of all monomers. The composition ratio thereof is preferably TFE:ethylene:third monomer=(63 to 94):(27 to 2):(1 to 10). The third monomer is preferably perfluorobutyl ethylene, perfluorobutyl ethylene, 3,3,4,4,5, 5,6,6,7,7,8,8,8-tridecafluorooct-1-ene, 2,3,3,4,4,5,5-heptafluoro-1-pentene ($CH_2$=$CFCF_2CF_2CF_2H$), or 2-trifluoromethyl-3,3,3-trifluoropropene (($CF_3)_2C$=$CH_2$).

In the polymerization for ETFE, the surfactant may be used within the use range of the production method of the present invention, and is usually added in an amount of 0.0001 to 10% by mass based on 100% by mass of the aqueous medium.

In the polymerization for ETFE, the chain transfer agent used is preferably cyclohexane, methanol, ethanol, propanol, ethane, propane, butane, pentane, hexane, carbon tetrachloride, chloroform, methylene chloride, methyl chloride, or the like.

The aqueous dispersion of ETFE obtained by the production method of the present invention may optionally be subjected to post-treatment such as concentration, and then the concentrate may be dried and powdered, and the powder may be melt-extruded into pellets. The aqueous medium in the aqueous dispersion may optionally contain an additive such as a nonionic surfactant and may contain a water-soluble organic solvent such as a water-soluble alcohol or may be free from a water-soluble organic solvent.

The melt extrusion may be performed under any appropriately set extrusion conditions usually capable of providing pellets.

The ETFE may be extrusion-molded into a sheet. In other words, powder or pellets of ETFE in a molten state may be continuously extruded through a die and then cooled to provide a sheet-shaped molded article. The ETFE may be mixed with an additive.

Known additives may be incorporated as appropriate. Specific examples thereof include ultraviolet absorbers, photostabilizers, antioxidants, infrared absorbers, flame retarders, flame-retardant fillers, organic pigments, inorganic pigments, and dyes. From the viewpoint of excellent weather resistance, inorganic additives are preferred.

The content of the additive in the ETFE sheet is preferably 20% by mass or less, and particularly preferably 10% by mass or less, based on the total mass of the ETFE sheet.

The ETFE sheet has excellent mechanical strength and appearance, and thus can suitably be used for film materials (e.g., roof materials, ceiling materials, outer wall materials, inner wall materials, and coating materials) of film-structured buildings (e.g., sports facilities, gardening facilities, and atriums).

In addition to the film materials of film-structured buildings, the ETFE sheet is also useful for, for example, outdoor boards (e.g., noise-blocking walls, windbreak fences, breakwater fences, roof panels of carports, shopping arcades, footpath walls, and roof materials), shatter-resistant window films, heat-resistant waterproof sheets, building materials (e.g., tent materials of warehouse tents, film materials for shading, partial roof materials for skylights, window materials alternative to glass, film materials for flame-retardant partitions, curtains, outer wall reinforcement, waterproof films, anti-smoke films, non-flammable transparent partitions, road reinforcement, interiors (e.g., lighting, wall surfaces, and blinds), exteriors (e.g., tents and signboards)), living and leisure goods (e.g., fishing rods, rackets, golf clubs, and screens), automobile materials (e.g., hoods, damping materials, and bodies), aircraft materials, shipment materials, exteriors of home appliances, tanks, vessel inner walls, filters, film materials for construction works, electronic materials (e.g., printed circuit boards, circuit boards, insulating films, and release films), surface materials for solar cell modules, mirror protection materials for solar thermal energy, and surface materials for solar water heaters.

(4) The production method of the present invention may be used to produce an electrolyte polymer precursor. In the production method of the present invention, the polymerization for the electrolyte polymer precursor is preferably performed at a polymerization temperature of 0 to 100° C. and a polymerization pressure of −0.05 to 5.0 MPa. The electrolyte polymer precursor contains a vinyl ether monomer as described below and can be converted into an ion-exchangeable polymer through a hydrolysis treatment. When producing the electrolyte polymer precursor, the polymerization temperature is more preferably 5° C. or higher, and still more preferably 10° C. or higher. Further, the polymerization temperature is more preferably 80° C. or lower, and still more preferably 60° C. or lower. The polymerization pressure is preferably 0 MPa or higher, preferably 0.02 MPa or higher, and more preferably 2.0 MPa or lower, still more preferably 1.0 or lower.

An example of the vinyl ether monomer to be used for the electrolyte polymer precursor is a fluoromonomer represented by the general formula (150):

$$CF_2=CF-O-(CF_2CFY^{151}-O)_n-(CFY^{152})_{m-A}^{151}$$

wherein $Y^{151}$ represents a fluorine atom, a chlorine atom, a —$SO_2F$ group, or a perfluoroalkyl group; the perfluoroalkyl group optionally containing ether oxygen and a —$SO_2F$ group; n represents an integer of 0 to 3; n $Y^{151}$s are the same as or different from each other; $Y^{152}$ represents a fluorine atom, a chlorine atom, or a —$SO_2F$ group; m represents an integer of 1 to 5; m $Y^{152}$s are the same as or different from each other; $A^{151}$ represents —$SO_2X^{151}$, —$COZ^{151}$, or —$POZ^{152}Z^{153}$; $X^{151}$ represents F, Cl, Br, I, —$OR^{151}$, or —$NR^{152}R^{153}$; $Z^{151}$, $Z^{152}$, and $Z^{153}$ are the same as or different from each other, and each represent —$NR^{154}R^{155}$ or —$OR^{156}$; and $R^{151}$, $R^{152}$, $R^{153}$, $R^{154}$, $R^{155}$, and $R^{156}$ are the same as or different from each other, and each represent H, ammonium, an alkali metal, or an alkyl group, aryl group, or sulfonyl-containing group optionally containing a fluorine atom. The electrolyte polymer precursor preferably has a monomer composition ratio (mol %) of TFE:vinyl ether=(50 to 99):(50 to 1), more preferably TFE:vinyl ether=(50 to 93):(50 to 7).

The electrolyte polymer precursor may be modified with a third monomer within a range of 0 to 20% by mass of all monomers. Examples of the third monomer include multifunctional monomers such as CTFE, vinylidene fluoride, perfluoroalkyl vinyl ether, and divinylbenzene.

The electrolyte polymer precursor thereby obtained may be molded into a film, followed by hydrolysis using an alkali solution and a treatment using a mineral acid, and thereby used as a polymer electrolyte film for fuel cells, electrolysis devices, redox flow batteries, and the like.

The electrolyte polymer precursor may be hydrolyzed using an alkali solution while the dispersed state thereof is maintained, thereby providing an electrolyte polymer dispersion.

This dispersion may be then heated up to 120° C. or higher in a pressurized vessel and thereby dissolved in, for example, a solvent mixture of water and an alcohol, i.e., converted into a solution state.

The solution thereby obtained may be used as a binder for electrodes. Also, the solution may be combined with a variety of additives and cast to form a film, and the film may be used for antifouling films, organic actuators, or the like.

(5) TFE/VDF Copolymer

In the production method of the present invention, the polymerization for the TFE/VDF copolymer may be performed at any polymerization temperature, for examples, 0 to 100° C. The polymerization pressure is determined as appropriate in accordance with the other polymerization conditions such as the polymerization temperature, and may be usually 0 to 9.8 MPa.

When producing a TFE/VDF copolymer, the polymerization temperature is preferably 20° C. or higher, more preferably 30° C. or higher, and still more preferably 40° C. or higher. Further, the polymerization temperature is preferably 95° C. or lower, more preferably 90° C. or lower, and still more preferably 80° C. or lower. The polymerization pressure is preferably 0.2 MPa or higher, preferably 0.3 MPa or higher, preferably 0.5 MPa or higher, and preferably 5.0 MPa or lower, more preferably 4.0 MPa or lower, and still more preferably 3.0 MPa or lower.

The TFE/VDF copolymer preferably has a monomer composition ratio (mol %) of TFE:VDF=(5 to 90):(95 to 10). The TFE/VDF copolymer may be modified with a third monomer within a range of 0 to 50 mol % of all monomers. The composition ratio thereof is preferably TFE:ethylene: third monomer=(30 to 85):(10 to 69.9):(0.1 to 10).

The third monomer is preferably a monomer represented by the formula:

$$CX^{11}X^{12}=CX^{13}(CX^{14}X^{15})_{n11}X^{16}$$

wherein $X^{11}$ to $X^{16}$ are the same as or different from each other, and each represent H, F, or Cl; n11 represents an integer of 0 to 8, with the proviso that the third monomer is other than TFE and VDF; or a monomer represented by the formula:

$$CX^{21}X^{22}=CX^{23}-O(CX^{24}X^{25})_{n21}X^{26}$$

wherein $X^{21}$ to $X^{26}$ are the same as or different from each other, and each represent H, F, or Cl; and n21 represents an integer of 0 to 8.

The third monomer may be a fluorine-free ethylenic monomer. From the viewpoint of maintaining the heat resistance and the chemical resistance, the fluorine-free ethylenic monomer is preferably selected from ethylenic monomers having 6 or less carbon atoms. Examples thereof include ethylene, propylene, 1-butene, 2-butene, vinyl chloride, vinylidene chloride, alkyl vinyl ethers (e.g., methyl vinyl ether, ethyl vinyl ether, and propyl vinyl ether), maleic acid, itaconic acid, 3-butenoic acid, 4-pentenoic acid, vinylsulfonic acid, acrylic acid, and methacrylic acid.

In the polymerization for the TFE/VDF copolymer, the surfactant described above may be used within the use range of the production method of the present invention, and is usually added in an amount of 0.0001 to 5% by mass based on 100% by mass of the aqueous medium.

The TFE/VDF copolymer obtained by the polymerization may be amidated by bringing it into contact with a nitrogen compound capable of generating ammonia water, ammonia gas, or ammonia.

The TFE/VDF copolymer obtained by the above-described method may also preferably be used as a material for providing TFE/VDF copolymer fibers by a spinning-drawing method. The spinning-drawing method is a method for obtaining a TFE/VDF copolymer fiber by melt spinning a TFE/VDF copolymer, cooling and solidifying it to obtain an undrawn yarn, and then running the undrawn yarn in a heating cylinder to draw the undrawn yarn.

The TFE/VDF copolymer may be dissolved in an organic solvent to provide a solution of the TFE/VDF copolymer. Examples of the organic solvent include nitrogen-containing organic solvents such as N-methyl-2-pyrrolidone, N,N-dimethyl acetamide, and dimethyl formamide; ketone-based solvents such as acetone, methyl ethyl ketone, cyclohexanone, and methyl isobutyl ketone; ester-based solvents such as ethyl acetate and butyl acetate; ether-based solvents such as tetrahydrofuran and dioxane; and general-purpose organic solvents having a low boiling point such as solvent mixtures thereof. The solution may be used as a binder for batteries.

The aqueous dispersion of the TFE/VDF copolymer may preferably be used to coat a porous base material formed from a polyolefin resin to provide a composite porous film. The aqueous dispersion may also preferably contain inorganic particles and/or organic particles dispersed therein and be used to coat a porous base material to provide a composite porous film. The composite porous film thereby obtained may be used as a separator for lithium secondary batteries.

The powder of the melt-fabricable fluororesin is suitably used as a powdery coating material. When applied to a base material, the powdery coating material made of the melt-fabricable fluororesin powder can provide a film having a smooth surface. The melt-fabricable fluororesin powder having an average particle size of 1 μm or greater and smaller than 100 μm is particularly suitable as a powdery coating material used for electrostatic coating. The melt-fabricable fluororesin powder having an average particle size of 100 μm or greater and 1,000 μm or smaller is particularly suitable as a powdery coating material used for rotational coating or rotational molding.

The melt-fabricable fluororesin powder can be produced by a method of drying the melt-fabricable fluororesin obtained by the production method of the present invention described above to powder the melt-fabricable fluororesin. The method for producing the melt-fabricable fluororesin powder is also one aspect of the present invention.

(III) Fluoroelastomers

In the production method of the present invention, the polymerization reaction for the fluoroelastomer is initiated by charging pure water and the surfactant into a pressure-resistant reaction vessel equipped with a stirrer, deoxidizing the system, charging the monomers, increasing the temperature to a predetermined level, and adding a polymerization initiator. The pressure decreases as the reaction progresses, and additional monomers are fed continuously or intermittently to maintain the initial pressure. When the amount of the monomers fed reaches a predetermined level, feeding is stopped, and the monomers in the reaction vessel are purged and the temperature is returned to room temperature, whereby the reaction is completed. In this case, polymer latex can be continuously taken out of the reaction vessel.

In particular, in the case of producing a thermoplastic elastomer as the fluoroelastomer, it is also possible to use a method in which fluoropolymer fine particles are synthesized at a high concentration defined as described above and then diluted for further polymerization as disclosed in International Publication No. WO00/01741, whereby the final polymerization rate can be increased as compared with ordinary polymerization.

The polymerization for the fluoroelastomer may be performed under conditions appropriately selected from the viewpoints of physical properties of the target polymer and control of the polymerization rate, and is performed at a polymerization temperature of usually −20 to 200° C., preferably 5 to 150° C., and a polymerization pressure of usually 0.05 to 10 MPaG, preferably 0.1 to 8 MPaG.

When producing a fluoroelastomer, the polymerization temperature is more preferably 10° C. or higher, still more preferably 15° C. or higher, and particularly preferably 20° C. or higher. Further, the polymerization temperature is more preferably 130° C. or lower, and still more preferably 90° C. or lower. The polymerization pressure is preferably 0.5 MPa or higher, more preferably 1.0 MPa or higher, and still more preferably 7.0 MPa or lower.

Examples of the monomer used in the polymerization for the fluoroelastomer include vinylidene fluoride, as well as fluorine-containing ethylenically unsaturated monomers having fluorine atoms at least as much as the carbon atoms therein and copolymerizable with vinylidene fluoride. Examples of the fluorine-containing ethylenically unsaturated monomers include trifluoropropene, pentafluoropropene, hexafluorobutene, and octafluorobutene. Of these, hexafluoropropene is particularly preferred because of the properties of the elastomer obtained when hexafluoropropene blocks the crystal growth of the polymer. Examples of the fluorine-containing ethylenically unsaturated monomers also include trifluoroethylene, TFE, and CTFE. Fluorine-containing monomers containing one or two or more chlorine and/or bromine substituents may also be used. Perfluoro (alkyl vinyl ethers) such as perfluoro(methyl vinyl ether) may also be used. TFE and HFP are preferred for producing fluoroelastomer.

The fluoroelastomer preferably has a monomer composition ratio (% by mass) of vinylidene fluoride:HFP:TFE=(20 to 70):(20 to 48):(0 to 32), more preferably (20 to 70):(30 to 48):(0 to 32), and still more preferably (32 to 64):(30 to 48):(0 to 27). The fluoroelastomer having this composition ratio exhibits good elastomeric characteristics, chemical resistance, and thermal stability.

In the polymerization for the fluoroelastomer, the surfactant may be used within the use range of the production method of the present invention, and is usually added in an amount of 0.0001 to 20% by mass, preferably 10% by mass or less, and more preferably 2% by mass or less, based on 100% by mass of the aqueous medium.

In the polymerization for the fluoroelastomer, the polymerization initiator used may be a known inorganic radical polymerization initiator. Examples of particularly useful inorganic radical polymerization initiators include conventionally known water-soluble inorganic peroxides, such as persulfates, perphosphates, perborates, percarbonates or permanganates of sodium, potassium, and ammonium. The radical polymerization initiator may be further activated with a reducing agent such as thiosulfate, phosphite, or hypophosphite of sodium, potassium, or ammonium, or with an easily oxidizable metal compound such as an iron(I) salt, a copper(I) salt, or a silver salt. A preferred inorganic radical polymerization initiator is ammonium persulfate, which is more preferably used in redox systems.

In the polymerization of the fluoroelastomer, the amount of the polymerization initiator added is set to preferably, but is not limited to, 0.005 to 1.0% by mass, and preferably 0.01 to 0.5% by mass based on 100% by mass of the total amount of the monomers, from the viewpoint of efficient polymerization.

The polymerization initiator is preferably the water-soluble radical polymerization initiator, and more preferably ammonium persulfate. In the polymerization step, ammonium persulfate is preferably added in an amount of 0.005% by mass or more, more preferably 0.01% by mass or more, based on 100% by mass of the total amount of the monomers.

In the polymerization for the fluoroelastomer, a known chain transfer agent may be used, and examples thereof include hydrocarbons, esters, ethers, alcohols, ketones, chlorine compounds, and carbonates. A hydrocarbon, an ester, an ether, an alcohol, a chlorine compound, an iodine compound, or the like may be used as the thermoplastic elastomer, for example. Of these, preferred are acetone and isopropyl alcohol. From the viewpoint of reducing a reaction rate drop in polymerization for a thermoplastic elastomer, isopentane, diethyl malonate, and ethyl acetate are preferred. Diiodine compounds such as $I(CF_2)_4I$, $I(CF_2)_6I$, and $ICH_2I$ are preferred because they can iodize ends of the polymer and allow the resulting polymer to serve as a reactive polymer.

The amount of the chain transfer agent used is usually $0.5 \times 10^{-3}$ to $5 \times 10^{-3}$ mol %, preferably $1.0 \times 10^{-3}$ to $3.5 \times 10^{-3}$ mol %, based on the total amount of the monomers fed.

Paraffin wax may preferably be used as an emulsification stabilizer on the polymerization for the fluoroelastomer, for example. A phosphate, sodium hydroxide, potassium hydroxide, or the like may preferably be used as a pH adjuster in the polymerization for a thermoplastic elastomer, for example.

At completion of the polymerization, the fluoroelastomer obtained by the production method of the present invention has a solid concentration of 1.0 to 40% by mass, an average particle size of 0.03 to 1 μm, preferably 0.05 to 0.5 μm, and a number average molecular weight of 1,000 to 2,000,000.

The fluoroelastomer obtained by the production method of the present invention may optionally be mixed with a dispersion stabilizer such as a hydrocarbon-containing surfactant or be concentrated, for example, to form a dispersion suitable for rubber molding. The dispersion is subjected to treatments such as pH adjustment, solidification, and heating. The treatments are performed as follows.

The pH adjustment is performed such that a mineral acid such as nitric acid, sulfuric acid, hydrochloric acid, or phosphoric acid and/or a carboxylic acid or the like having 5 or less carbon atoms and having pK=4.2 or lower is added to adjust the pH to 2 or lower.

The solidification is performed by adding an alkaline earth metal salt. Examples of the alkaline earth metal salt include nitrates, chlorates, and acetates of calcium or magnesium.

Although the pH adjustment and the solidification may be performed in any order, the pH adjustment is preferably performed prior to performing the solidification.

These operations are followed by washing with the same volume of water as the fluoroelastomer to remove a small amount of impurities such as buffer solution and salts present in the fluoroelastomer and drying of the fluoroelastomer.

The drying is preferably performed at 40 to 250° C., more preferably 60 to 230° C., and still more preferably 80 to 200° C.

The fluoroelastomer may be either a partially fluorinated elastomer or a perfluoroelastomer.

Examples of the partially fluorinated elastomer include vinylidene fluoride (VdF)-based fluoroelastomers, tetrafluoroethylene (TFE)/propylene (Pr)-based fluoroelastomers, tetrafluoroethylene (TFE)/propylene/vinylidene fluoride (VdF)-based fluoroelastomers, ethylene/hexafluoropropylene (HFP)-based fluoroelastomers, ethylene/hexafluoropropylene (HFP)/vinylidene fluoride (VdF)-based fluoroelastomers, and ethylene/hexafluoropropylene (HFP)/ tetrafluoroethylene (TFE)-based fluoroelastomers. Of these, the partially fluorinated elastomer is preferably at least one selected from the group consisting of vinylidene fluoride-based fluoroelastomers and tetrafluoroethylene/propylene-based fluoroelastomers.

The vinylidene fluoride-based fluoroelastomer is preferably a copolymer containing 45 to 85 mol % of vinylidene fluoride and 55 to 15 mol % of at least one monomer copolymerizable with and different from vinylidene fluoride. The vinylidene fluoride-based fluoroelastomer is more preferably a copolymer containing 50 to 80 mol % of vinylidene fluoride and 50 to 20 mol % of at least one monomer copolymerizable with and different from vinylidene fluoride.

Examples of the at least one monomer copolymerizable with and different from vinylidene fluoride include monomers such as tetrafluoroethylene (TFE), hexafluoropropylene (HFP), fluoroalkyl vinyl ethers, chlorotrifluoroethylene (CTFE), trifluoroethylene, trifluoropropylene, pentafluoropropylene, trifluorobutene, tetrafluoroisobutene, hexafluoroisobutene, vinyl fluoride, a fluoromononmer represented by the general formula (100): $CH_2=CFRf^{101}$ (wherein $Rf^{101}$ is a linear or branched fluoroalkyl group having 1 to 12 carbon atoms), a fluoromonomer represented by the general formula (170): $CH_2=CH-(CF_2)_n-X^{171}$ (wherein $X^{171}$ is H or F; and n is an integer of 3 to 10), and a monomer that provides a crosslinking site; and non-fluorinated monomers such as ethylene, propylene, and alkyl vinyl ethers. These may be used alone or in any combination thereof. Of these, preferred is at least one selected from the group consisting of TFE, HFP, fluoroalkyl vinyl ether, and CTFE. The fluoroalkyl vinyl ether is preferably a fluoromonomer represented by the general formula (160).

Specific examples of the vinylidene fluoride-based fluoroelastomers include VdF/HFP-based rubber, VdF/HFP/TFE-based rubber, VdF/CTFE-based rubber, VdF/CTFE/TFE-based rubber, rubber based on VDF and a fluoromonomer represented by the general formula (100), rubber based on VDF, a fluoromonomer represented by the general formula (100), and TFE, rubber based on VDF and perfluoro(methyl vinyl ether) (PMVE), VDF/PMVE/TFE-based rubber, and VDF/PMVE/TFE/HFP-based rubber. The rubber based on VDF and a fluoromonomer represented by the general formula (100) is preferably VDF/$CH_2=CFCF_3$-based rubber. The rubber based on VDF, a fluoromonomer represented by the formula (100), and TFE is preferably VDF/TFE/$CH_2=CFCF_3$-based rubber.

The VDF/$CH_2=CFCF_3$-based rubber is preferably a copolymer containing 40 to 99.5 mol % of VDF and 0.5 to 60 mol % of $CH_2=CFCF_3$, more preferably a copolymer containing 50 to 85 mol % of VDF and 20 to 50 mol % of $CH_2=CFCF_3$.

The tetrafluoroethylene/propylene-based fluoroelastomer is preferably a copolymer containing 45 to 70 mol % of tetrafluoroethylene, 55 to 30 mol % of propylene, and 0 to 5 mol % of a fluoromonomer that provides a crosslinking site.

The fluoroelastomer may be a perfluoroelastomer. The perfluoroelastomer is preferably at least one selected from the group consisting of perfluoroelastomers containing TFE, such as a copolymer containing TFE and a fluoromonomer represented by the general formula (160), (130), or (140) and a copolymer containing TFE, a fluoromonomer represented by the general formula (160), (130), or (140), and a monomer that provides a crosslinking site.

In the case of the TFE/PMVE copolymer, the composition ratio thereof is preferably 45 to 90/10 to 55 (mol %), more preferably 55 to 80/20 to 45, and still more preferably 55 to 70/30 to 45.

In the case of the copolymer of TFE, PMVE, and a monomer that provides a crosslinking site, the composition ratio thereof is preferably 45 to 89.9/10 to 54.9/0.01 to 4 (mol %), more preferably 55 to 77.9/20 to 49.9/0.1 to 3.5, and still more preferably 55 to 69.8/30 to 44.8/0.2 to 3.

In the case of the copolymer of TFE and a fluoromonomer represented by the general formula (160), (130), or (140) having 4 to 12 carbon atoms, the composition ratio thereof is preferably 50 to 90/10 to 50 (mol %), more preferably 60 to 88/12 to 40, and still more preferably 65 to 85/15 to 35.

In the case of the copolymer of TFE, a fluoromonomer represented by the general formula (160), (130), or (140) having 4 to 12 carbon atoms, and a monomer that provides a crosslinking site, the composition ratio thereof is preferably 50 to 89.9/10 to 49.9/0.01 to 4 (mol %), more preferably 60 to 87.9/12 to 39.9/0.1 to 3.5, and still more preferably 65 to 84.8/15 to 34.8/0.2 to 3.

When these copolymers have compositional features outside these ranges, the properties as a rubber elastic body are lost, and the properties tend to be close to those of a resin.

The perfluoroelastomer is preferably at least one selected from the group consisting of copolymers of TFE, a fluoromonomer represented by the general formula (140), and a fluoromonomer that provides a crosslinking site, copolymers of TFE and a perfluorovinyl ether represented by the general formula (140), copolymers of TFE and a fluoromonomer represented by the general formula (160), and copolymers of TFE, a fluoromonomer represented by the general formula (160), and a monomer that provides a crosslinking site.

Examples of the perfluoroelastomer further include the perfluoroelastomers disclosed in documents such as International Publication No. WO97/24381, Japanese Patent Publication No. 61-57324, Japanese Patent Publication No. 04-81608, and Japanese Patent Publication No. 05-13961.

From the viewpoint of achieving an excellent compression set at high temperature, the fluoroelastomer preferably has a glass transition temperature of −70° C. or higher, more preferably −60° C. or higher, and still more preferably −50° C. or higher. From the viewpoint of achieving good cold resistance, the glass transition temperature is preferably 5° C. or lower, more preferably 0° C. or lower, and still more preferably −3° C. or lower.

The glass transition temperature can be determined as follows. Specifically, using a differential scanning calorimeter (DSC822e, manufactured by Mettler-Toledo International Inc.), 10 mg of a sample is heated at a rate of 10° C./min to give a DSC curve, and the temperature is read at the midpoint of two intersections between each of the extension lines of the base lines before and after the secondary transition of the DSC curve and the tangent line at the inflection point of the DSC curve.

From the viewpoint of achieving good heat resistance, the fluoroelastomer preferably has a Mooney viscosity ML(1+20) at 170° C. of 30 or higher, more preferably 40 or higher, and still more preferably 50 or higher. From the viewpoint of achieving good processability, the Mooney viscosity is preferably 150 or lower, more preferably 120 or lower, and still more preferably 110 or lower.

From the viewpoint of achieving good heat resistance, the fluoroelastomer preferably has a Mooney viscosity ML(1+20) at 140° C. of 30 or higher, more preferably 40 or higher, and still more preferably 50 or higher. From the viewpoint of achieving good processability, the Mooney viscosity is preferably 180 or lower, more preferably 150 or lower, and still more preferably 110 or lower.

From the viewpoint of achieving good heat resistance, the fluoroelastomer preferably has a Mooney viscosity ML(1+10) at 100° C. of 10 or higher, more preferably 20 or higher, and still more preferably 30 or higher. From the viewpoint of achieving good processability, the Mooney viscosity is preferably 120 or lower, more preferably 100 or lower, and still more preferably 80 or lower.

The Mooney viscosity can be determined using a Mooney viscometer MV2000E manufactured by Alpha Technologies Inc. at 170° C., 140° C., or 100° C. in conformity with JIS K 6300.

The fluoroelastomer obtained by the production method of the present invention may be in any form as long as it is obtainable by the polymerization. The fluoroelastomer may be in the form of an aqueous dispersion as polymerized, or may be used in the form of a gum or a crumb obtained by conventionally known coagulation, drying, and any other treatment on the aqueous dispersion as polymerized. The surfactant used in the production method of the present invention can improve the stability of the aqueous dispersion, and is more preferably used in a polymerization method in which substances insoluble in water such as an initiator, including an organic peroxide, and a chain transfer agent, including an iodine or bromine compound, are added during the polymerization defined as described above.

The gum is a small particulate mass of the fluoroelastomer. The crumb is an amorphous mass of the fluoroelastomer resulting from fusion of particles that cannot maintain the form of small particles as gum at room temperature.

The fluoroelastomer may be mixed with an additive such as a curing agent and a filler to be processed into a fluoroelastomer composition.

Examples of the curing agent include polyols, polyamines, organic peroxides, organotins, bis(aminophenol)tetraamine, and bis(thioaminophenol).

The fluoroelastomer composition is made of the above fluoroelastomer, and thus is substantially free from an emulsifier and is excellent in that it is easily crosslinked during molding.

The fluoroelastomer may be molded to form a fluoroelastomer molded body. The molding may be performed by any method such as a known method using the above-mentioned curing agent.

The fluoroelastomer molded body is suitable for seals, gaskets, electric wire coatings, hoses, tubes, laminated products, and accessories, particularly parts for semiconductor manufacturing devices and automobile parts.

The polymerization usually provides an aqueous dispersion containing the fluoropolymer. The fluoropolymer is usually at a concentration of 8 to 50% by mass in the aqueous dispersion obtained by the polymerization. In the aqueous dispersion, the lower limit of the concentration of the fluoropolymer is preferably 10% by mass, more preferably 15% by mass, while the upper limit thereof is preferably 40% by mass, more preferably 35% by mass.

The average primary particle size of the fluoropolymer is, for example, 50 to 500 nm. The lower limit of the average primary particle size is preferably 100 nm, and more preferably 150 nm. The upper limit of the average primary particle size is preferably 400 nm, and more preferably 350 nm.

The average primary particle size can be determined by dynamic light scattering. The average primary particle size may be determined by preparing a fluoropolymer aqueous dispersion with a fluoropolymer solids concentration being adjusted to 1.0% by mass and using dynamic light scattering at 25° C. with 70 measurement processes, wherein the solvent (water) has a refractive index of 1.3328 and the solvent (water) has a viscosity of 0.8878 mPa·s. The dynamic light scattering may be, for example, ELSZ-1000S (manufactured by Otsuka Electronics Co., Ltd.).

The aqueous dispersion obtained by the polymerization may be concentrated or subjected to dispersion stabilization treatment to form a dispersion, or may be subjected to coagulation or agglomeration, and collected and dried into powder or other solid.

The surfactant may also be suitably used as a dispersant for dispersing the fluoropolymer obtained by the polymerization in an aqueous medium.

The polymerization usually provides an aqueous dispersion containing particles of the fluoropolymer, the surfactant, and the aqueous medium. The aqueous dispersion contains particles of the fluoropolymer dispersed in an aqueous medium in the presence of the surfactant.

The lower limit value of the content of the carboxylic acid type hydrocarbon-containing surfactant in the aqueous dispersion is preferably 10 ppb, more preferably 100 ppb, still more preferably 1 ppm, further preferably 10 ppm, and particularly preferably 50 ppm based on the fluoropolymer. The upper limit value thereof is preferably 100,000 ppm, more preferably 50,000 ppm, still more preferably 10,000 ppm, and still more preferably 5,000 ppm based on the fluoropolymer.

The aqueous dispersion may be any of an aqueous dispersion obtained by the polymerization, a dispersion obtained by concentrating this aqueous dispersion or subjecting the aqueous dispersion to dispersion stabilization treatment, and an aqueous dispersion obtained by dispersing powder of the fluoropolymer into an aqueous medium in the presence of the surfactant.

The aqueous dispersion may also be produced as a purified aqueous dispersion by a method including a step (I) of bringing the aqueous dispersion obtained by the polymerization into contact with an anion exchange resin or a mixed bed containing an anion exchange resin and a cation exchange resin in the presence of a nonionic surfactant (I), and/or a step (II) of concentrating the aqueous dispersion obtained by this step such that the solid concentration is 30 to 70% by mass based on 100% by mass of the aqueous dispersion (II). The nonionic surfactant may be, but is not limited to, any of those to be described later. The anion exchange resin to be used may be, but is not limited to, a known one. The contact with the anion exchange resin may be performed by a known method.

A method for producing the aqueous dispersion may include subjecting the aqueous dispersion obtained by the polymerization to the step (I), and subjecting the aqueous dispersion obtained in the step (I) to the step (II) to produce a purified aqueous dispersion. The step (II) may also be carried out without carrying out the step (I) to produce a purified aqueous dispersion. Further, the step (I) and the step (II) may be repeated or combined.

Examples of the anion exchange resin include known ones such as a strongly basic anion exchange resin containing as a functional group a —N$^+$X$^-$(CH$_3$)$_3$ group (wherein X represents Cl or OH) or a strongly basic anion exchange resin containing a —N$^+$X$^-$(CH$_3$)$_3$(C$_2$H$_4$OH) group (wherein X is as described above). Specific examples thereof include those described in International Publication No. WO99/62858, International Publication No. WO03/020836, International Publication No. WO2004/078836, International Publication No. WO2013/027850, and International Publication No. WO2014/084399.

Examples of the cation exchange resin include, but are not limited to, known ones such as a strongly acidic cation exchange resin containing as a functional group a —SO$_3^-$ group and a weakly acidic cation exchange resin containing as a functional group a —COO$^-$ group. Of these, from the viewpoint of removal efficiency, a strongly acidic cation exchange resin is preferred, a H$^+$ form strongly acidic cation exchange resin is more preferred.

The "mixed bed containing a cation exchange resin and an anion exchange resin" encompasses, but is not limited to, those in which the resins are filled into a single column, those in which the resins are filled into different columns, and those in which the resins are dispersed in an aqueous dispersion.

The concentration may be carried out by a known method. Specific examples include those described in International Publication No. WO2007/046482 and International Publication No. WO2014/084399.

Examples thereof include phase separation, centrifugal sedimentation, cloud point concentration, electric concentration, electrophoresis, filtration treatment using ultrafiltration, filtration treatment using a reverse osmosis membrane (RO membrane), and nanofiltration treatment. The concentration may concentrate the fluoropolymer concentration to be 30 to 70% by mass in accordance with the application thereof. The concentration may impair the stability of the dispersion. In such a case, a dispersion stabilizer may be further added. The dispersion stabilizer added may be the aforementioned nonionic surfactant or any of other various surfactants. The nonionic surfactant is the same as the nonionic surfactant exemplified as the nucleating agent described above, and can be appropriately selected from the nonionic surfactants described above. The nonionic surfactant is preferably free from an aromatic moiety.

Also, the cloud point of the nonionic surfactant is a measure of its solubility in water. The surfactant used in the aqueous dispersion has a cloud point of about 30° C. to about 90° C., preferably about 35° C. to about 85° C.

The total amount of the dispersion stabilizer is 0.5 to 20% by mass in terms of concentration, based on the solid of the dispersion. When the amount of the dispersion stabilizer is less than 0.5% by mass, the dispersion stability may deteriorate, and when the amount thereof is more than 20% by mass, dispersion effects commensurate with the amount thereof may not be obtained, which is impractical. The lower limit of the amount of the dispersion stabilizer is more preferably 2% by mass, while the upper limit thereof is more preferably 12% by mass.

The surfactant may be removed by the concentration operation.

The aqueous dispersion obtained by the polymerization may also be subjected to a dispersion stabilization treatment without concentration depending on the application, to prepare an aqueous dispersion having a long pot life. Examples of the dispersion stabilizer used include the same as those described above.

Examples of the applications of the aqueous dispersion include, but are not limited to, those in which the aqueous dispersion is directly used, such as coating achieved by applying the aqueous dispersion to a base material, drying the dispersion, and optionally firing the workpiece; impregnation achieved by impregnating a porous support such as a nonwoven fabric or a resin molded article with the aqueous dispersion, drying the dispersion, and preferably firing the workpiece; and casting achieved by applying the aqueous dispersion to a base material such as glass, drying the dispersion, optionally immersing the workpiece into water to remove the base material and to thereby provide a thin film. Examples of such applications include aqueous dispersion-type coating materials, tent membranes, conveyor belts, printed circuit boards (CCL), binders for electrodes, and water repellents for electrodes.

The aqueous dispersion may be used in the form of an aqueous coating material for coating by mixing with a known compounding agent such as a pigment, a thickener, a dispersant, a defoaming agent, an antifreezing agent, a film-forming aid, or by compounding another polymer compound.

In addition, the aqueous dispersion may be used for additive applications, for example, for a binder application for preventing the active material of an electrode from falling off, for a compound application such as a drip inhibitor, or for a dust suppression treatment application for preventing floating of sand, dust, and the like.

For the purpose of adjusting the viscosity of the aqueous dispersion or improving the miscibility with a pigment or filler, the aqueous dispersion may preferably contain an anionic surfactant. The anionic surfactant may be appropriately added to an extent that causes no problems from the economic and environmental viewpoints.

Examples of the anionic surfactant include non-fluorinated anionic surfactants and fluorine-containing anionic surfactants. Preferred are fluorine-free, non-fluorinated anionic surfactants, i.e., hydrocarbon anion surfactants.

For the purpose of adjusting the viscosity, any known anionic surfactants may be used, for example, anionic surfactants disclosed in International Publication No. WO2013/146950 and International Publication No. WO2013/146947. Examples thereof include those having a saturated or unsaturated aliphatic chain having 6 to 40 carbon atoms, preferably 8 to 20 carbon atoms, and more preferably 9 to 13 carbon atoms. The saturated or unsaturated aliphatic chain may be either linear or branched, or may have a cyclic structure. The hydrocarbon may have aromaticity, or may have an aromatic group. The hydrocarbon may contain a hetero atom such as oxygen, nitrogen, or sulfur.

Examples of the anionic surfactants include alkyl sulfonates, alkyl sulfates, and alkyl aryl sulfates, and salts thereof; aliphatic (carboxylic) acids and salts thereof; and phosphoric acid alkyl esters and phosphoric acid alkyl aryl esters, and salts thereof. Of these, preferred are alkyl sulfonates, alkyl sulfates, and aliphatic carboxylic acids, or salts thereof.

Preferred examples of the alkyl sulfates or salts thereof include ammonium lauryl sulfate and sodium lauryl sulfate.

Preferred examples of the aliphatic carboxylic acids or salts thereof include succinic acid, decanoic acid, undecanoic acid, undecenoic acid, lauric acid, hydrododecanoic acid, or salts thereof.

The amount of the anionic surfactant added depends on the types of the anion surfactant and other compounding agents, and is preferably 10 ppm to 5,000 ppm based on the mass of the solid of the fluoropolymer.

The lower limit of the amount of the anionic surfactant added is more preferably 50 ppm or more, still more preferably 100 ppm or more. Too small an amount of the anionic surfactant may result in a poor viscosity adjusting effect.

The upper limit of the amount of the anionic surfactant added is more preferably 3,000 ppm or less, still more preferably 2,000 ppm or less. Too large an amount of the anionic surfactant may impair mechanical stability and storage stability of the aqueous dispersion.

For the purpose of adjusting the viscosity of the aqueous dispersion, components other than the anionic surfactants, such as methyl cellulose, alumina sol, polyvinyl alcohol, and carboxylated vinyl polymers may also be added.

For the purpose of adjusting the pH of the aqueous dispersion, a pH adjuster such as aqueous ammonia may also be added.

The aqueous dispersion may optionally contain other water soluble polymer compounds to an extent that does not impair the characteristics of the aqueous dispersion.

Examples of the other water soluble polymer compound include, but are not limited to, polyethylene oxide (dispersion stabilizer), polyethylene glycol (dispersion stabilizer), polyvinylpyrrolidone (dispersion stabilizer), phenol resin, urea resin, epoxy resin, melamine resin, polyester resin, polyether resin, silicone acrylic resin, silicone resin, silicone polyester resin, and polyurethane resin. The aqueous dispersion may further contain a preservative, such as isothiazolone-based, azole-based, pronopol, chlorothalonil, methylsulfonyltetrachloropyridine, carbendazim, fluorfolpet, sodium diacetate, and diiodomethylparatolylsulfone.

The surfactant, decomposition products and by-products of the surfactant by-produced by the surfactant, and residual monomers may be collected from discharge water generated in the coagulation or the washing and/or from off gas generated in the drying, and then purified to reuse the surfactant, the decomposition products and by-products of the surfactant, and the residual monomers by-produced by the surfactant. The collection and the purification may be performed by known methods, although not limited thereto. For example, they may be performed by the methods disclosed in National Publication of International Patent Application No. 2011-520020.

The collection of the surfactant, the decomposition products and by-products of the surfactant by-produced by the surfactant, the residual monomers, and the like from discharge water generated in the coagulation, discharge water generated in the washing, and off gas generated in the drying and the purification thereof may be performed by any known methods, although not limited thereto, such as the methods disclosed in U.S. Patent Application Publication No. 2007/15937, U.S. Patent Application Publication No. 2007/25902, and U.S. Patent Application Publication No. 2007/27251. Specific examples of the methods are as follows.

An example of the method of collecting the surfactant, the decomposition products and by-products of the surfactant by-produced by the surfactant, the residual monomers, and the like from discharge water is a method in which the discharge water is brought into contact with adsorbent particles formed of ion exchange resin, activated carbon, silica gel, clay, zeolite, or the like, so that the particles are allowed to adsorb the surfactant and the others, and then the discharge water and the adsorbent particles are separated. Incinerating the adsorbent particles having adsorbed the surfactant and the others can prevent emission of the surfactant and the others into the environment.

Alternatively, the surfactant and the others may be removed and eluted by a known method from the ion exchange resin particles having adsorbed the surfactant and the others, and collected. For example, in the case of using anion exchange resin particles as the ion exchange resin particles, the surfactant and the others can be eluted by bringing a mineral acid into contact with an anion exchange resin. When a water-soluble organic solvent is added to the resulting eluate, the mixture is usually separated into two phases. Since the lower phase contains the surfactant and the others, it is possible to collect the surfactant and the others by collecting and neutralizing the lower phase. Examples of the water-soluble organic solvent include polar solvents such as alcohols, ketones, and ethers.

Other methods of collecting the surfactant and the others from ion exchange resin particles include a method of using an ammonium salt and a water-soluble organic solvent and a method of using an alcohol and, if necessary, an acid. In the latter method, ester derivatives of the surfactant and the others are generated, and they can easily be separated from the alcohol by distillation.

When the discharge water contains fluoropolymer particles and other solids, they are preferably removed before the discharge water and the adsorbent particles are brought into contact with each other. Examples of methods of removing the fluoropolymer particles and other solids include a method of adding an aluminum salt, for example, to deposit these components, and then separating the discharge water and the deposits, and an electrocoagulation method. The components may also be removed by a mechanical method, and examples thereof include a cross-flow filtration method, a depth filtration method, and a precoat filtration method.

From the viewpoint of productivity, the discharge water preferably contains the fluoropolymer in a non-agglomerated form in a low concentration, more preferably less than 0.4% by mass, and particularly preferably less than 0.3% by mass.

An example of the method of collecting the surfactant and the others from the off gas is a method in which a scrubber is brought into contact with deionized water, an alkaline aqueous solution, an organic solvent such as a glycol ether solvent, or the like to provide a scrubber solution containing the surfactant and the others. When the alkaline aqueous solution used is a highly concentrated alkaline aqueous solution, the scrubber solution can be collected in a state where the surfactant and the others are phase-separated, and thus the surfactant and the others can be easily collected and reused. Examples of the alkali compound include alkali metal hydroxides and quaternary ammonium salts.

The scrubber solution containing the surfactant and the others may be concentrated using a reverse osmosis membrane, for example. The concentrated scrubber solution usually contains fluoride ions. Still, the fluoride ions may be removed by adding alumina after the concentration so that the surfactant and the others can easily be reused. Alternatively, the scrubber solution may be brought into contact with adsorbent particles so that the adsorbent particles can adsorb the surfactant and the others, and thereby the surfactant and the others may be collected by the aforementioned method.

The surfactant and the others collected by any of the methods may be reused in the production of fluoropolymer.

The production method of the present invention provides a fluoropolymer. In an embodiment of the present invention, a composition contains the fluoropolymer obtained by the production method.

The production method also provides a fluoropolymer substantially free from a compound represented by the general formula (3) described below and a composition containing the fluoropolymer.

The present invention also relates to a composition containing a fluoropolymer and substantially free from a compound represented by the following general formula (3).

$$(H—(CF_2)_8—SO_3)_q M^2 \qquad \text{General Formula (3)}$$

wherein $M^2$ is H, a metal atom, $NR^5_4$, imidazolium optionally having a substituent, pyridinium optionally having a substituent, or phosphonium optionally having a substituent; and q is 1 or 2.

The fluoropolymer is the same as described above.

The composition of the present invention is substantially free from the compound represented by the general formula (3). The expression "substantially free from the compound represented by the general formula (3)" means that, for example, the content of the compound represented by the general formula (3) may be 1,000 ppb or less based on the fluoropolymer. The content of the compound represented by the general formula (3) is preferably 500 ppb or less, more preferably 100 ppb or less, still more preferably 25 ppb or less, and particularly preferably 15 ppb or less, and further preferably 10 ppb or less based on the fluoropolymer. The lower limit thereof may be, but is not limited to, 0 ppb or 1 ppb.

In a case where the composition of the present invention is in the form of an aqueous dispersion, the quantification limit is about 10 to 100 ppb when the content of the compound represented by the general formula (3) is measured by the method described later, but the quantification limit can be lowered by performing concentration. The concentration may be repeated multiple times.

In an embodiment of the present invention, the composition may be in the form of an aqueous dispersion, may be in the form of a powder, may be in the form of a pellet, may be in the form of a molded article, or may be in the form of a molded body. The aqueous dispersion may be a dispersion as polymerized, or may be one obtained by processing the dispersion as polymerized. For example, a nonionic surfactant or the like may be added to the aqueous dispersion for mechanical stability and storage stability.

The aqueous dispersion is a dispersion system in which an aqueous medium serves as a dispersion medium and the fluoropolymer serves as a dispersoid. The aqueous medium may be any liquid containing water, and may contain, in addition to water, an organic solvent such as an alcohol, an ether, a ketone, or paraffin wax.

In production of the fluoropolymer using a hydrocarbon surfactant, the resulting aqueous dispersion may contain a compound represented by the following general formula (4), (4'), (5), or (5'). In an embodiment of the present invention, the composition contains such a compound in an amount within the following ranges.

In an embodiment of the present invention, the composition contains a compound represented by the following general formula (4) in an amount of 100 ppb or more based on the fluoropolymer. The upper limit of the content of the compound represented by the general formula (4) may be, but is not limited to, 1,000,000 ppb, may be 100,000 ppb, may be 10,000 ppb, or may be 5,000 ppb. The lower limit of the content of the compound represented by the general formula (4) may be 500 ppb, or may be 1,000 ppb.

$$(H—(CF_2)_7—COO)_p M^1 \qquad \text{General Formula (4)}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains a compound represented by the following general formula (4') in an amount of 100 ppb or more based on the fluoropolymer. The upper limit of the content of the compound represented by the general formula (4') may be, but is not limited to, 1,000,000 ppb, may be 100,000 ppb, may be 10,000 ppb, or may be 5,000 ppb. The lower limit of the content of the compound represented by the general formula (4') may be 500 ppb, or may be 1,000 ppb.

$$(H—(CF_2)_8—COO)_p M^1 \qquad \text{General Formula (4')}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains a compound represented by the following general formula (4) in an amount of 100 ppb or more based on the fluoropolymer, and/or a compound represented by the following general formula (4') in an amount of 100 ppb or more based on the fluoropolymer. The upper limit of the content of the compound represented by the general formula (4) may be, but is not limited to, 1,000,000 ppb, may be 100,000 ppb, may be 10,000 ppb, or may be 5,000 ppb. The lower limit of the content of the compound represented by the general formula (4) may be 500 ppb, or may be 1,000 ppb. The upper limit of the content of the compound represented by the general formula (4') may be, but is not limited to, 1,000,000 ppb, may be 100,000 ppb, may be 10,000 ppb, or may be 5,000 ppb. The lower limit of the content of the compound represented by the general formula (4') may be 500 ppb, or may be 1,000 ppb.

$$(H—(CF_2)_7—COO)_p M^1 \qquad \text{General Formula (4)}$$

wherein $M^1$ is H, a metal atom, $NR^5_4$, imidazolium optionally having a substituent, pyridinium optionally having a substituent, or phosphonium optionally having a substituent; and p is 1 or 2.

$$(H—(CF_2)_8—COO)_p M^1 \qquad \text{General Formula (4')}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains a compound represented by the following general formula (5) in an amount of 100 ppb or more based on the fluoropolymer. The upper limit of the content of the compound represented by the general formula (5) may be, but is not limited to, 1,000,000 ppb, may be 100,000 ppb, may be 10,000 ppb, or may be 5,000 ppb. The lower limit of the content of the compound represented by the general formula (5) may be 500 ppb, or may be 1,000 ppb.

$$(H—(CF_2)_{13}—COO)_p M^1 \qquad \text{General Formula (5)}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains a compound represented by the following general formula (5') in an amount of 100 ppb or more based on the fluoropolymer. The upper limit of the content of the compound represented by the general formula (5') may be, but is not limited to, 1,000,000 ppb, may be 100,000 ppb, may be 10,000 ppb, or may be 5,000 ppb. The lower limit of the content of the compound represented by the general formula (5') may be 500 ppb, or may be 1,000 ppb.

$$(H—(CF_2)_{14}—COO)_p M^1 \qquad \text{General Formula (5')}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains a compound represented by the following general formula (5) in an amount of 100 ppb or more based on the fluoropolymer, and/or a compound represented by the following general formula (5') in an amount of 100 ppb or more based on the fluoropolymer. The upper limit of the content of the compound represented by the general formula (5) may be, but is not limited to, 1,000,000 ppb, may be 100,000 ppb, may be 10,000 ppb, or may be 5,000 ppb. The lower limit of the content of the compound represented by the general formula (5) may be 500 ppb, or may be 1,000 ppb. The upper limit of the content of the compound represented by the general formula (5') may be, but is not limited to, 1,000,000 ppb, may be 100,000 ppb, may be 10,000 ppb, or may be 5,000 ppb. The lower limit of the content of the compound represented by the general formula (5') may be 500 ppb, or may be 1,000 ppb.

$$(H—(CF_2)_{13}—COO)_pM^1 \qquad \text{General Formula (5)}$$

wherein $M^1$ is H, a metal atom, $NR^5_4$, imidazolium optionally having a substituent, pyridinium optionally having a substituent, or phosphonium optionally having a substituent; and p is 1 or 2.

$$(H—(CF_2)_{14}—COO)_pM^1 \qquad \text{General Formula (5')}$$

wherein $M^1$ is H, a metal atom, $NR^5_4$, imidazolium optionally having a substituent, pyridinium optionally having a substituent, or phosphonium optionally having a substituent; and p is 1 or 2.

When the composition of the present invention is in the form of an aqueous dispersion, the content of the compound represented by the following general formula (4), (4'), (5), or (5') may be within the following range.

Further, a nonionic surfactant may be added to the aqueous dispersion in order to enhance the stability thereof. The nonionic surfactant may be any conventionally known nonionic surfactant.

In an embodiment of the present invention, the composition contains a compound represented by the following general formula (4) in an amount of 1,000 ppb or less based on the fluoropolymer and contains a nonionic surfactant in an amount of 1% by mass or more. The upper limit value of the content of the nonionic surfactant is, for example, preferably 10% by mass. The content of the compound represented by the general formula (4) is more preferably 500 ppb or less, still more preferably 100 ppb or less, particularly preferably 25 ppb or less, further preferably 15 ppb or less, and further preferably 10 ppb or less. The lower limit thereof may be, but is not limited to, 1 ppb.

$$(H—(CF_2)_7—COO)_pM^1 \qquad \text{General Formula (4)}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains a compound represented by the following general formula (4') in an amount of 1,000 ppb or less based on the fluoropolymer and contains a nonionic surfactant in an amount of 1% by mass or more. The upper limit value of the content of the nonionic surfactant is, for example, preferably 10% by mass. The content of the compound represented by the general formula (4') is more preferably 500 ppb or less, still more preferably 100 ppb or less, particularly preferably 25 ppb or less, further preferably 15 ppb or less, and further preferably 10 ppb or less. The lower limit thereof may be, but is not limited to, 1 ppb.

$$(H—(CF_2)_8—COO)_pM^1 \qquad \text{General Formula (4')}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains at least one of a compound represented by the following general formula (4) and a compound represented by the following general formula (4'), the content of the compound represented by the general formula (4) is 1,000 ppb or less based on the fluoropolymer, and the content of the compound represented by the general formula (4') is 1,000 ppb or less based on the fluoropolymer, and contains a nonionic surfactant in an amount of 1% by mass or more. The upper limit value of the content of the nonionic surfactant is, for example, preferably 10% by mass. The content of the compound represented by the general formula (4) is more preferably 500 ppb or less, still more preferably 100 ppb or less, particularly preferably 25 ppb or less, further preferably 15 ppb or less, and further preferably 10 ppb or less. The lower limit of the content of the compound represented by the general formula (4) may be, but is not limited to, 0 ppb or 1 ppb. The content of the compound represented by the general formula (4') is more preferably 500 ppb or less, still more preferably 100 ppb or less, particularly preferably 25 ppb or less, further preferably 15 ppb or less, and further preferably 10 ppb or less. The lower limit of the content of the compound represented by the general formula (4') may be, but is not limited to, 0 ppb or 1 ppb.

$$(H—(CF_2)_7—COO)_pM^1 \qquad \text{General Formula (4)}$$

wherein $M^1$ is H, a metal atom, $NR^5_4$, imidazolium optionally having a substituent, pyridinium optionally having a substituent, or phosphonium optionally having a substituent; and p is 1 or 2.

$$(H—(CF_2)_8—COO)_pM^1 \qquad \text{General Formula (4')}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains a compound represented by the following general formula (5) in an amount of 1,000 ppb or less based on the fluoropolymer and contains a nonionic surfactant in an amount of 1% by mass or more. The upper limit value of the content of the nonionic surfactant is, for example, preferably 10% by mass. The content of the compound represented by the general formula (5) is more preferably 500 ppb or less, still more preferably 100 ppb or less, particularly preferably 25 ppb or less, further preferably 15 ppb or less, and further preferably 10 ppb or less. The lower limit thereof may be, but is not limited to, 1 ppb.

$$(H—(CF_2)_{13}—COO)_pM^1 \qquad \text{General Formula (5)}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains a compound represented by the following general formula (5') in an amount of 1,000 ppb or less based on the fluoropolymer and contains a nonionic surfactant in an amount of 1% by mass or more. The upper limit value of the content of the nonionic surfactant is, for example, preferably 10% by mass. The content of the compound represented by the general formula (5') is more preferably 500 ppb or less, still more preferably 100 ppb or less, particularly preferably 25 ppb or less, further preferably 15 ppb or less, and further preferably 10 ppb or less. The lower limit thereof may be, but is not limited to, 1 ppb.

$$(H-(CF_2)_{14}-COO)_pM^1 \qquad \text{General Formula (5')}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains at least one of a compound represented by the following general formula (5) and a compound represented by the following general formula (5'), the content of the compound represented by the general formula (5) is 1,000 ppb or less based on the fluoropolymer, and the content of the compound represented by the general formula (5') is 1,000 ppb or less based on the fluoropolymer, and contains a nonionic surfactant in an amount of 1% by mass or more. The upper limit value of the content of the nonionic surfactant is, for example, preferably 10% by mass. The content of the compound represented by the general formula (5) is more preferably 500 ppb or less, still more preferably 100 ppb or less, particularly preferably 25 ppb or less, further preferably 15 ppb or less, and further preferably 10 ppb or less. The lower limit of the content of the compound represented by the general formula (5) may be, but is not limited to, 0 ppb or 1 ppb. The content of the compound represented by the general formula (5') is more preferably 500 ppb or less, still more preferably 100 ppb or less, particularly preferably 25 ppb or less, further preferably 15 ppb or less, and further preferably 10 ppb or less. The lower limit of the content of the compound represented by the general formula (5') may be, but is not limited to, 0 ppb or 1 ppb.

$$(H-(CF_2)_{13}-COO)_pM^1 \qquad \text{General Formula (5)}$$

wherein $M^1$ is H, a metal atom, $NR^5_4$, imidazolium optionally having a substituent, pyridinium optionally having a substituent, or phosphonium optionally having a substituent; and p is 1 or 2.

$$(H-(CF_2)_{14}-COO)_pM^1 \qquad \text{General Formula (5')}$$

wherein $M^1$ is H, a metal atom, $NR^5_4$, imidazolium optionally having a substituent, pyridinium optionally having a substituent, or phosphonium optionally having a substituent; and p is 1 or 2.

In production of the fluoropolymer using a hydrocarbon surfactant, the resulting fluoropolymer powder may contain a compound represented by the following general formula (1), (2), (4), (4'), (5), or (5'). When the composition of the present invention is in the form of a powder, the content of the compound represented by the general formula (1), (2), (4), (4'), (5), or (5') may be within the following range.

In an embodiment of the present invention, the composition contains a compound represented by the following general formula (4) in an amount of 1,000 ppb or less based on the fluoropolymer. The content of the compound represented by the general formula (4) is more preferably 500 ppb or less, still more preferably 100 ppb or less, particularly preferably 25 ppb or less, further preferably 15 ppb or less, and further preferably 10 ppb or less. The lower limit thereof may be, but is not limited to, 1 ppb.

$$(H-(CF_2)_7-COO)_pM^1 \qquad \text{General Formula (4)}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains a compound represented by the following general formula (4') in an amount of 1,000 ppb or less based on the fluoropolymer. The content of the compound represented by the general formula (4') is more preferably 500 ppb or less, still more preferably 100 ppb or less, particularly preferably 25 ppb or less, further preferably 15 ppb or less, and further preferably 10 ppb or less. The lower limit thereof may be, but is not limited to, 1 ppb.

$$(H-(CF_2)_8-COO)_pM^1 \qquad \text{General Formula (4')}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains at least one of a compound represented by the following general formula (4) and a compound represented by the following general formula (4'), the content of the compound represented by the general formula (4) is 1,000 ppb or less based on the fluoropolymer, and the content of the compound represented by the general formula (4') is 1,000 ppb or less based on the fluoropolymer. The content of the compound represented by the general formula (4) is more preferably 500 ppb or less, still more preferably 100 ppb or less, particularly preferably 25 ppb or less, further preferably 15 ppb or less, and further preferably 10 ppb or less. The lower limit of the content of the compound represented by the general formula (4) may be, but is not limited to, 0 ppb or 1 ppb. The content of the compound represented by the general formula (4') is more preferably 500 ppb or less, still more preferably 100 ppb or less, particularly preferably 25 ppb or less, further preferably 15 ppb or less, and further preferably 10 ppb or less. The lower limit of the content of the compound represented by the general formula (4') may be, but is not limited to, 0 ppb or 1 ppb.

$$(H-(CF_2)_7-COO)_pM^1 \qquad \text{General Formula (4)}$$

wherein $M^1$ is H, a metal atom, $NR^5_4$, imidazolium optionally having a substituent, pyridinium optionally having a substituent, or phosphonium optionally having a substituent; and p is 1 or 2.

$$(H-(CF_2)_8-COO)_pM^1 \qquad \text{General Formula (4')}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains a compound represented by the following general formula (5) in an amount of 1,000 ppb or less based on the fluoropolymer. The content of the compound represented by the general formula (5) is more preferably 500 ppb or less, still more preferably 100 ppb or less, particularly preferably 25 ppb or less, further preferably 15 ppb or less, and further preferably 10 ppb or less. The lower limit thereof may be, but is not limited to, 1 ppb.

$$(H-(CF_2)_{13}-COO)_pM^1 \qquad \text{General Formula (5)}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains a compound represented by the following general formula (5') in an amount of 1,000 ppb or less based on the fluoropolymer. The content of the compound represented by the general formula (5') is more preferably 500 ppb or less, still more preferably 100 ppb or less, particularly preferably 25 ppb or less, further preferably 15 ppb or less, and further preferably 10 ppb or less. The lower limit thereof may be, but is not limited to, 1 ppb.

$$(H\!-\!(CF_2)_{14}\!-\!COO)_p M^1 \qquad \text{General Formula (5')}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition contains at least one of a compound represented by the following general formula (5) and a compound represented by the following general formula (5'), the content of the compound represented by the general formula (5) is 1,000 ppb or less based on the fluoropolymer, and the content of the compound represented by the general formula (5') is 1,000 ppb or less based on the fluoropolymer. The content of the compound represented by the general formula (5) is more preferably 500 ppb or less, still more preferably 100 ppb or less, particularly preferably 25 ppb or less, further preferably 15 ppb or less, and further preferably 10 ppb or less. The lower limit of the content of the compound represented by the general formula (5) may be, but is not limited to, 0 ppb or 1 ppb. The content of the compound represented by the general formula (5') is more preferably 500 ppb or less, still more preferably 100 ppb or less, particularly preferably 25 ppb or less, further preferably 15 ppb or less, and further preferably 10 ppb or less. The lower limit of the content of the compound represented by the general formula (5') may be, but is not limited to, 0 ppb or 1 ppb.

$$(H\!-\!(CF_2)_{13}\!-\!COO)_p M^1 \qquad \text{General Formula (5)}$$

wherein $M^1$ is H, a metal atom, $NR^5_4$, imidazolium optionally having a substituent, pyridinium optionally having a substituent, or phosphonium optionally having a substituent; and p is 1 or 2.

$$(H\!-\!(CF_2)_{14}\!-\!COO)_p M^1 \qquad \text{General Formula (5')}$$

wherein $M^1$ is H, a metal atom, $NR^5_4$, imidazolium optionally having a substituent, pyridinium optionally having a substituent, or phosphonium optionally having a substituent; and p is 1 or 2.

In an embodiment of the present invention, the composition is a composition in which, among compounds represented by the following general formula (2), the content of the compound in which n is 4 is 1,000 ppb or less based on the fluoropolymer, the content of the compound in which n is 5 is 1,000 ppb or less based on the fluoropolymer, the content of the compound in which n is 6 is 1,000 ppb or less based on the fluoropolymer, the content of the compound in which n is 7 is 1,000 ppb or less based on the fluoropolymer, the content of the compound in which n is 8 is 1,000 ppb or less based on the fluoropolymer, the content of the compound in which n is 9 is 1,000 ppb or less based on the fluoropolymer, the content of the compound in which n is 10 is 1,000 ppb or less based on the fluoropolymer, the content of the compound in which n is 11 is 1,000 ppb or less based on the fluoropolymer, the content of the compound in which n is 12 is 1,000 ppb or less based on the fluoropolymer, the content of the compound in which n is 13 is 1,000 ppb or less based on the fluoropolymer, the content of the compound in which n is 14 is 1,000 ppb or less based on the fluoropolymer, the content of the compound in which n is 15 is 1,000 ppb or less based on the fluoropolymer, the content of the compound in which n is 16 is 1,000 ppb or less based on the fluoropolymer, the content of the compound in which n is 17 is 1,000 ppb or less based on the fluoropolymer, the content of the compound in which n is 18 is 1,000 ppb or less based on the fluoropolymer, the content of the compound in which n is 19 is 1,000 ppb or less based on the fluoropolymer, and the content of the compound in which n is 20 is 1,000 ppb or less based on the fluoropolymer.

$$(H\!-\!(CF_2)_n\!-\!SO_3)_q M^2 \qquad \text{General Formula (2)}$$

(wherein n is 4 to 20; $M^2$ is H, a metal atom, $NR^5_4$, imidazolium optionally having a substituent, pyridinium optionally having a substituent, or phosphonium optionally having a substituent; and q is 1 or 2.

The content of each of the compounds in which n is 4 to 20 is more preferably 500 ppb or less, still more preferably 100 ppb or less, particularly preferably 25 ppb or less, further preferably 15 ppb or less, and further preferably 10 ppb or less. The lower limit thereof may be, but is not limited to, 0 ppb or 1 ppb. In the composition of the present invention, the content of any of the compounds represented by the general formula (2) may be 0 ppb.

In an embodiment of the present invention, the composition is a composition in which, among compounds represented by the following general formula (1), the content of the compound in which m is 3 is 1,000 ppb or less based on the fluoropolymer, the content of the compound in which m is 4 is 1,000 ppb or less based on the fluoropolymer, the content of the compound in which m is 5 is 1,000 ppb or less based on the fluoropolymer, the content of the compound in which m is 6 is 1,000 ppb or less based on the fluoropolymer, the content of the compound in which m is 7 is 1,000 ppb or less based on the fluoropolymer, the content of the compound in which m is 8 is 1,000 ppb or less based on the fluoropolymer, the content of the compound in which m is 9 is 1,000 ppb or less based on the fluoropolymer, the content of the compound in which m is 10 is 1,000 ppb or less based on the fluoropolymer, the content of the compound in which m is 11 is 1,000 ppb or less based on the fluoropolymer, the content of the compound in which m is 12 is 1,000 ppb or less based on the fluoropolymer, the content of the compound in which m is 13 is 1,000 ppb or less based on the fluoropolymer, the content of the compound in which m is 14 is 1,000 ppb or less based on the fluoropolymer, the content of the compound in which m is 15 is 1,000 ppb or less based on the fluoropolymer, the content of the compound in which m is 16 is 1,000 ppb or less based on the fluoropolymer, the content of the compound in which m is 17 is 1,000 ppb or less based on the fluoropolymer, the content of the compound in which m is 18 is 1,000 ppb or less based on the fluoropolymer, and the content of the compound in which m is 19 is 1,000 ppb or less based on the fluoropolymer.

$$(H\!-\!(CF_2)_m\!-\!COO)_p M^1 \qquad \text{General Formula (1)}$$

wherein m is 3 to 19; $M^1$ is H, a metal atom, $NR^5_4$, imidazolium optionally having a substituent, pyridinium optionally having a substituent, or phosphonium optionally having a substituent; and p is 1 or 2.

The content of each of the compounds in which m is 3 to 19 is more preferably 500 ppb or less, still more preferably 100 ppb or less, particularly preferably 25 ppb or less, further preferably 15 ppb or less, and further preferably 10 ppb or less. The lower limit thereof may be, but is not limited to, 0 ppb or 1 ppb. In an embodiment of the present invention, the composition contains any of the compounds represented by the general formula (1).

In the general formula (1), (2), (3), (4), (4'), (5), or (5'), four $R^5$s may be the same or different from each other. $R^5$ is preferably H or an organic group having 1 to 10 carbon atoms, and more preferably H or an organic group having 1 to 4 carbon atoms.

In an embodiment of the present invention, the composition may be in the form of a powder, and when the composition of the present invention is in the form of a powder, the powder preferably has an average particle size of 0.5 to 2,000 μm. The lower limit of the average particle size is more preferably 1 μm, and the upper limit thereof is more preferably 1,000 μm, and still more preferably 800 μm.

The average particle size as used herein for low-molecular-weight PTFE is determined as follows. That is, the particle size distribution is determined using a laser diffraction particle size distribution measurement apparatus (manufactured by Japan Laser Corp.) at a pressure of 0.1 MPa and a measurement time of 3 seconds without cascade impaction. The value corresponding to 50% of the cumulative volume in the resulting particle size distribution is taken as the average particle size.

For high-molecular-weight PTFE, the average particle size is a value determined in conformity with JIS K 6891.

The powder preferably has a tone L* of 50 or lower after the firing. The tone L* is more preferably 45 or lower, still more preferably 40 or lower, particularly preferably 35 or lower, and further preferably 30 or lower.

A sample for measurement of tone L* is obtained by molding 4.0 g of PTFE powder into a disc-shaped PTFE molded body having an inner diameter of 28.6 mm and a thickness of about 4 mm.

The tone L* of the powder is determined using a color difference meter (CIELAB color scale) in conformity with JIS Z 8781-4.

The firing is performed by heat treatment for 10 minutes in an electric furnace heated to 385° C.

The composition of the present invention preferably has a tone change ΔL* of 70% or higher before and after fluorination. The tone change ΔL* is more preferably 80 or higher, and still more preferably 90 or higher.

The tone change ΔL* is defined by the following formula:

$$\Delta L^*(\%)=(L^*_t-L^*_i)/(L^*_{Std}-L^*_i)\times100$$

$L^*_i$ is the initial tone, and is a measured value L* in the CIELAB scale of PTFE before the fluorination.

$L^*_t$ is the tone after the treatment, and is a measured value L* in the CIELAB scale of PTFE after the fluorination.

$$L^*_{Std}=87.3$$

The fluorination is performed by continuously introducing a gas mixture (fluorine/nitrogen (ratio by volume)=20/80) obtained by diluting fluorine gas ($F_2$) as a fluorine radical source with nitrogen gas into a reactor heated to 150° C. or higher under the atmospheric pressure at a flow rate of about 50 cc/min for 480 minutes (8 hours).

In the composition of the present invention, the content of the compound represented by the general formula (1), (2), (3), (4), (4'), (5), or (5') is a value determined by liquid chromatography-mass spectrometry as described in Examples to be described later.

In the composition of the present invention, the content of the compound represented by the general formula (1), (2), (3), (4), (4'), (5), or (5') is a value determined by liquid chromatography-mass spectrometry as described in Examples to be described later.

In the composition of the present invention, the fluoropolymer is preferably one obtained by polymerization using a hydrocarbon surfactant.

The composition of the present invention may contain a hydrocarbon surfactant. Examples of the hydrocarbon surfactant include the carboxylic acid type hydrocarbon-containing surfactant described above.

The composition may further contain conventionally known additives such as pigments and fillers in addition to the fluoropolymer and the hydrocarbon surfactant. The additives may be used to an extent that does not inhibit the effects of the present invention.

The composition of the present invention may be produced by using a carboxylic acid-based surfactant or by combining a carboxylic acid-based surfactant with a specific polymerization initiator.

Examples of the carboxylic acid-based surfactant include the carboxylic acid type hydrocarbon-containing surfactant described above.

Examples of the specific polymerization initiator include water-soluble radical polymerization initiators and redox initiators.

The water-soluble radical polymerization initiator may be a known water-soluble peroxide, and examples thereof include ammonium salts, potassium salts, and sodium salts of persulfuric acid and percarbonic acid, t-butyl permaleate, and t-butyl hydroperoxide, and the use amount thereof may be 0.1 to 20 times that of peroxide.

For example, in a case where the polymerization is performed at a low temperature of 30° C. or lower, the polymerization initiator used is preferably a redox initiator obtained by combining an oxidizing agent and a reducing agent. Examples of the oxidizing agent include persulfates, organic peroxides, potassium permanganate, manganese triacetate, and ammonium cerium nitrate. Examples of the reducing agent include bromates, diimines, and oxalic acid. Examples of the persulfates include ammonium persulfate and potassium persulfate. In order to increase the decomposition rate of the initiator, the combination of the redox initiator may preferably contain a copper salt or an iron salt. An example of the copper salt is copper(II) sulfate and an example of the iron salt is iron(II) sulfate.

Examples of the redox initiator include potassium permanganate/oxalic acid, manganese triacetate/oxalic acid, cerium ammonium nitrate/oxalic acid, and bromates, and potassium permanganate/oxalic acid is preferred. In the case of using a redox initiator, either an oxidizing agent or a reducing agent may be charged into a polymerization tank in advance, followed by adding the other continuously or intermittently thereto to initiate the polymerization. For example, in the case of using potassium permanganate/oxalic acid, preferably, oxalic acid is charged into a polymerization tank and potassium permanganate is continuously added thereto.

The composition of the present invention is preferably substantially free from a fluorine-containing surfactant. In the composition of the present invention, the term "substantially free from fluorine-containing surfactant" means that the fluorine-containing surfactant is 10 ppm or less based on the fluoropolymer. The content of the fluorine-containing surfactant is preferably 1 ppm or less, more preferably 100 ppb or less, still more preferably 10 ppb or less, further preferably 1 ppb or less, and particularly preferably the fluorine-containing surfactant is below the detection limit as measured by liquid chromatography-mass spectrometry (LC/MS/MS).

The amount of the fluorine-containing surfactant can be determined by a known method. For example, it can be determined by LC/MS/MS analysis. First, any of the obtained aqueous dispersion, the powder, the molded body, the pellets, a fluoropolymer obtained by refining the molded body, or a fluoropolymer obtained by refining the pellets is extracted into an organic solvent of methanol, and the extracted liquid is subjected to LC/MS/MS analysis. Then, the molecular weight information is extracted from the LC/MS/MS spectrum to confirm agreement with the structural formula of the candidate surfactant.

Thereafter, aqueous solutions having five or more different concentration levels of the confirmed surfactant are prepared, and LC/MS/MS analysis is performed for each concentration level to prepare a calibration curve with the area.

The obtained aqueous dispersion, powder, or powder obtained by crushing a molded body is subjected to Soxhlet extraction with methanol, and the extracted liquid is subjected to LC/MS/MS analysis for quantitative measurement.

The fluorine-containing surfactant is the same as those exemplified in the production method of the present invention. For example, the surfactant may be a fluorine atom-containing surfactant having, in the portion excluding the anionic group, 20 or less carbon atoms in total, may be a fluorine-containing surfactant having an anionic moiety having a molecular weight of 800 or less, and may be a fluorine-containing surfactant having a Log POW of 3.5 or less.

Examples of the anionic fluorine-containing surfactant include compounds represented by the general formula (N⁰), and specific examples thereof include compounds represented by the general formula (N¹), compounds represented by the general formula (N²), compounds represented by the general formula (N³), compounds represented by the general formula (N⁴), and compounds represented by the general formula (N⁵). More specific examples thereof include a perfluorocarboxylic acid (I) represented by the general formula (I), an ω-H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω-H perfluorosulfonic acid (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), and a compound (XII) represented by the general formula (XII).

In an embodiment of the present invention, a molded body contains the composition. The molded body is preferably a stretched body. Examples of the stretched body include, but are not limited to, yarns, tubes, tapes, and films (e.g., uniaxially stretched films and biaxially stretched films).

The composition of the present invention can also be produced by preparing the fluoropolymer by the method for producing a fluoropolymer described above and then treating the fluoropolymer by the above-described method or the like.

The stretched body is a porous body having a high porosity, and can suitably be used as a filter material for a variety of microfiltration filters such as air filters and chemical filters, a support member for polymer electrolyte films, and the like.

The stretched body is also useful as a material of products used in the fields of textiles, of medical treatment, of electrochemistry, of sealants, of air filters, of ventilation/internal pressure adjustment, of liquid filters, and of consumer goods.

The following provides examples of specific applications.

Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

Sealant Field

Examples of the applications in this field include gaskets, packings, pump diaphragms, pump tubes, and sealants for aircraft.

Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

Ventilation/Internal Pressure Adjustment Field

Examples of the applications in this field include materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.

Liquid Filter Field

Examples of the applications in this field include liquid filters for semiconductors (for production of semiconductors), hydrophilic PTFE filters (for production of semiconductors), filters for chemicals (for chemical treatment), filters for pure water production lines (for production of pure water), and back-washing liquid filters (for treatment of industrial discharge water).

Consumer Goods Field

Examples of the applications in this field include clothes, cable guides (movable wires for motorcycles), clothes for motor cyclists, cast liners (medical supporters), filters for cleaners, bagpipes (musical instrument), cables (signal cables for guitars, etc.), and strings (for string instrument).

Textile Field

Examples of the applications in this field include PTFE fibers (fiber materials), machine threads (textiles), weaving yarns (textiles), and ropes.

Medical Treatment Field

Examples of the applications in this field include implants (stretched articles), artificial blood vessels, catheters, general surgical operations (tissue reinforcing materials), products for head and neck (dura mater alternatives), oral health (tissue regenerative medicine), and orthopedics (bandages).

EXAMPLES

The present invention is described with reference to Examples, but the present invention is not intended to be limited by these Examples.

Synthesis Example 1

A mixture of 10-undecenoic acid (4.7 g), 1,4-benzoquinone (0.63 g), DMF (50 mL), water (5 mL), and $PdCl_2$ (0.09 g) was heated and stirred at 90° C. for 12 hours.

The solvent was then distilled off under reduced pressure. The resulting residue was mixed with a solution of sodium methoxide in methanol and the mixture was filtered. The solid residue was mixed with hydrochloric acid and the mixture was extracted with ethyl acetate. The extract was dried over sodium sulfate, and the solvent was distilled off under reduced pressure. The residue was purified by column chromatography to give 10-oxoundecanoic acid (3.2 g).

The spectrum data of the resulting 10-oxoundecanoic acid is shown below.

$^1$H-NMR ($CDCl_3$) δ ppm: 1.27-1.37 (m, 8H), 1.51-1.60 (m, 4H), 2.11 (s, 3H), 2.29-2.42 (m, 4H)

To 1.0 M KOH water, 10-oxoundecanoic acid (1.8 g) was added, and the water was distilled off, whereby potassium 10-oxoundecanoate (2.2 g) was obtained.

The spectrum data of the resulting potassium 10-oxoundecanoate (hereinafter referred to as surfactant A) is shown below.

$^1$H-NMR ($CDCl_3$) δ ppm: 1.04 (m, 8H), 1.30-1.32 (m, 4H), 1.89-2.01 (m, 5H), 2.27-2.33 (t, J=7.6, 4H)

The parameters in the Examples and Comparative Examples were determined by the following methods.

Content of Specific Surfactant Containing Fluorine

The following describes the method of measuring the contents of compounds represented by the following general formulas (1) and (2).

$$(H—(CF_2)_m—COO)_p M^1 \qquad \text{General Formula (1)}$$

wherein m is 3 to 19; $M^1$ is H, a metal atom, $NR^5{}_4$, imidazolium optionally having a substituent, pyridinium optionally having a substituent, or phosphonium optionally having a substituent; and p is 1 or 2.

$$(H—(CF_2)_n—SO_3)_q M^2 \qquad \text{General Formula (2)}$$

wherein n is 4 to 20; $M^2$ is H, a metal atom, $NR^5{}_4$, imidazolium optionally having a substituent, pyridinium optionally having a substituent, or phosphonium optionally having a substituent; and q is 1 or 2.

(Method of Measuring Content of Compound Represented by General Formula (1))

Extraction from Powder

To 10 g (12.6 mL) of methanol, 1 g of powder was added and ultrasonication was performed on the mixture for 60 minutes, and then the supernatant containing the compound represented by the general formula (1) was extracted.

Extraction from Aqueous Dispersion

The amount of the solid in the aqueous dispersion was determined, and the aqueous dispersion in an amount equivalent to 0.5 g of the solid PTFE was put into a 100-mL screw tube. Thereafter, water and methanol were added thereto such that the extraction solvent was to be 40 g (43.14 mL) having a water/methanol ratio by vol % of 50/50 including the water originally contained in the aqueous dispersion. Thereafter, the mixture was well shaken until coagulation occurred. The solid was removed and the liquid phase was centrifuged at 4,000 rpm for one hour, and then the supernatant containing the compound represented by the general formula (1) was extracted.

Measurement of Content of Compound Represented by General Formula (1) Contained in Extract The content of the compound represented by the general formula (1) contained in the extract was determined by conversion in terms of perfluorooctanoic acid equivalent.

Calibration Curve of Perfluorooctanoic Acid

Five methanol standard solutions of perfluorooctanoic acid having known concentrations within 1 ng/mL to 100 ng/mL were prepared, and subjected to analysis using a liquid chromatograph-mass spectrometer (Waters, LC-MS ACQUITY UPLC/TQD). Using the first order approximation from the respective sample concentrations and the peak integral values, the values a and b were determined by the relational formula (1):

$$A = a \times X + b \tag{1}$$

A: peak area of perfluorooctanoic acid

X: concentration (ng/mL) of perfluorooctanoic acid

Measurement Equipment Configuration and LC-MS Measurement Conditions

TABLE 1

| LC unit | |
| --- | --- |
| Apparatus | Acquity UPLC manufactured by Waters |
| Column | Acquity UPLC manufactured by Waters BEH C18 1.7 mm(2.1 × 50 mm) |
| Mobile phases | A $CH_3CN$ |
| | B 20 mM $CH_3COONH_4/H_2O$ |
| | 0→1.5 min    A:B = 10:90 |
| | 1.5→8.5 min    A:B = 10:90 → A:B = 90:10 |
| |            Linear gradient |
| | 8.5→10 min    A:B = 90:10 |
| Flow rate | 0.4 mL/min |
| Column temperature | 40° C. |
| Sample injection volume | 5 µL |

| MS unit | |
| --- | --- |
| Apparatus | TQ Detector |
| Measurement mode | MRM(Multiple Reaction Monitoring) |
| Ionization method | Electrospray ionization negative mode |

MRM Measurement Parameters

TABLE 2

| Compound | Precursor | Product |
| --- | --- | --- |
| perfluorooctanoic acid | 413 | 369 |

Content of compounds represented by general formula (1) having 4 or more and 20 or less carbon atoms contained in extract Using a liquid chromatograph-mass spectrometer, compounds represented by the general formula (1) having 4 or more and 20 or less carbon atoms were subjected to analysis. For the extracted liquid phase, the peak areas of the compounds represented by the general formula (1) having the respective numbers of carbon atoms were determined by MRM.

MRM Measurement Parameters

TABLE 3

| Compound | Number of carbon atoms | Precursor | Product |
|---|---|---|---|
| (H—(CF$_2$)$_3$—COO)M | 4 | 195 | 131 |
| (H—(CF$_2$)$_4$—COO)M | 5 | 245 | 181 |
| (H—(CF$_2$)$_5$—COO)M | 6 | 295 | 231 |
| (H—(CF$_2$)$_6$—COO)M | 7 | 345 | 281 |
| (H—(CF$_2$)$_7$—COO)M | 8 | 395 | 331 |
| (H—(CF$_2$)$_8$—COO)M | 9 | 445 | 381 |
| (H—(CF$_2$)$_9$—COO)M | 10 | 495 | 431 |
| (H—(CF$_2$)$_{10}$—COO)M | 11 | 545 | 481 |
| (H—(CF$_2$)$_{11}$—COO)M | 12 | 595 | 531 |
| (H—(CF$_2$)$_{12}$—COO)M | 13 | 645 | 581 |
| (H—(CF$_2$)$_{13}$—COO)M | 14 | 695 | 631 |
| (H—(CF$_2$)$_{14}$—COO)M | 15 | 745 | 681 |
| (H—(CF$_2$)$_{15}$—COO)M | 16 | 795 | 731 |
| (H—(CF$_2$)$_{16}$—COO)M | 17 | 845 | 781 |
| (H—(CF$_2$)$_{17}$—COO)M | 18 | 895 | 831 |
| (H—(CF$_2$)$_{18}$—COO)M | 19 | 945 | 881 |
| (H—(CF$_2$)$_{19}$—COO)M | 20 | 995 | 931 |

The content of the compound represented by the general formula (1) having (m+1) carbon atoms in the extract was calculated by the formula (3). The values a and b in the formula (3) were determined by the formula (1):

$$XCm = ((ACm-b)/a) \times ((50 \times m + 45)/413) \qquad (3)$$

XCm: content (ng/mL) of compound represented by general formula (1) having (m+1) carbon atoms in extract solution ACm: peak area of compound represented by general formula (1) having (m+1) carbon atoms in extract solution The quantification limit in this measurement is 1 ng/mL.

Content of Compound Represented by General Formula (1) Having (m+1) Carbon Atoms Contained in Powder The content of the compound represented by the general formula (1) having (m+1) carbon atoms contained in the powder was determined by the formula (4):

$$YCm = XCm \times 12.6 \qquad (4)$$

YCm: content (based on fluoropolymer) of compound represented by general formula (1) having (m+1) carbon atoms contained in powder Content of Compound Represented by General Formula (1) Having (m+1) Carbon Atoms Contained in Aqueous Dispersion The content of the compound represented by the general formula (1) having (m+1) carbon atoms contained in the aqueous dispersion was determined by the formula (5):

$$ZCm = XCm \times 86.3 \qquad (5)$$

ZCm: content (based on fluoropolymer) of compound represented by general formula (1) having (m+1) carbon atoms contained in aqueous dispersion (Method of Measuring Content of Compound Represented by General Formula (2))

Extraction from Powder

To 10 g (12.6 mL) of methanol, 1 g of powder was added and ultrasonication was performed on the mixture for 60 minutes, and then the supernatant containing the compound represented by the general formula (2) was extracted.

Extraction from Aqueous Dispersion

The amount of the solid in the aqueous dispersion was determined, and the aqueous dispersion in an amount equivalent to 0.5 g of the solid PTFE was put into a 100-mL screw tube. Thereafter, water and methanol were added thereto such that the extraction solvent was to be 40 g (43.14 mL) having a water/methanol ratio by vol % of 50/50 including the water originally contained in the aqueous dispersion. Thereafter, the mixture was well shaken until coagulation occurred. The solid was removed and the liquid phase was centrifuged at 4,000 rpm for one hour, and then the supernatant containing the compound represented by the general formula (2) was extracted.

Measurement of Content of Compound Represented by General Formula (2) Contained in Extract The content of the compound represented by the general formula (2) contained in the extract was determined by conversion in terms of perfluorooctanesulfonic acid equivalent.

Calibration Curve of Perfluorooctanesulfonic Acid

Five methanol standard solutions of perfluorooctanesulfonic acid having known concentrations within 1 ng/mL to 100 ng/mL were prepared, and subjected to analysis using a liquid chromatograph-mass spectrometer (Waters, LC-MS ACQUITY UPLC/TQD). Using the first order approximation from the respective sample concentrations and the peak integral values, the values a and b were determined by the following relational formula (1):

$$A = a \times X + b \qquad (1)$$

A: peak area of perfluorooctanesulfonic acid
X: concentration (ng/mL) of perfluorooctanesulfonic acid Measurement Equipment Configuration and LC-MS Measurement Conditions

TABLE 4

| LC unit | |
|---|---|
| Apparatus | Acquity UPLC manufactured by Waters |
| Column | Acquity UPLC manufactured by Waters BEH C18 1.7 mm(2.1 × 50 mm) |
| Mobile phases | A CH$_3$CN |
| | B 20 mM CH$_3$COONH$_4$/H$_2$O |
| | 0→1.5 min    A:B = 10:90 |
| | 1.5→8.5 min    A:B = 10:90 → A:B = 90:10 |
| | Linear gradient |
| | 8.5→10 min    A:B = 90:10 |
| Flow rate | 0.4 mL/min |
| Column temperature | 40° C. |
| Sample injection volume | 5 μL |

| MS unit | |
|---|---|
| Apparatus | TQ Detector |
| Measurement mode | MRM(Multiple Reaction Monitoring) |
| Ionization method | Electrospray ionization negative mode |

MRM Measurement Parameters

TABLE 5

| Compound | Precursor | Product |
|---|---|---|
| perfluorooctanesulfonic acid | 499 | 99 |

Content of Compounds Represented by General Formula (2) Having 4 or More and 20 or Less Carbon Atoms Contained in Extract Using a liquid chromatograph-mass spectrometer, compounds represented by the general formula (2) having 4 or more and 20 or less carbon atoms were subjected to analysis. For the extracted liquid phase, the peak areas of the compounds represented by the general formula (2) having the respective numbers of carbon atoms were determined by MRM.

MRM Measurement Parameters

TABLE 6

| Compound | Number of carbon atoms | Precursor | Product |
|---|---|---|---|
| (H—(CF$_2$)$_4$—SO$_3$)M | 4 | 281 | 99 |
| (H—(CF$_2$)$_5$—SO$_3$)M | 5 | 331 | 99 |
| (H—(CF$_2$)$_6$—SO$_3$)M | 6 | 381 | 99 |
| (H—(CF$_2$)$_7$—SO$_3$)M | 7 | 431 | 99 |
| (H—(CF$_2$)$_8$—SO$_3$)M | 8 | 481 | 99 |
| (H—(CF$_2$)$_9$—SO$_3$)M | 9 | 531 | 99 |
| (H—(CF$_2$)$_{10}$—SO$_3$)M | 10 | 581 | 99 |
| (H—(CF$_2$)$_{11}$—SO$_3$)M | 11 | 631 | 99 |
| (H—(CF$_2$)$_{12}$—SO$_3$)M | 12 | 681 | 99 |
| (H—(CF$_2$)$_{13}$—SO$_3$)M | 13 | 731 | 99 |
| (H—(CF$_2$)$_{14}$—SO$_3$)M | 14 | 781 | 99 |
| (H—(CF$_2$)$_{15}$—SO$_3$)M | 15 | 831 | 99 |
| (H—(CF$_2$)$_{16}$—SO$_3$)M | 16 | 881 | 99 |
| (H—(CF$_2$)$_{17}$—SO$_3$)M | 17 | 931 | 99 |
| (H—(CF$_2$)$_{18}$—SO$_3$)M | 18 | 981 | 99 |
| (H—(CF$_2$)$_{19}$—SO$_3$)M | 19 | 1031 | 99 |
| (H—(CF$_2$)$_{20}$—SO$_3$)M | 20 | 1081 | 99 |

The content of the compound represented by the general formula (2) having n carbon atoms in the extract was calculated by the formula (3). The values a and b in the formula (3) were determined by the formula (1):

$$XSn=((ASn-b)/a)\times((50\times n+81)/499) \qquad (3)$$

XSn: content (ng/mL) of compound represented by general formula (2) having n carbon atoms in extract solution ASn: peak area of compound represented by general formula (2) having n carbon atoms in extract solution The quantification limit in this measurement is 1 ng/mL.

Content of Compound Represented by General Formula (2) Having n Carbon Atoms Contained in Powder The content of the compound represented by the general formula (2) having n carbon atoms contained in the powder was determined by the formula (4):

$$YSn=XSn\times12.6 \qquad (4)$$

YSn: content (based on fluoropolymer) of compound represented by general formula (2) having n carbon atoms contained in powder Content of Compound Represented by General Formula (2) Having n Carbon Atoms Contained in Aqueous Dispersion The content of the compound represented by the general formula (2) having n carbon atoms contained in the aqueous dispersion was determined by the formula (5):

$$ZSn=XSn\times86.3 \qquad (5)$$

ZSn: content (based on fluoropolymer) of compound represented by general formula (2) having n carbon atoms contained in aqueous dispersion Average Primary Particle Size The average particle size was determined by dynamic light scattering. A fluoropolymer aqueous dispersion with the fluoropolymer solid concentration being adjusted to about 1.0% by mass was prepared. The average primary particle size was determined from 70 measurement processes using ELSZ-1000S (manufactured by Otsuka Electronics Co., Ltd.) at 25° C. The refractive index of the solvent (water) was 1.3328 and the viscosity of the solvent (water) was 0.8878 mPa·s.

Solid Concentration of PTFE Aqueous Dispersion

In an air dryer, 1 g of PTFE aqueous dispersion was dried at a condition of 150° C. for 60 minutes, and the ratio of the mass of the non-volatile matter to the mass of the aqueous dispersion (1 g) was expressed by percentage and taken as the solid concentration thereof.

Peak Temperature

Regarding each of the PTFE powders obtained in Examples, a heat-of-fusion curve was drawn at a condition of a temperature-increasing rate of 10° C./min using a differential scanning calorimeter (DSC), and the temperature corresponding to the maximum value of the endothermic peak appearing in the heat-of-fusion curve was taken as the peak temperature thereof.

Content of Modifying Monomer

In order to determine the HFP content, a thin film disk was prepared by pressing the PTFE powder, and the infrared absorbance thereof was measured by FT-IR, and the value obtained by multiplying the ratio of absorbance at 982 cm$^{-1}$/absorbance at 935 cm$^{-1}$ by 0.3 was taken as the HFP content.

Standard Specific Gravity (SSG)

Using a sample molded in conformity with ASTM D4895-89, the SSG was determined by the water replacement method in conformity with ASTM D-792.

Mooney Viscosity (ML1+20 (140° C.)

The Mooney viscosity can be determined using a Mooney viscometer MV2000E manufactured by Alpha Technologies Inc. at 140° C. in conformity with JIS K 6300.

Example 1

To a glass autoclave having an internal volume of 1 L, 550 g of deionized degassed water, 30 g of paraffin wax, and 0.0145 g of the surfactant A were added. The reactor was sealed and the system was purged with nitrogen, so that oxygen was removed. The reactor was heated up to 70° C. and TFE was charged into the reactor such that the reactor was adjusted to 0.78 MPa. Then, 0.110 g of ammonium persulfate (APS) serving as a polymerization initiator was charged thereinto. TFE was charged so as to keep the reaction pressure constant at 0.78 MPa. When 50 g of TFE was charged, the stirring was stopped and the pressure was released until the reactor was adjusted to the atmospheric pressure. The aqueous dispersion was collected from the reactor and cooled so that the paraffin wax was separated, whereby a PTFE aqueous dispersion was obtained. The average primary particle size (volume average particle size) of the particles contained in the resulting PTFE aqueous dispersion was 216 nm. The solid content in the resulting PTFE aqueous dispersion was 8.2% by mass.

The resulting PTFE aqueous dispersion was dried at 150° C. for 18 hours.

The resulting PTFE resin had an SSG of 2.261. This demonstrates that the resulting PTFE was a high-molecular-weight PTFE.

Example 2

To an autoclave made of SUS with an internal volume of 6 L, 3,600 g of deionized degassed water, 180 g of paraffin wax, and 0.54 g of sodium laurate were added. The reactor was sealed and the system was purged with nitrogen, so that oxygen was removed. The reactor was heated up to 70° C. and TFE was filled into the reactor such that the reactor was adjusted to 2.76 MPa. Then, 0.62 g of ammonium persulfate (APS) and 1.488 g of disuccinic acid peroxide (DSP) serving as polymerization initiators were charged thereinto. TFE was charged so as to keep the reaction pressure constant at 2.76 MPa. When 350 g of TFE was charged, the stirring was stopped and the pressure was released until the reactor was adjusted to the atmospheric pressure. The aqueous dispersion was collected from the reactor and cooled so that the paraffin wax was separated. The particles contained in the resulting PTFE aqueous dispersion had an average primary particle size of 157 nm. The solid content in the resulting PTFE aqueous dispersion was 8.9% by mass.

The resulting PTFE aqueous dispersion was vigorously stirred and coagulated until solidification occurred, and the resulting agglomerate was dried at 150° C. for 18 hours, whereby PTFE powder was obtained.

The resulting PTFE had a standard specific gravity of 2.184. This demonstrates that the resulting PTFE was a high-molecular-weight PTFE.

The resulting PTFE aqueous dispersion was vigorously stirred and coagulated in the same manner until solidification occurred, and the resulting agglomerate was dried at 150° C. or 210° C. for 18 hours, whereby PTFE powder was obtained.

Example 3

To an autoclave made of SUS with an internal volume of 6 L, 3,600 g of deionized degassed water, 180 g of paraffin wax, and 0.360 g of sodium laurate were added. The reactor was sealed and the system was purged with nitrogen, so that oxygen was removed. The reactor was heated up to 70° C. and TFE was filled into the reactor such that the reactor was adjusted to 2.76 MPa. Then, 0.50 g of oxalic acid serving as a polymerization initiator was charged thereinto, and an aqueous potassium permanganate solution was continuously added, whereby the polymerization was immediately initiated. TFE was charged so as to keep the reaction pressure constant at 2.76 MPa. An aqueous potassium permanganate solution equivalent to 0.655 g in terms of potassium permanganate solid was continuously charged. When 350 g of TFE was charged, the stirring was stopped and the pressure was released until the reactor was adjusted to the atmospheric pressure. The aqueous dispersion was collected from the reactor and cooled so that the paraffin wax was separated. The particles contained in the resulting PTFE aqueous dispersion had an average primary particle size of 229 nm. The solid content in the resulting PTFE aqueous dispersion was 9.0% by mass.

The resulting PTFE aqueous dispersion was vigorously stirred and coagulated until solidification occurred, and the resulting agglomerate was dried at 150° C. for 18 hours, whereby PTFE powder was obtained.

The resulting PTFE had a standard specific gravity of 2.182. This demonstrates that the resulting PTFE was a high-molecular-weight PTFE.

The resulting PTFE aqueous dispersion was vigorously stirred and coagulated in the same manner until solidification occurred, and the resulting agglomerate was dried at 150° C. or 210° C. for 18 hours, whereby PTFE powder was obtained.

Comparative Example 1: To an autoclave made of SUS with an internal volume of 6 L, 3,600 g of deionized degassed water, 180 g of paraffin wax, and 0.540 g of sodium dodecyl sulfate were added. The reactor was sealed and the system was purged with nitrogen, so that oxygen was removed. The reactor was heated up to 90° C. and TFE was filled into the reactor such that the reactor was adjusted to 2.76 MPa. Then, 0.031 g of ammonium persulfate (APS) and 1.488 g of disuccinic acid peroxide (DSP) serving as polymerization initiators were charged thereinto. TFE was charged so as to keep the reaction pressure constant at 2.76 MPa.

During the reaction, an aqueous sodium dodecyl sulfate solution was continuously added so that the amount of sodium dodecyl sulfate was 0.612 g. When 350 g of TFE was charged, the stirring was stopped and the pressure was released until the reactor was adjusted to the atmospheric pressure. The aqueous dispersion was collected from the reactor and cooled so that the paraffin wax was separated. The particles contained in the resulting PTFE aqueous dispersion had an average primary particle size of 209 nm. The solid content in the resulting PTFE aqueous dispersion was 9.0% by mass.

The resulting PTFE aqueous dispersion was dried at 150° C. for 18 hours. The resulting PTFE powder had a peak temperature of 344° C.

Comparative Example 2

The reaction was performed under the same conditions as in Comparative Example 1 except that 750 g of TFE was charged into the reactor. The particles contained in the resulting PTFE aqueous dispersion had an average primary particle size of 268 nm. The solid content in the resulting PTFE aqueous dispersion was 17.5% by mass.

The resulting PTFE aqueous dispersion was dried at 150° C. for 18 hours.

Synthesis Example 2

To a glass reactor with an internal volume of 1 L and equipped with a stirrer, 658.0 g of deionized water and 35.0 g of sodium laurate were added. The reactor was sealed, and the system was purged with nitrogen, so that oxygen was removed. The reactor was heated up to 90° C. and pressurized to 0.4 MPa with nitrogen. Then, 6.90 g of ammonium persulfate (APS) was charged thereinto and stirred for 3 hours. The stirring was stopped, the pressure was released until the reactor was adjusted to the atmospheric pressure, and the reactor was cooled.

An aqueous ammonia solution was gradually added to the resulting aqueous surfactant solution with stirring to provide an aqueous surfactant solution B having a pH adjusted to 8.5. The concentration of sodium laurate in this aqueous surfactant solution B was 4.75% by mass.

Example 4

To an autoclave made of SUS with an internal volume of 3 L, 1,800 g of deionized water, 90 g of paraffin wax, 0.540 g of sodium laurate, and 0.25 g of oxalic acid were added. The reactor was sealed and the system was purged with nitrogen, so that oxygen was removed. The reactor was heated up to 70° C., 6.8 g of HFP was added thereto, and further pressurized to 2.70 MPa with TFE. The reaction was performed by continuously charging an aqueous potassium permanganate solution having a concentration of 1.0% by mass as a polymerization initiator into the reactor. TFE was charged so as to keep the reaction pressure constant at 2.70 MPa. When 45 g of TFE was charged, the stirring was stopped and the pressure was released until the reactor was adjusted to the atmospheric pressure. The aqueous dispersion was collected from the reactor and cooled so that the paraffin wax was separated. The particles contained in the resulting PTFE aqueous dispersion had an average primary particle size of 81 nm. The solid concentration of the resulting PTFE aqueous dispersion was 2.5% by mass.

The resulting PTFE aqueous dispersion was coagulated under high speed stirring conditions, and water was separated. The coagulated wet powder was dried at 210° C. for 18 hours. The resulting PTFE powder had an HFP modification amount of 0.06% by mass and a peak temperature of 328° C.

Example 5

To an autoclave made of SUS with an internal volume of 3 L, 1,454 g of deionized water, 90 g of paraffin wax, and 355 g of the PTFE aqueous dispersion obtained in Example 4 were added. The reactor was sealed and the system was purged with nitrogen, so that oxygen was removed. The reactor was heated up to 85° C. and TFE was filled into the reactor such that the reactor was adjusted to 2.70 MPa. Then, 0.5724 g of disuccinic acid peroxide (DSP) serving as a polymerization initiator was charged thereinto. TFE was charged so as to keep the reaction pressure constant at 2.70 MPa. The aqueous surfactant solution B obtained in Synthesis Example 2 was immediately and continuously charged into the reactor. Further, an aqueous disuccinic acid peroxide solution having a concentration of 2.0% by mass was continuously charged into the reactor. When 175 g of TFE was charged, the stirring was stopped and the pressure was released until the reactor was adjusted to the atmospheric pressure. By the end of the reaction, 27.4 g of the aqueous surfactant solution B and 30 g of the aqueous disuccinic acid peroxide solution were charged. The aqueous dispersion was collected from the reactor and cooled so that the paraffin wax was separated. The particles contained in the resulting PTFE aqueous dispersion had an average primary particle size of 216 nm. The solid concentration of the resulting PTFE aqueous dispersion was 8.5% by mass.

The resulting PTFE aqueous dispersion was coagulated under high speed stirring conditions, and water was separated. The coagulated wet powder was dried at 210° C. for 18 hours. The resulting PTFE powder had an SSG of 2.201 and an HFP modification amount of 0.003% by mass.

Example 6

To an autoclave made of SUS with an internal volume of 3 L, 1,780 g of deionized water, 90 g of paraffin wax, and 0.270 g of sodium laurate were added. The reactor was sealed and the system was purged with nitrogen, so that oxygen was removed. The reactor was heated up to 85° C., 7.0 g of HFP was added thereto, and further pressurized to 2.70 MPa with TFE. A polymerization initiator aqueous solution prepared by dissolving 0.310 g of ammonium persulfate (APS) in 20 g of pure water was charged into the reactor. TFE was charged so as to keep the reaction pressure constant at 2.70 MPa. When 45 g of TFE was charged, the stirring was stopped and the pressure was released to the atmospheric pressure. The reactor was immediately filled with TFE and the reaction pressure was set to 2.70 MPa. The stirring was restarted to continue the reaction. The aqueous surfactant solution B obtained in Synthesis Example 2 was immediately and continuously charged into the reactor. Further, an aqueous disuccinic acid peroxide solution having a concentration of 2.0% by mass was continuously charged into the reactor. When 685 g of TFE was charged, the stirring was stopped and the pressure was released until the reactor was adjusted to the atmospheric pressure. By the end of the reaction, 47.0 g of the aqueous surfactant solution B and 14.5 g of the aqueous disuccinic acid peroxide solution were charged. The aqueous dispersion was collected from the reactor and cooled so that the paraffin wax was separated. The particles contained in the resulting PTFE aqueous dispersion had an average primary particle size of 189 nm. The solid concentration of the resulting PTFE aqueous dispersion was 26.8% by mass.

The resulting PTFE aqueous dispersion was coagulated under high speed stirring conditions, and water was separated. The coagulated wet powder was dried at 210° C. for 18 hours. The resulting PTFE powder had an SSG of 2.198 and an HFP modification amount of 0.03% by mass.

Synthesis Example 3

To deionized water, 0.273 g of lauric acid was added, and then ammonia water was gradually added with stirring to obtain 30 g of an aqueous surfactant solution C. The aqueous surfactant solution C had a pH of 8.5.

Synthesis Example 4

To deionized water, 5 g of lauric acid was added, and then ammonia water was gradually added with stirring to obtain an aqueous surfactant solution D having a pH adjusted to 8.5. The concentration of lauric acid in this aqueous surfactant solution D was 4.35% by mass.

Example 7

To an autoclave made of SUS with an internal volume of 3 L, 1,750 g of deionized water, 90 g of paraffin wax, and 30 g of an aqueous surfactant solution C were added. The reactor was sealed and the system was purged with nitrogen, so that oxygen was removed. The reactor was heated up to 85° C., 7.0 g of HFP was added thereto, and further pressurized to 2.70 MPa with TFE. A polymerization initiator aqueous solution prepared by dissolving 0.310 g of ammonium persulfate (APS) in 20 g of pure water was charged into the reactor. TFE was charged so as to keep the reaction pressure constant at 2.70 MPa. When 45 g of TFE was charged, the stirring was stopped and the pressure was released to the atmospheric pressure. The reactor was immediately filled with TFE and the reaction pressure was set to 2.70 MPa. The stirring was restarted to continue the reaction. The aqueous surfactant solution D obtained above was immediately and continuously charged into the reactor. Further, an aqueous disuccinic acid peroxide solution having a concentration of 2.0% by mass was charged into the reactor. When 375 g of TFE was charged, the stirring was stopped and the pressure was released until the reactor was adjusted to the atmospheric pressure. By the end of the reaction, 27 g of the aqueous surfactant solution D and 14 g of the aqueous disuccinic acid peroxide solution were charged. The resulting aqueous dispersion was collected from the reactor and cooled so that the paraffin wax was separated. The particles contained in the resulting PTFE aqueous dispersion had an average primary particle size of 144 nm. The solid concentration of the resulting PTFE aqueous dispersion was 16.9% by mass.

The resulting PTFE aqueous dispersion was coagulated under high speed stirring conditions, and water was separated. The coagulated wet powder was dried at 210° C. for 18 hours. The resulting PTFE powder had an SSG of 2.205, a peak temperature of 339° C., and an HFP modification amount of 0.03% by mass.

Example 8

To an autoclave made of SUS with an internal volume of 3 L, 1,500 g of deionized water and 0.225 g of sodium laurate were added. The reactor was sealed and the system was purged with nitrogen to remove oxygen. The temperature of the reactor was raised to 80° C., and while stirring, a monomer composition (initial monomer) consisting of vinylidene fluoride (VDF)/tetrafluoroethylene (TFE)/ hexafluoropropylene (HFP) (=19/11/70 mol %) was fed under pressure until the pressure reaches 1.53 MPa. Then, a polymerization initiator aqueous solution prepared by dissolving 0.030 g of ammonium persulfate (APS) in deionized water was fed under nitrogen gas pressure to initiate the reaction. At the point when the internal pressure dropped to 1.50 MPa as the polymerization proceeded, a mixed monomer consisting of VDF/TFE/HFP (=50/20/30 mol %) was charged until the internal pressure was kept constant at 1.53 MPa. APS was dissolved in deionized water in an amount of 0.15 g after 100 minutes, 0.03 g after 180 minutes, 0.03 g after 240 minutes, and 0.75 g after 300 minutes from the initiation of polymerization, and fed under nitrogen gas pressure to continue the polymerization reaction. When 512 g of the mixed monomer was added, the stirring was stopped and the pressure was released until the reactor was adjusted to the atmospheric pressure. The autoclave was cooled to obtain an aqueous dispersion having a solid concentration of 23.4% by mass.

An aqueous aluminum sulfate solution was added to the aqueous dispersion to cause coagulation. The resulting coagulated product was washed with water and dried to obtain a rubbery fluorine-containing copolymer. The Mooney viscosity of the rubbery fluorine-containing copolymer was ML1+20 (140° C.)=114.8. The copolymer compositional features were determined by NMR analysis to be VDF/TFE/HFP=50/20/30 (mol %).

TABLE 7

Measurement results of content of compounds represented
by General Formula (1): (H—(CF2)m-COO)pM1

| | Example 1 | | Example 2 | | | Example 3 |
|---|---|---|---|---|---|---|
| | Aqueous dispersion after polymerization | Powder after drying at 150° C. | Aqueous dispersion after polymerization | Powder after drying at 150° C. | Powder after drying at 210° C. | Aqueous dispersion after polymerization |
| m= | ppb/polymer | ppb/polymer | ppb/polymer | ppb/polymer | ppb/polymer | ppb/polymer |
| 3 | 8.3E+04 | quantification limit or lower | 2.2E+04 | quantification limit or lower | quantification limit or lower | 3.0.E+02 |
| 4 | quantification limit or lower | quantification limit or lower | quantification limit or lower | quantification limit or lower | quantification limit or lower | 5.2.E+04 |
| 5 | 9.3E+04 | quantification limit or lower | 3.0E+04 | quantification limit or lower | quantification limit or lower | 4.3.E+02 |
| 6 | quantification limit or lower | quantification limit or lower | quantification limit or lower | quantification limit or lower | quantification limit or lower | 4.5.E+05 |
| 7 | 6.6E+04 | quantification limit or lower | 6.4E+04 | 3.5.E+01 | quantification limit or lower | 1.3.E+03 |
| 8 | quantification limit or lower | quantification limit or lower | quantification limit or lower | quantification limit or lower | quantification limit or lower | 8.4.E+05 |
| 9 | 9.0E+03 | quantification limit or lower | 1.2E+05 | quantification limit or lower | quantification limit or lower | 1.7.E+03 |
| 10 | quantification limit or lower | quantification limit or lower | quantification limit or lower | quantification limit or lower | quantification limit or lower | 8.4.E+05 |
| 11 | 4.4E+02 | quantification limit or lower | 1.0E+05 | 2.3.E+02 | 6.9.E+01 | 2.1.E+03 |
| 12 | quantification limit or lower | quantification limit or lower | quantification limit or lower | quantification limit or lower | quantification limit or lower | 1.9.E+05 |
| 13 | quantification limit or lower | quantification limit or lower | 2.4E+04 | 3.3.E+02 | 1.3.E+02 | quantification limit or lower |
| 14 | quantification limit or lower | quantification limit or lower | quantification limit or lower | quantification limit or lower | quantification limit or lower | 2.7.E+03 |
| 15 | 8.7E+01 | 1.7E+01 | 2.3E+04 | 4.5.E+03 | 2.6.E+02 | quantification limit or lower |
| 16 | quantification limit or lower | quantification limit or lower | quantification limit or lower | quantification limit or lower | quantification limit or lower | 5.6.E+03 |
| 17 | 1.8E+03 | 3.9E+02 | 6.6E+03 | 3.0.E+04 | 8.7.E+03 | 7.4.E+03 |
| 18 | quantification limit or lower | quantification limit or lower | quantification limit or lower | quantification limit or lower | quantification limit or lower | 4.1.E+03 |
| 19 | 1.9E+03 | 4.1E+02 | 9.7E+03 | 4.6.E+04 | 1.1.E+04 | 9.5.E+03 |
| Total | 2.5E+05 | 8.2E+02 | 4.0E+05 | 8.1E+04 | 2.0E+04 | 2.4.E+06 |

| | Example 4 Aqueous dispersion after polymerization | Example 5 Aqueous dispersion after polymerization | Example 6 Aqueous dispersion after polymerization | Example 7 Aqueous dispersion after polymerization | Comparative Example 2 Powder after drying at 150° C. |
|---|---|---|---|---|---|
| m= | ppb/polymer | ppb/polymer | ppb/polymer | ppb/polymer | ppb/polymer |
| 3 | 4.9.E+03 | 1.3.E+04 | 2.8.E+04 | 1.4.E+04 | quantification limit or lower |
| 4 | 2.4.E+04 | 1.0.E+03 | quantification limit or lower | quantification limit or lower | quantification limit or lower |
| 5 | 2.6.E+03 | 2.4.E+03 | 7.4.E+03 | 5.6.E+03 | quantification limit or lower |

TABLE 7-continued

Measurement results of content of compounds represented
by General Formula (1): (H—(CF2)m-COO)pM1

|  |  |  |  |  |  |
|---|---|---|---|---|---|
| 6 | 5.7.E+04 | 6.0.E+03 | quantification limit or lower | quantification limit or lower | quantification limit or lower |
| 7 | quantification limit or lower | 2.5.E+04 | 5.8.E+04 | 2.4.E+04 | quantification limit or lower |
| 8 | 1.2.E+05 | 7.4.E+03 | quantification limit or lower | quantification limit or lower | quantification limit or lower |
| 9 | 1.8.E+03 | 1.9.E+04 | 3.0.E+04 | 6.4.E+04 | 3.6E+02 |
| 10 | 1.1.E+05 | 1.2.E+04 | quantification limit or lower | quantification limit or lower | quantification limit or lower |
| 11 | 2.0.E+03 | 1.7.E+04 | 3.5.E+04 | 2.0.E+04 | 1.6E+03 |
| 12 | quantification limit or lower | 2.8.E+03 | quantification limit or lower | quantification limit or lower | quantification limit or lower |
| 13 | quantification limit or lower | 4.1.E+02 | 9.1.E+02 | 6.6.E+03 | 2.0E+03 |
| 14 | quantification limit or lower | quantification limit or lower | quantification limit or lower | quantification limit or lower | quantification limit or lower |
| 15 | quantification limit or lower | quantification limit or lower | 1.1.E+03 | 2.6.E+03 | 3.5E+03 |
| 16 | quantification limit or lower | quantification limit or lower | quantification limit or lower | quantification limit or lower | quantification limit or lower |
| 17 | quantification limit or lower | quantification limit or lower | 3.2.E+02 | 2.1.E+03 | 5.0E+03 |
| 18 | quantification limit or lower | quantification limit or lower | quantification limit or lower | quantification limit or lower | quantification limit or lower |
| 19 | quantification limit or lower | quantification limit or lower | 8.1.E+02 | 6.7.E+03 | 1.3E+03 |
| Total | 3.3.E+05 | 1.1.E+05 | 1.6.E+05 | 1.5.E+05 | 1.4E+04 |

TABLE 8

Measurement results of content of compounds represented
by General Formula (2): (H—(CF2)n-SO3)qM2

|  | Example 1 | | Example 2 | | | Example 3 |
|---|---|---|---|---|---|---|
|  | Aqueous dispersion after polymerization | Powder after drying at 150° C. | Aqueous dispersion after polymerization | Powder after drying at 150° C. | Powder after drying at 210° C. | Aqueous dispersion after polymerization |
| m= | ppb/polymer | ppb/polymer | ppb/polymer | ppb/polymer | ppb/polymer | ppb/polymer |
| 4 | quantification limit or lower | quantification limit or lower | quantification limit or lower | quantification limit or lower | quantification limit or lower | quantification limit or lower |
| 5 | quantification limit or lower | quantification limit or lower | quantification limit or lower | quantification limit or lower | quantification limit or lower | quantification limit or lower |
| 6 | quantification limit or lower | quantification limit or lower | quantification limit or lower | quantification limit or lower | quantification limit or lower | quantification limit or lower |
| 7 | quantification limit or lower | quantification limit or lower | quantification limit or lower | quantification limit or lower | quantification limit or lower | quantification limit or lower |
| 8 | quantification limit or lower | quantification limit or lower | quantification limit or lower | quantification limit or lower | quantification limit or lower | quantification limit or lower |
| 9 | quantification limit or lower | quantification limit or lower | quantification limit or lower | quantification limit or lower | quantification limit or lower | quantification limit or lower |
| 10 | quantification limit or lower | quantification limit or lower | quantification limit or lower | quantification limit or lower | quantification limit or lower | quantification limit or lower |
| 11 | quantification limit or lower | quantification limit or lower | quantification limit or lower | quantification limit or lower | quantification limit or lower | quantification limit or lower |
| 12 | quantification limit or lower | quantification limit or lower | quantification limit or lower | quantification limit or lower | quantification limit or lower | quantification limit or lower |
| 13 | quantification limit or lower | quantification limit or lower | quantification limit or lower | quantification limit or lower | quantification limit or lower | quantification limit or lower |
| 14 | quantification limit or lower | quantification limit or lower | quantification limit or lower | quantification limit or lower | quantification limit or lower | quantification limit or lower |
| 15 | quantification limit or lower | quantification limit or lower | quantification limit or lower | quantification limit or lower | quantification limit or lower | quantification limit or lower |
| 16 | quantification limit or lower | quantification limit or lower | quantification limit or lower | quantification limit or lower | quantification limit or lower | quantification limit or lower |
| 17 | quantification limit or lower | quantification limit or lower | quantification limit or lower | quantification limit or lower | quantification limit or lower | quantification limit or lower |
| 18 | quantification limit or lower | quantification limit or lower | quantification limit or lower | quantification limit or lower | quantification limit or lower | quantification limit or lower |
| 19 | quantification limit or lower | quantification limit or lower | quantification limit or lower | quantification limit or lower | quantification limit or lower | quantification limit or lower |

TABLE 8-continued

Measurement results of content of compounds represented
by General Formula (2): (H—(CF2)n-SO3)qM2

| 20 | quantification limit or lower | quantification limit or lower | quantification limit or lower | quantification limit or lower | quantification limit or lower | quantification limit or lower |
|---|---|---|---|---|---|---|
| Total | quantification limit or lower | quantification limit or lower | quantification limit or lower | quantification limit or lower | quantification limit or lower | quantification limit or lower |

| | Example 4 Aqueous dispersion after polymerization | Example 5 Aqueous dispersion after polymerization | Example 6 Aqueous dispersion after polymerization | Example 7 Aqueous dispersion after polymerization | Comparative Example 2 Powder after drying at 150° C. |
|---|---|---|---|---|---|
| m= | ppb/polymer | ppb/polymer | ppb/polymer | ppb/polymer | ppb/polymer |
| 4 | quantification limit or lower | quantification limit or lower | quantification limit or lower | quantification limit or lower | 3.8E+01 |
| 5 | quantification limit or lower | quantification limit or lower | quantification limit or lower | quantification limit or lower | quantification limit or lower |
| 6 | quantification limit or lower | quantification limit or lower | quantification limit or lower | quantification limit or lower | 5.3E+02 |
| 7 | quantification limit or lower | quantification limit or lower | quantification limit or lower | quantification limit or lower | quantification limit or lower |
| 8 | quantification limit or lower | quantification limit or lower | quantification limit or lower | quantification limit or lower | 6.5E+02 |
| 9 | quantification limit or lower | quantification limit or lower | quantification limit or lower | quantification limit or lower | quantification limit or lower |
| 10 | quantification limit or lower | quantification limit or lower | quantification limit or lower | quantification limit or lower | 4.9E+02 |
| 11 | quantification limit or lower | quantification limit or lower | quantification limit or lower | quantification limit or lower | quantification limit or lower |
| 12 | quantification limit or lower | quantification limit or lower | quantification limit or lower | quantification limit or lower | 2.2E+02 |
| 13 | quantification limit or lower | quantification limit or lower | quantification limit or lower | quantification limit or lower | quantification limit or lower |
| 14 | quantification limit or lower | quantification limit or lower | quantification limit or lower | quantification limit or lower | 9.5E+01 |
| 15 | quantification limit or lower | quantification limit or lower | quantification limit or lower | quantification limit or lower | quantification limit or lower |
| 16 | quantification limit or lower | quantification limit or lower | quantification limit or lower | quantification limit or lower | quantification limit or lower |
| 17 | quantification limit or lower | quantification limit or lower | quantification limit or lower | quantification limit or lower | quantification limit or lower |
| 18 | quantification limit or lower | quantification limit or lower | quantification limit or lower | quantification limit or lower | quantification limit or lower |
| 19 | quantification limit or lower | quantification limit or lower | quantification limit or lower | quantification limit or lower | quantification limit or lower |
| 20 | quantification limit or lower | quantification limit or lower | quantification limit or lower | quantification limit or lower | quantification limit or lower |
| Total | quantification limit or lower | quantification limit or lower | quantification limit or lower | quantification limit or lower | 2.0E+03 |

The quantification limit of the aqueous dispersion was 86 ppb/PTFE, and the quantification limit of the powder was 13 ppb/PTFE.

The invention claimed is:

1. A method for producing a fluoropolymer, comprising:
polymerizing a fluoromonomer in an aqueous medium in the presence of a surfactant to provide a fluoropolymer, and
drying the fluoropolymer obtained in the polymerization at 155° C. or higher while air is circulated in a drying furnace,
wherein the fluoropolymer is polytetrafluoroethylene or modified polytetrafluoroethylene having modifying monomer units in a range of 0.00001 to 1% by mass,
the surfactant is a carboxylic acid-based hydrocarbon-containing surfactant represented by the following formula (A):

$$R—COO-M \qquad (A)$$

wherein R is a non-halogenated alkyl group free from halogen atoms or a non-halogenated alkylene group free from halogen atoms, each of which optionally contains an ether bond; M is H, a metal atom, $NR^{11}_4$, imidazolium optionally having a substituent, pyridinium optionally having a substituent, or phosphonium optionally having a substituent; and $R^{11}$ is the same or different and is H or an organic group having 1 to 10 carbon atoms,
in the polymerization, a redox initiator as a polymerization initiator is added to the aqueous medium, wherein an oxidizing agent for the redox initiator is selected from the group consisting of organic peroxides, permanganic acid, permanganates, manganese triacetate $(C_6H_9MnO_6)$, cerium (IV) salts, bromic acid and salts of bromic acid,
in the polymerization, the carboxylic acid-based hydrocarbon-containing surfactant at the initial stage of polymerization is in an amount of 90 ppm or more based on the aqueous medium, the polymerization provides a fluoropolymer aqueous dispersion, and the fluoropolymer aqueous dispersion is substantially free from a compound represented by the following formula (3), and contains greater than 20 ppm of a compound represented by the following formula (4) based on the fluoropolymer, $$(H—(CF_2)_8—SO_3)_qM^2 \qquad \text{Formula (3)}$$

wherein $M^2$ is H, a metal atom, $NR^{11}_4$, imidazolium optionally having a substituent, pyridinium optionally having a substituent, or phosphonium optionally having a substituent; q is 1 or 2; and $R^{11}$ is the same or different and is H or an organic group having 1 to 10 carbon atoms, $$(H—(CF_2)_7—COO)_pM^1 \qquad \text{Formula (4)}$$

wherein $M^1$ is H, a metal atom, $NR^5_4$, imidazolium optionally having a substituent, pyridinium optionally having a substituent, or phosphonium optionally having a substituent; and p is 1 or 2; and $R^5$ is the same or different and is H or an organic group having 1 to 10 carbon atoms.

2. The method according to claim 1, wherein in the polymerization, the fluoromonomer is polymerized in an aqueous medium substantially free from a nonionic surfactant.

3. The method according to claim 1, wherein the carboxylic acid-based hydrocarbon-containing surfactant is free from a carbonyl group which is not in a carboxyl group.

4. The method according to claim 1, wherein in the polymerization, the carboxylic acid-based hydrocarbon-containing surfactant is added to the aqueous medium before the initiation of polymerization or when the concentration of fluoropolymer particles formed in the aqueous medium is 0.36% by mass or less.

5. The method according to claim 1, wherein in the polymerization, the carboxylic acid-based hydrocarbon-containing surfactant is added to the aqueous medium before the initiation of polymerization.

6. The method according to claim 1, wherein in the polymerization, the polymerization temperature is 30 to 100° C.; and
the polymerization pressure is 0.5 to 5.0 MPa.

7. The method according to claim 1, wherein in the polymerization, the polymerization temperature is 30 to 100° C.;
the polymerization pressure is 0.5 to 5.0 MPa; and
the carboxylic acid-based hydrocarbon-containing surfactant is free from a carbonyl group which is not in a carboxyl group.

8. The method according to claim 1, wherein in the polymerization, the polymerization temperature is 30 to 100° C.;
the polymerization pressure is 0.5 to 5.0 MPa; and
the carboxylic acid-based hydrocarbon-containing surfactant is added to the aqueous medium before the initiation of polymerization or when the concentration of fluoropolymer particles formed in the aqueous medium is 0.36% by mass or less.

9. The method according to claim 1, wherein in the polymerization, the polymerization temperature is 30 to 100° C.;
the polymerization pressure is 0.5 to 5.0 MPa; and
the carboxylic acid-based hydrocarbon-containing surfactant is added to the aqueous medium before the initiation of polymerization.

10. The method according to claim 1, wherein in the polymerization, the polymerization temperature is 30 to 100° C.;
the polymerization pressure is 0.5 to 5.0 MPa;
the carboxylic acid-based hydrocarbon-containing surfactant is added to the aqueous medium before the initiation of polymerization or when the concentration of fluoropolymer particles formed in the aqueous medium is 0.36% by mass or less; and
the carboxylic acid-based hydrocarbon-containing surfactant is free from a carbonyl group which is not in a carboxyl group.

11. The method according to claim 1, wherein the oxidizing agent for the redox initiator is selected from the group consisting of disuccinic acid peroxide, diglutaric acid peroxide, permanganic acid, ammonium permanganate, alkali metal salts of permanganate, manganese triacetate $(C_6H_9MnO_6)$, cerium ammonium nitrate, cerium ammonium sulfate, bromic acid, ammonium bromate, alkali metal salts of bromate, and alkaline earth metal salts of bromate.

12. The method according to claim 1, wherein

R in the formula (A) is a linear alkyl group with the number of carbon atoms of 5 to 23.

13. The method according to claim 1, wherein the carboxylic acid-based hydrocarbon-containing surfactant represented by the formula (A) is a salt of lauric acid.

14. The method according to claim 1, wherein the carboxylic acid-based hydrocarbon-containing surfactant represented by the formula (A) is sodium laurate or ammonium laurate.

* * * * *